(12) United States Patent
Nel et al.

(10) Patent No.: US 12,551,542 B2
(45) Date of Patent: Feb. 17, 2026

(54) POLYMERIC NANOPARTICLES THAT TARGET LIVER SINUSOIDAL ENDOTHELIAL CELLS TO INDUCE ANTIGEN-SPECIFIC IMMUNE TOLERANCE

(71) Applicant: The Regents of the University of California, Oakland, CA (US)

(72) Inventors: Andre E. Nel, Sherman Oaks, CA (US); Tian Xia, Los Angeles, CA (US); Qi Liu, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 874 days.

(21) Appl. No.: 17/775,245

(22) PCT Filed: Nov. 11, 2020

(86) PCT No.: PCT/US2020/060036
§ 371 (c)(1),
(2) Date: May 6, 2022

(87) PCT Pub. No.: WO2021/096972
PCT Pub. Date: May 20, 2021

(65) Prior Publication Data
US 2022/0395563 A1 Dec. 15, 2022

Related U.S. Application Data

(60) Provisional application No. 62/706,002, filed on Jul. 24, 2020, provisional application No. 62/933,898, filed on Nov. 11, 2019.

(51) Int. Cl.
| | |
|---|---|
| *A61K 9/16* | (2006.01) |
| *A61K 31/436* | (2006.01) |
| *A61K 39/00* | (2006.01) |
| *A61K 39/35* | (2006.01) |
| *A61P 11/06* | (2006.01) |
| *A61P 37/08* | (2006.01) |

(52) U.S. Cl.
CPC ........ *A61K 39/0008* (2013.01); *A61K 31/436* (2013.01); *A61K 39/001* (2013.01); *A61K 39/35* (2013.01); *A61P 11/06* (2018.01); *A61P 37/08* (2018.01); *A61K 2039/54* (2013.01); *A61K 2039/6031* (2013.01); *A61K 2039/6093* (2013.01); *A61K 2039/627* (2013.01)

(58) Field of Classification Search
None
See application file for complete search history.

(56) References Cited

U.S. PATENT DOCUMENTS

| | | | |
|---|---|---|---|
| 5,023,262 A | 6/1991 | Caufield et al. | |
| 5,120,725 A | 6/1992 | Kao et al. | |
| 5,120,727 A | 6/1992 | Kao et al. | |
| 5,120,842 A | 6/1992 | Failli et al. | |
| 5,177,203 A | 1/1993 | Failli et al. | |
| 5,416,016 A | 5/1995 | Low et al. | |
| 6,335,435 B1 | 1/2002 | Shimamoto et al. | |
| 6,528,631 B1 | 3/2003 | Cook et al. | |
| 6,651,655 B1 | 11/2003 | Licalsi et al. | |
| 6,656,730 B1 | 12/2003 | Manoharan | |
| 6,861,514 B2 | 3/2005 | Cook et al. | |
| 6,919,439 B2 | 7/2005 | Manoharan et al. | |
| 9,295,718 B2 * | 3/2016 | Fraser | G01N 33/56972 |
| 2004/0249178 A1 | 12/2004 | Vargeese et al. | |
| 2005/0058643 A1 | 3/2005 | Wraith et al. | |
| 2009/0155292 A1 | 6/2009 | Santamaria et al. | |
| 2014/0328921 A1 | 11/2014 | Maldonado | |
| 2015/0118318 A1 | 4/2015 | Fahmy et al. | |
| 2017/0020926 A1 | 1/2017 | Mata-Fink et al. | |

(Continued)

FOREIGN PATENT DOCUMENTS

| | | |
|---|---|---|
| CA | 2473469 C | 4/2012 |
| EP | 467606 | 1/1992 |
| WO | WO 92/005179 | 4/1992 |

(Continued)

OTHER PUBLICATIONS

Pearson et al. "Controlled Delivery of Single or Multiple Antigens in Tolerogenic Nanoparticles Using Peptide-Polymer Bioconjugates", Molecular Therapy vol. 25 No 7; pp. 1655-1664 (Year: 2017).*
International Search Report and Written Opinion, dated Mar. 25, 2021, from corresponding International Application No. PCT/US20/60036.
Liu et al., "Use of Polymeric Nanoparticle Platform Targeting the Liver to Induce Treg-Mediated Antigen-Specific Immune Tolerance in a Pulmonary Allergen Sensitization Model", ACS Nano, Apr. 2019, 13:4778-4794.
Extended European Search Report, dated May 26, 2023, from corresponding EP Application No. 20888468.4.
Rai et al., "Polymeric Nanoparticles in Gene Therapy: New Avenues of Design and Optimization for Delivery Applications", Polymers, Apr. 25, 2019; 11:745, doi:10.3390/polym11040745.

(Continued)

*Primary Examiner* — Susan T Tran
(74) *Attorney, Agent, or Firm* — Mark S. Cohen; PEARL COHEN ZEDEK LATZER BARATZ LLP

(57) ABSTRACT

In various embodiments tolerogenic nanoparticles are provided that induce immune tolerance to one or more desired antigen(s) and/or that reduce an immune response to those antigen(s). In certain embodiments the tolerogenic nanoparticle comprises a nanoparticle comprising a biocompatible polymer; an antigen disposed within or attached to said biocompatible polymer where said antigen comprises an antigen to which immune tolerance is to be induced by administration of said tolerogenic nanoparticle to a mammal; and a first targeting moiety that binds to a scavenger receptor in the liver, and/or a second targeting moiety that binds to a mannose receptor in the liver, and/or a third targeting moiety that binds to hepatocytes, wherein said first and/or second and/or third targeting moiety are attached to the surface of said nanoparticle.

16 Claims, 60 Drawing Sheets

Specification includes a Sequence Listing.

(56) References Cited

U.S. PATENT DOCUMENTS

2019/0060354 A1    2/2019  Getts
2019/0202875 A1    7/2019  Peters et al.

FOREIGN PATENT DOCUMENTS

WO    WO 2007087341    8/2007
WO    WO-2007087341 A2 *  8/2007  ........... A61K 39/385

OTHER PUBLICATIONS

Marin et al., "Critical evaluation of biodegradable polymers used in nanodrugs", Int. J. Nanomed., Aug. 2013; 8: 3071-3091.
Wing et al., "Regulatory T Cells Exert Checks and Balances on Self Tolerance and Autoimmunity", Nat. Immunol., Jan. 2010; 11(1): 7-13.
Sharabi et al., "Regulatory T Cells in the Treatment of Disease", Nat. Rev. Drug Discovery, Nov. 2018; 17(11): 823-844.
Smith et al., "Applications of Nanotechnology for Immunology", Nat. Rev. Immunol., Jul. 2013; 13(8): 592-605.
Getts et al., "Harnessing Nanoparticles for Immune Modulation", Trends Immunol., Jul. 2015; 36(7): 419-427.
Gomes et al., "Harnessing Nanoparticles for Immunomodulation and Vaccines", Vaccines, Feb. 2017; 5(1): 6, 15 pages.
Irvine et al., "Synthetic Nanoparticles for Vaccines and Immunotherapy", Chem. Rev., Oct. 2015; 115(19): 11109-11146.
Irvine et al., "Engineering Synthetic Vaccines Using Cues from Natural Immunity", Nat. Mater., Oct. 2013; 12(11): 978-990.
Racanelli et al., "The Liver as an Immunological Organ", Hepatology, Feb. 2006; 43(2)Suppl. 1: S54-S62.
Madariaga et al., "Organ-Specific Differences in Achieving Tolerance", Curr. Opin. Organ Transplant, Aug. 2015; 20(4): 392-399.
Luth et al., "Ectopic Expression of Neural Autoantigen in Mouse Liver Suppresses Experimental Autoimmune Neuroinflammation by Inducing Antigen-Specific Tregs", J. Clin. Invest., Oct. 2008; 118(10): 3403-3410.
Thomson et al., "Antigen-Presenting Cell Function in the Tolerogenic Liver Environment", Nat. Rev. Immunol., Nov. 2010; 10, 753-766.
Crispe, I.N., "Liver Antigen-Presenting Cells", J. Hepatol., Feb. 2011; 54(2): 357-365.
Sorensen et al., "The scavenger endothelial cell—a new player in homeostasis and immunity", Am. J. Physiol. Regul. Integr. Comp. Physiol., Oct. 2012; 303(12): R1217-R1230.
Desjardins et al., "Phagocytosis: Latex Leads the Way", Curr. Opin. Cell Biol., Aug. 2003; 15(4): 498-503.
Limmer et al., "Efficient Presentation of Exogenous Antigen by Liver Endothelial Cells to Cd8+ T Cells Results in Antigen-Specific T-Cell Tolerance", Nat. Med., Dec. 2000, 6, 1348-1354.
Carambia et al., "TGF-B-dependent induction of CD4+CD25+ Foxp3+ Tregs by liver sinusoidal endothelial cells", J. Hepatol., Sep. 2014; 61(3): 594-599.
Carambia et al., "Nanoparticle-based autoantigen delivery to Treg-inducing liver sinusoidal endothelial cells enables control of autoimmunity in mice", J. Hepatol., Jun. 2015; 62(6): 1349-1356.
Tiegs et al., "Immune tolerance: What is unique about the liver", J. Autoimmun., Feb. 2010; 34(1): 1-6.
Kishimoto et al., "Nanoparticles for the Induction of Antigen-Specific Immunological Tolerance", Front. Immunol., Feb. 2018; 9: 230.
Adams et al., "Costimulation Blockade in Autoimmunity and Transplantation: The CD28 Pathway", J. Immunol., Sep. 2016; 197(6): 2045-2050.
Esensten et al., "CD28 Costimulation: From Mechanism to Therapy", Immunity, May 2016; 44(5): 973-988.
Clemente-Casares et al., "Expanding Antigen-Specific Regulatory Networks to Treat Autoimmunity", Nature, Feb. 2016; 530(7591): 434-440.
Tsai et al., "Reversal of Autoimmunity by Boosting Memory-Like Autoregulatory T Cells", Immunity, Apr. 2010; 32(4): 568-580.
Kim et al., "Suppression of Collagen-Induced Arthritis by Single Administration of Poly (Lactic-Co-Glycolic Acid) Nanoparticles Entrapping Type II Collagen: A Novel Treatment Strategy for Induction of Oral Tolerance", Arthritis Rheum., Apr. 2002; 46(4): 1109-1120.
Dhadwar et al., "Repeated Oral Administration of Chitosan/DNA Nanoparticles Delivers Functional FVIII with the Absence of Antibodies in Hemophilia A Mice", J. Thromb. Haemostasis, Dec. 2010; 8(12): 2743-2750.
Goldmann et al., "Oral Gene Application Using Chitosan-DNA Nanoparticles Induces Transferable Tolerance", Clin. Vaccine Immunol., Oct. 2012; 19(11): 1758-1764.
Ramani et al., "Phosphatidylserine Containing Liposomes Reduce Immunogenicity of Recombinant Human Factor VIII (rFVIII) in a Murine Model of Hemophilia A", J. Pharm. Sci., Apr. 2008; 97(4): 1386-1398.
Birge et al., "Phosphatidylserine Is a Global Immunosuppressive Signal in Efferocytosis, Infectious Disease, and Cancer", Cell Death Differ., Feb. 2016; 23, 962-978.
Pearson et al., "In vivo Reprogramming of Immune Cells: Technologies for Induction of Antigen-Specific Tolerance", Adv. Drug Delivery Rev., May 2017; 114: 240-255.
Pearson et al., "Controlled Delivery of Single or Multiple Antigens in Tolerogenic Nanoparticles Using Peptide-Polymer Bioconjugates", Mol. Ther., Jul. 2017; 25(7): 1655-1664.
Kontos et al., "Engineering Antigens for in situ Erythrocyte Binding Induces T-Cell Deletion", Proc. Natl. Acad. Sci. U. S. A., Dec. 2012; 110: E60-E68.
Duong et al., "Decoration of T-Independent Antigen with Ligands for CD22 and Siglec-G Can Suppress Immunity and Induce B Cell Tolerance in vivo", J. Exp. Med., 2010, 207(1): 173-187.
Macauley et al., "Antigenic Liposomes Displaying CD22 Ligands Induce Antigen- Specific B Cell Apoptosis", J. Clin. Invest., Jun. 2013; 123: 3074-3083.
Maldonado et al., "Polymeric Synthetic Nanoparticles for the Induction of Antigen-Specific Immunological Tolerance", Proc. Natl. Acad. Sci. U. S. A., Dec. 2014; 112: E156-E165.
Tostanoski et al., "Reprogramming the Local Lymph Node Microenvironment Promotes Tolerance That Is Systemic and Antigen Specific", Cell Rep., Sep. 2016; 16: 2940-2952.
Lamothe et al., "Tolerogenic Nanoparticles Induce Antigen-Specific Regulatory T Cells and Provide Therapeutic Efficacy and Transferrable Tolerance against Experimental Auto- immune Encephalomyelitis", Front. Immunol., Mar. 2018; 9, 281.
Kumari et al., "Biodegradable Polymeric Nanoparticles Based Drug Delivery Systems", Colloids and Surfaces B: Biointerfaces, Jan. 2010; 75(1): 1-18.
Soppimath et al., "Biodegradable Polymeric Nanoparticles as Drug Delivery Devices", J. Controlled Release, Jan. 2001; 70(1-2): 1-20.
Li et al., "Role of liver sinusoidal endothelial cells and stabilins in elimination of oxidized low-density lipoproteins", Am. J. Physiol. Gastrointest. Liver Physiol., Jan. 2011; 300(1): G71-G81.
Van Berkel et al., "Different Fate in vivo of Oxidatively Modified Low Density Lipoprotein and Acetylated Low Density Lipoprotein in Rats. Recognition by Various Scavenger Receptors on Kupffer and Endothelial Liver Cells", J. Biol. Chem., Feb. 1991; 266(4): 2282-2289.
Hirose et al., "Mannose-Conjugated Alendronate Selectively Depletes Kupffer Cells and Inhibits Endotoxemic Shock in the Mice", Hepatol. Res., Sep. 2006; 36(1): 3-10.
Yamane et al., "Feasibility of Chitosan-Based Hyaluronic Acid Hybrid Biomaterial for a Novel Scaffold in Cartilage Tissue Engineering", Biomaterials, Feb. 2005; 26(6): 611-619.
Crispe et al., "Cellular and Molecular Mechanisms of Liver Tolerance", Immunol. Rev., Sep. 2006; 213(1): 101-118.
Crispe, "Hepatic T cells and liver tolerance", Nature Reviews Immunology, (2003) 3: 51-62.
Smarr et al., "Biodegradable Antigen-Associated PLG Nanoparticles Tolerize Th2-Mediated Allergic Airway Inflammation Pre- and Postsensitization", Proc. Natl. Acad. Sci. U. S. A., Apr. 2016; 113(18): 5059-5064.

(56) References Cited

OTHER PUBLICATIONS

Vanderlugt et al., "Epitope Spreading in Immune- Mediated Diseases: Implications for Immunotherapy", Nat. Rev. Immunol., Feb. 2002; 2(2): 85-95.
Hofmann et al., "Safety of a Peanut Oral Immunotherapy Protocol in Children with Peanut Allergy", J. Allergy Clin. Immunol., Aug. 2009; 124(2): 286-291.
Klugewitz et al., "Immunomodulatory Effects of the Liver: Deletion of Activated CD4+ Effector Cells and Suppression of IFN-γ-Producing Cells after Intravenous Protein Immunization", J. Immunol., 2002, 169: 2407-2413.
Elvevold et al., "The Liver Sinusoidal Endothelial Cell: A Cell Type of Controversial and Confusing Identity", Am. J. Physiol. Gastrointest. Liver Physiol., Feb. 2008; 294(2): G391- G400.
Falkowska-Hansen et al., "Clathrin-Coated Vesicles Form a Unique Net-Like Structure in Liver Sinusoidal Endothelial Cells by Assembling Along Undisrupted Microtubules", Exp. Cell Res., May 2007; 313(9): 1745-1757.
Kjeken et al., "Fluid Phase Endocytosis of Iodixanol in Rat Liver Parenchymal, Endothelial and Kupffer Cells", Cell Tissue Res., Mar. 2001; 304: 221-230.
Hansen et al., "Stabilin-1 and Stabilin-2 Are Both Directed into the Early Endocytic Pathway in Hepatic Sinusoidal Endothelium Via Interactions with Clathrin/Ap-2, Independent of Ligand Binding", Exp. Cell Res., Feb. 2005; 303(1): 160-173.
Andersson et al., "CD4+Foxp3+Regulatory T Cells Confer Infectious Tolerance in a TGF-ß-Dependent Manner", J. Exp. Med., Aug. 2008; 205(9): 1975-1981.
Bissell et al., "Cell- Specific Expression of Transforming Growth Factor-Beta in Rat Liver. Evidence for Autocrine Regulation of Hepatocyte Proliferation", J. Clin. Invest., Jul. 1995, 96, 447-455.
Akhter et al., "Ligand Density at the Surface of a Nanoparticle and Different Uptake Mechanism: Two Important Factors for Successful siRNA Delivery to Liver Endothelial Cells", Int. J. Pharm., Nov. 2014, 475(1-2): 227-237.
Shi et al., "Myeloid-Derived Suppressor Cell Function Is Diminished in Aspirin- Triggered Allergic Airway Hyperresponsiveness In Mice", J. Allergy Clin. Immunol., Nov. 2014; 134(5): 1163-1174.
Hirose et al., "Allergic Airway Inflammation: Key Players Beyond the Th2 Cell Pathway", Immunol. Rev., Jun. 2017; 278(1): 145-161.
Hammerich et al., "Emerging Roles of Myeloid Derived Suppressor Cells in Hepatic Inflammation and Fibrosis", World J. Gastrointest. Pathophysiolog., Aug. 2015; 6(3): 43-50.
Hochst et al., "Differential Induction of Ly6G and Ly6C Positive Myeloid Derived Suppressor Cells in Chronic Kidney and Liver Inflammation and Fibrosis", PLoS One, Mar. 2015; 10(3): e0119662.
Kishimoto et al., "Improving the Efficacy and Safety of Biologic Drugs with Tolerogenic Nanoparticles", Nat. Nanotechnol., Aug. 2016; 11(10): 890- 899.
Shen et al., "Killer Artificial Antigen-Presenting Cells Deplete Alloantigen-Specific T Cells in a Murine Model of Alloskin Transplantation", Immunol. Lett., Aug. 2011; 138(2): 144-155.
Whitekus et al., "Thiol Antioxidants Inhibit the Adjuvant Effects of Aerosolized Diesel Exhaust Particles in a Murine Model for Ovalbumin Sensitization", J. Immunol., Mar. 2002; 168(5): 2560-2567.
Hao et al., "Diesel Exhaust Particles Exert Acute Effects on Airway Inflammation and Function in Murine Allergen Provocation Models", J. Allergy Clin. Immunol., Nov. 2003; 112(5): 905-914.
Lu et al., "Nano- Enabled Pancreas Cancer Immunotherapy Using Immunogenic Cell Death and Reversing Immunosuppression", Nat. Commun., Nov. 2017; 8: 1811.
Carballido et al., "Taming Autoimmunity: Translating Antigen-Specific Approaches to Induce Immune Tolerance", Journal of Experimental Medicine, Feb. 2019; 216(2): 247-250.
Serra et al., "Antigen-Specific Therapeutic Approaches for Autoimmunity", Nature Biotechnology, Feb. 2019; 37(3): 238-251.
Shakya et al., "Antigen-Specific Tolerization and Targeted Delivery as Therapeutic Strategies for Autoimmune Diseases", Trends in Biotechnology, Jul. 2018; 36(7): 686-699.

Ben-Akiva et al., "Polymeric Micro- and Nanoparticles for Immune Modulation", Biomaterials Science, 2019, 7, 14-30.
Kishimoto et al., "Nanoparticles for the Induction of Antigen-Specific Immunological Tolerance", Frontiers in Immunology, Feb. 2018, vol. 9, Article 230.
Pozsgay et al., "Antigen-Specific Immunotherapies in Rheumatic Diseases", Nature Reviews Rheumatology, Jul. 2017; 13(9): 525-537.
Stabler et al., "Engineering Immunomodulatory Biomaterials for Type 1 Diabetes", Nature Reviews Materials, May 2019; 4, 429-450.
Vickery et al., "Mechanisms of Immune Tolerance Relevant to Food Allergy", Journal of Allergy and Clinical Immunology, 2011, 127, 576-584.
Sabatos-Peyton et al., "Antigen-Specific Immunotherapy of Autoimmune and|Allergic Diseases", Current Opinion in Immunology, Oct. 2010; 22(5): 609-615.
Sakaguchi et al., "Regulatory T Cells and Immune Tolerance", Cell, May 2008; 133(5): 775-787.
Bacher et al., "The Effect of Regulatory T Cells on Tolerance to Airborne Allergens|and Allergen Immunotherapy", Journal of Allergy and Clinical Immunology, Dec. 2018; 142(6): 1697-1709.
Jonuleit et al., "Treg Cells as Potential Cellular Targets for Functionalized|Nanoparticles in Cancer Therapy", Nanomedicine, Sep. 2016; 11(20): 2699-2709.
Serra et al., "Nanoparticle-Based Approaches to Immune Tolerance for the|Treatment of Autoimmune Diseases", European Journal of Immunology, Feb. 2018; 48: 751-756.
Yeste et al., "Tolerogenic Nanoparticles Inhibit T Cell-Mediated Autoimmunity|through SOCS2", Science Signaling, Jun. 2016; 9(433): ra61-ra61.
Anderson et al., "Prevalent CD8+ T Cell Response against One Peptide/MHC|Complex in Autoimmune Diabetes", Proceedings of the National Academy of Sciences, Aug. 1999; 96: 9311-9316.
Groux et al., "A CD4+T-Cell Subset Inhibits Antigen-Specific T-Cell Responses and Prevents Colitis", Nature, Oct. 1997; 389: 737-742.
Lieberman et al., "Identification of the ß Cell Antigen Targeted by a Prevalent|Population of Pathogenic CD8+ T Cells in Autoimmune Diabetes", Proceedings of the National Academy of Sciences, May 2003; 100(14): 8384-8388.
Macauley et al., "Siglecs Induce Tolerance to Cell Surface Antigens by Bim-Dependent Deletion of the Antigen-Reactive B Cells", The Journal of Immunology, Nov. 2014; 193(9): 4312-4321.
Sojka et al., "Mechanisms of Regulatory T-Cell Suppression—a Diverse Arsenal for a Moving Target", Immunology, 2008, 124: 13-22.
Corthay, "How Do Regulatory T Cells Work?", Scandinavian Journal of Immunology, 2009, 70: 326-336.
Kuo et al., "Peptide-Conjugated Nanoparticles Reduce Positive Co-Stimulatory|Expression and T Cell Activity to Induce Tolerance", Molecular Therapy, Jul. 2017; 25(7): 1676-1685.
Schneider et al., "Phosphatidylserine Converts Immunogenic Recombinant|Human Acid Alpha-Glucosidase to a Tolerogenic Form in a Mouse Model of Pompe Disease", Journal of Pharmaceutical Sciences, Oct. 2016; 105(10): 3097-3104.
Yeste et al., "Nanoparticle-Mediated Codelivery of Myelin Antigen and a|Tolerogenic Small Molecule Suppresses Experimental Autoimmune Encephalomyelitis", Proceedings of the National Academy of Sciences, Jul. 2012; 109(28): 11270-11275.
Doherty, "Immunity, Tolerance and Autoimmunity in the Liver: A Comprehensive Review", Journal of Autoimmunity, 2016, 66: 60-75.
Knolle et al., "Immunological Functions of Liver Sinusoidal Endothelial Cells", Cellular & Molecular Immunology, 2016, 13: 347-353.
Capini et al., "Antigen-Specific Suppression of Inflammatory Arthritis Using Liposomes", The Journal of Immunology, 2009, 182: 3556-3565.
Zhang et al., "Tolerogenic Nanoparticles to Induce Immunologic Tolerance: Prevention and Reversal of FVIII Inhibitor Formation", Cellular Immunology, 2016, 301: 74-81.
Thomson et al., "Immunoregulatory Functions of mTOR Inhibition", Nature Reviews Immunology, May 2009; 9(5): 324-337.

(56) References Cited

OTHER PUBLICATIONS

Perl, "Activation of mTOR (Mechanistic Target of Rapamycin) in Rheumatic Diseases", Nature Reviews Rheumatology, Mar. 2016; 12(3): 169-182.
Turnquist et al., "Rapamycin-Conditioned Dendritic Cells Are Poor Stimulators of Allogeneic CD4+ T Cells, but Enrich for Antigen-Specific Foxp3+ T Regulatory Cells and Promote Organ Transplant Tolerance", The Journal of Immunology, Jun. 2007; 178(11): 7018-7031.
Olivera et al., "Inhibition of the NF-kB Signaling Pathway by the Curcumin Analog,|3,5-Bis(2-Pyridinylmethylidene)-4-Piperidone (EF31): Anti-Inflammatory and Anti-Cancer Properties", International Immunopharmacology, Feb. 2012; 12(2): 368-377.
Prickett et al., "Immunoregulatory T cell epitope peptides: the new frontier in allergy therapy", Clin. & Exp. Allergy, Jun. 2015; 45(6): 1015-1026.
O'Hehir et al., "T Cell Epitope Peptide Therapy for Allergic Diseases", Curr. Allergy Asthma Rep. (2016) 16(2): 14.
Akdis et al., "Bypassing IgE and Targeting T Cells for Specific Immunotherapy of|Allergy", Trends in Immunology, Apr. 2001; 22(4): 175-178.
Pentier et al., "Advances in T-Cell Epitope Engineering", Frontiers in Immunology, Jun. 2013, 4: 133.
Hafner et al., "Validation of Peptide Immunotherapy as a New Approach in the Treatment of Allergic Rhinoconjunctivitis: The Clinical Benefits of Treatment with Amb α 1 Derived T Cell Epitopes", Journal of Allergy and Clinical Immunology, Feb. 2012; 129(2): AB368.
Couroux et al., "Fel d 1-Derived Synthetic Peptide Immuno-Regulatory Epitopes Show a Long-Term Treatment Effect in Cat Allergic Subjects", Clinical & Experimental Allergy, Jan. 2015; 45(5): 974-981.
Wen et al., "Drug Delivery Approaches in Addressing Clinical Pharmacology-Related Issues: Opportunities and Challenges", The AAPS Journal, Nov. 2015; 17(6): 1327-1340.
Sorensen et al., "Liver Sinusoidal Endothelial Cells", Comprehensive Physiology, Oct. 2015, 5: 1751-1774.
Wan et al., "'Yin-Yang' Functions of Transforming Growth Factor-Beta and T Regulatory Cells in Immune Regulation", Immunol. Rev., Dec. 2007, 220: 199-213.
Letterio et al., "Regulation of Immune Responses by TGF-Beta", Annu. Rev. Immunol., Apr. 1998; 16: 137-161.
Ng et al., "Regulation of Adaptive Immunity; the Role of Interleukin-10", Frontiers in Immunology, May 2013; 4:129.
Couper et al., "IL-10: The Master Regulator of Immunity to Infection", The Journal of Immunology, May 2008; 180(9): 5771-5777.
Seder et al., "The Presence of Interleukin 4 During in vitro Priming Determines the Lymphokine-Producing Potential of CD4+ T Cells from T Cell Receptor Transgenic Mice", The Journal of Experimental Medicine, Oct. 1992, 176: 1091-1098.
Kouro et al., "IL-5- and Eosinophil-Mediated Inflammation: From Discovery to Therapy", International Immunology, Oct. 2009, 21(12): 1303-1309.
Huston et al., "Interleukin-5, a Therapeutic Target in Allergic Inflammation",|Transactions of the American Clinical and Climatological Association, 2000, 111: 46-60.
Akdis et al., "Therapeutic Manipulation of Immune Tolerance in Allergic Disease", Nature Reviews Drug Discovery, Aug. 2009; 8(8): 645-660.
Rotzschke et al., "Exact Prediction of a Natural T Cell Epitope", Eur. J. Immunol., |1991, 21: 2891-2894.

McFarland et al., "Ovalbumin(323-339) Peptide Binds to the Major|Histocompatibility Complex Class II I-A$^D$ Protein Using Two Functionally Distinct Registers", Biochemistry, 1999, 38(50): 16663-16670.
Johnsen et al., "Antigenic and Allergenic Determinants of Ovalbumin-III. MHC la-Binding Peptide (OA 323-339) Interacts with Human and Rabbit Specific Antibodies", Molecular Immunology, Sep. 1990, 27(9): 821-827.
Barnden et al., "Defective TCR Expression in Transgenic Mice Constructed Using|cDNA-Based Alpha- and Beta-Chain Genes under the Control of Heterologous Regulatory Elements", Immunology and Cell Biology, 1998, 76: 34-40.
Hogquist et al., "T Cell Receptor Antagonist Peptides Induce Positive Selection", Cell, 1994, 76: 17-27.
Horst et al., "Modulation of liver tolerance by conventional and nonconventional|antigen-presenting cells and regulatory immune cells", Cell. Mol. Immunol., Apr. 2016; 13(3): 277-292.
Chapman et al., "mTOR Signaling, Tregs and Immune Modulation",|Immunotherapy, 2014, 6(12): 1295-1311.
Furukawa et al., "Impact of Immune-Modulatory Drugs on Regulatory T Cell", Transplantation, Nov. 2016; 100(11): 2288-2300.
Battaglia et al., "Rapamycin Promotes Expansion of Functional CD4+CD25+FOXP3+ Regulatory T Cells of Both Healthy Subjects and Type 1 Diabetic Patients", The Journal of Immunology, Dec. 2006, 177(12): 8338-8347.
Meliani et al., "Antigen-Specific Modulation of Capsid Immunogenicity with Tolerogenic Nanoparticles Results in Successful AAV Vector Readministration", Molecular Therapy, May 2016; 24(Suppl. 1): S34.
Mazor et al., "Tolerogenic Nanoparticles Restore the Antitumor Activity of Recombinant Immunotoxins by Mitigating Immunogenicity", Proceedings of the National Academy of Sciences, Jan. 2018; 115(4): E733-E742.
Catanzaro et al., "Immunomodulators Inspired by Nature: A Review on Curcumin and Echinacea", Molecules, Oct. 2018; 23(11): 2778.
Panda et al., "New Insights into Therapeutic Activity and Anticancer Properties of Curcumin", J. Exp. Pharmacol., Mar. 2017, 9: 31-45.
Galli et al., "IgE and Mast Cells in Allergic Disease", Nat. Med., May 2012, 18(5): 693-704.
Handlogten et al., "Inhibition of Weak-Affinity Epitope-Ige Interactions Prevents|Mast Cell Degranulation", Nat. Chem. Biol., Oct. 2013; 9(12): 789-795.
Pfaar et al., "Perspectives in Allergen Immunotherapy: 2017 and Beyond", Allergy, 2018, 73(S104): 5-23.
Hoffmann et al., "Novel Approaches and Perspectives in Allergen|Immunotherapy", Allergy, Jan. 2017; 72(7): 1022-1034.
Cappellano et al., "Subcutaneous Inverse Vaccination with PLGA Particles|Loaded with a MOG Peptide and IL-10 Decreases the Severity of Experimental Autoimmune Encephalomyelitis", Vaccine, Sep. 2014; 32(43): 5681-5689.
Pei et al., "Direct Modulation of Myelin-Autoreactive CD4+ and CD8+ T Cells in EAE Mice by a Tolerogenic Nanoparticle Co-Carrying Myelin Peptide-Loaded Major Histocompatibility Complexes, CD47 and Multiple Regulatory Molecules", Int. J. Nanomedicine, Jun. 2018; 13: 3731-3750.
Kim et al., "Curcumin Inhibits Immunostimulatory Function of Dendritic Cells: MAPKs|and Translocation of NF-kB as Potential Targets", The Journal of Immunology, 2005, 174(12): 8116-8124.
Swain et al., "Il-4 Directs the Development of Th2-Like Helper Effectors", Journal of Immunology (Baltimore, Md.) 1990, 145, 3796-3806, abstract only.

\* cited by examiner

A i.

ii.

B

Scale bar: 500 nm

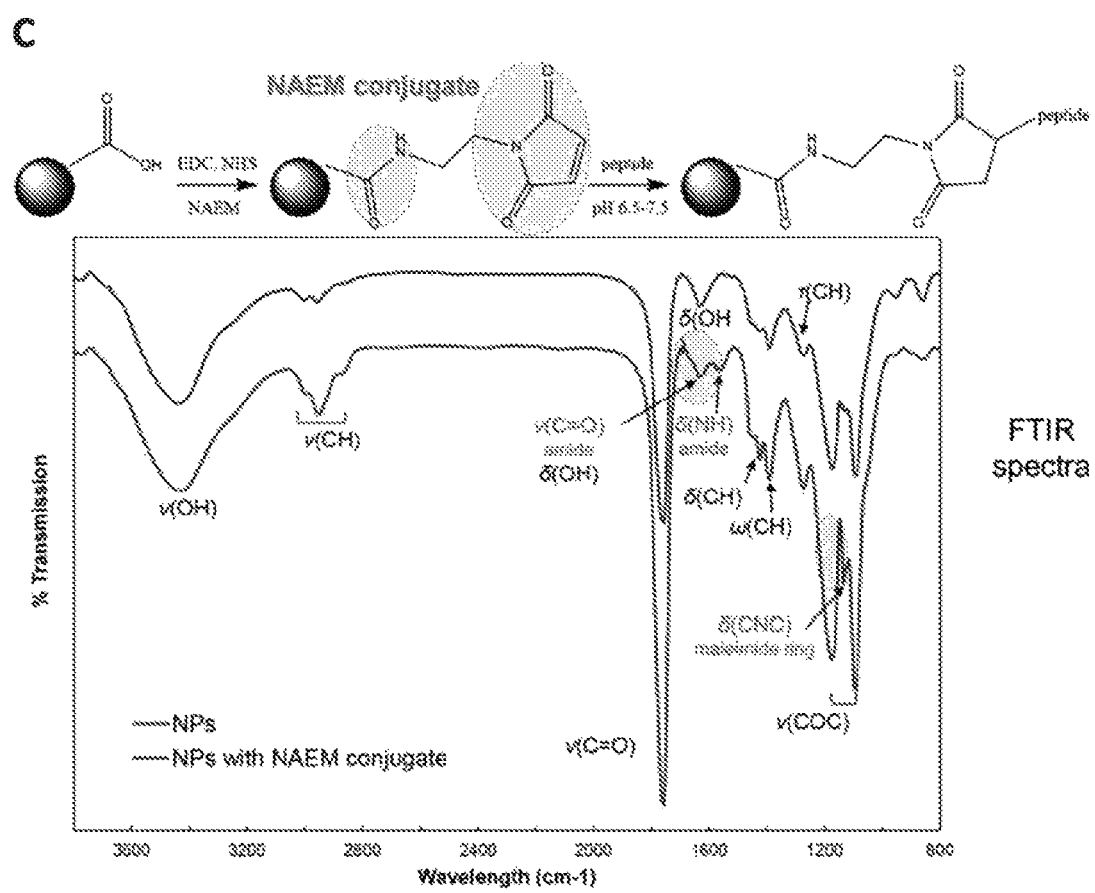
Fig. 1, cont'd.

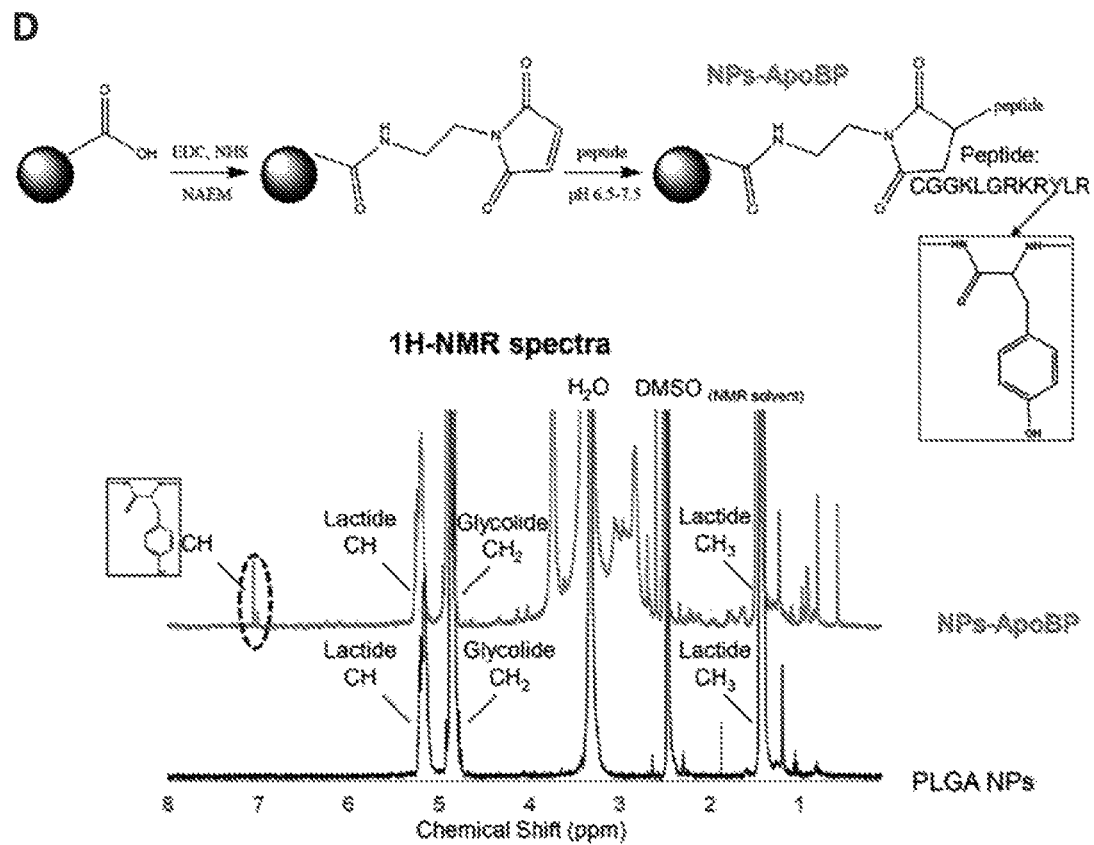
Fig. 1, cont'd.

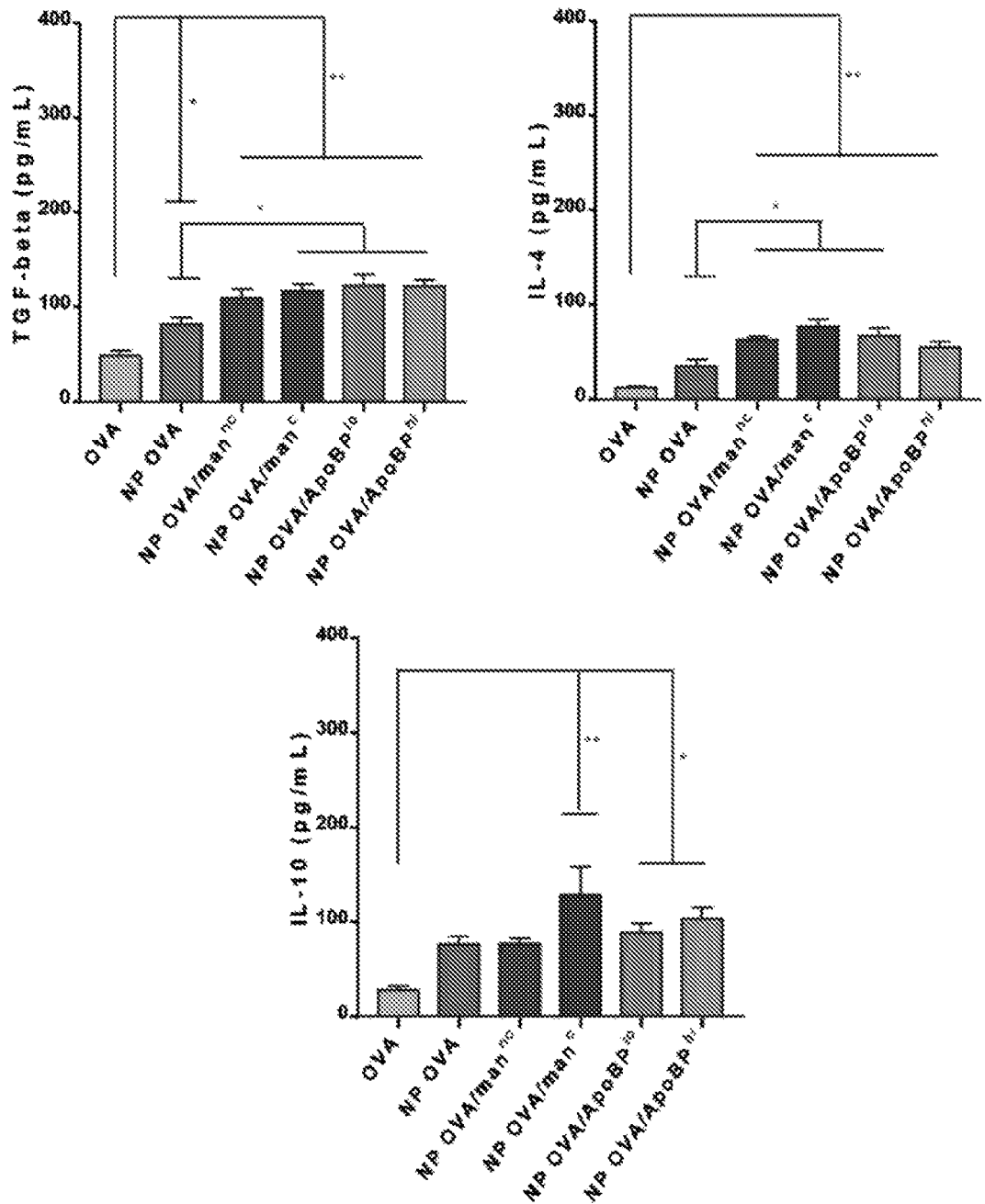
Fig. 3, cont'd.

B
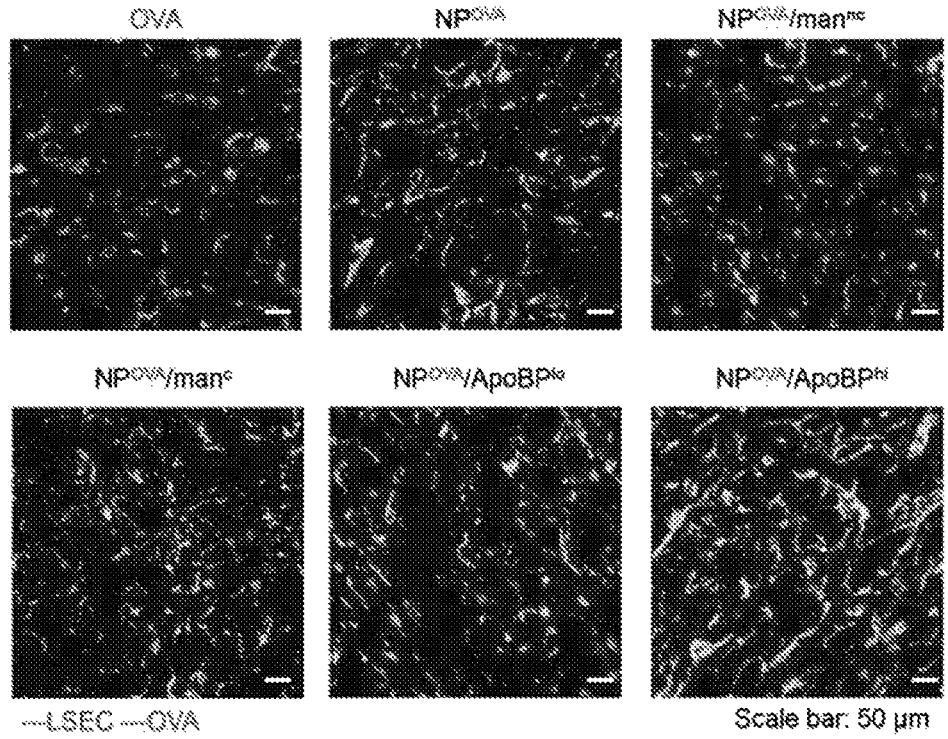
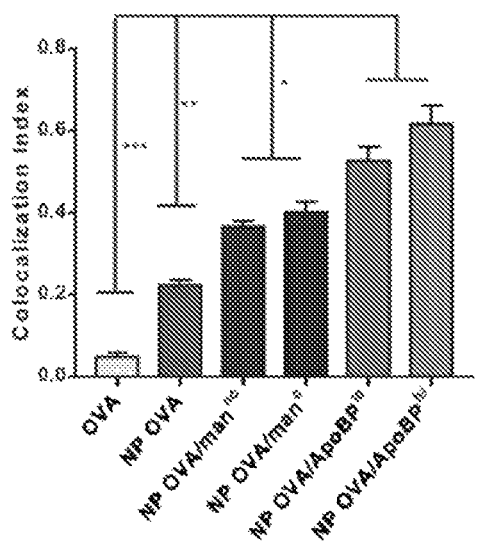
Fig. 4, cont'd.

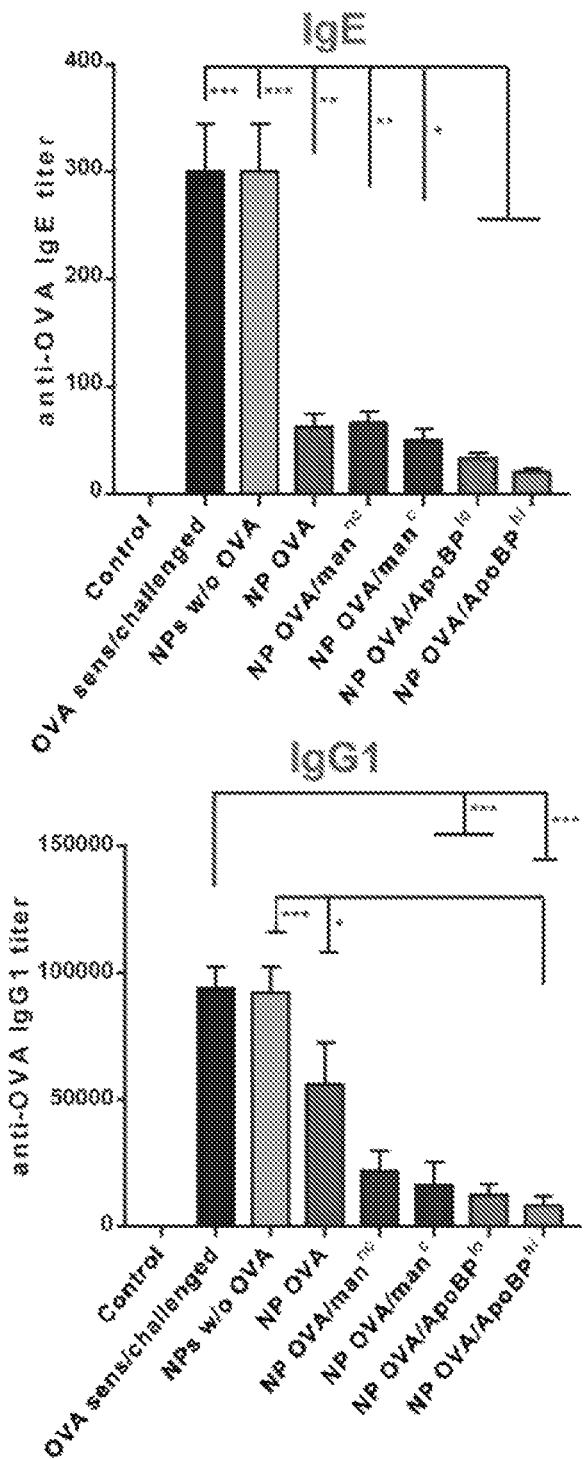
Fig. 5, con'td.

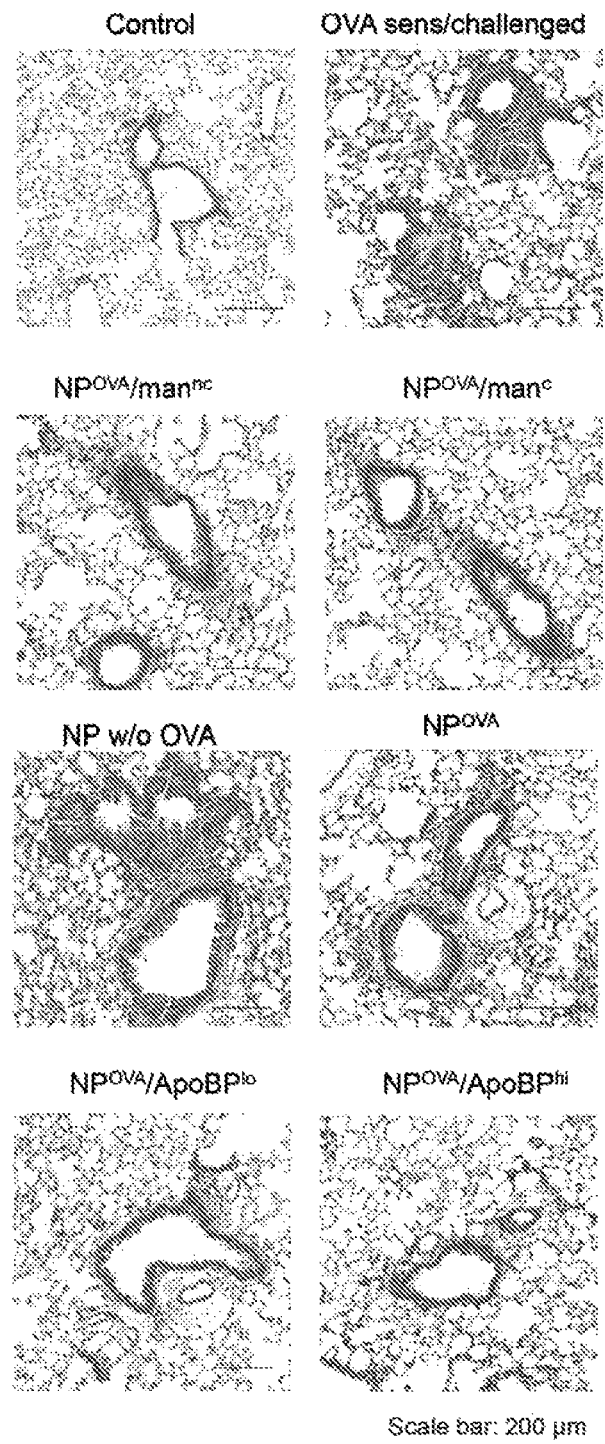
Fig. 6, cont'd.

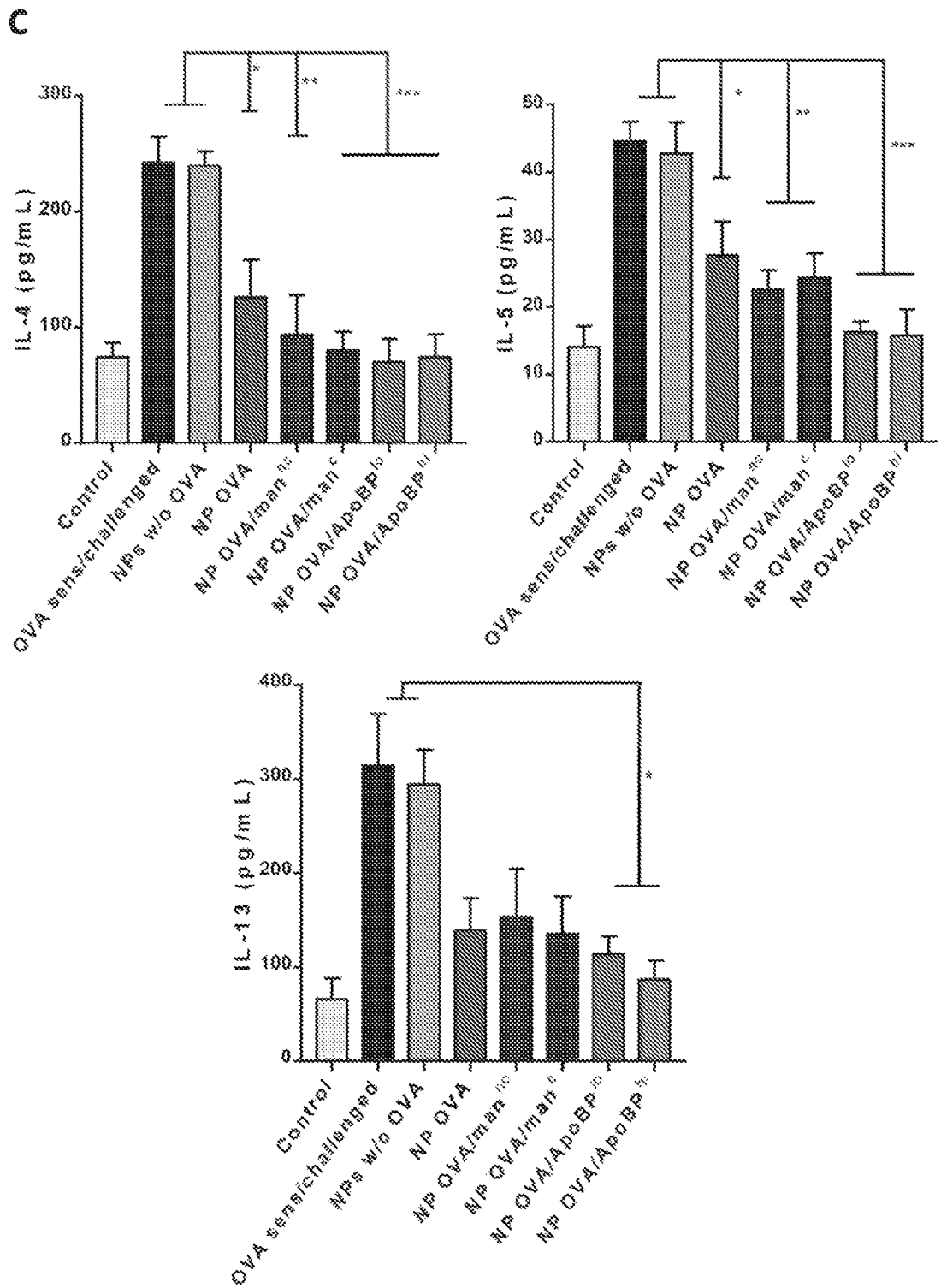
Fig. 6, cont'd.

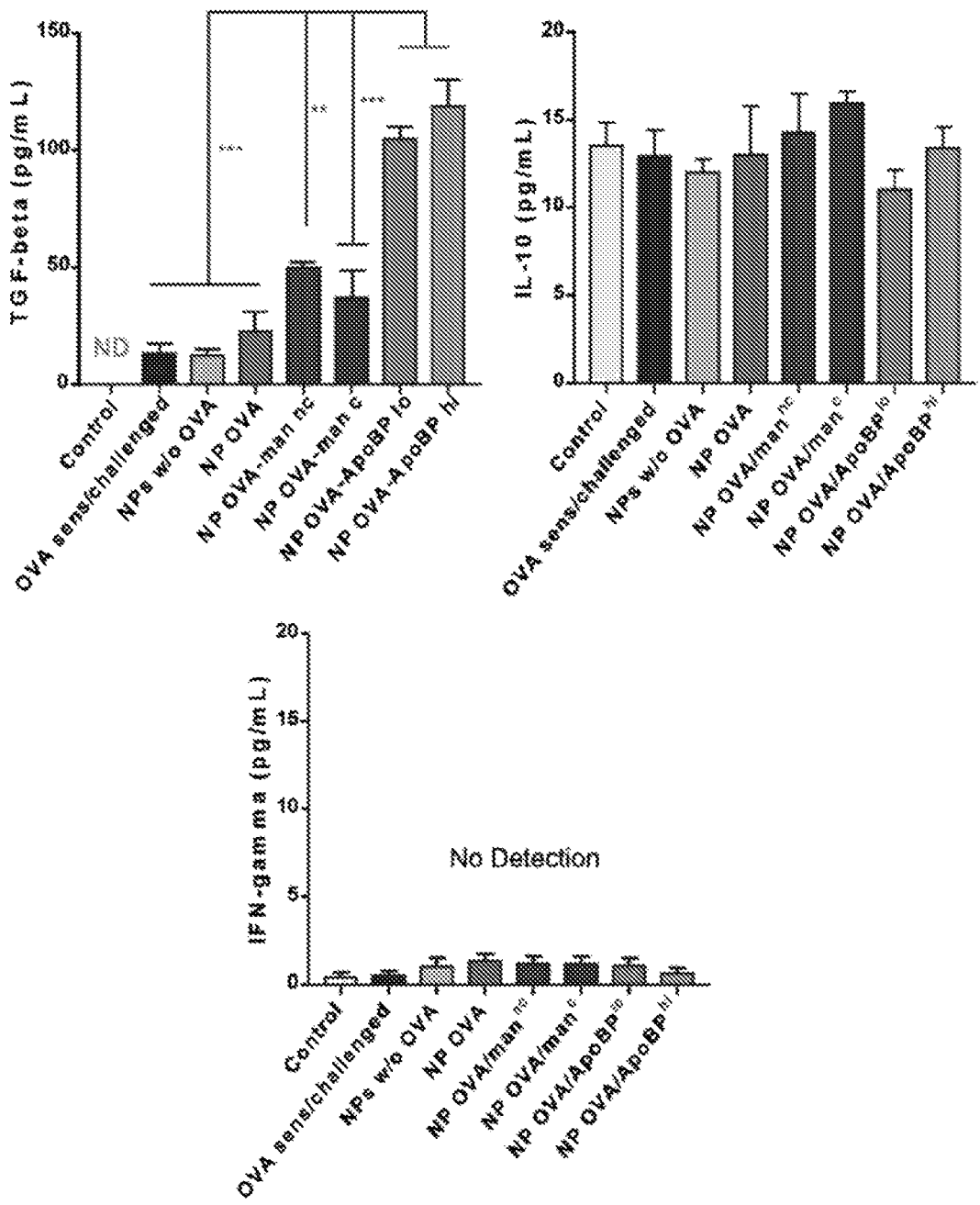
Fig. 6, cont'd.

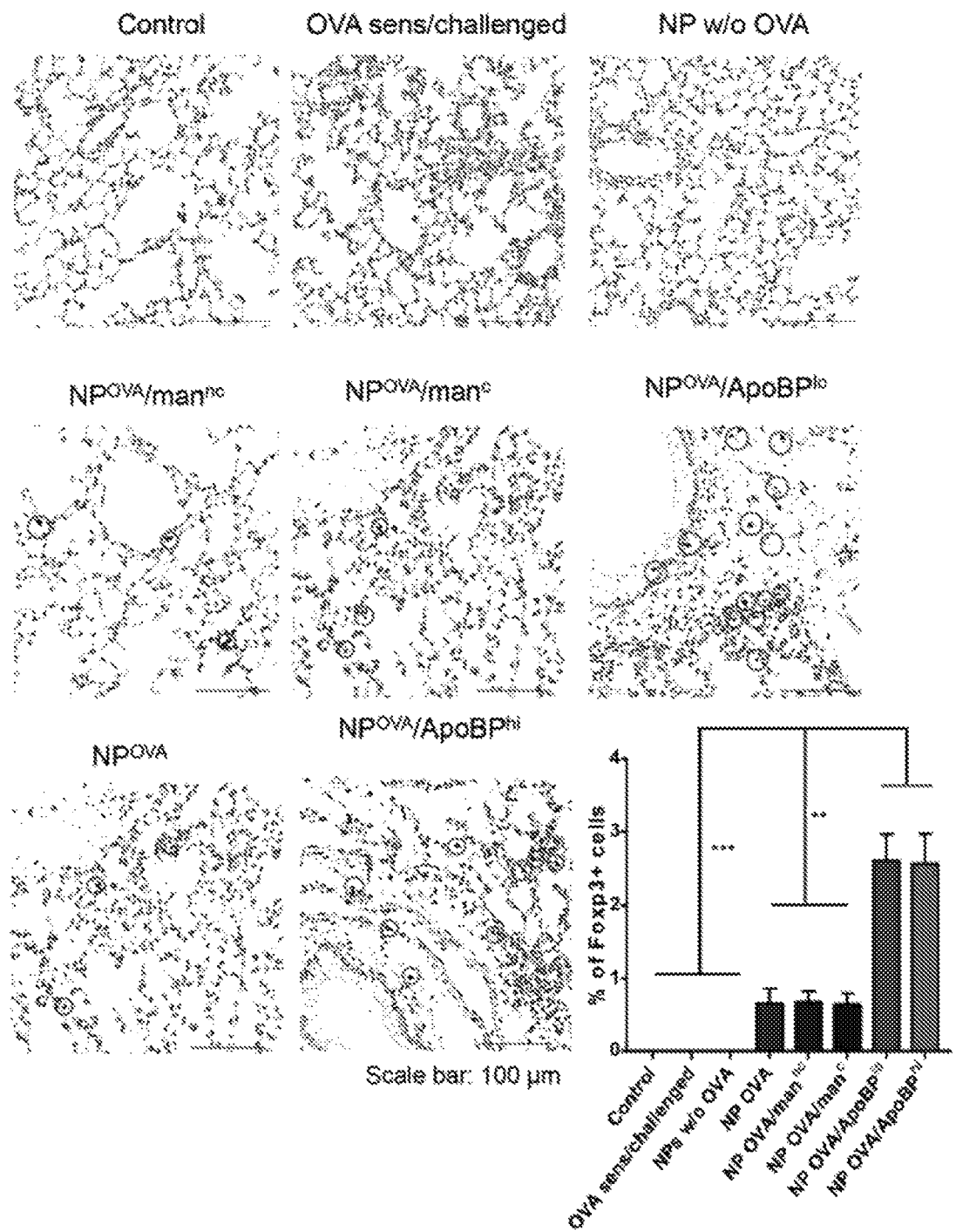
Fig. 6, cont'd.

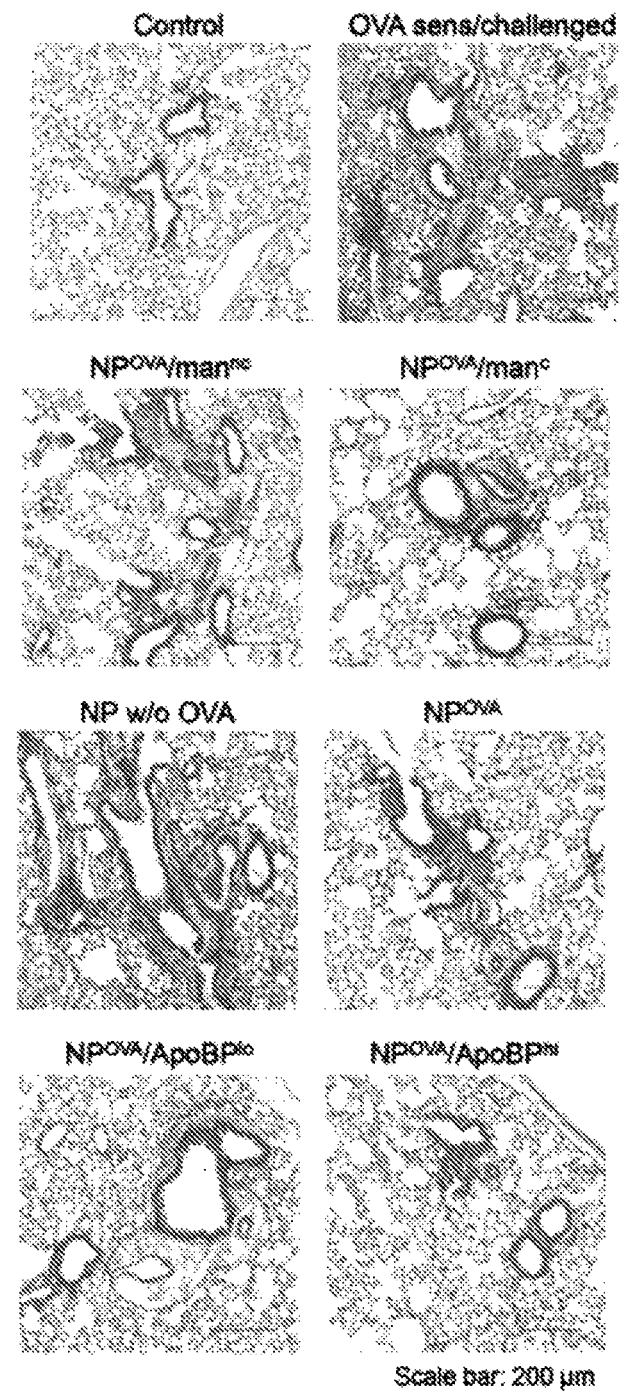
Fig. 7, cont'd.

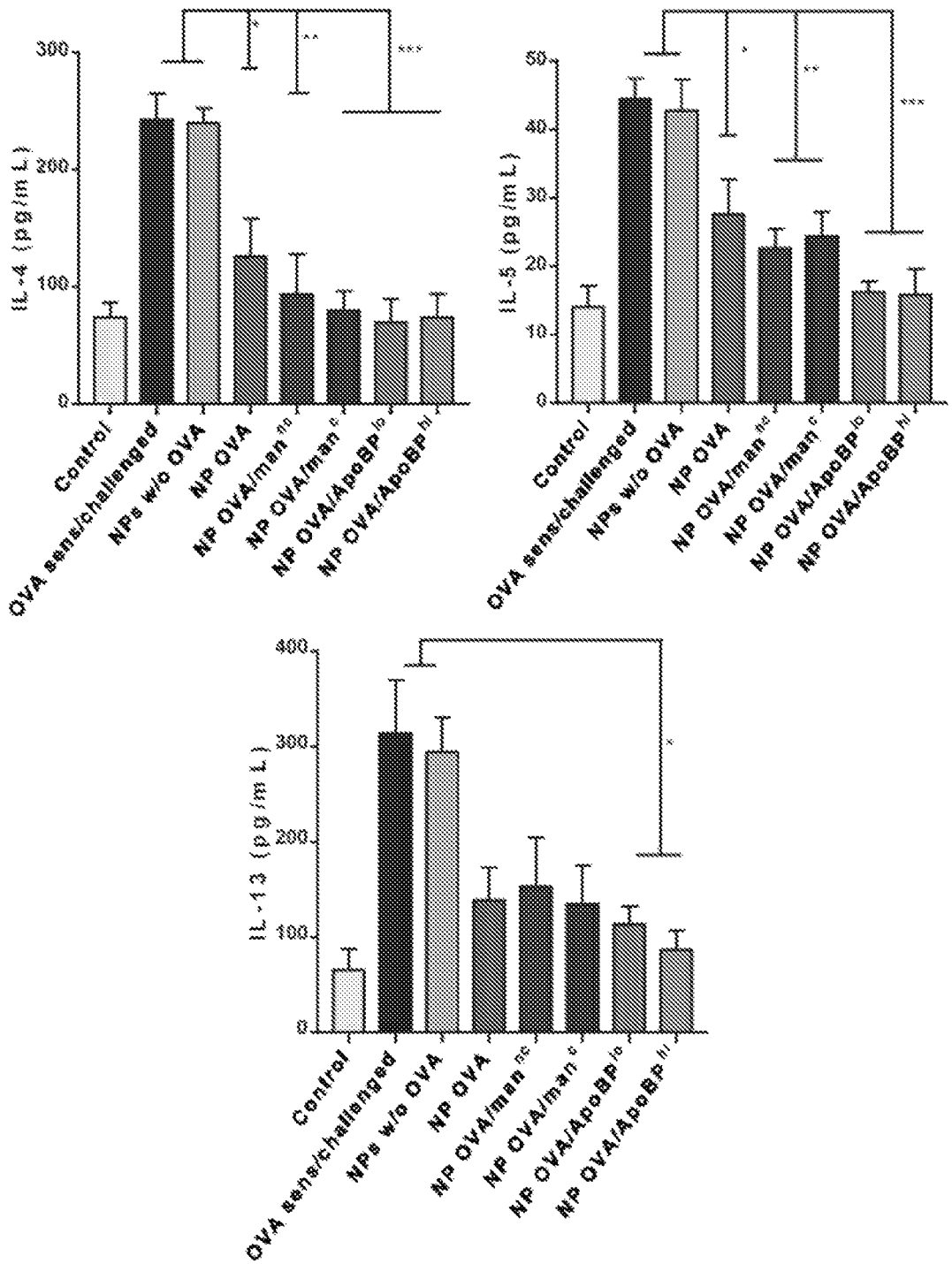
Fig. 7, cont'd.

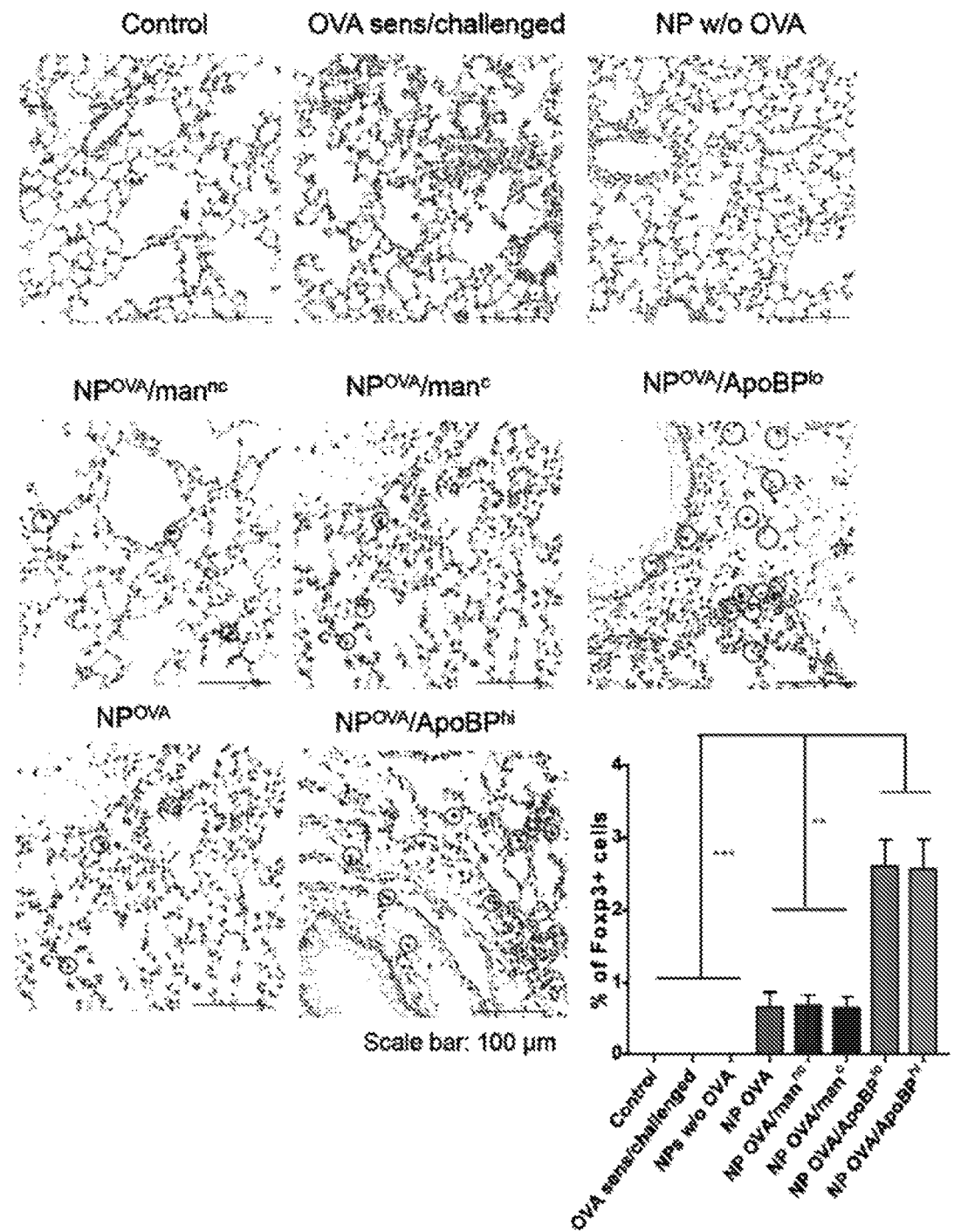
Fig. 7, cont'd.

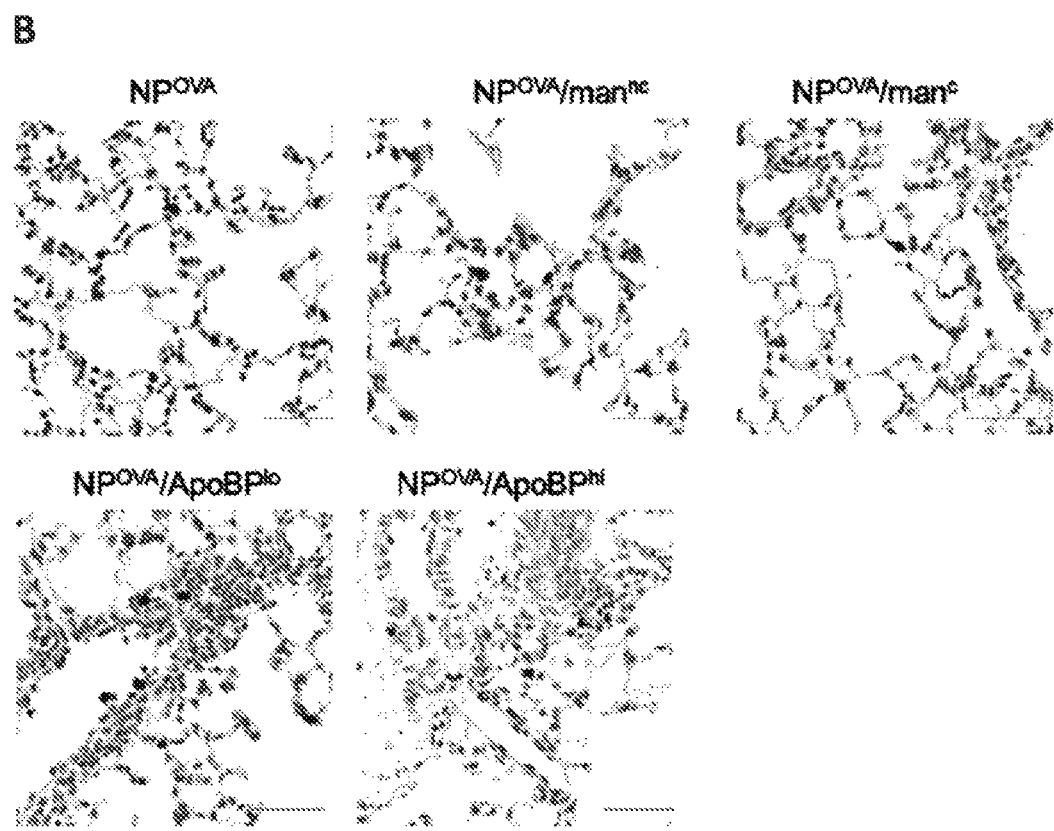
Fig. 13, cont'd.

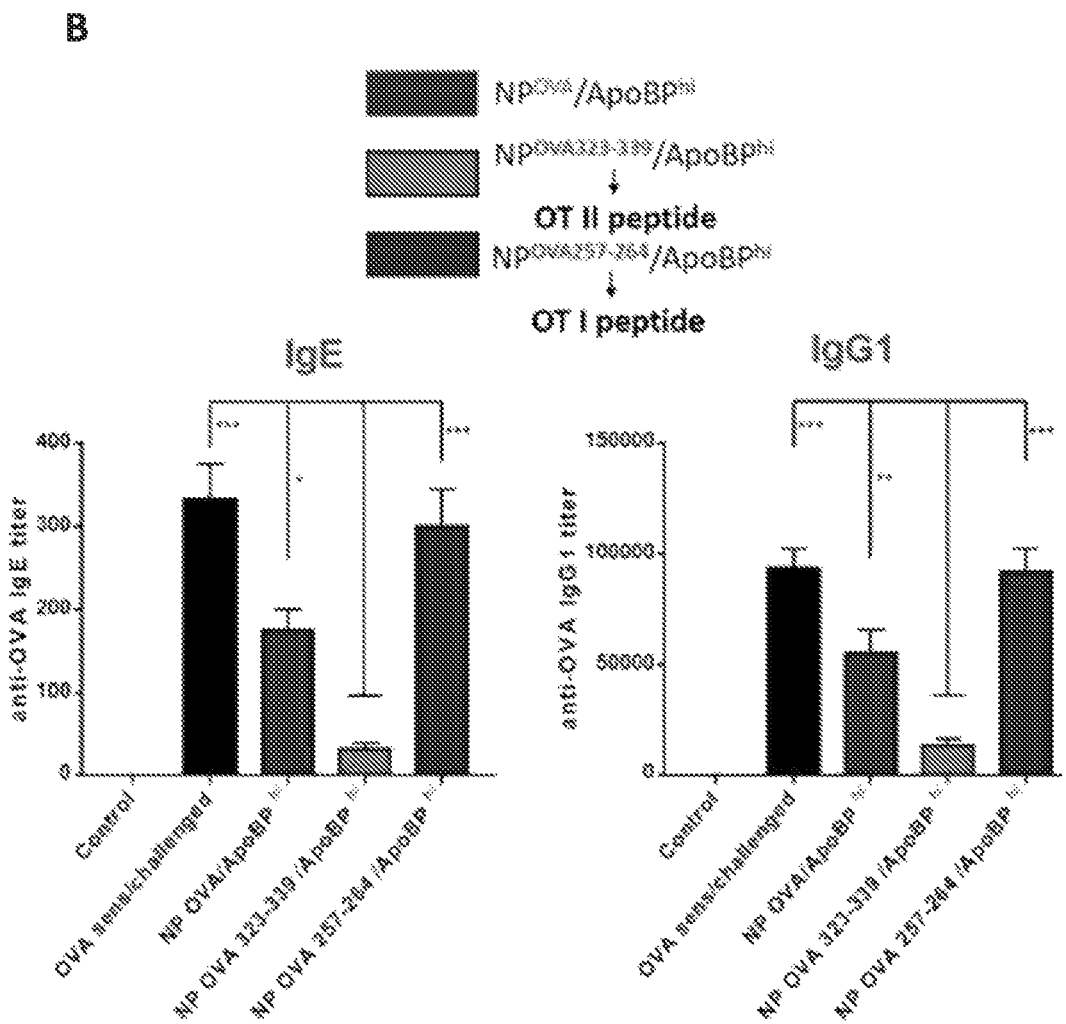
Fig. 15, cont'd.

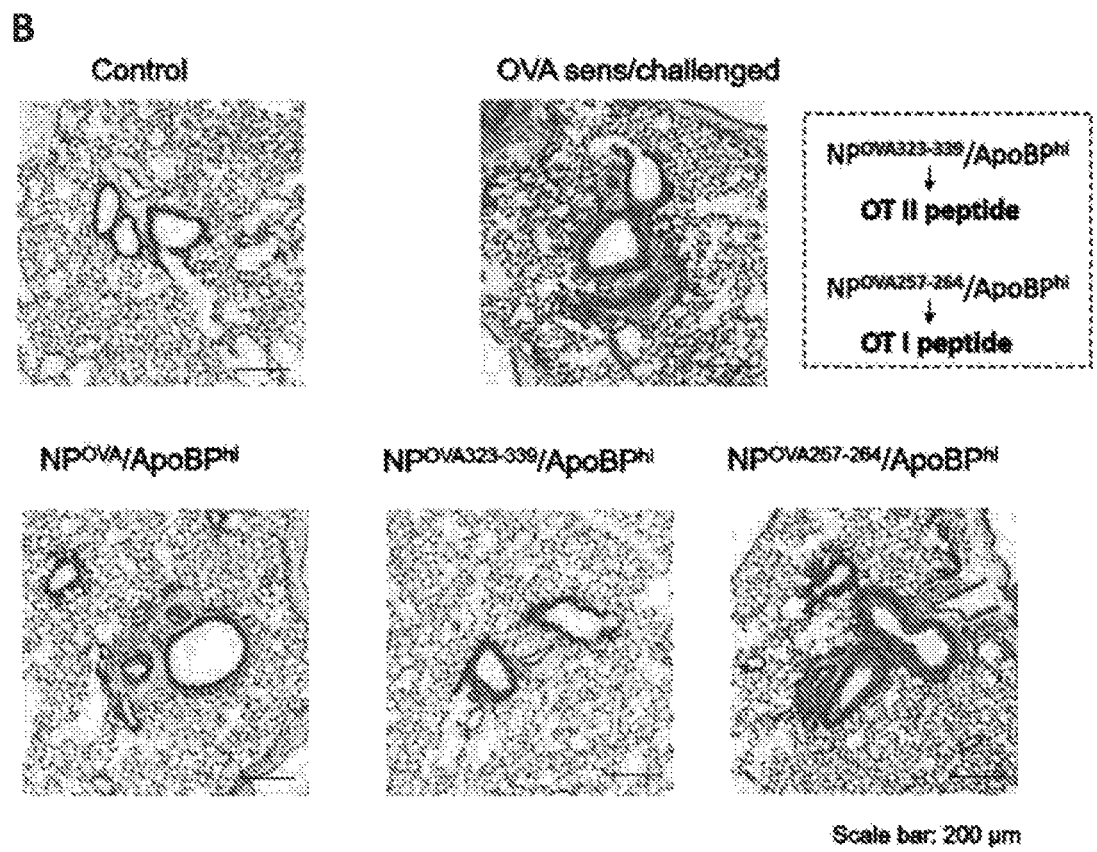
Fig. 16, cont'd.

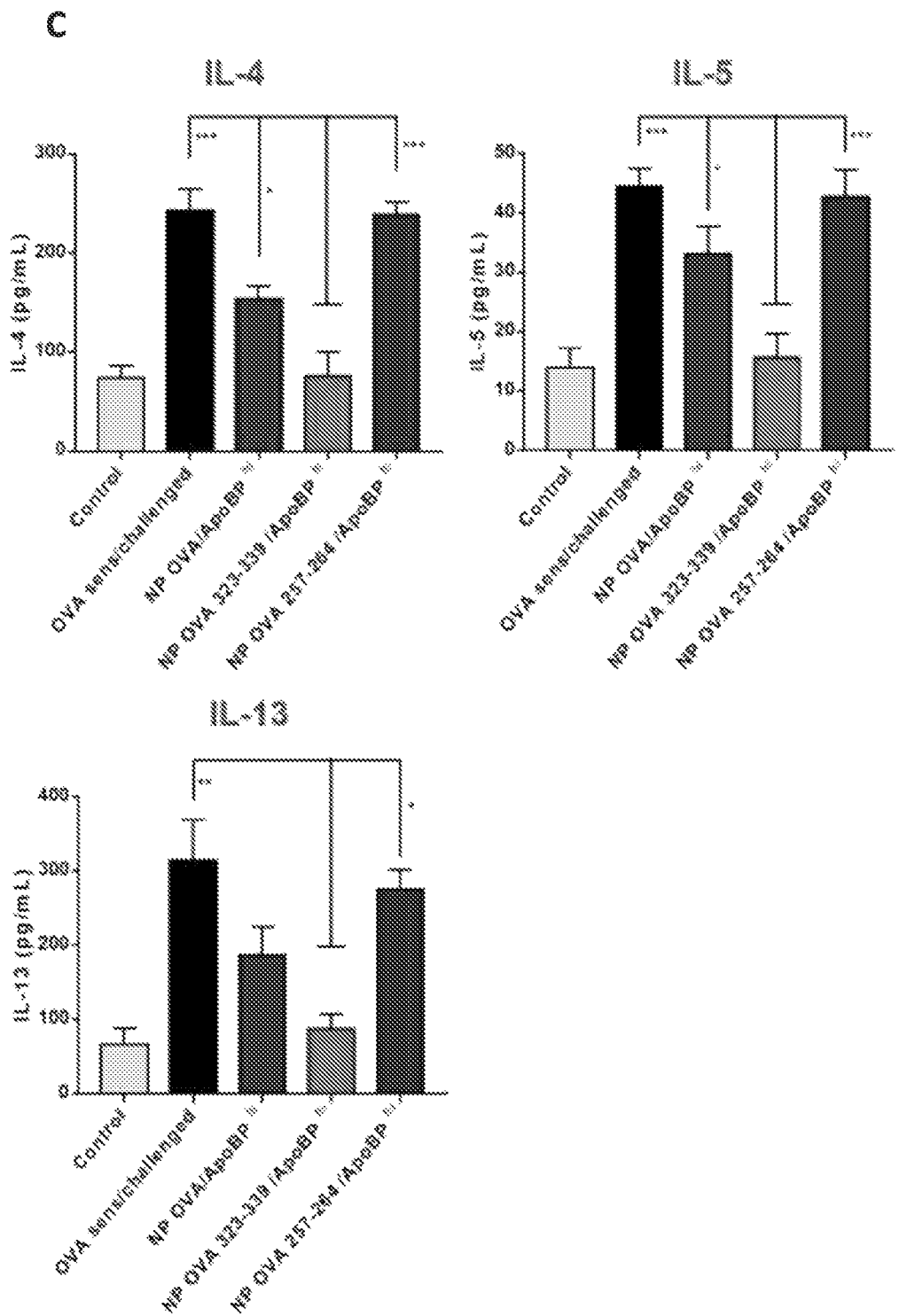
Fig. 16, cont'd.

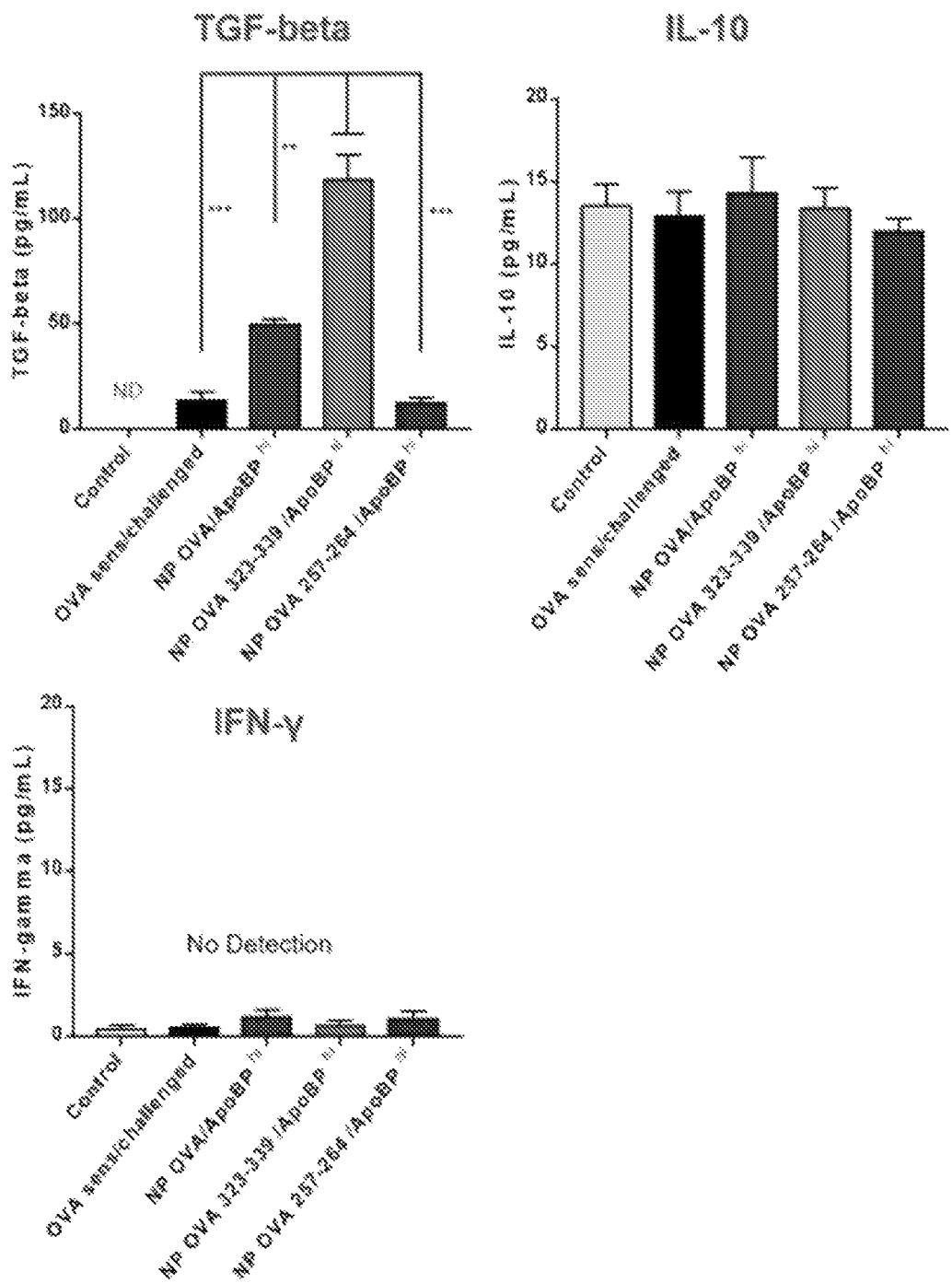
Fig. 16, cont'd.

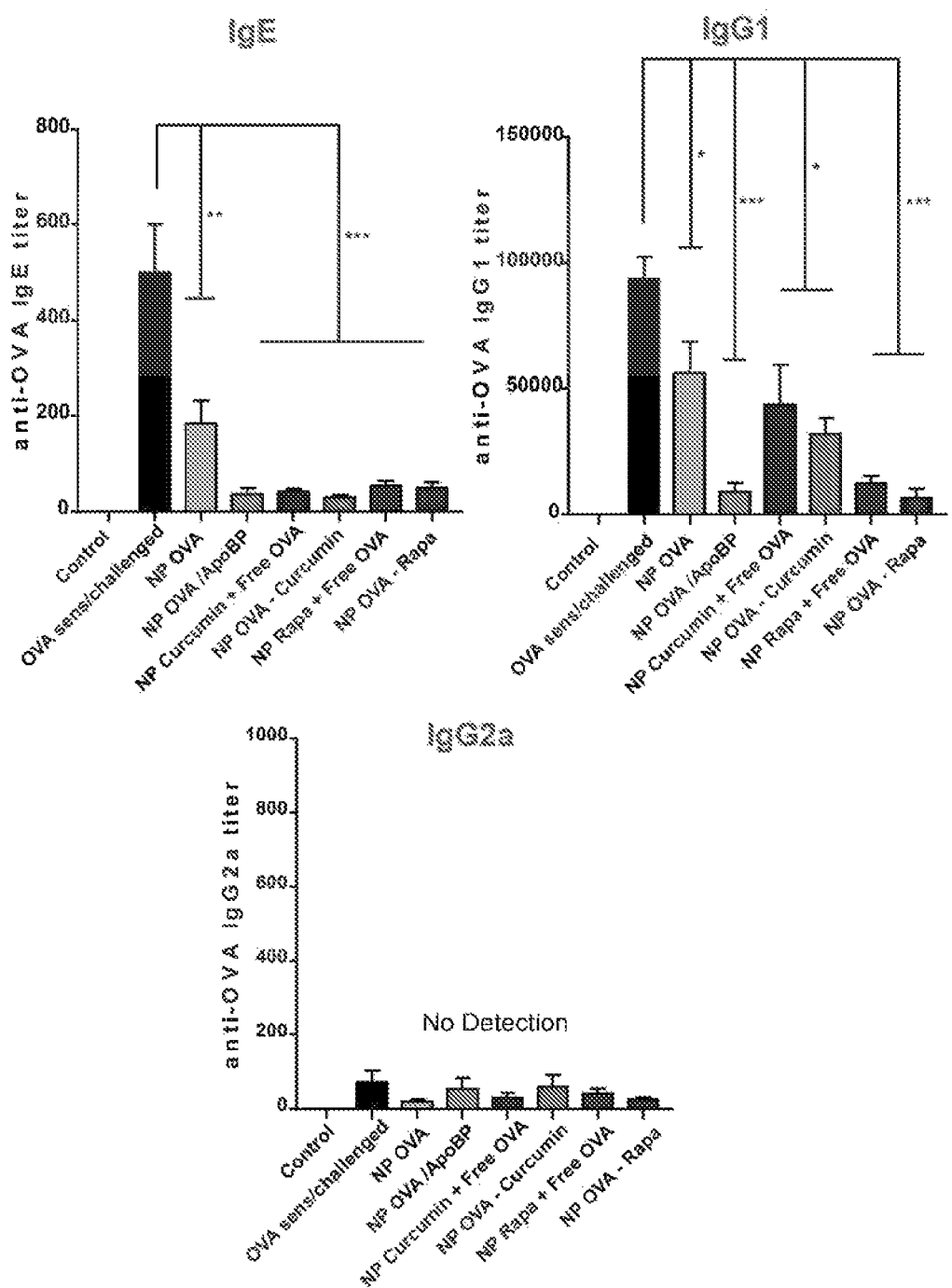
Fig. 20, cont'd.

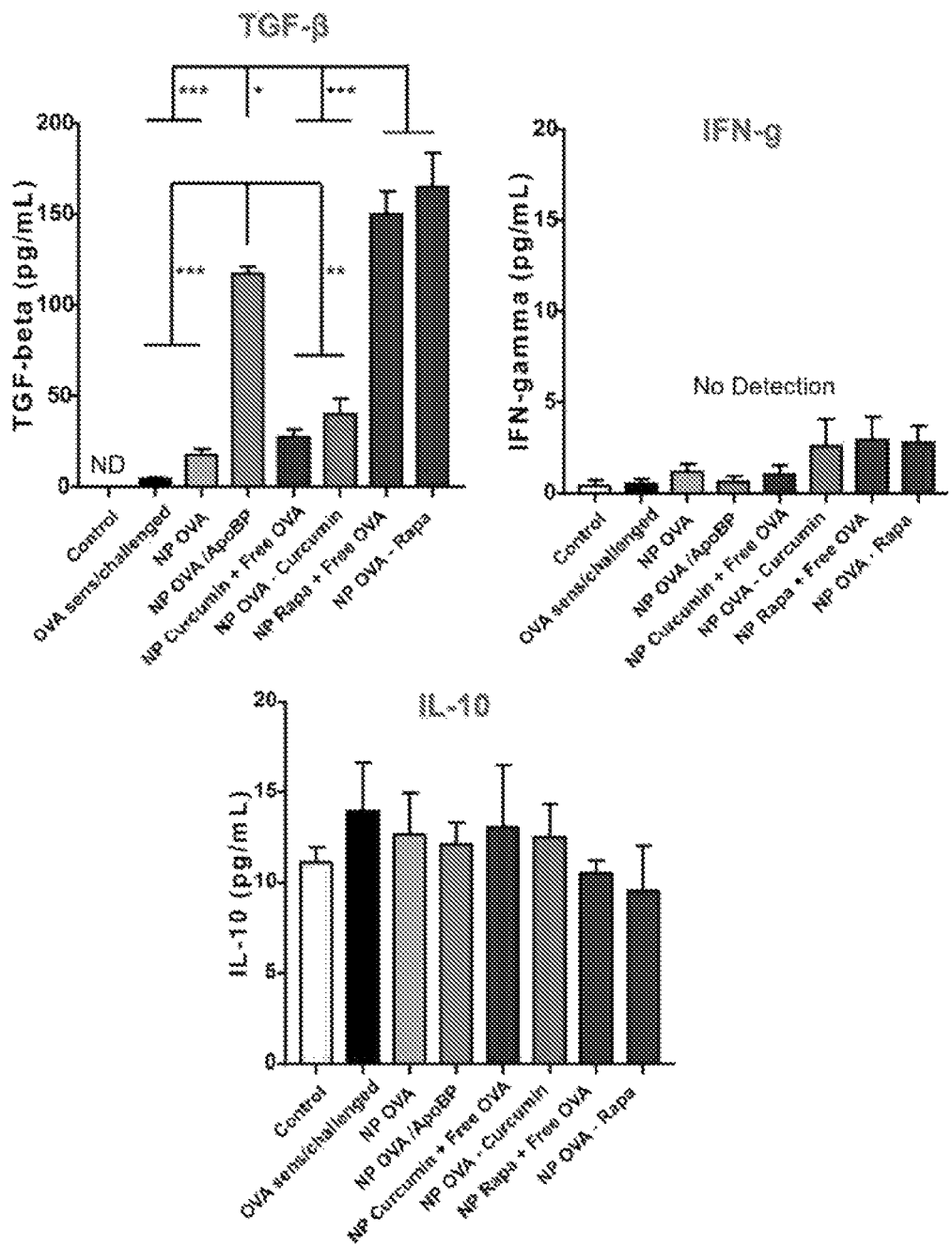
Fig. 21, cont'd.

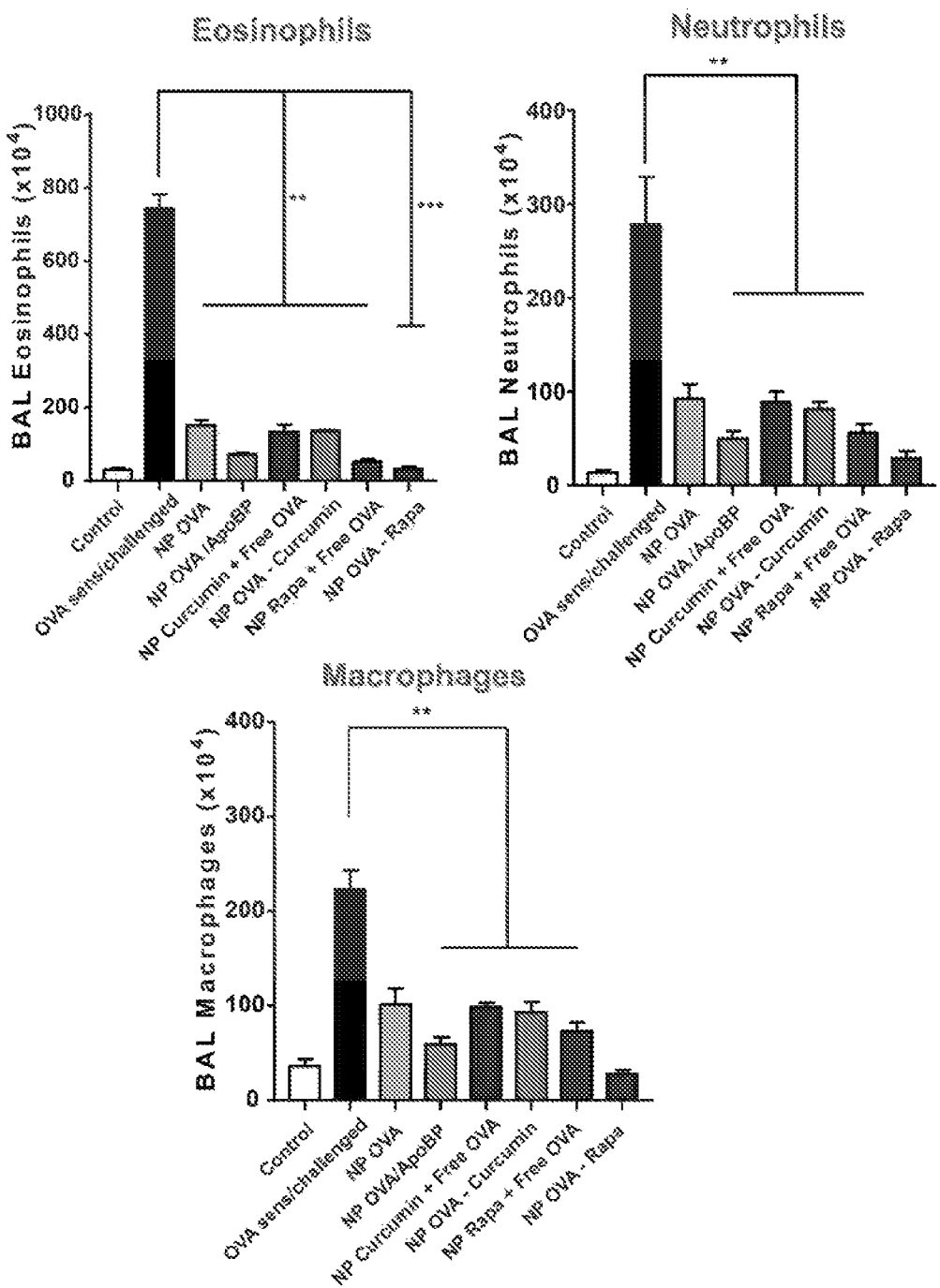
Fig. 21, cont'd.

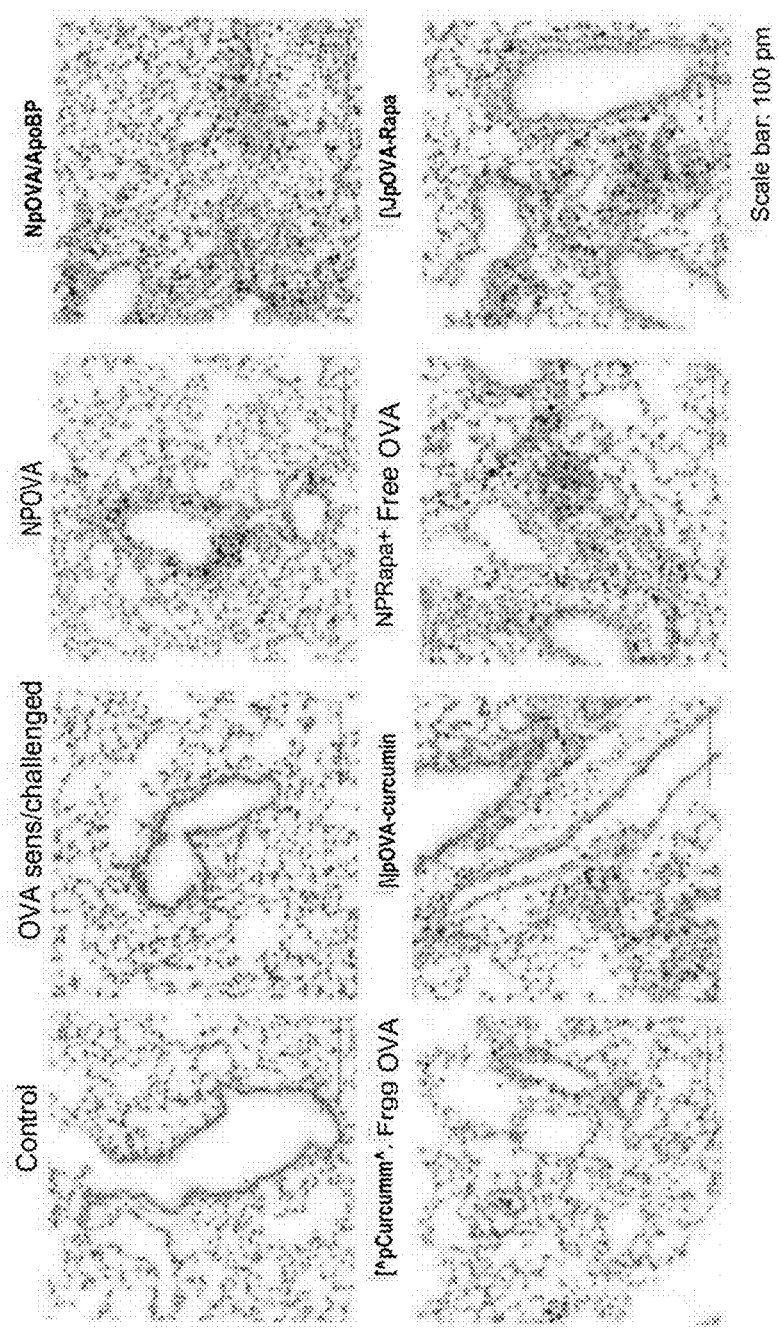
Fig. 22, cont'd.

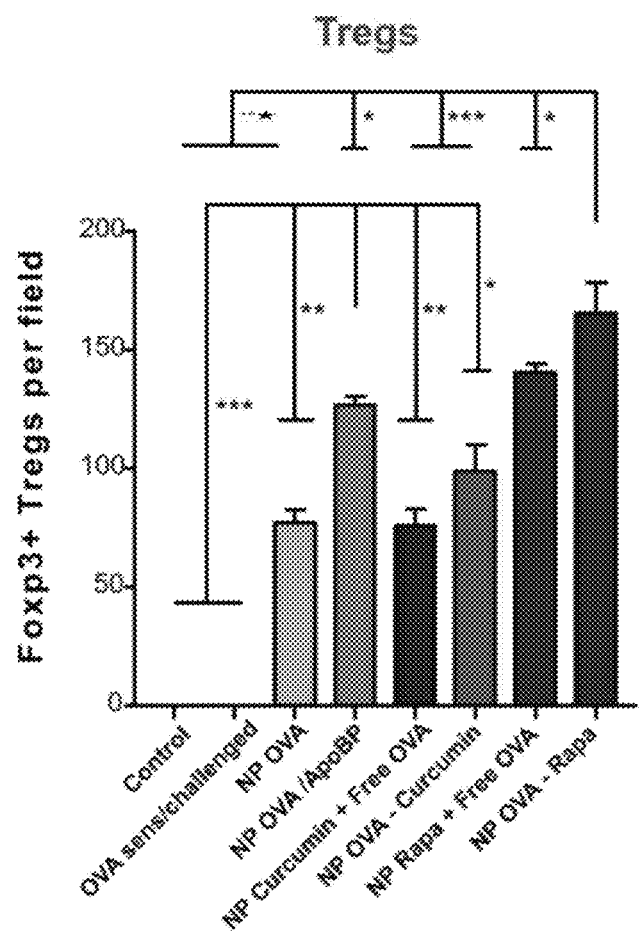
Fig. 22, cont'd.

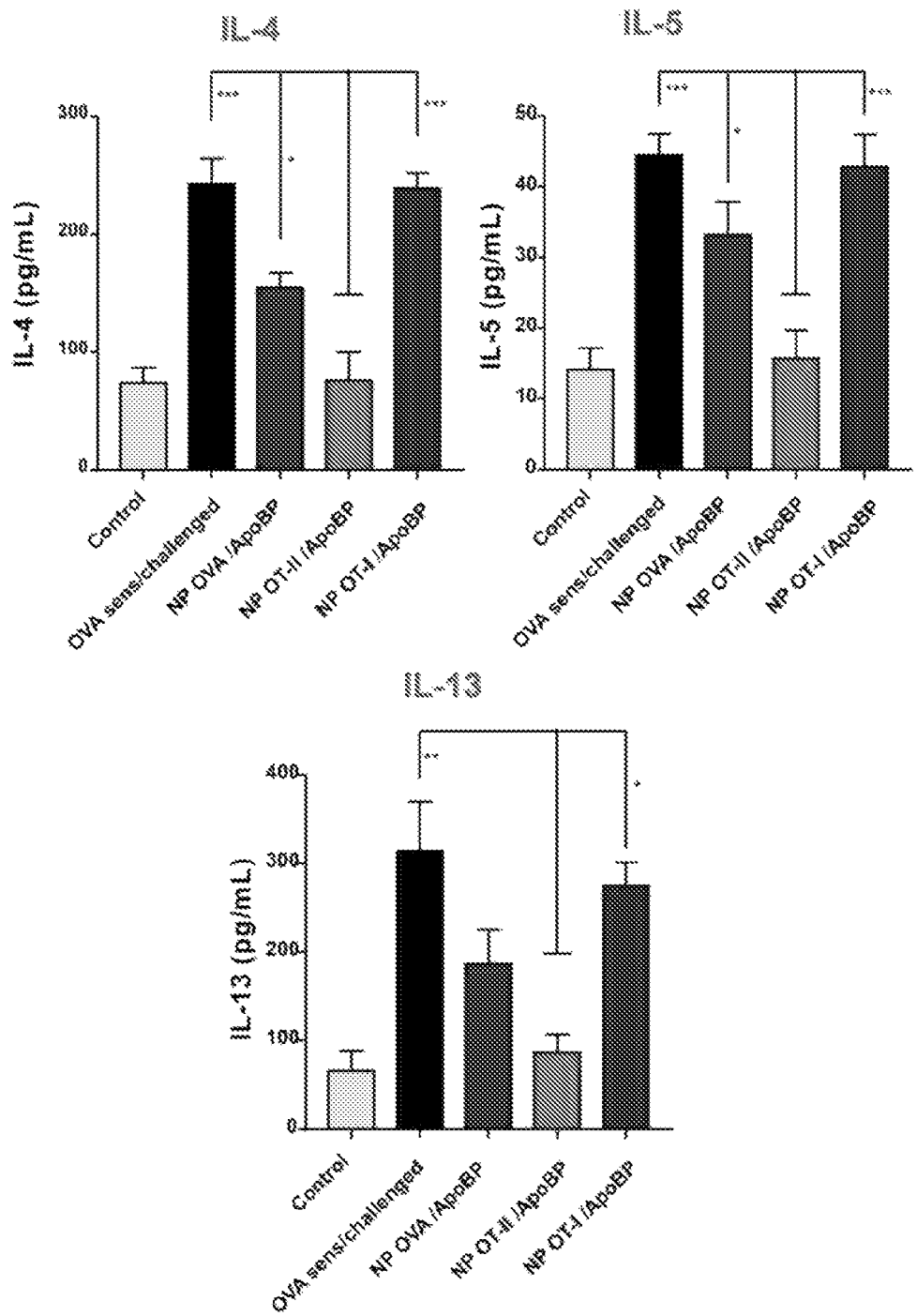
Fig. 23, cont'd.

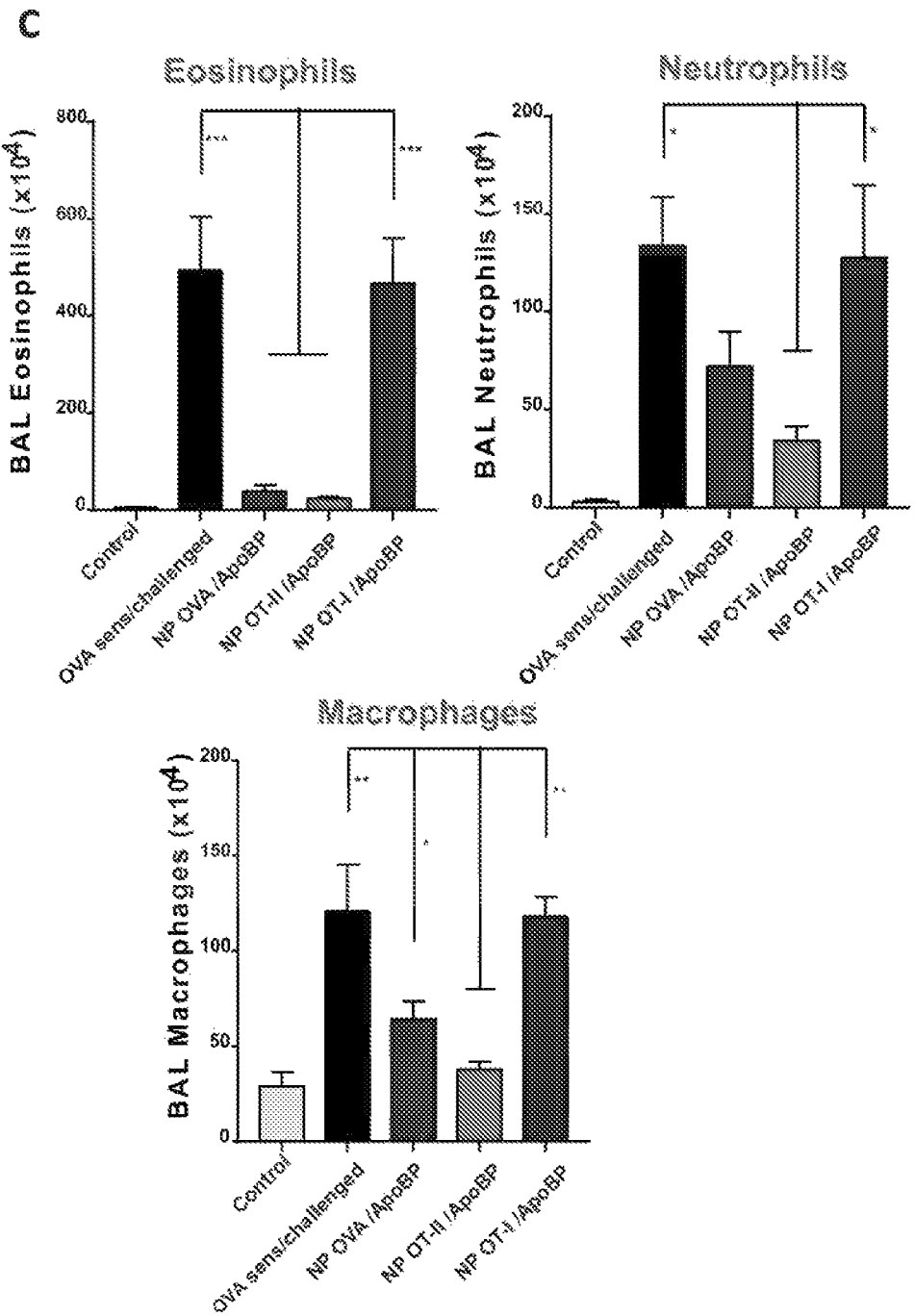
Fig. 23, cont'd.

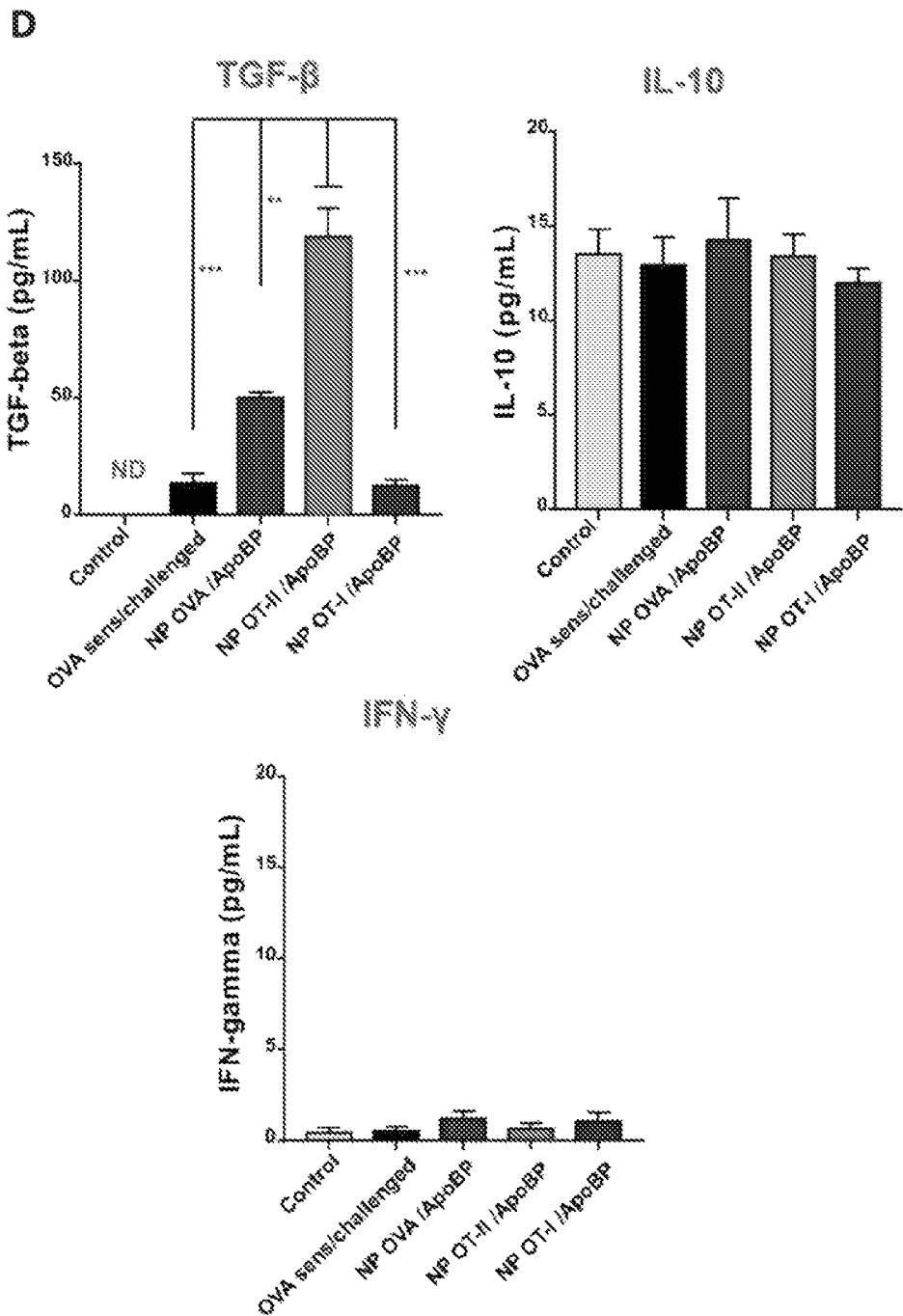
Fig. 23, cont'd.

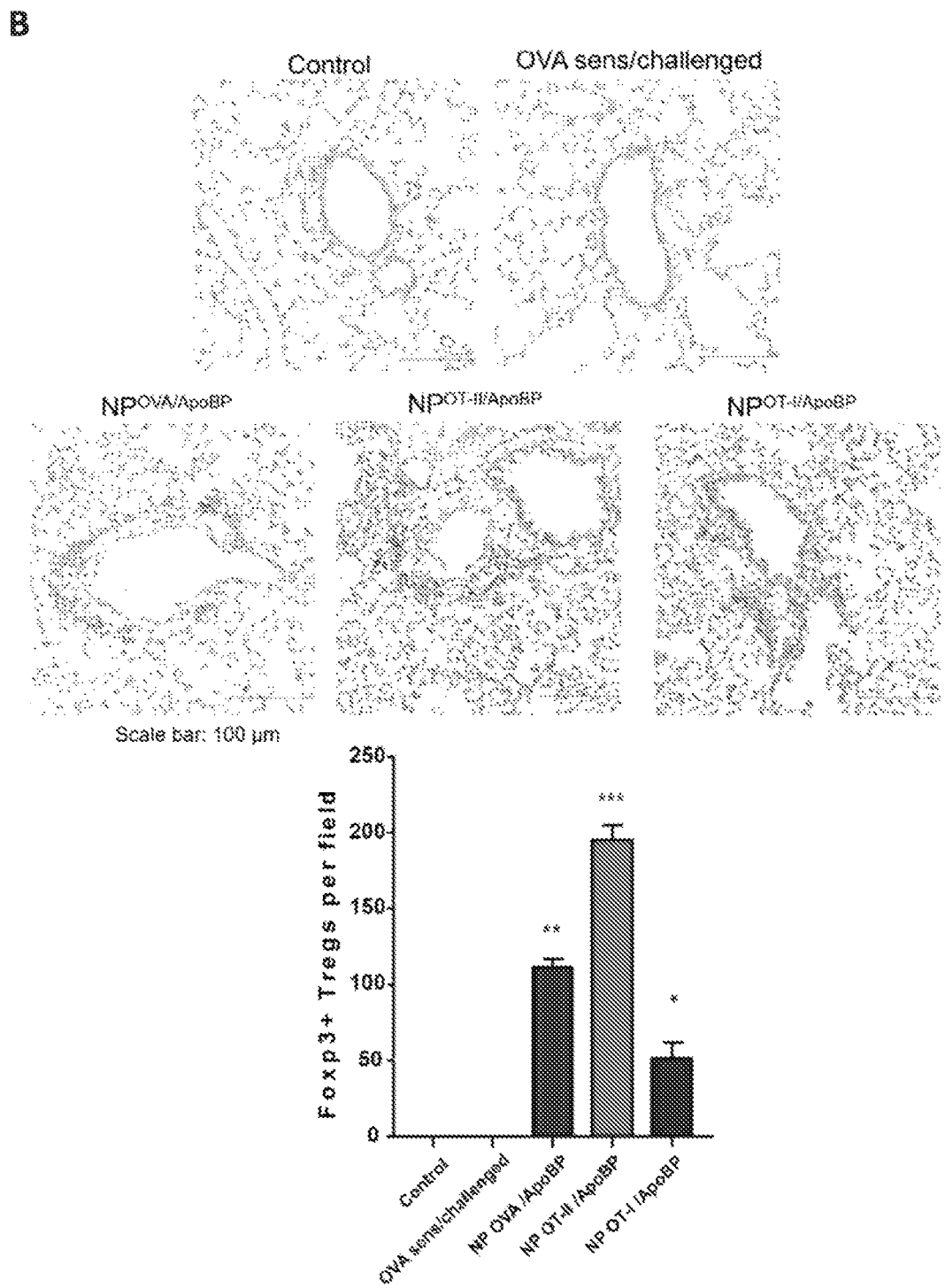
Fig. 24, cont'd.

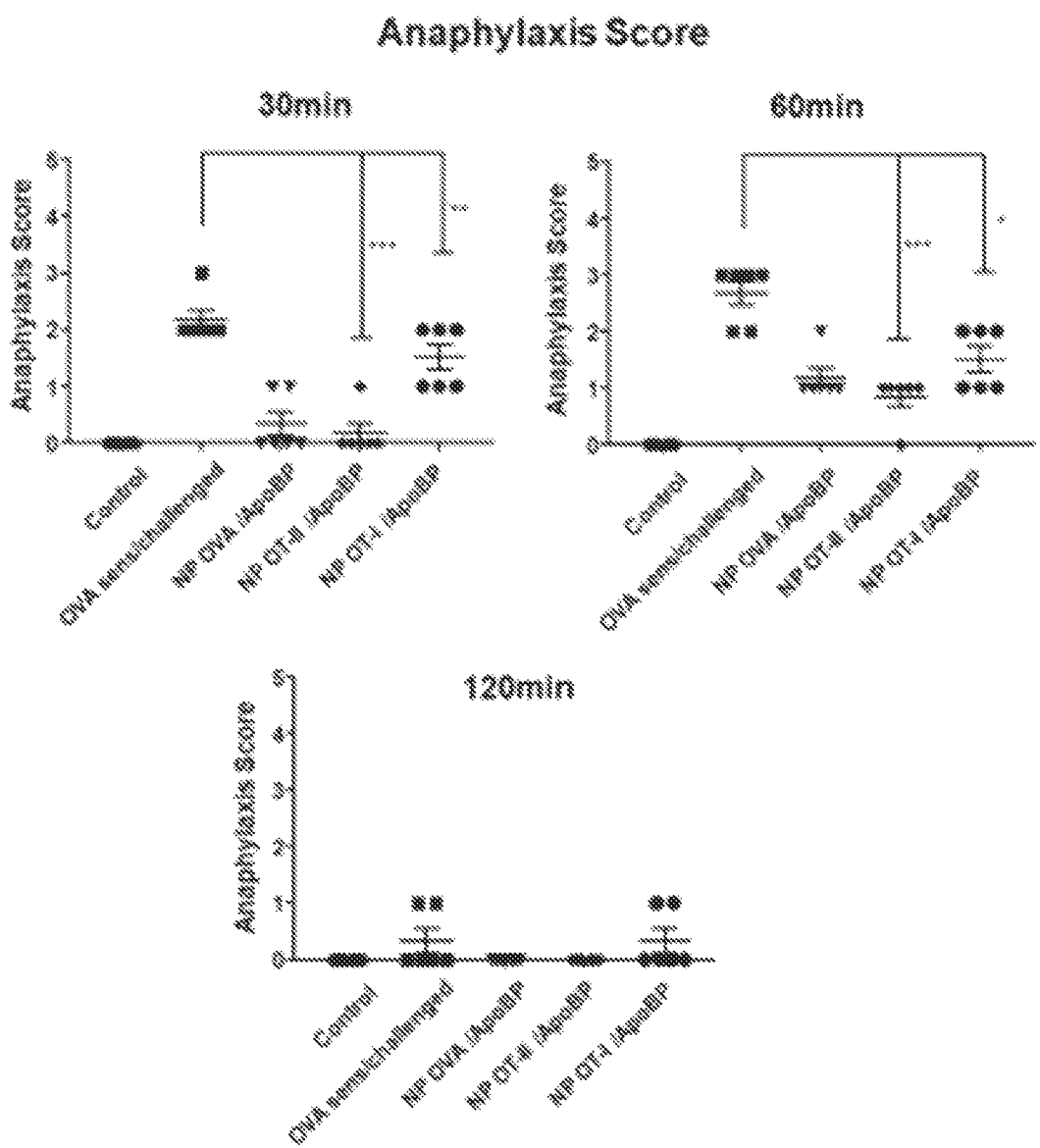
Fig. 28, cont'd.

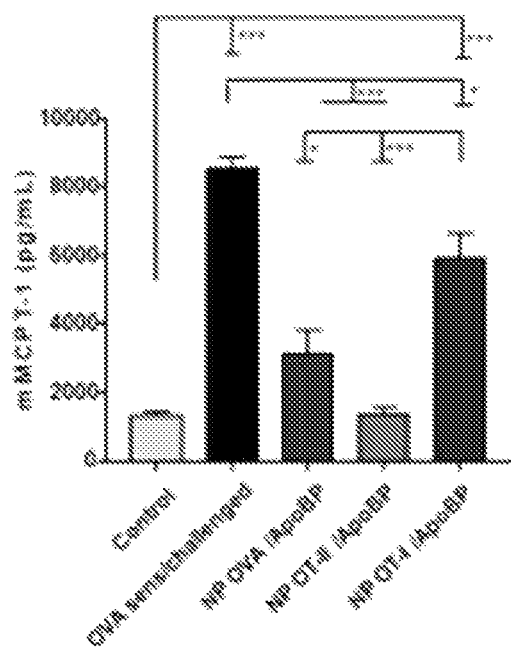
Fig. 28, cont'd.

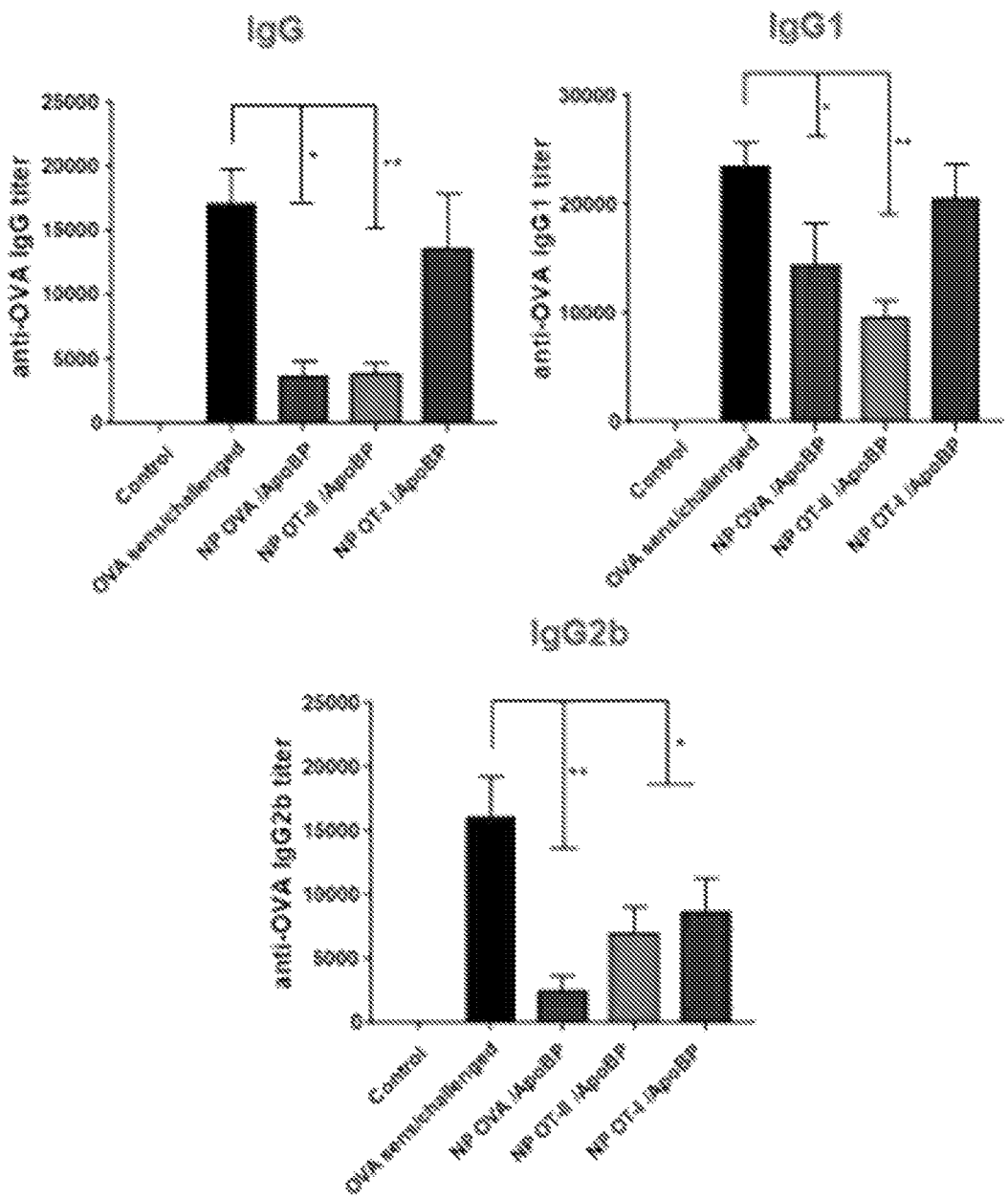
Fig. 28, cont'd.

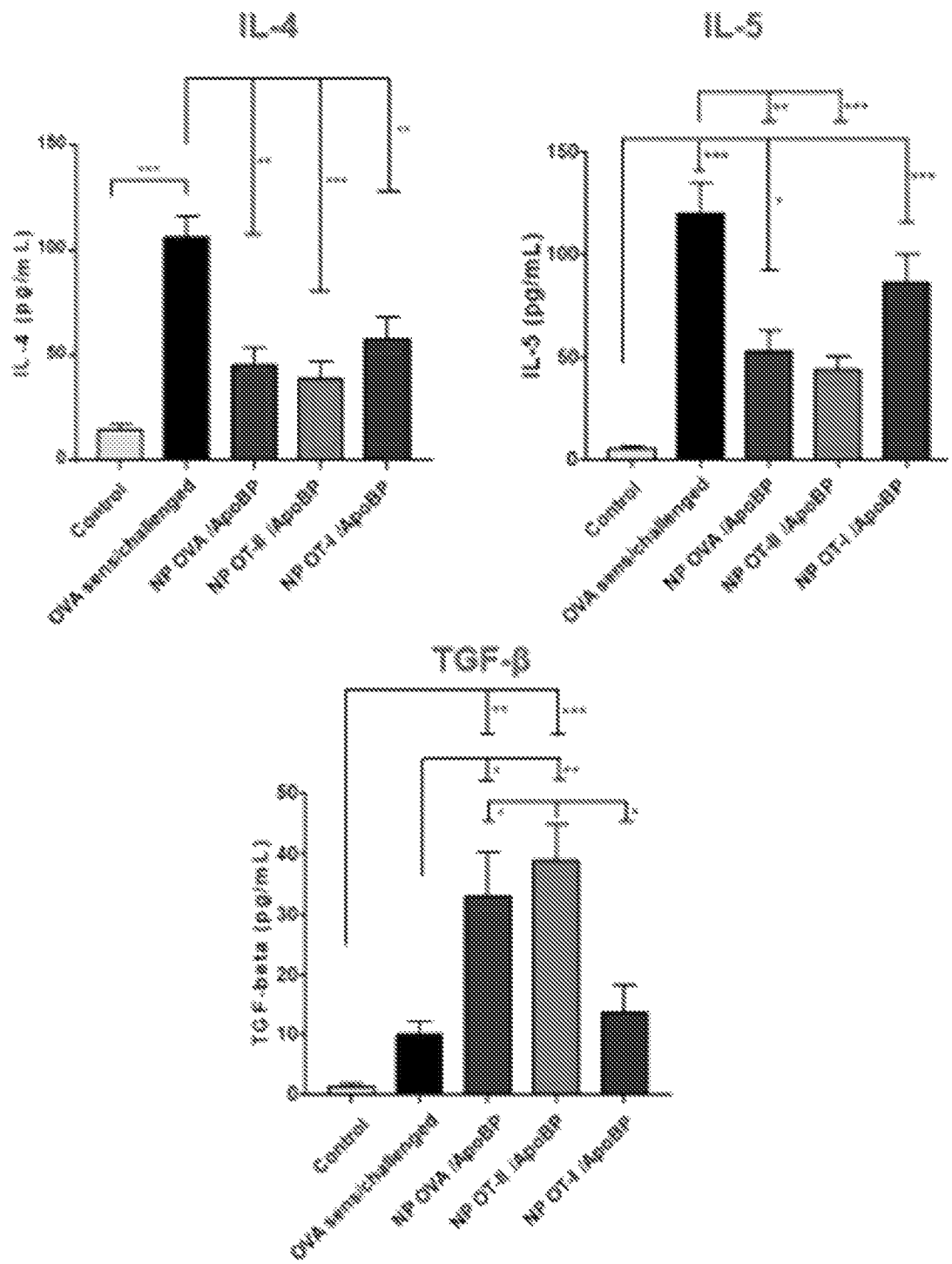
Fig. 28, cont'd.

SEQUENCE LISTING

<160> NUMBER OF SEQ ID NOS: 77

<210> SEQ ID NO 1
<211> LENGTH: 12
<212> TYPE: PRT
<213> ORGANISM: Artificial
<220> FEATURE:
<223> OTHER INFORMATION: ApoB targeting peptide

<400> SEQUENCE: 1

Cys Gly Gly Lys Leu Gly Arg Lys Arg Tyr Leu Arg
1               5                   10

<210> SEQ ID NO 2
<211> LENGTH: 6
<212> TYPE: PRT
<213> ORGANISM: Artificial
<220> FEATURE:
<223> OTHER INFORMATION: ApoB targeting peptide

<400> SEQUENCE: 2

Arg Lys Arg Gly Leu Lys
1               5

<210> SEQ ID NO 3
<211> LENGTH: 9
<212> TYPE: PRT
<213> ORGANISM: Artificial
<220> FEATURE:
<223> OTHER INFORMATION: ApoB targeting peptide

<400> SEQUENCE: 3

```
Arg Leu Tyr Arg Lys Arg Gly Leu Lys
1               5

<210> SEQ ID NO 4
<211> LENGTH: 19
<212> TYPE: PRT
<213> ORGANISM: Artificial
<220> FEATURE:
<223> OTHER INFORMATION: Glycyrrhizin targeting peptide

<400> SEQUENCE: 4

Cys Lys Asn Glu Lys Lys Asn Lys Ile Glu Arg Asn Asn Lys Leu Lys
1               5                   10                  15

Gln Pro Pro

<210> SEQ ID NO 5
<211> LENGTH: 17
<212> TYPE: PRT
<213> ORGANISM: Gallus gallus

<400> SEQUENCE: 5

Ile Ser Gln Ala Val His Ala Ala His Ala Glu Ile Asn Glu Ala Gly
1               5                   10                  15

Arg

<210> SEQ ID NO 6
<211> LENGTH: 16
<212> TYPE: PRT
<213> ORGANISM: Gallus gallus

<400> SEQUENCE: 6

Lys Leu Thr Glu Trp Thr Ser Ser Asn Val Met Glu Glu Arg Lys Ile
1               5                   10                  15

<210> SEQ ID NO 7
<211> LENGTH: 8
<212> TYPE: PRT
<213> ORGANISM: Gallus gallus

<400> SEQUENCE: 7

Ser Ile Ile Asn Phe Glu Lys Leu
1               5

<210> SEQ ID NO 8
<211> LENGTH: 12
<212> TYPE: PRT
<213> ORGANISM: Homo sapiens
<220> FEATURE:
<221> NAME/KEY: misc_feature
<222> LOCATION: (2)..(2)
<223> OTHER INFORMATION: Xaa is citrulline
<220> FEATURE:
<221> NAME/KEY: misc_feature
<222> LOCATION: (7)..(7)
<223> OTHER INFORMATION: Xaa can be any naturally occurring amino acid

<400> SEQUENCE: 8

Ala Xaa Gly Leu Thr Gly Xaa Pro Gly Asp Ala Lys
1               5                   10

<210> SEQ ID NO 9
<211> LENGTH: 21
<212> TYPE: PRT
<213> ORGANISM: Homo sapiens
<220> FEATURE:
<221> NAME/KEY: misc_feature
```

```
<222> LOCATION: (9)..(9)
<223> OTHER INFORMATION: Xaa is citrulline

<400> SEQUENCE: 9

His Gln Cys His Gln Glu Ser Thr Xaa Gly Arg Ser Arg Gly Arg Cys
1               5                   10                  15

Gly Arg Ser Gly Ser
            20

<210> SEQ ID NO 10
<211> LENGTH: 15
<212> TYPE: PRT
<213> ORGANISM: Homo sapiens
<220> FEATURE:
<221> NAME/KEY: misc_feature
<222> LOCATION: (1)..(1)
<223> OTHER INFORMATION: Xaa is citrulline
<220> FEATURE:
<221> NAME/KEY: misc_feature
<222> LOCATION: (13)..(13)
<223> OTHER INFORMATION: Xaa is citrulline
<220> FEATURE:
<221> NAME/KEY: misc_feature
<222> LOCATION: (15)..(15)
<223> OTHER INFORMATION: Xaa is citrulline

<400> SEQUENCE: 10

Xaa Pro Ala Pro Pro Ile Ser Gly Gly Gly Tyr Xaa Ala Xaa
1               5                   10                  15

<210> SEQ ID NO 11
<211> LENGTH: 14
<212> TYPE: PRT
<213> ORGANISM: Homo sapiens
<220> FEATURE:
<221> NAME/KEY: misc_feature
<222> LOCATION: (6)..(6)
<223> OTHER INFORMATION: Xaa is citrulline

<400> SEQUENCE: 11

Ser Ala Val Arg Ala Xaa Ser Ser Val Pro Gly Val Arg Lys
1               5                   10

<210> SEQ ID NO 12
<211> LENGTH: 10
<212> TYPE: PRT
<213> ORGANISM: Homo sapiens

<400> SEQUENCE: 12

Val Met Asn Ile Leu Leu Gln Tyr Val Val
1               5                   10

<210> SEQ ID NO 13
<211> LENGTH: 10
<212> TYPE: PRT
<213> ORGANISM: Homo sapiens

<400> SEQUENCE: 13

Arg Met Met Glu Tyr Gly Thr Thr Met Val
1               5                   10

<210> SEQ ID NO 14
<211> LENGTH: 10
<212> TYPE: PRT
<213> ORGANISM: Homo sapiens

<400> SEQUENCE: 14
```

Asn Leu Ala Gln Thr Asp Leu Ala Thr Val
1               5                   10

<210> SEQ ID NO 15
<211> LENGTH: 9
<212> TYPE: PRT
<213> ORGANISM: Homo sapiens

<400> SEQUENCE: 15

Gln Leu Ala Arg Gln Gln Val His Val
1               5

<210> SEQ ID NO 16
<211> LENGTH: 9
<212> TYPE: PRT
<213> ORGANISM: Homo sapiens

<400> SEQUENCE: 16

Ser Leu Ser Pro Leu Gln Ala Glu Leu
1               5

<210> SEQ ID NO 17
<211> LENGTH: 9
<212> TYPE: PRT
<213> ORGANISM: Homo sapiens

<400> SEQUENCE: 17

Ser Leu Ala Ala Gly Val Lys Leu Leu
1               5

<210> SEQ ID NO 18
<211> LENGTH: 9
<212> TYPE: PRT
<213> ORGANISM: Homo sapiens

<400> SEQUENCE: 18

Val Ile Val Met Leu Thr Pro Leu Val
1               5

<210> SEQ ID NO 19
<211> LENGTH: 9
<212> TYPE: PRT
<213> ORGANISM: Homo sapiens

<400> SEQUENCE: 19

Lys Leu Gln Val Phe Leu Ile Val Leu
1               5

<210> SEQ ID NO 20
<211> LENGTH: 9
<212> TYPE: PRT
<213> ORGANISM: Homo sapiens

<400> SEQUENCE: 20

Phe Leu Ile Val Leu Ser Val Ala Leu
1               5

<210> SEQ ID NO 21
<211> LENGTH: 9
<212> TYPE: PRT
<213> ORGANISM: Homo sapiens

<400> SEQUENCE: 21

Phe Leu Trp Ser Val Phe Met Leu Ile
1               5

```
<210> SEQ ID NO 22
<211> LENGTH: 9
<212> TYPE: PRT
<213> ORGANISM: Homo sapiens

<400> SEQUENCE: 22

Asn Leu Phe Leu Phe Leu Phe Ala Val
1               5

<210> SEQ ID NO 23
<211> LENGTH: 9
<212> TYPE: PRT
<213> ORGANISM: Homo sapiens

<400> SEQUENCE: 23

Phe Leu Phe Ala Val Gly Phe Tyr Leu
1               5

<210> SEQ ID NO 24
<211> LENGTH: 9
<212> TYPE: PRT
<213> ORGANISM: Homo sapiens

<400> SEQUENCE: 24

Tyr Leu Leu Leu Arg Val Leu Asn Ile
1               5

<210> SEQ ID NO 25
<211> LENGTH: 8
<212> TYPE: PRT
<213> ORGANISM: Homo sapiens

<400> SEQUENCE: 25

Leu Asn Ile Asp Leu Leu Trp Ser
1               5

<210> SEQ ID NO 26
<211> LENGTH: 9
<212> TYPE: PRT
<213> ORGANISM: Homo sapiens

<400> SEQUENCE: 26

Val Leu Phe Gly Leu Gly Phe Ala Ile
1               5

<210> SEQ ID NO 27
<211> LENGTH: 9
<212> TYPE: PRT
<213> ORGANISM: Homo sapiens

<400> SEQUENCE: 27

Arg Leu Leu Cys Ala Leu Thr Ser Leu
1               5

<210> SEQ ID NO 28
<211> LENGTH: 9
<212> TYPE: PRT
<213> ORGANISM: Homo sapiens

<400> SEQUENCE: 28

Ala Leu Trp Met Arg Leu Leu Pro Leu
1               5
```

```
<210> SEQ ID NO 29
<211> LENGTH: 9
<212> TYPE: PRT
<213> ORGANISM: Homo sapiens

<400> SEQUENCE: 29

Leu Trp Met Arg Leu Leu Pro Leu Leu
1               5

<210> SEQ ID NO 30
<211> LENGTH: 9
<212> TYPE: PRT
<213> ORGANISM: Homo sapiens

<400> SEQUENCE: 30

Arg Leu Leu Pro Leu Leu Ala Leu Leu
1               5

<210> SEQ ID NO 31
<211> LENGTH: 10
<212> TYPE: PRT
<213> ORGANISM: Homo sapiens

<400> SEQUENCE: 31

His Leu Cys Gly Ser His Leu Val Glu Ala
1               5                   10

<210> SEQ ID NO 32
<211> LENGTH: 9
<212> TYPE: PRT
<213> ORGANISM: Homo sapiens

<400> SEQUENCE: 32

His Leu Val Glu Ala Leu Tyr Leu Val
1               5

<210> SEQ ID NO 33
<211> LENGTH: 9
<212> TYPE: PRT
<213> ORGANISM: Homo sapiens

<400> SEQUENCE: 33

Ala Leu Tyr Leu Val Cys Gly Glu Arg
1               5

<210> SEQ ID NO 34
<211> LENGTH: 10
<212> TYPE: PRT
<213> ORGANISM: Homo sapiens

<400> SEQUENCE: 34

Leu Tyr Leu Val Cys Gly Glu Arg Gly Phe
1               5                   10

<210> SEQ ID NO 35
<211> LENGTH: 9
<212> TYPE: PRT
<213> ORGANISM: Homo sapiens

<400> SEQUENCE: 35

Leu Val Cys Gly Glu Arg Gly Phe Phe
1               5

<210> SEQ ID NO 36
<211> LENGTH: 10
```

```
<212> TYPE: PRT
<213> ORGANISM: Homo sapiens

<400> SEQUENCE: 36

Val Cys Gly Glu Arg Gly Phe Phe Tyr Thr
1               5                   10

<210> SEQ ID NO 37
<211> LENGTH: 8
<212> TYPE: PRT
<213> ORGANISM: Homo sapiens

<400> SEQUENCE: 37

Gly Glu Arg Gly Phe Phe Tyr Thr
1               5

<210> SEQ ID NO 38
<211> LENGTH: 9
<212> TYPE: PRT
<213> ORGANISM: Homo sapiens

<400> SEQUENCE: 38

Glu Arg Gly Phe Phe Tyr Thr Pro Lys
1               5

<210> SEQ ID NO 39
<211> LENGTH: 9
<212> TYPE: PRT
<213> ORGANISM: Homo sapiens

<400> SEQUENCE: 39

Phe Tyr Thr Pro Lys Thr Arg Arg Glu
1               5

<210> SEQ ID NO 40
<211> LENGTH: 11
<212> TYPE: PRT
<213> ORGANISM: Homo sapiens

<400> SEQUENCE: 40

Thr Pro Lys Thr Arg Arg Glu Ala Glu Asp Leu
1               5                   10

<210> SEQ ID NO 41
<211> LENGTH: 9
<212> TYPE: PRT
<213> ORGANISM: Homo sapiens

<400> SEQUENCE: 41

Ser Leu Gln Pro Leu Ala Leu Glu Gly
1               5

<210> SEQ ID NO 42
<211> LENGTH: 9
<212> TYPE: PRT
<213> ORGANISM: Homo sapiens

<400> SEQUENCE: 42

Ala Leu Glu Gly Ser Leu Gln Lys Arg
1               5

<210> SEQ ID NO 43
<211> LENGTH: 10
<212> TYPE: PRT
<213> ORGANISM: Homo sapiens
```

<400> SEQUENCE: 43

Ser Leu Gln Lys Arg Gly Ile Val Glu Gln
1               5                   10

<210> SEQ ID NO 44
<211> LENGTH: 10
<212> TYPE: PRT
<213> ORGANISM: Homo sapiens

<400> SEQUENCE: 44

Gly Ile Val Glu Gln Cys Cys Thr Ser Ile
1               5                   10

<210> SEQ ID NO 45
<211> LENGTH: 9
<212> TYPE: PRT
<213> ORGANISM: Homo sapiens

<400> SEQUENCE: 45

Ile Val Glu Gln Cys Cys Thr Ser Ile
1               5

<210> SEQ ID NO 46
<211> LENGTH: 9
<212> TYPE: PRT
<213> ORGANISM: Homo sapiens

<400> SEQUENCE: 46

Ser Leu Tyr Gln Leu Glu Asn Tyr Cys
1               5

<210> SEQ ID NO 47
<211> LENGTH: 13
<212> TYPE: PRT
<213> ORGANISM: Homo sapiens

<400> SEQUENCE: 47

His Ser Leu Gly Lys Trp Leu Gly His Pro Asp Lys Phe
1               5                   10

<210> SEQ ID NO 48
<211> LENGTH: 14
<212> TYPE: PRT
<213> ORGANISM: Homo sapiens

<400> SEQUENCE: 48

Asn Thr Trp Thr Thr Ser Gln Ser Ile Ala Phe Pro Ser Lys
1               5                   10

<210> SEQ ID NO 49
<211> LENGTH: 21
<212> TYPE: PRT
<213> ORGANISM: Homo sapiens

<400> SEQUENCE: 49

Val His Phe Phe Lys Asn Ile Val Thr Pro Arg Thr Pro Pro Pro Ser
1               5                   10                  15

Gln Gly Lys Gly Arg
                20

<210> SEQ ID NO 50
<211> LENGTH: 15
<212> TYPE: PRT

<213> ORGANISM: Homo sapiens

<400> SEQUENCE: 50

Tyr Lys Ser Ala His Lys Gly Phe Lys Gly Val Asp Ala Gln Gly
1               5                   10                  15

<210> SEQ ID NO 51
<211> LENGTH: 15
<212> TYPE: PRT
<213> ORGANISM: Homo sapiens

<400> SEQUENCE: 51

Lys Ser Ala His Lys Gly Phe Lys Gly Val Asp Ala Gln Gly Thr
1               5                   10                  15

<210> SEQ ID NO 52
<211> LENGTH: 15
<212> TYPE: PRT
<213> ORGANISM: Homo sapiens

<400> SEQUENCE: 52

Ser Ala His Lys Gly Phe Lys Gly Val Asp Ala Gln Gly Thr Leu
1               5                   10                  15

<210> SEQ ID NO 53
<211> LENGTH: 15
<212> TYPE: PRT
<213> ORGANISM: Homo sapiens

<400> SEQUENCE: 53

Ala His Lys Gly Phe Lys Gly Val Asp Ala Gln Gly Thr Leu Ser
1               5                   10                  15

<210> SEQ ID NO 54
<211> LENGTH: 15
<212> TYPE: PRT
<213> ORGANISM: Homo sapiens

<400> SEQUENCE: 54

His Lys Gly Phe Lys Gly Val Asp Ala Gln Gly Thr Leu Ser Lys
1               5                   10                  15

<210> SEQ ID NO 55
<211> LENGTH: 15
<212> TYPE: PRT
<213> ORGANISM: Homo sapiens

<400> SEQUENCE: 55

Gly Phe Lys Gly Val Asp Ala Gln Gly Thr Leu Ser Lys Ile Phe
1               5                   10                  15

<210> SEQ ID NO 56
<211> LENGTH: 21
<212> TYPE: PRT
<213> ORGANISM: Homo sapiens

<400> SEQUENCE: 56

Met Glu Val Gly Trp Tyr Arg Ser Pro Phe Ser Arg Val Val His Leu
1               5                   10                  15

Tyr Arg Asn Gly Lys
            20

<210> SEQ ID NO 57
<211> LENGTH: 15

```
<212> TYPE: PRT
<213> ORGANISM: Homo sapiens

<400> SEQUENCE: 57

Asp Glu Gly Gly Tyr Thr Cys Phe Phe Arg Asp His Ser Tyr Gln
1               5                   10                  15

<210> SEQ ID NO 58
<211> LENGTH: 17
<212> TYPE: PRT
<213> ORGANISM: Homo sapiens

<400> SEQUENCE: 58

Ile Ser Gln Ala Val His Ala Ala His Ala Glu Ile Asn Glu Ala Gly
1               5                   10                  15

Arg

<210> SEQ ID NO 59
<211> LENGTH: 15
<212> TYPE: PRT
<213> ORGANISM: Homo sapiens

<400> SEQUENCE: 59

Glu Lys Pro Lys Val Glu Ala Tyr Lys Ala Ala Ala Pro Ala
1               5                   10                  15

<210> SEQ ID NO 60
<211> LENGTH: 9
<212> TYPE: PRT
<213> ORGANISM: Homo sapiens

<400> SEQUENCE: 60

Ser Leu Leu Leu Glu Leu Glu Glu Val
1               5

<210> SEQ ID NO 61
<211> LENGTH: 9
<212> TYPE: PRT
<213> ORGANISM: Homo sapiens

<400> SEQUENCE: 61

Leu Met Trp Ala Lys Ile Gly Pro Val
1               5

<210> SEQ ID NO 62
<211> LENGTH: 9
<212> TYPE: PRT
<213> ORGANISM: Homo sapiens

<400> SEQUENCE: 62

Val Leu Phe Ser Ser Asp Phe Arg Ile
1               5

<210> SEQ ID NO 63
<211> LENGTH: 9
<212> TYPE: PRT
<213> ORGANISM: Homo sapiens

<400> SEQUENCE: 63

Ser Leu Ser Arg Phe Ser Trp Gly Ala
1               5

<210> SEQ ID NO 64
<211> LENGTH: 9
```

```
<212> TYPE: PRT
<213> ORGANISM: Homo sapiens

<400> SEQUENCE: 64

Lys Val Glu Asp Pro Phe Tyr Trp Val
1               5

<210> SEQ ID NO 65
<211> LENGTH: 10
<212> TYPE: PRT
<213> ORGANISM: Homo sapiens

<400> SEQUENCE: 65

Arg Thr Phe Asp Pro His Phe Leu Arg Val
1               5                   10

<210> SEQ ID NO 66
<211> LENGTH: 9
<212> TYPE: PRT
<213> ORGANISM: Homo sapiens

<400> SEQUENCE: 66

Phe Leu Arg Val Pro Cys Trp Lys Ile
1               5

<210> SEQ ID NO 67
<211> LENGTH: 10
<212> TYPE: PRT
<213> ORGANISM: Homo sapiens

<400> SEQUENCE: 67

Lys Ile Thr Leu Phe Val Ile Val Pro Val
1               5                   10

<210> SEQ ID NO 68
<211> LENGTH: 9
<212> TYPE: PRT
<213> ORGANISM: Homo sapiens

<400> SEQUENCE: 68

Val Leu Gly Pro Leu Val Ala Leu Ile
1               5

<210> SEQ ID NO 69
<211> LENGTH: 9
<212> TYPE: PRT
<213> ORGANISM: Homo sapiens

<400> SEQUENCE: 69

Thr Leu Phe Val Ile Val Pro Val Leu
1               5

<210> SEQ ID NO 70
<211> LENGTH: 10
<212> TYPE: PRT
<213> ORGANISM: Homo sapiens

<400> SEQUENCE: 70

Arg Leu Ala Gly Gln Phe Leu Glu Glu Leu
1               5                   10

<210> SEQ ID NO 71
<211> LENGTH: 9
<212> TYPE: PRT
<213> ORGANISM: Homo sapiens
```

<400> SEQUENCE: 71

Phe Leu Tyr Gly Ala Leu Leu Leu Ala
1               5

<210> SEQ ID NO 72
<211> LENGTH: 15
<212> TYPE: PRT
<213> ORGANISM: Arachis hypogaea

<400> SEQUENCE: 72

Leu Ala Leu Phe Leu Leu Ala Ala His Ala Ser Ala Arg Gln Gln
1               5                   10                  15

<210> SEQ ID NO 73
<211> LENGTH: 15
<212> TYPE: PRT
<213> ORGANISM: Arachis hypogaea

<400> SEQUENCE: 73

Leu Arg Asn Leu Pro Gln Gln Cys Gly Leu Arg Ala Pro Gln Arg
1               5                   10                  15

<210> SEQ ID NO 74
<211> LENGTH: 15
<212> TYPE: PRT
<213> ORGANISM: Arachis hypogaea

<400> SEQUENCE: 74

Met Ala Lys Leu Thr Ile Leu Val Ala Leu Ala Leu Phe Leu Leu
1               5                   10                  15

<210> SEQ ID NO 75
<211> LENGTH: 15
<212> TYPE: PRT
<213> ORGANISM: Arachis hypogaea

<400> SEQUENCE: 75

Ser Tyr Gly Arg Asp Pro Tyr Ser Pro Ser Gln Asp Pro Tyr Ser
1               5                   10                  15

<210> SEQ ID NO 76
<211> LENGTH: 10
<212> TYPE: PRT
<213> ORGANISM: Arachis hypogaea

<400> SEQUENCE: 76

His Ala Ser Ala Arg Gln Gln Trp Glu Leu
1               5                   10

<210> SEQ ID NO 77
<211> LENGTH: 15
<212> TYPE: PRT
<213> ORGANISM: Homo sapiens
<220> FEATURE:
<221> NAME/KEY: misc_feature
<222> LOCATION: (1)..(1)
<223> OTHER INFORMATION: Xaa can be any naturally occurring amino acid
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: misc_feature
<222> LOCATION: (15)..(15)
<223> OTHER INFORMATION: Xaa can be any naturally occurring amino acid

```
<400> SEQUENCE: 77

Xaa Pro Ala Pro Pro Pro Ile Ser Gly Gly Gly Tyr Xaa Ala Xaa
1               5                   10                  15
```

POLYMERIC NANOPARTICLES THAT TARGET LIVER SINUSOIDAL ENDOTHELIAL CELLS TO INDUCE ANTIGEN-SPECIFIC IMMUNE TOLERANCE

CROSS-REFERENCE TO RELATED APPLICATIONS

This application is a U.S. 371 National Phase of PCT/US2020/060036, filed on Nov. 11, 2020, which claims priority to and benefit of U.S. Ser. No. 62/933,898, filed on Nov. 11, 2019, and to U.S. Ser. No. 62/706,002, filed on Jul. 24, 2020, all of which are incorporated herein by reference in their entirety for all purposes.

STATEMENT OF GOVERNMENTAL SUPPORT

This invention was made with government support under Grant Numbers ES022698 and ES027237, awarded by the National Institutes of Health. The government has certain rights in the invention.

INCORPORATION BY REFERENCE OF SEQUENCE LISTING PROVIDED AS A TEXT FILE

This application contains references to nucleic acid sequences that have been submitted concurrently herewith as the sequence listing text file "UCLAP214US_ST25.txt", file size 14,422 bytes, created on Oct. 29, 2022, which is incorporated by reference in its entirety pursuant to 37 C.F.R. § 1.52(e)(5).

BACKGROUND

There is an unmet need for developing new treatment approaches for autoimmune and allergic disorders that goes beyond current therapeutic efforts of utilizing anti-inflammatory, immunosuppressive, targeted monoclonal antibody, or immunomodulatory approaches. Although most of these therapies provide symptomatic relief and a temporary abatement of disease activity, they do not provide long-term suppression of chronic disease activity or the prospect of a cure.

However, there is growing awareness of the power of regulatory T-cell (Treg) biology to provide antigen-specific immune tolerance for autoimmune disease (e.g., rheumatoid arthritis, lupus, type I diabetes) and allergic disorders (e.g., food allergy (e.g., peanut, wheat, milk, egg, etc.), anaphylaxis, asthma).[1,2] One approach for inducing antigen-specific tolerance is to use biodegradable nanoparticles to initiate and sustain immunomodulatory responses, based on the ability of these carriers to encapsulate disease-related antigens that are delivered to antigen-presenting cells (APC).[3-7] The tolerogenic properties of the liver are well-known for this organ's role in preventing immune responses to exogenous food antigens coming from the gastrointestinal tract and portal venous system, as well as promoting the persistence of tumor metastases to this organ.[8] Moreover, the liver also enjoys immune privilege during organ transplantation, requiring less immunosuppressive therapy than kidney or heart transplants.[9] It has also been demonstrated that concurrent transplant of a kidney or a heart with a liver is less prone to undergo immunological rejection compared to an isolated organ transplant.[10,11] The hepatic expression and ability of liver APCs to present myelin basic protein (MBP) to the immune system has likewise been demonstrated to control experimental allergic encephalomyelitis (an autoimmune disorder that simulates multiple sclerosis) in mice.[12]

The immunosuppressive effects of the liver can, in part, be ascribed to its unique system of APCs, including natural tolerogenic APCs such as Kupffer cells (KC), dendritic cells (DC), and liver sinusoidal endothelial cells (LSECs).[13,14] These tolerogenic APCs constitute an integral component of the liver's reticuloendothelial system, which has the key function of clearing foreign materials, degradation products, and toxins from sinusoidal blood by phagocytic uptake as well as endocytic processing.[14] Moreover, whereas professional phagocytes (KC and DC) preferentially eliminate circulating microscale particulate materials through phagocytosis, LSECs are more proficient in eliminating soluble macromolecules and particulates in the 200 nm size range by clathrin-mediated endocytosis.[15,16] From an immunoregulatory perspective, LSECs play a key role in inducing immune suppression of $CD8^+$ and $CD4^+$ populations through the generation of antigen-specific Tregs, TGF-β production, and upregulation of the ligand (PD-L1) for the programmed cell death protein 1 (PD-1) receptor.[17-19] It is also of further interest that LSECs obtained from Foxp3gfp/KI transgenic mice were shown to be more capable of generating antigen-specific $CD4^+$/$Foxp3^+$ regulatory T-cells compared to KC or liver DC from the same animals.[18,20] Thus, the ability of LSECs to control the function of antigen-specific Tregs should be considered for the treatment of autoimmune and allergic disease manifestations.

The use of nanoparticles to induce immune tolerance is an active area of investigation and includes approaches such decorating particle surfaces with peptide/major histocompatibility (MHC) complexes, serving as a surrogate antigen presentation platform for immune tolerization in the absence of costimulation.[21-25] Other approaches include the incorporation of food allergens or autoimmune proteins/peptides (e.g., type II collagen) in orally administered nanoparticles,[26-28] harnessing apoptotic cell death (e.g., apoptotic cell-peptide conjugates or liposomes containing phosphatidylserine),[29-33] targeting B-cell-specific tolerance via the CD22 receptor,[34,35] or encapsulating pharmacological agents (e.g., rapamycin) that induce tolerogenic states in APC by impacting antigen presentation, maturation, and/or the expression of costimulatory molecules.[36-38]

SUMMARY

Although various nano-enabled immunotherapy approaches are yielding promising results, our preferred approach is to use the natural tolerogenic effects of the liver, which can be exploited by a versatile nanoparticle platform constructed from, inter alia, a FDA-approved biodegradable polymer, e.g., poly(lactic-co-glycolic acid) (PLGA). One illustrative approach is to target mannose and/or scavenging receptors (SR) that are involved in endocytosis of circulating antigens, extracellular macromolecules, protein degradation products, and lipoproteins by LSECs.[15] Whereas the stabilin-1 and stabilin-2 SRs are exclusively expressed on LSECs, the mannose receptor also appears in lesser quantities on the KC surface.[15] These receptors can be targeted by placing, for example, an apolipoprotein B (ApoB) peptide sequence or mannan, respectively, on the nanoparticle surface.

As described in the Examples with respect to an illustrative, but non-limiting embodiment, we demonstrate the design and synthesis of PLGA nanoparticles for delivering ovalbumin (OVA) in a murine model of OVA-induced airway allergic inflammation to investigate whether surface coating with mannan and/or an ApoB peptide could change disease outcome by inducing a Treg-mediated tolerogenic effect. We demonstrate that ligand-coated NPs can improve OVA delivery to LSECs in vitro and in vivo, with the ability to induce TGF-β production and antigen-specific immune tolerance. Although tolerization could be obtained by OVA delivery to the liver in nondecorated 200-300 nm NPs, the tolerogenic effects could be dramatically enhanced by the attachment of surface ligands. These results demonstrate the feasibility of developing a tolerogenic nanoparticle platform for allergen delivery to LSECs by controlling particle size and decorating the particle surface with ligands that target the liver.

Accordingly, various embodiments contemplated herein may include, but need not be limited to, one or more of the following:

Embodiment 1: A tolerogenic nanoparticle comprising:

a nanoparticle comprising a biocompatible polymer;

an antigen encapsulated within or attached to said biocompatible polymer where said antigen comprises an antigen to which immune tolerance is to be induced by administration of said tolerogenic nanoparticle to a mammal; and a first targeting moiety that binds to a scavenger receptor in the liver and/or a second targeting moiety that binds to a mannose receptor in the liver, and/or a third targeting moiety that binds to hepatocytes, wherein said first targeting moiety and/or said second targeting moiety, and/or said third targeting moiety are attached to the surface of said nanoparticle.

Embodiment 2: The tolerogenic nanoparticle of embodiment 1, wherein said biocompatible polymer comprises one or more polymers selected from the group consisting of poly(lactic-co-glycolic acid) (PLGA), Poly(glycolic acid) (PGA), Poly(lactic acid) (PLA), Poly(caprolactone) (PCL), Poly(butylene succinate), Poly(trimethylene carbonate), Poly(p-dioxanone), Poly(butylene terephthalate), Poly(ester amide) (HYBRANE®), polyurethane, Poly[(carboxyphenoxy) propane-sebacic acid], Poly[bis(hydroxyethyl) terephthalate-ethyl orthophosphorylate/terephthaloyl chloride], Poly(β-hydroxyalkanoate), Poly(hydroxybutyrate), and Poly(hydroxybutyrate-co-hydroxyvalerate).

Embodiment 3: The tolerogenic nanoparticle of embodiment 2, wherein said biocompatible polymer comprises poly(lactic-co-glycolic acid) (PLGA).

Embodiment 4: The tolerogenic nanoparticle of embodiment 3, wherein said PLGA comprises a lactide/glycolide molar ratio of about 50:50.

Embodiment 5: The tolerogenic nanoparticle according to any one of embodiments 3-4, wherein said PLGA includes a content ranging from about 8% up to about 20% of ~5 kDa PEG.

Embodiment 6: The tolerogenic nanoparticle according to any one of embodiments 1-5, wherein said nanoparticle ranges in size from about 50 nm, or from about 100 nm, or from about 200 nm up to about 450 nm, or up to about 400 nm, or up to about 350 nm, or up to about 300 nm.

Embodiment 7: The tolerogenic nanoparticle of embodiment 6, wherein said nanoparticle ranges in size from about 200 nm up to about 300 nm.

Embodiment 8: The tolerogenic nanoparticle according to any one of embodiments 1-7, wherein said nanoparticle comprises a first targeting moiety that binds to an APC-targeting scavenger receptor in the liver attached to the surface of said nanoparticle.

Embodiment 9: The tolerogenic nanoparticle of embodiment 8, wherein said first targeting moiety binds to or more scavenger receptors selected from the group consisting of Stabilin 1, Stabilin 2, and mannose receptor.

Embodiment 10: The tolerogenic nanoparticle of embodiment 9, wherein said targeting moiety comprises a fragment of apolipoprotein B protein effective to bind to Stabilin 1 and/or Stabilin 2.

Embodiment 11: The tolerogenic nanoparticle of embodiment 10, wherein said targeting moiety fragment ranges in length from about 5 amino acids, or from about 8, or from about 10 up to about 50, or up to about 40, or up to about 30, or up to about 20 amino acids.

Embodiment 12: The tolerogenic nanoparticle of embodiment 11, wherein said first targeting moiety comprises a fragment of the apoB protein comprising the amino acid sequence RKRGLK (SEQ ID NO:2).

Embodiment 13: The tolerogenic nanoparticle of embodiment 12, wherein said first targeting moiety comprises a fragment of the apoB protein comprising the amino acid sequence RLYRKRGLK (SEQ ID NO: 5).

Embodiment 14: The tolerogenic nanoparticle of embodiment 12, wherein said first targeting moiety comprise or consists of the amino acid sequence

```
                                      (SEQ ID NO: 1)
                    CGGKLGRKYRYL.
```

Embodiment 15: The tolerogenic nanoparticle according to any one of embodiments 8-14, wherein said first binding moiety is physically adsorbed to said nanoparticle.

Embodiment 16: The tolerogenic nanoparticle according to any one of embodiments 8-14, wherein said first binding moiety is covalently bound to said nanoparticle directly or through a linker.

Embodiment 17: The tolerogenic nanoparticle of embodiment 16, wherein said first binding moiety is covalently bound to said nanoparticle through a linker.

Embodiment 18: The tolerogenic nanoparticle of embodiment 17, wherein said linker comprises a maleimide linker.

Embodiment 19: The tolerogenic nanoparticle of embodiment 18, wherein said linker comprises N-(2-aminoethyl) maleimide (NAEM).

Embodiment 20: The tolerogenic nanoparticle according to any one of embodiments 1-19, wherein said nanoparticle comprises a second targeting moiety that binds to a mannose receptor.

Embodiment 21: The tolerogenic nanoparticle of embodiment 20, wherein said second targeting moiety comprises mannan.

Embodiment 22: The tolerogenic nanoparticle of embodiment 21, wherein said second targeting moiety comprises a mannan having a MW ranging from about 35 to about 60 kDa.

Embodiment 23: The tolerogenic nanoparticle according to any one of embodiments 20-22, wherein said second binding moiety is adsorbed to said nanoparticle.

Embodiment 24: The tolerogenic nanoparticle according to any one of embodiments 20-22, wherein said second binding moiety is covalently bound to said nanoparticle directly or through a linker.

Embodiment 25: The tolerogenic nanoparticle of embodiment 24, wherein said second binding moiety is coupled to said nanoparticle through a hydroxyl terminus of said binding moiety.

Embodiment 26: The tolerogenic nanoparticle of embodiment 25, wherein said hydroxyl terminus is bound to a COOH terminal group on said nanoparticle.

Embodiment 27: The tolerogenic nanoparticle according to any one of embodiments 1-26, wherein said nanoparticle comprises a third targeting moiety that binds to a hepatocyte.

Embodiment 28: The tolerogenic nanoparticle of embodiment 27, wherein said third targeting moiety comprises a moiety selected from the group consisting of Asialoorosomucoid, Galactoside, a Galactosamine, Asialofetuin, Sterylglucoside, Lactose/lactobionic acid, PVLA (poly-(N-p-vinylbenzyl-O-beta-D-galactopyranosyl-[1-4]-D-gluconamide), Linoleic acid, Glycyrrhizin, and acetyl-CKNEKKNKIERNNKLKQPP-amide (SEQ ID NO:4).

Embodiment 29: The tolerogenic nanoparticle of embodiment 28, wherein said third targeting moiety comprises N-acetylgalactosamine (GalNAC).

Embodiment 30: The tolerogenic nanoparticle according to any one of embodiments 27-29, wherein said third binding moiety is adsorbed to said nanoparticle.

Embodiment 31: The tolerogenic nanoparticle according to any one of embodiments 27-29, wherein said third binding moiety is covalently bound to said nanoparticle directly or through a linker.

Embodiment 32: The tolerogenic nanoparticle of embodiment 24, wherein said hydroxyl terminus is bound to a COOH terminal group on said nanoparticle.

Embodiment 33: The tolerogenic nanoparticle according to any one of embodiments 1-32, wherein said an antigen disposed on or encapsulated within said biocompatible polymer.

Embodiment 34: The tolerogenic nanoparticle according to any one of embodiments 1-32, wherein said an antigen is attached to the surface of said nanoparticle.

Embodiment 35: The tolerogenic nanoparticle according to any one of embodiments 1-32, wherein said antigen comprises a material selected from the group consisting of a peptide, a nucleic acid, a nucleoprotein, a glycoprotein, and a carbohydrate.

Embodiment 36: The tolerogenic nanoparticle of embodiment 35, wherein said antigen comprises a peptide.

Embodiment 37: The tolerogenic nanoparticle of embodiment 34, wherein said antigen comprises a peptide ranging in length from about 5 amino acids, or from about 8 amino acids, or from about 10 amino acids, or from about 15 amino acids up to about 60 amino acids, or up to about 50 amino acids, or up to about 40 amino acids, or up to about 30 amino acids.

Embodiment 38: The tolerogenic nanoparticle according to any one of embodiments 1-37, wherein said tolerogenic nanoparticle is effective to induce immune tolerance and/or to reduce an immune response when administered to a mammal.

Embodiment 39: The tolerogenic nanoparticle of embodiment 38, wherein said induction of immune tolerance and/or reduction of the allergic immune response is characterized by an increase in one or more markers selected from the group consisting of TGFβ, IL-10, and Foxp3 and/or a decrease in IgE (IgE directed against said antigen), and a decrease in T-helper 2 cytokines (IL-4, IL-5, IL-13) and eosinophils.

Embodiment 40: The tolerogenic nanoparticle according to any one of embodiments 1-37, wherein said antigen comprises an antigen, associated with an allergic disease or an autoimmune disorder, or an epitope of said antigen.

Embodiment 41: The tolerogenic nanoparticle of embodiment 40, wherein said antigen comprises an antigen associated with an allergic disease.

Embodiment 42: The tolerogenic nanoparticle of embodiment 41, wherein said allergic disease comprises a food allergy or asthma.

Embodiment 43: The tolerogenic nanoparticle of embodiment 42, wherein said allergic disease comprises asthma.

Embodiment 44: The tolerogenic nanoparticle of embodiment 43, wherein said antigen comprises an antigen selected from the group consisting of ovalbumin or a tolerogenic fragment thereof. Api m 1(PLA$_2$) (bee) or a tolerogenic epitope thereof, Ara h2 or an epitope thereof for peanut allergy and Fel d 1 (cat) or a tolerogenic epitope thereof.

Embodiment 45: The tolerogenic nanoparticle of embodiment 44, wherein said antigen comprises an antigen selected from the group consisting of OVA$_{323-339}$ ISQAVHAA-HAEINEAGR (SEQ ID NO:5), OVA$_{263-278}$, KLTEWTSSNVMEERKI (SEQ ID NO:6), and OVA$_{257-264}$ SIINFEKL (SEQ ID NO:7).

Embodiment 46: The tolerogenic nanoparticle of embodiment 42, wherein said allergic disease comprises a food antigen selected from the gliadin's leading to gluten intolerance and lactose intolerance.

Embodiment 47: The tolerogenic nanoparticle of embodiment 46, wherein said antigen comprises gluten or tolerogenic epitope thereof, lactose or a tolerogenic fragment thereof.

Embodiment 48: The tolerogenic nanoparticle of embodiment 42, wherein said allergic disease comprises a gluten intolerance, a lactose intolerance, a shellfish allergy, or a peanut allergy.

Embodiment 49: The tolerogenic nanoparticle of embodiment 48, wherein said antigen comprises gluten or tolerogenic fragment thereof, or lactose or a tolerogenic fragment thereof, a tolerogenic component of shellfish, or a tolerogenic component of peanut.

Embodiment 50: The tolerogenic nanoparticle of embodiment 48, wherein said antigen comprises a tolerogenic component of peanut.

Embodiment 51: The tolerogenic nanoparticle of embodiment 50, wherein said antigen comprises a crude peanut extract.

Embodiment 52: The tolerogenic nanoparticle of embodiment 50, wherein said antigen comprises an Ara h protein or tolerogenic fragment thereof.

Embodiment 53: The tolerogenic nanoparticle of embodiment 52, wherein said antigen comprise a protein selected from the group consisting of Ara h1 or a tolerogenic fragment thereof, Ara h2 or a tolerogenic fragment thereof, Ara h3 or a tolerogenic fragment thereof, and Ara h4 or a tolerogenic fragment thereof.

Embodiment 54: The tolerogenic nanoparticle of embodiment 53, wherein said antigen comprises or consists of an amino acid sequence selected from the group consisting of

```
                                          (SEQ ID NO: 72)
       LALFLLAAHASARQQ, (SEQ ID NO: 73)
       LRNLPQQCGLRAPQR, (SEQ ID NO: 74)
       MAKLTILVALALFLL, (SEQ ID NO: 75
       SYGRDPYSPSQDPYS,
       and (SEQ ID NO: 76)
       HASARQQWEL.
```

Embodiment 55: The tolerogenic nanoparticle of embodiment 54, wherein said antigen ranges in length up to 30 amino acids, or up to 25 amino acids, or up to 20 amino acids, and comprises an amino acid sequence selected from the group consisting of

LALFLLAAHASARQQ, (SEQ ID NO: 72)

LRNLPQQCGLRAPQR, (SEQ ID NO: 73)

MAKLTILVALALFLL, (SEQ ID NO: 74)

SYGRDPYSPSQDPYS, (SEQ ID NO: 75)
and

HASARQQWEL. (SEQ ID NO: 76)

Embodiment 56: The tolerogenic nanoparticle of embodiment 55, wherein the amino acid sequence of said antigen consists of an amino acid sequence selected from the group consisting of

LALFLLAAHASARQQ, (SEQ ID NO: 72)

LRNLPQQCGLRAPQR, (SEQ ID NO: 73)

MAKLTILVALALFLL, (SEQ ID NO: 74)

SYGRDPYSPSQDPYS, (SEQ ID NO: 75)
and

HASARQQWEL. (SEQ ID NO: 76)

Embodiment 57: The tolerogenic nanoparticle of embodiment 40, wherein said antigen comprises an antigen associated with an autoimmune disorder.

Embodiment 58: The tolerogenic nanoparticle of embodiment 57, wherein the autoimmune disorder is selected from the group consisting of rheumatoid arthritis, type 1 diabetes, multiple sclerosis, Crohn's disease, Systemic lupus erythematosus, Scleroderma, Alopecia areata, Antiphospholipid antibody syndrome, Autoimmune hepatitis, Celiac disease, Graves' disease, Guillain-Barre syndrome, Hashimoto's disease, Hemolytic anemia, Idiopathic thrombocytopenic purpura, inflammatory bowel disease, ulcerative colitis, inflammatory myopathies, Polymyositis, Myasthenia gravis, Primary biliary cirrhosis, Psoriasis, Sjogren's syndrome, Vitiligo, gout, celiac disease, atopic dermatitis, acne vulgaris, autoimmune hepatitis, and autoimmune pancreatitis.

Embodiment 59: The tolerogenic nanoparticle of embodiment 58, wherein the autoimmune disorder is rheumatoid arthritis.

Embodiment 60: The tolerogenic nanoparticle of embodiment 59, wherein said antigen comprises a citrinullated peptide.

Embodiment 61: The tolerogenic nanoparticle of embodiment 60, wherein said antigen comprises a citrullinated peptide selected from the group consisting of citrullinated collagen type II, a citrinullated filaggrin, a citrinullated beta-fibrinogen, and a citrinullated vimentin.

Embodiment 62: The tolerogenic nanoparticle of embodiment 61, wherein said antigen is selected from the group consisting of citrullinated (cit)-collagen type II (359-369) ACitGLTGCitPGDAK (SEQ ID NO:8); cit-filaggrin (306-326), HQCHQESTCitGRSRGRCGRSGS (SEQ ID NO:9); cit-β-fibrinogen (60-74), CitPAPPPISGGGYCitACit (SEQ ID NO:10); and cit-vimentin (65-77), SAVRACitSSVPGVRK (SEQ ID NO: 11).

Embodiment 63: The tolerogenic nanoparticle of embodiment 58, wherein the autoimmune disorder is type 1 diabetes.

Embodiment 64: The tolerogenic nanoparticle of embodiment 63, wherein the antigen comprises a pancreatic cell antigen.

Embodiment 65: The tolerogenic nanoparticle of embodiment 64, wherein the antigen is selected from the group consisting of insulin, proinsulin, glutamic acid decarboxylase-65 (GAD65), insulinoma-associated protein 2, heat shock protein 60, ZnT8, and islet-specific glucose-6-phosphatase catalytic subunit.

Embodiment 66: The tolerogenic nanoparticle of embodiment 64, wherein the antigen comprises or consists of an amino acid sequence shown in Table 1.

Embodiment 67: The tolerogenic nanoparticle of embodiment 58, wherein the autoimmune disorder is a demyelinating CNS disease.

Embodiment 68: The tolerogenic nanoparticle of embodiment 67, wherein said demyelinating disease comprises multiple sclerosis or acute disseminated encephalomyelitis (ADEM).

Embodiment 69: The tolerogenic nanoparticle according to any one of embodiments 67-68, wherein the antigen is selected from the group consisting of myelin basic protein or a tolerogenic fragment thereof, myelin proteolipid protein or a tolerogenic fragment thereof, and myelin-associated oligodendrocyte basic protein or a tolerogenic fragment thereof.

Embodiment 70: The tolerogenic nanoparticle of embodiment 69, wherein said antigen comprises encephalitogenic proteolipid peptides PLP139-151 or PLP178-191.

Embodiment 71: The tolerogenic nanoparticle of embodiment 69, wherein said antigen comprises a tolerogenic fragment of myelin basic protein $MBP_{84-131}$, $MBP_{131-158}$, or myelin oligodendrocyte protein.

Embodiment 72: The tolerogenic nanoparticle of embodiment 71, wherein said tolerogenic fragment is selected from the group consisting of $MBP_{84-104}$ (VHFFKNIVTPRTPPP-SQGKGR, SEQ ID NO:49), $MBP_{134-148}$ (YK-SAHKGFKGVDAQG, SEQ ID NO:50), $MBP_{135-149}$ (KSAHKGFKGVDAQGT, SEQ ID NO:51), $MBP_{136-150}$ (SAHKGFKGVDAQGTL, SEQ ID NO:52), $MBP_{137-151}$ (AHKGFKGVDAQGTLS, SEQ ID NO:53), $MBP_{138-152}$ (HKGFKGVDAQGTLSK, SEQ ID NO:54), $MBP_{140-151}$ (GFKGVDAQGTLSKIF, SEQ ID NO:55), myelin oligodendrocyte protein $(MOG)_{35-55}$ (MEVGWYRSPFSRVVH-LYRNGK, SEQ ID NO:56), $MOG_{92-106}$ (DE-GGYTCFFRDHSYQ, SEQ ID NO:57), and J5 (EKPKVEAYKAAAAPA, SEQ ID NO:59).

Embodiment 73: The tolerogenic nanoparticle of embodiment 69, wherein said antigen comprises or consists of an amino acid sequence shown in Table 2.

Embodiment 74: The tolerogenic nanoparticle of embodiment 58, wherein the autoimmune disorder is acquired factor VIII (FVIII) deficiency, or acquired hemophilia A (AHA).

Embodiment 75: The tolerogenic nanoparticle of embodiment 74, wherein said antigen comprises coagulation FVII or a tolerogenic epitope thereof.

Embodiment 76: The tolerogenic nanoparticle of embodiment 74, wherein said antigen comprises a proteins used in therapeutics and/or drugs that lead to acute anaphylactic reactions or delayed onset hypersensitivity such as Stevens-Johnson syndrome.

Embodiment 77: The tolerogenic nanoparticle according to any one of embodiments 1-32, wherein said antigen comprises a gene therapy vector or a protein comprising a protein from the protein coat of a gene therapy vector.

Embodiment 78: The tolerogenic nanoparticle of embodiment 77, wherein said antigen comprises a gene therapy vector or a protein comprising a protein coat from a gene therapy vector selected from the group consisting of a lentiviral vector (lentivector), an adenovirus vector, and an adeno-associated viral (AAV) vectors.

Embodiment 79: The tolerogenic nanoparticle of embodiment 78, wherein said antigen comprises an AAV gene therapy vector or a protein comprising a protein coat from an AAV gene therapy vector.

Embodiment 80: The tolerogenic nanoparticle according to any one of embodiments 77-79, wherein said antigen comprises a protein comprising a protein coat of a gene therapy vector.

Embodiment 81: The tolerogenic nanoparticle according to any one of embodiments 77-79, wherein said antigen comprises a gene therapy viral vector (virion).

Embodiment 82: The tolerogenic nanoparticle according to any one of embodiments 1-81, wherein said nanoparticle contains an immune modulator (e.g., an immune suppressant).

Embodiment 83: The tolerogenic nanoparticle of embodiment 82, wherein said immune modulator comprises one or more moieties selected from the group consisting of rapamycin or a rapamycin analog (e.g., Calcineurin inhibitors (cyclosporin, tacrolimus), Corticosteroids (e.g., methylprednisolone, dexamethasone, prednisolone), Cytotoxic immunosuppressants (e.g., azathioprine, chlorambucil, cyclophosphamide, mercaptopurine, methotrexate), Immunosuppressant antibodies (e.g., antithymocyte globulins, basiliximab, infliximab), sirolimus derivatives (e.g., everolimus, sirolimus), and other immunosuppressants such as mycophenolate.

Embodiment 84: The tolerogenic nanoparticle of embodiment 83, wherein said immune modulator comprises rapamycin (sirolimus).

Embodiment 85: The tolerogenic nanoparticle of embodiment 83, wherein said immune modulator comprises a rapamycin analog selected from the group consisting of temsirolimus, everolimus, and ridaforolimus.

Embodiment 86: The tolerogenic nanoparticle of embodiment 83, wherein said immune modulator comprises a moiety selected from the group consisting of rapamycin, all-trans retinoic acid (ATRA) or nucleoside DNA methyl trans-ferase inhibitors, which functions specifically to increase Treg generation, Treg stability (through Fox P3 expression) and Treg trafficking to sites of immune suppression.

Embodiment 87: A pharmacological formulation, said formulation comprising:
 a tolerogenic nanoparticle according to any one of embodiments 1-86; and
 a pharmaceutically acceptable carrier.

Embodiment 88: The pharmaceutical formulation of embodiment 87, wherein said formulation is a unit dosage formulation.

Embodiment 89: The pharmaceutical formulation according to any one of embodiments 87-88, wherein said formulation is formulated for administration via a route selected from the group consisting of oral administration, inhalation, nasal administration, rectal administration, intraperitoneal injection, intravascular injection, subcutaneous injection, transcutaneous administration, intrathecal administration and intramuscular injection.

Embodiment 90: A method for the treatment and/or prophylaxis of an autoimmune disorder and/or an allergic disease in a mammal, said method comprising:
 administering to said mammal an effective amount of a tolerogenic nanoparticle according to any one of embodiments 1-37, wherein said antigen comprises an antigen, associated with said allergic disease and/or said autoimmune disorder, or an effective fragment of said antigen.

Embodiment 91: The method of embodiment 90, wherein said antigen comprises an antigen associated with an allergic disease.

Embodiment 92: The method of embodiment 91, wherein said allergic disease comprises a food allergy or asthma.

Embodiment 93: The method of embodiment 92, wherein said allergic disease comprises asthma.

Embodiment 94: The method of embodiment 93, wherein said antigen comprises an antigen selected from the group consisting of ovalbumin or a tolerogenic fragment thereof. Api m 1($PLA_2$) (bee) or a tolerogenic epitope thereof, Ara h2 (peanut) or a tolerogenic epitope thereof and Fel d 1 (cat) or a tolerogenic fragment thereof.

Embodiment 95: The method of embodiment 94, wherein said antigen comprises an antigen selected from the group consisting of $OVA_{323-339}$ ISQAVHAAHAEINEAGR (SEQ ID NO:5), $OVA_{263-278}$ KLTEWTSSNVMEERKI (SEQ ID NO:6), and $OVA_{257-264}$ SIINFEKL (SEQ ID NO:7).

Embodiment 96: The method of embodiment 92, wherein said allergic disease comprises a food allergy selected from the group consisting of gluten intolerance and lactose intolerance.

Embodiment 97: The method of embodiment 96, wherein said antigen comprises gluten or tolerogenic fragment thereof, lactose or a tolerogenic fragment thereof.

Embodiment 98: The method of embodiment 90, wherein said antigen comprises an antigen associated with an autoimmune disorder.

Embodiment 99: The method of embodiment 98, wherein the autoimmune disorder is selected from the group consisting of rheumatoid arthritis, type 1 diabetes, multiple sclerosis, Crohn's disease, Systemic lupus erythematosus, Scleroderma, Alopecia areata, Antiphospholipid antibody syndrome, Autoimmune hepatitis, Celiac disease, Graves' disease, Guillain-Barre syndrome, Hashimoto's disease, Hemolytic anemia, Idiopathic thrombocytopenic purpura, inflammatory bowel disease, ulcerative colitis, inflammatory myopathies, Polymyositis, Myasthenia gravis, Primary biliary cirrhosis, Psoriasis, Sjogren's syndrome, Vitiligo, gout, celiac disease, atopic dermatitis, acne vulgaris, autoimmune hepatitis, and autoimmune pancreatitis.

Embodiment 100: The method of embodiment 99, wherein the autoimmune disorder is rheumatoid arthritis.

Embodiment 101: The method of embodiment 100, wherein said antigen comprises a citrinullated peptide.

Embodiment 102: The method of embodiment 101, wherein said antigen comprises a citrullinated peptide selected from the group consisting of citrinullated collagen type II, a citrinullated filaggrin, a citrinullated beta-fibrinogen, and a citrinullated vimentin.

Embodiment 103: The method of embodiment 102, wherein said antigen is selected from the group consisting of citrullinated (cit)-collagen type II (359-369) ACitGLTGCitPGDAK (SEQ ID NO:8); cit-filaggrin (306-326), HQCHQESTCitGRSRGRCGRSGS (SEQ ID NO:9); cit-β-fibrinogen (60-74), CitPAPPPISGGGYCitACit (SEQ ID NO:10); and cit-vimentin (65-77), SAVRAC-itSSVPGVRK (SEQ ID NO:11).

Embodiment 104: The method of embodiment 99, wherein the autoimmune disorder is type 1 diabetes.

Embodiment 105: The method of embodiment 104, wherein the antigen comprises a pancreatic cell antigen.

Embodiment 106: The method of embodiment 105, wherein the antigen is selected from the group consisting of insulin, proinsulin, glutamic acid decarboxylase-65 (GAD65), insulinoma-associated protein 2, heat shock protein 60, ZnT8, and islet-specific glucose-6-phosphatase catalytic subunit.

Embodiment 107: The method of embodiment 99, wherein the autoimmune disorder is a demyelinating disease.

Embodiment 108: The method of embodiment 107, wherein said demyelinating disease comprises multiple sclerosis or acute disseminated encephalomyelitis (ADEM).

Embodiment 109: The method according to any one of embodiments 107-108, wherein the antigen is selected from the group consisting of myelin basic protein or a tolerogenic fragment thereof, myelin proteolipid protein or a tolerogenic fragment thereof, and myelin-associated oligodendrocyte basic protein or a tolerogenic fragment thereof.

Embodiment 110: The method of embodiment 109, wherein said antigen comprises encephalitogenic proteolipid peptides PLP139-151 or PLP178-191.

Embodiment 111: The method of embodiment 109, wherein said antigen comprises a tolerogenic fragment of myelin basic protein myelin basic protein $MBP_{84-131}$, $MBP_{131-158}$, or myelin oligodendrocyte protein.

Embodiment 112: The method of embodiment 111, wherein said tolerogenic fragment is selected from the group consisting of $MBP_{84-104}$ (VHFFKNIVTPRTPPPSQGKGR, SEQ ID NO:49), $MBP_{134-148}$ (YKSAHKGFKGVDAQG, SEQ ID NO:50), $MBP_{135-149}$ (KSAHKGFKGVDAQGT, SEQ ID NO:51), $MBP_{136-150}$ (SAHKGFKGVDAQGTL, SEQ ID NO:52), $MBP_{137-151}$ (AHKGFKGVDAQGTLS, SEQ ID NO:53), $MBP_{138-152}$ (HKGFKGVDAQGTLSK, SEQ ID NO:54), $MBP_{140-151}$ (GFKGVDAQGTLSKIF, SEQ ID NO:55), myelin oligodendrocyte protein $(MOG)_{35-55}$ (MEVGWYRSPFSRVVHLYRNGK, SEQ ID NO:56), $MOG_{92-106}$ (DEGGYTCFFRDHSYQ, SEQ ID NO:57), and J5 (EKPKVEAYKAAAAPA, SEQ ID NO:59).

Embodiment 113: The method of embodiment 99, wherein the autoimmune disorder is acquired factor VIII (FVIII) deficiency, or acquired hemophilia A (AHA).

Embodiment 114: The method of embodiment 113, wherein said antigen comprises coagulation FVII or a tolerogenic fragment thereof.

Embodiment 115: The method of embodiment 113, wherein said antigen comprises a therapeutic protein or drug.

Embodiment 116: The method according to any one of embodiments 90-115, wherein said tolerogenic nanoparticle is effective in induce immune tolerance and/or to reduce an immune response when administered to a mammal.

Embodiment 117: The method of embodiment 116, wherein said inducing immune tolerance and/or to reducing an immune response is characterized by an increase in one or more markers selected from the group consisting of TGFβ, IL-10, and Foxp3 and/or a decrease in one or more of IgE (IgE directed against said antigen), eosinophils, IgG1, IL-4, IL-5, and/or IL-13.

Embodiment 118: The method according to any one of embodiments 90-117, wherein said mammal is administered a pharmaceutical immunosuppressant in conjunction with said tolerogenic nanoparticles.

Embodiment 119: The method of embodiment 118, wherein said immunosuppressant is selected from the group consisting of rapamycin, fujimycin, curcumin, quercetin, an endogenous nontoxic AHR ligand (ITE), and methotrexate.

Embodiment 120: The method according to any one of embodiments 90-119, wherein said mammal is a human.

Embodiment 121: The method according to any one of embodiments 90-119, wherein said mammal is a non-human mammal.

Embodiment 122: A method of performing gene therapy on a subject, said method comprising:
reducing or preventing an immune response in said subject directed against a gene therapy vector by administering to said subject an effective amount of a tolerogenic nanoparticle according to any one of embodiments 1-32, wherein the antigen comprises a gene therapy vector or a protein comprising a protein from the protein coat of a gene therapy vector.

Embodiment 123: The method of embodiment 122, wherein said tolerogenic nanoparticle is administered prior to administration of a gene therapy vector to said subject.

Embodiment 124: The method of embodiment 122, wherein said tolerogenic nanoparticle is administered at the same time or overlapping time of administration of a gene therapy vector to said subject.

Embodiment 125: The method according to any one of embodiments 122-124, wherein said antigen comprises a gene therapy vector or a protein comprising a protein coat from a gene therapy vector selected from the group consisting of a lentiviral vector (lentivector), an adenovirus vector, and an adeno-associated viral (AAV) vectors.

Embodiment 126: The method of embodiment 125, wherein said antigen comprises an AAV gene therapy vector or a protein comprising a protein coat from an AAV gene therapy vector.

Embodiment 127: The method according to any one of embodiments 122-126, wherein said antigen comprises a protein comprising a protein coat of a gene therapy vector.

Embodiment 128: The method according to any one of embodiments 122-126, wherein said antigen comprises a gene therapy viral vector (virion).

Embodiment 129: The method according to any one of embodiments 122-128, wherein said nanoparticle contains an immune modulator (e.g., an immune suppressant).

Embodiment 130: The method of embodiment 129, wherein said immune modulator comprises rapamycin or a rapamycin analog.

Embodiment 131: The method of embodiment 130, wherein said immune modulator comprises rapamycin (sirolimus).

Embodiment 132: The method of embodiment 130, wherein said immune modulator comprises a rapamycin analog selected from the group consisting of temsirolimus, everolimus, and ridaforolimus.

Embodiment 133: The method according to any one of embodiments 122-132, wherein said subject is a human.

Embodiment 134: The method according to any one of embodiments 122-132, wherein said subject is a non-human mammal.

Definitions

The terms "subject," "individual," and "patient" may be used interchangeably and refer to humans, as well as non-human mammals (e.g., non-human primates, canines, equines, felines, porcines, bovines, ungulates, lagomorphs, and the like). In various embodiments, the subject can be a human (e.g., adult male, adult female, adolescent male, adolescent female, male child, female child) under the care of a physician or other health worker in a hospital, as an outpatient, or other clinical context. In certain embodiments, the subject may not be under the care or prescription of a physician or other health worker.

The terms "polypeptide", "peptide" and "protein" are used interchangeably herein to refer to a polymer of amino acid residues. The terms apply to amino acid polymers in which one or more amino acid residue is an artificial chemical analogue of a corresponding naturally occurring amino acid, as well as to naturally occurring amino acid polymers.

As used herein, the phrase "a subject in need thereof" refers to a subject, as described infra, that suffers from, or is at risk for an autoimmune disorder and/or an allergic pathology, e.g., as described herein. Thus, for example, in certain embodiments the subject is a subject with an autoimmune disorder (e.g., type I diabetes, rheumatoid arthritis, lupus, etc.) or an allergic disease (e.g., asthma, and the like). In certain embodiments the methods described herein are prophylactic and the subject is one in whom an autoimmune disorder and/or an allergic disease is to be inhibited or prevented.

The term "treat" when used with reference to treating, e.g., a pathology or disease refers to the mitigation and/or elimination of one or more symptoms of that pathology or disease, and/or a delay in the progression and/or a reduction in the rate of onset or severity of one or more symptoms of that pathology or disease, and/or the prevention of that pathology or disease. The term treat can refer to prophylactic treatment which includes a delay in the onset or the prevention of the onset of a pathology or disease.

A "nanoparticle" refers to a particle having an average size (e.g., diameter) below 1 μm. In certain embodiments the "nanoparticle" refers to a particle having an average size (e.g., diameter) below 500 nm.

An "antigen" refers to any substance that can stimulate an immune response in the body and can react with the products of that response, that is, with specific antibodies or specifically sensitized T lymphocytes, or both.

The term "immune tolerance" refers to a state of unresponsiveness of the immune system to substances or tissue that have the capacity to elicit an immune response in a given organism. It is induced by prior exposure to that specific antigen and contrasts with immune-mediated elimination of foreign antigens.

The terms "effective fragment of an antigen" or "tolerogenic fragment of an antigen", an "epitope", or antigenic determinant are used interchangeably to refer to the part of an antigen that is recognized by the immune system, specifically by T-cells, antibodies, or B-cells. Although epitopes are usually non-self proteins, sequences derived from the host that sometimes be recognized as antigenic determinants, as in the case of autoimmune disease.

The "stabilins" (e.g., stabilin-1, stabilin-2) are class H scavenger receptors that typically clear negatively charged and/or sulfated carbohydrate polymer components of the extracellular matrix from circulation (see, e.g., Murphy et al. (2005) Atherosclerosis, 182:1-15). They are large type I receptors composed of four Fasciclin-1 domain clusters, four epidermal growth factor (EGF)/EGF-like clusters and one X-Link domain near the single transmembrane region. Although the human Stabilin-1 and Stabilin-2 extracellular portions of the receptors (>96% of the protein) are 55% homologous, the short intracellular domains are very diverse which contributes to differences in their location within the cell, cycling from the plasma membrane and downstream signaling activities.

"Apolipoprotein B" also called apolipoprotein B 100 or apoB is a protein that is involved in the metabolism of lipids and is the main protein constituent of lipoproteins such as very-low-density lipoprotein (VLDL) and low-density lipoprotein (LDL, the "bad cholesterol"). The amino acid sequence of apoB is well known to those of skill in the art (see, e.g., Chen et al. (1986) J. Biol. Chem., 261(28): 12918-12921).

The term "mannan" can refer to a plant polysaccharide that is a linear polymer of the sugar mannose. Plant mannans have β (1-4) linkages. In certain embodiments mannan can also refer to a cell wall polysaccharide found, inter alia, in yeasts. This type of mannan has an α (1-6) linked backbone and α (1-2) and α (1-3) linked branches. It is serologically similar to structures found on mammalian glycoproteins.

BRIEF DESCRIPTION OF THE DRAWINGS

FIG. 26 outlines the experimental animal protocol. Panel A) Serum anti-OVA IgE and IgG$_1$ antibody titers were determined by ELISA. Panel B) TH2 cytokine (IL-4, IL-5, and IL-13) levels in the BALF, determined by ELISA. Panel C) Differential eosinophil, neutrophil and macrophage cell counts on BALF. Panel D) TGF-β, IL-10 and INF-γ levels in the BALF, determined by ELISA. Data are expressed as the mean±SEM. $*p<0.05$; $p<0.01$; $*p<0.00$ (one-way ANOVA followed by a Tukey's test).

Figure 23:
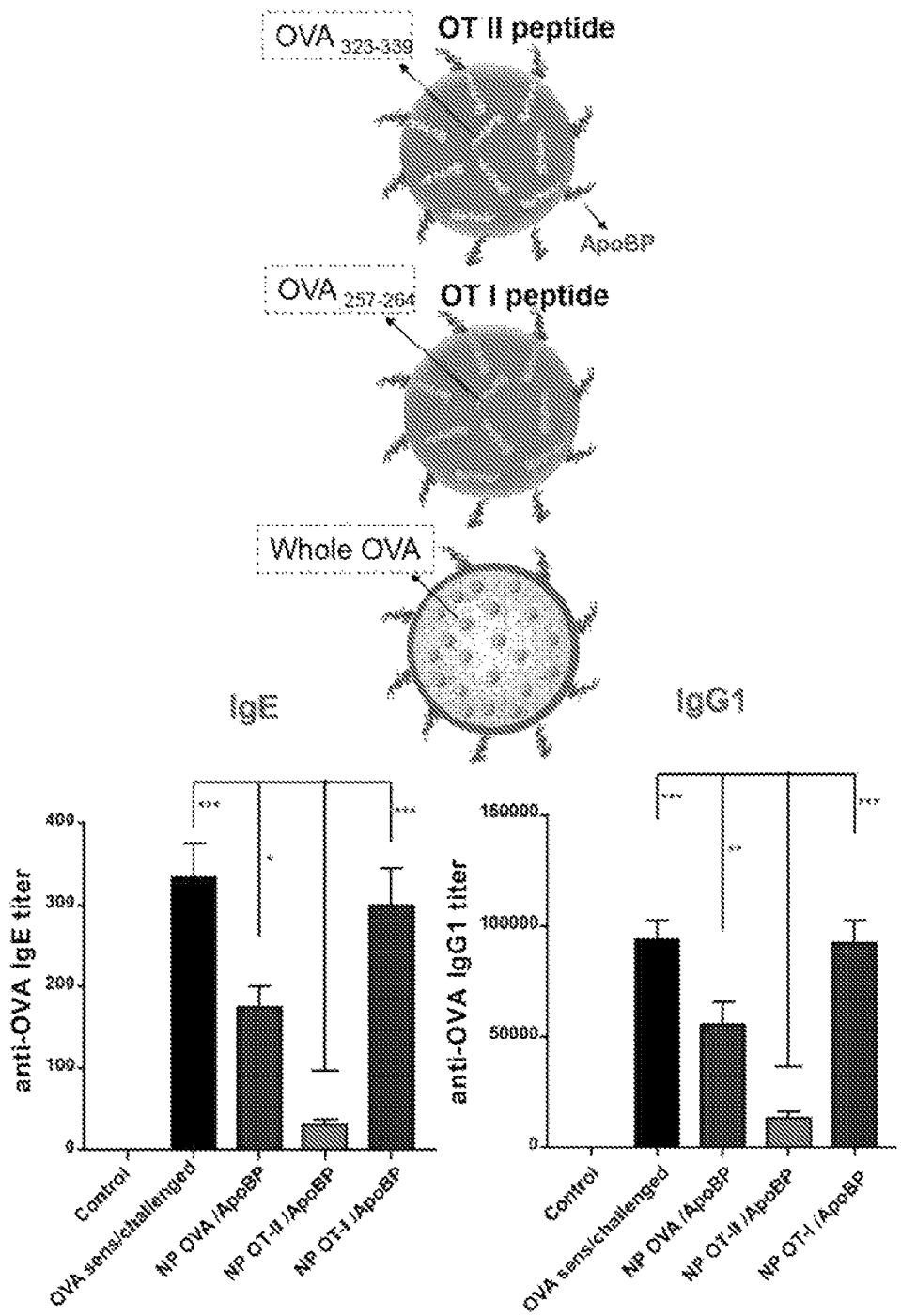
FIG. 23, panels A-D, shows the results of pretreatment using epitope-encapsulating nanoparticles to assess the impact on OVA-induced serological responses and cytokine production in a transgenic OT-II murine model.
Figure 24:
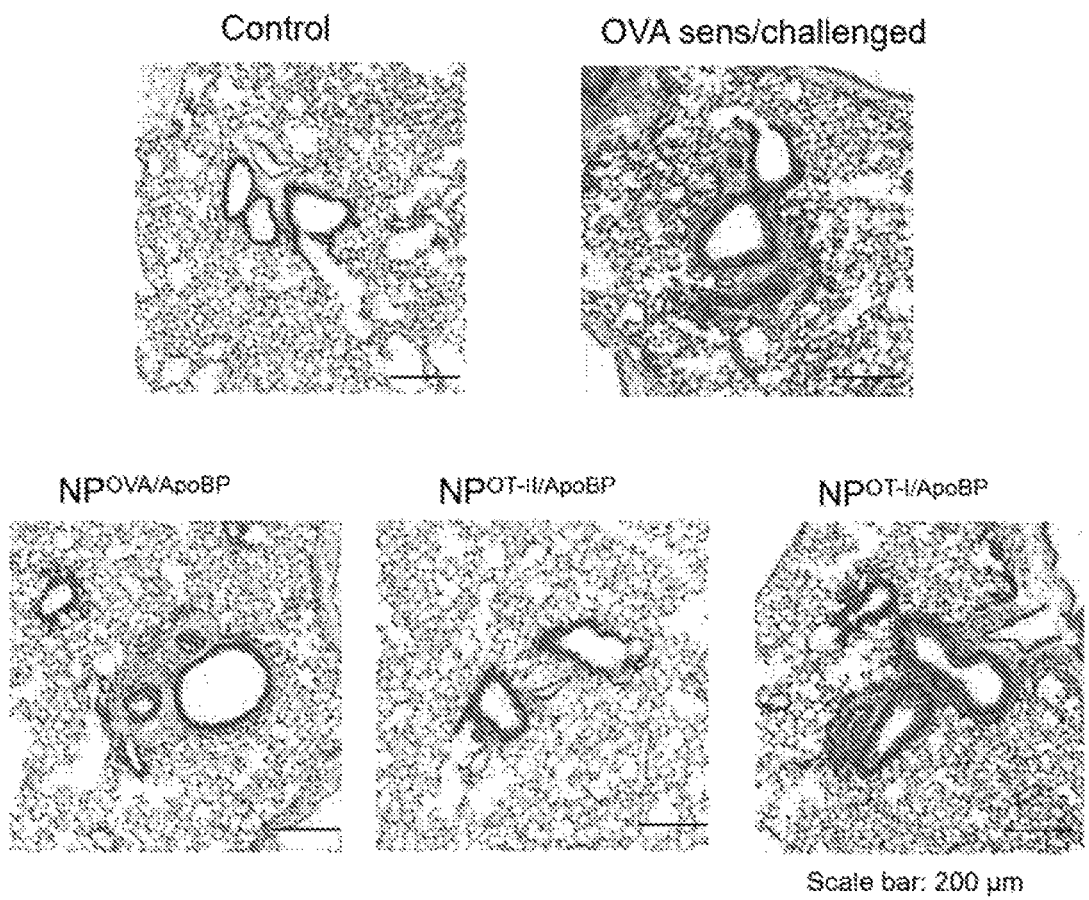

FIG. 24, panels A-B, shows the impact of epitope-encapsulating nanoparticles loaded with T-cell epitopes on allergic airway inflammation and Treg generation. Same experiment as in FIG. 23. Panel A) Representative lung histology, as determined by H&E staining; scale bars represent 200 μm. Panel B) IHC for Foxp3$^+$ T-cell recruitment to the lung. Data are expressed as the mean±SEM. $*p<0.05$; $p<0.01$; $*p<0.00$ (one-way ANOVA followed by a Tukey's test).

Figure 25:
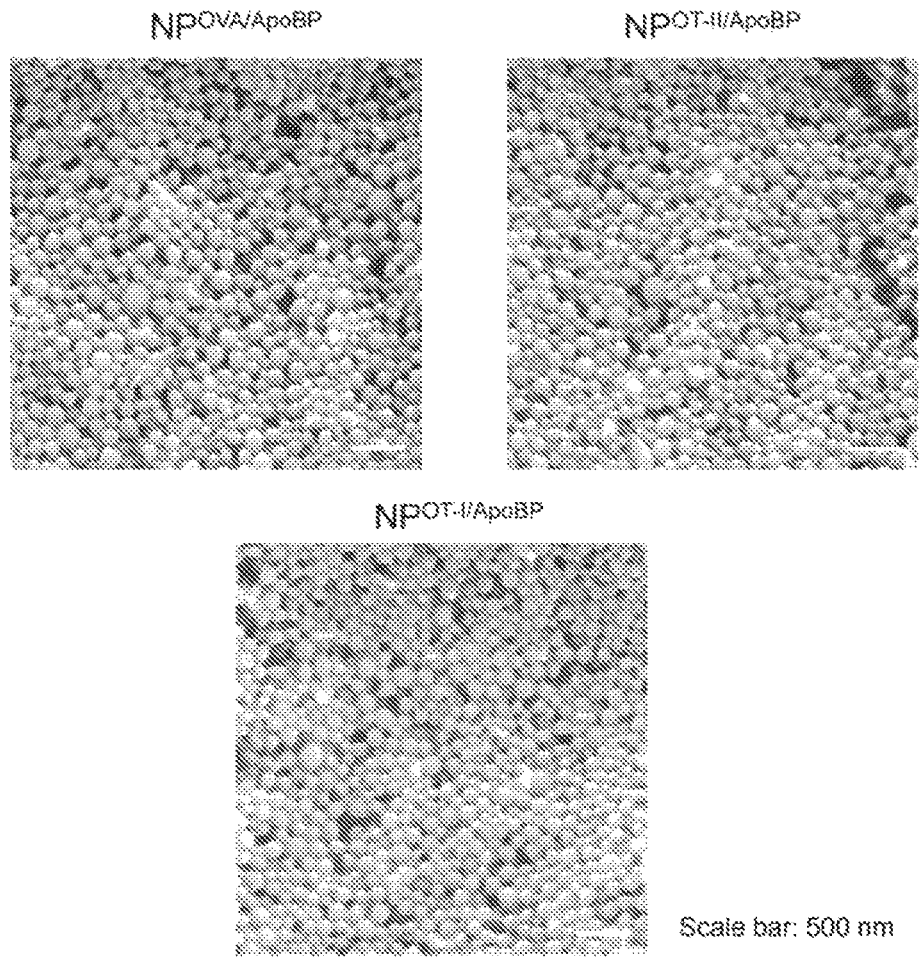

FIG. 25, shows SEM pictures illustrating surface morphology of liver targeting tolerogenic nanoparticles loaded with T-cell epitopes.

Figure 26:
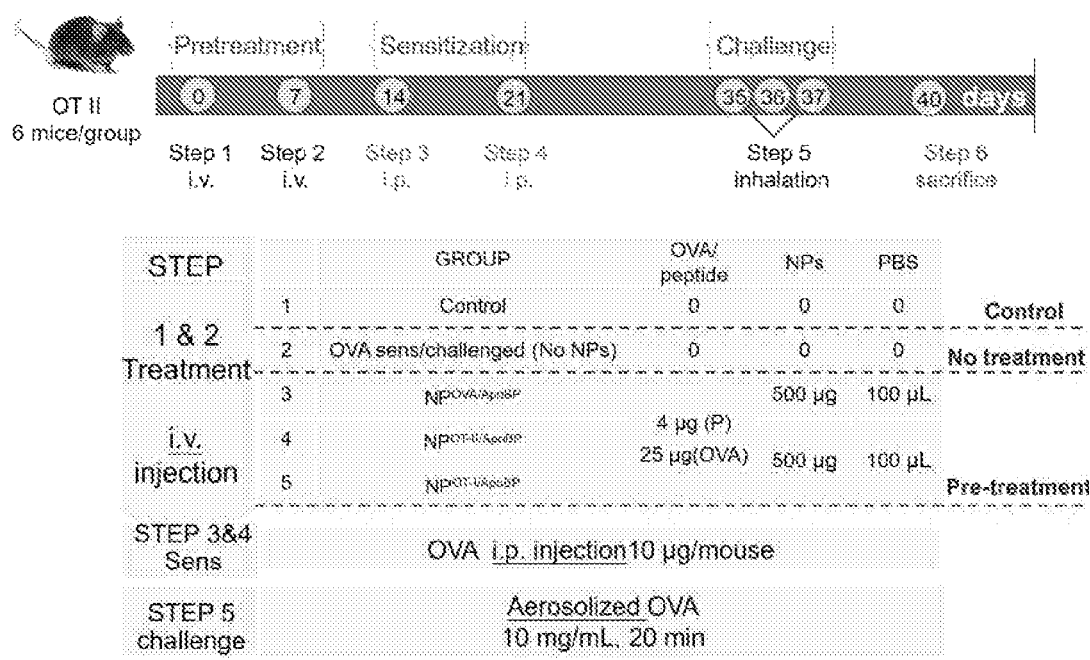

FIG. 26 provides an outline of the experimental animal protocol. Six to eight week old OT-II transgenic mice received IV particle injections to deliver 25 μg OVA or 4 μg of OT-II or OT-I epitopes in 500 μg particles per mouse on days 0 and 7. The animals were subsequently sensitized by two doses of OVA (10 μg/mouse) ID on days 14 and 21, prior to exposure to aerosolized OVA inhalation (10 mg/mL) for 20 min on days 35-37. Animals were sacrificed for tissue harvesting and collection of BALF on day 40. The treatment groups (n=6) in the experiment included: (1) a control group without NP pretreatment, sensitization or challenge; (2) no pretreatment before sensitization and challenge; pretreatment with (3) NP$^{OVA/ApoBP}$, (4) NP$^{OT-II/ApoBP}$, (5) NP$^{OT-I/ApoBP}$ before sensitization and challenge.

Figure 27:
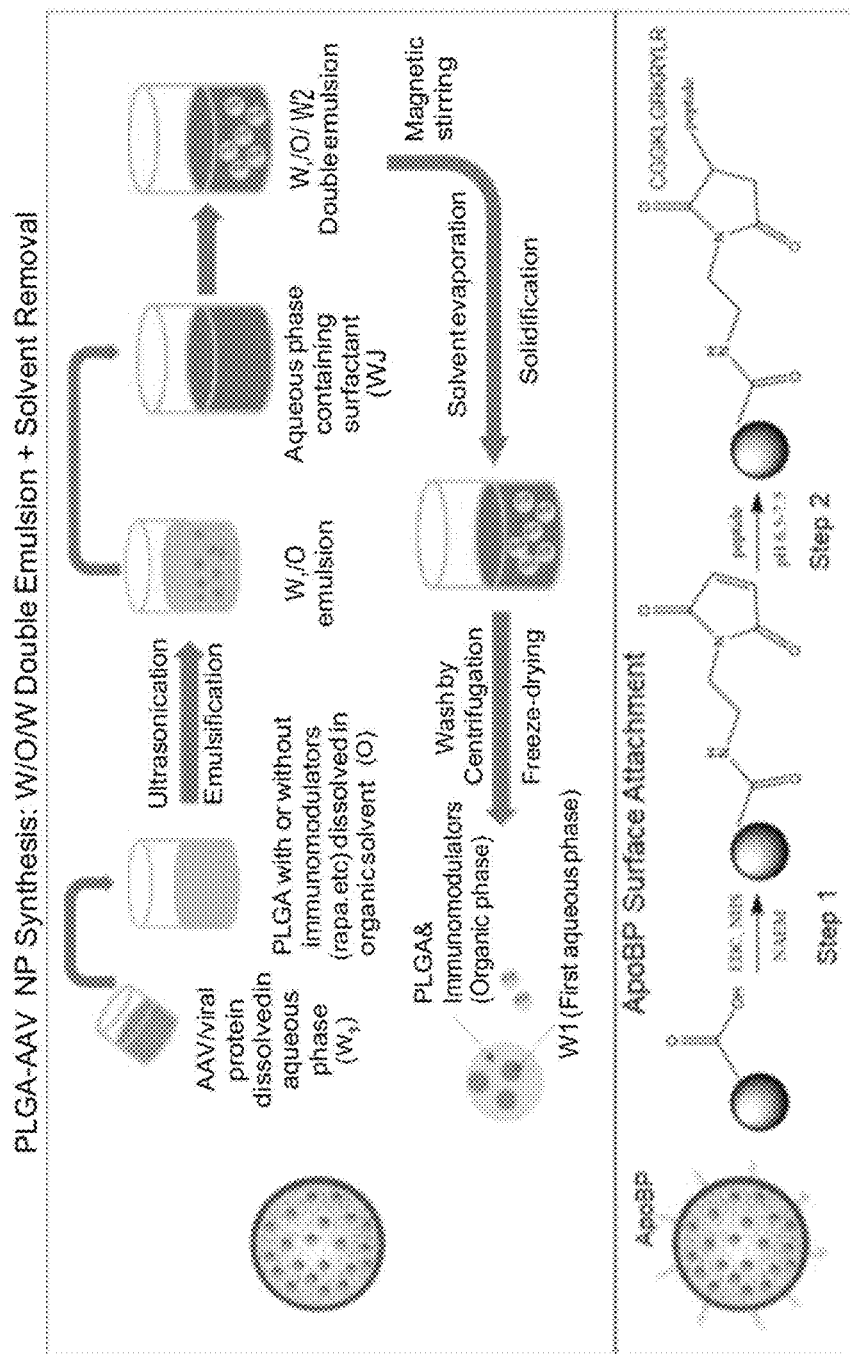

FIG. 27 provides one illustrative, but non-limiting protocol for the production of a tolerogenic nanoparticle comprising an AAV vector protein and an immunomodulator.

Figure 28:
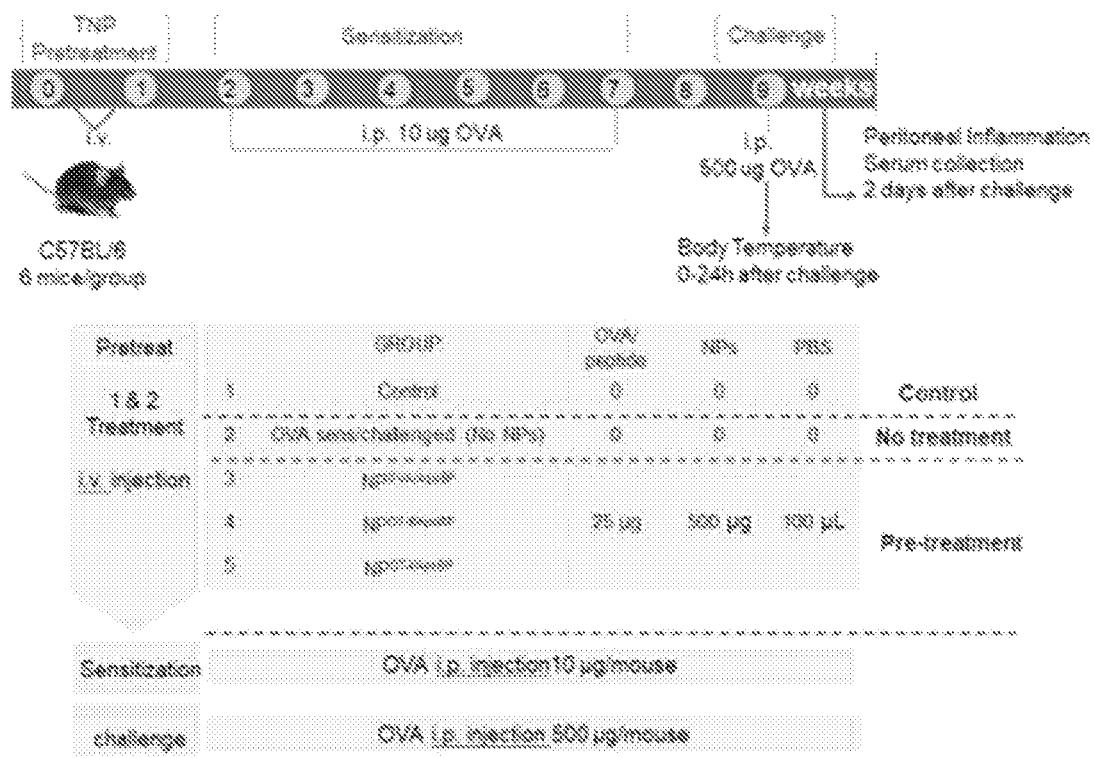

FIG. 28, panels A-E, Pretreatment using epitope-encapsulated tolerogenic nanoparticles to assess the impact on OVA-induced anaphylaxis responses, serological responses, and late phase cytokine production in an OVA anaphylaxis murine model. Panel A) Outline of the experimental animal protocol. Six to eight-week old C57BL/6 mice received IV particle injections to deliver 25 μg OVA or 4 μg of OT-II or OT-I epitopes in 500 μg particles per mouse on weeks 0 and 1. The animals were subsequently sensitized by six doses of OVA (10 μg/mouse) IP over 7 weeks, prior to exposure to OVA challenge by IP injection (500 μg/mouse) on week 9. Animals were monitored for anaphylaxis scoring, as shown in the bottom of panel B. The treatment groups (n=6) in the experiment included: (i) a control group without NP pretreatment, sensitization or challenge; (ii) no pretreatment before sensitization and challenge; pretreatment with (iii) NPOVA/ApoBP, (iv) NPOT-II/ApoBP, (v) NPOT-I/ApoBP before sensitization and challenge. Panel B) Anaphylaxis scoring. Panel C) Serum mMCPT-1 level determined by ELISA. Panel D) Serum anti-OVA IgG, IgG1 and IgG2b antibody titers were determined by ELISA. Panel E) TH2 cytokine (IL-4 and IL-5) and TGF-β levels in the peritoneal lavage fluid, determined by ELISA. Data are expressed as the mean±SEM. $*p<0.05$; $p<0.01$; $*p<0.001$ (one-way ANOVA followed by a Tukey's test).

DETAILED DESCRIPTION

In various embodiments tolerogenic nanoparticles that can induce epitope-specific immune tolerance and uses of such tolerogenic nanoparticles are provided. As illustrated in Example 1, the engineering of a biodegradable polymeric poly (lactic-co-glycolic acid) (PLGA) nanocarrier for the selective delivery of the allergen, ovalbumin (OVA), to the liver was demonstrated. This was accomplished by developing a series of nanoparticles (NPs) in the 200-300 nm size range as well as decorating particle surfaces with ligands that target scavenger and/or mannose receptors on liver sinusoidal endothelial cells (LSECs). LSEC represents a major antigen-presenting cell type in the liver capable of generating regulatory T-cells (Tregs). As shown in Example 1, in vitro exposure of LSECs to NP$^{OVA}$ induced abundant TGF-β, IL-4, and IL-10 production, which was further increased by surface ligands. Animal experiments showed that, in the chosen size range, NP$^{OVA}$ was almost exclusively delivered to the liver, where the colocalization of fluorescent-labeled particles with LSECs could be seen to increase by surface ligand decoration. Moreover, prophylactic treatment with NP$^{OVA}$ in OVA-sensitized and challenged animals (e.g., via aerosolized inhalation) could be seen to significantly suppress anti-OVA IgE responses, airway eosinophilia, and TH2 cytokine production in the BALF. The suppression of allergic airway inflammation was further enhanced by attachment of surface ligands, particularly for particles decorated with the ApoB peptide, which induced high levels of TGF-β production in the lung along with the appearance of Foxp3+ Tregs. The ApoB-peptide-coated NPs could also interfere in allergic airway inflammation when delivered post-sensitization. These data indicated that liver and LSEC targeting tolerogenic NPs could be used for therapy of allergic airway disease, in addition to the potential of using their tolerogenic effects for other disease applications.

Tolerogenic Nanoparticles

Accordingly, in certain embodiments, tolerogenic nanoparticles are described where the nanoparticles comprise: (1) One or more biocompatible polymer(s); (2) An antigen or antigenic epitope encapsulated within or attached to the biocompatible polymer where the antigen comprises an antigen or antigenic determinants to which immune tolerance is to be induced (e.g., by administration of the tolerogenic nanoparticle to a mammal); and (3) A first targeting moiety that binds to a scavenger receptor in the liver and/or a second targeting moiety that binds to a mannose receptor in the liver, and/or a third targeting moiety that binds to hepatocytes, where the first and/or second and/or third targeting moiety are attached to the surface of the nanoparticle. In certain embodiments the tolerogenic nanoparticles described herein only comprise the first targeting moiety. In certain embodiments the tolerogenic nanoparticles described herein only comprise the second targeting moiety. In certain embodiments the tolerogenic nanoparticles described herein only comprise the third targeting moiety. In certain embodiments the tolerogenic nanoparticles described herein only comprise the first targeting moiety and the second targeting moiety. In certain embodiments the tolerogenic nanoparticles described herein only comprise the first targeting moiety, the second targeting moiety, and the third targeting moiety.

In certain embodiments the tolerogenic nanoparticles described herein incorporate a single antigen. In certain embodiments the tolerogenic nanoparticles described herein incorporate 2, 3, 4, 5, 6, 7, 8, 9, or 10, or more antigens on a single tolerogenic nanoparticle. The same can also be said for multiple antigenic epitopes from a single antigen. In certain embodiments populations of tolerogenic nanoparticles are provided where the populations comprise different tolerogenic nanoparticles comprising different antigens. Thus, for example, in certain embodiments, the population contains 2, 3, 4, 5, 6, 7, 8, 9, or 10, or more different "types" of tolerogenic nanoparticles where each "type" of tolerogenic nanoparticle comprise a different antigen or antigens. In various embodiments the tolerogenic nanoparticles are effective to induce partial or complete immune tolerance to the antigen(s), and/or to reduce an immune response to the antigen(s). This type of scenario is particularly important in the setting of autoimmune disease where the autoimmune disease process may begin by dominantly targeting a single antigenic epitope, which is later expanded to include additional epitopes on the same antigen by a mechanism known as epitope spreading. Thus, while a dominant epitope may be useful in pretreatment approaches to suppress disease onset, it is often required in the chronic autoimmune state that treatment may need to be administered to multiple epitopes or spreading epitopes.

It is also noted that gene therapy mediated by recombinant adeno-associated virus (AAV), or lentiviral (LV) vectors, or adenovirus (AV) vectors is one of the most promising approaches for the treatment of systemic monogenic diseases. However, vector immunogenicity represents a major limitation to re-administration of gene therapy vectors (e.g., AAV vectors). Persistent high-titer neutralizing antibodies can be triggered following vector administration, which abolishes the benefit of repeated gene therapy vector-based treatments. Given this background, there has been a major unmet need to develop new therapeutic modalities that improve the AAV (and other gene therapy vector-mediated) gene therapy. One means to accomplish this is to make use of the considerable power of regulatory T cells to achieve antigen-specific immune tolerance for this unwanted allergic response, without the downside of suffering from systemic immune suppressive effects. We propose that liver targeting (e.g., as described herein) can provide a major avenue for accomplishing tolerization to AAV vector or viral protein (or to other gene therapy vectors or protein(s)). Accordingly, it is contemplated that tolerogenic nanoparticles described herein that comprise a gene therapy vector (e.g., AAV) or a gene therapy vector protein can induce vector-specific immune tolerance and provide an effective component of a gene therapy regimen.

It was also discovered that incorporation of an immune modulator (e.g., an immune inhibitor such as rapamycin and/or a rapamycin analog) and significantly enhance the activity of the tolerogenic nanoparticles described herein. Not only does the rapamycin offer the possibility of reprogramming the targeted antigen presenting cells in the liver, but is also known to promote Fox P3 expression on Tregs, in addition to expanding Treg populations. Additional immunomodulators that can modify the quality of the Treg response, in addition to rapamycin, can be incorporated, e.g., as described below.

Illustrative, but non-limiting, examples of suitable biocompatible polymer nanoparticles, targeting moieties, and tolerogenic antigens are described below.

Nanoparticles Comprising One or More Biocompatible Polymers.

In various embodiments any of a number of biocompatible polymers can be used to form the nanoparticles comprising the tolerogenic nanoparticles described herein. Such biocompatible polymers are well known to those of skill in the art and include but are not limited to polyesters (e.g., poly(lactic-co-glycolic acid), poly(glycolic acid), poly(lactic acid), poly(caprolactone), poly(butylene succinate), poly(trimethylene carbonate), poly(p-dioxanone), poly(butylene terephthalate), and the like), poly(ester amide)s (PEA) (see, e.g., Guerrero et al. (2015) *J. Control Release.,* 211: 105-117), polyurethanes and polyurethane copolymers (see, e.g., Cherng et al. (2013) *Int. J. Pharmaceutics,* 450(1-2): 145-162), polyanhydrides (e.g., poly[bis(p-carboxyphenoxy) methane], poly[bis(hydroxyethyl)terephthalate-ethyl orthophosphorylate/terephthaloyl chloride], see, e.g., Chang et al. (1983) *Biomaterials,* 4(2): 131-133), poly(ortho esters) (see, e.g., Nair et al. (2006) *Adv. Biochem. Eng. Biotechnol.* 102: 47-90; Park et al. (2005) *Molecules,* 10: 146-161), polyphosphoesters (e.g., polyphosphoesters Poly[bis(hydroxyethyl) terephthalate-ethyl orthophosphorylate/terephthaloyl chloride]), poly(alkyl cyanoacrylates) (e.g., poly(butyl cyanoacrylate), poly(β-hydroxyalkanoate)s, poly(hydroxybutyrate), poly(hydroxybutyrate-co-hydroxyvalerate, collagen, albumin, gluten, chitosan, hyaluronate, cellulose, alignate, and starch.

In certain embodiments the biocompatible polymer comprise one or more polymers selected from the group consisting of poly(lactic-co-glycolic acid) (PLGA), poly(glycolic acid) (PGA), poly(lactic acid) (PLA), poly(caprolactone) (PCL), poly(butylene succinate), poly(trimethylene carbonate), poly(p-dioxanone), poly(butylene terephthalate), poly(ester amide) (HYBRANE®), polyurethane, poly[(carboxyphenoxy) propane-sebacic acid], poly[bis(hydroxyethyl) terephthalate-ethyl orthophosphorylate/terephthaloyl chloride], poly(β-hydroxyalkanoate), poly(hydroxybutyrate), and poly(hydroxybutyrate-co-hydroxyvalerate). In certain embodiments the biocompatible polymer comprises poly(lactic-co-glycolic acid) (PLGA).

In one illustrative, but non-limiting embodiment the biocompatible polymer comprises PLGA comprising a lactide/glycolide molar ratio of about 50:50. In certain embodiments the biocompatible polymer (e.g., PLGA) incorporates polyethylene glycol (PEG), e.g., about 8% up to about 20% e.g., ~2 kDA or ~5 kDA PEG.

In certain embodiments the nanoparticle (without attached ligand(s)) has an average primary particle size ranging from about 100 nm, or from about 150 nm, or from about 200 nm up to about 350 nm, or up to about 300 nm, or up to about 250 nm. In certain embodiments the primary particle has an average primary particle size of about 230 nm.

In certain embodiments the nanoparticle with attached ligand(s) has an average particle size ranging from about 50 nm, or from about 100 nm, or from about 200 nm up to about 490 nm, or up to about 450 nm, or up to about 400 nm, or up to about 350 nm, or up to about 300 nm. In certain embodiments the nanoparticle with attached ligand(s) has an average particle size ranging from about 200 nm up to about 350 nm, or from about 200 nm up to about 300 nm, or from about 240 nm up to about 300 nm. Without being bound to a particular theory, is noted that the choice of particles in the 200 nm range (e.g., about 200 nm up to about 300 nm) is to allow endocytic rather than phagocytic uptake by LSECs. The specific pathway utilizes clathrin-coated pits, which preferentially take up particles in the size range, as compared to smaller particles being taken up into endosomal compartments such as caveolae or macropinocytosis. Phagocytic cells like Kupffer cells tend to phagocytose particles in the 500 nm and above size range.

Methods of making polymeric nanoparticles are well known to those of skill in the art (see, e.g., Marin et al. (2013) *Int. J Nanomed.,* 8: 3071-3091, and references therein).

In certain embodiments the antigen(s) are encapsulated within the nanoparticle and this can readily be accomplished by combining the antigen(s) with the biocompatible polymer during nanoparticle synthesis. In certain embodiments the antigen(s) are covalently attached to the surface of the nanoparticle, e.g., by adsorption or by coupling directly or using a linker.

First, and/or Second, and/or Third Targeting Moieties.

In various embodiments the tolerogenic nanoparticles described herein comprise a first targeting moiety that binds to a scavenger receptor in the liver (and/or on macrophages in the liver) and/or a second targeting moiety that binds to a mannose receptor in the liver, and/or a third targeting moiety that binds to hepatocytes. In certain embodiments the first and/or second targeting moiety, and/or third targeting moiety are attached to the surface of the nanoparticle (e.g., adsorbed, directly conjugated, or attached through a linker).

Scavenger receptors are receptors on macrophages and other cells that bind to numerous ligands, such as bacterial cell-wall components, and remove them from the blood. The Kupffer cells in the liver are particularly rich in scavenger receptors. Illustrative scavenger receptors in the liver and/or on macrophages in the liver include, but are not limited to stabilin-1, stabilin-2, SCARA1 or MSR1, SCARA2 or MARCO, SCARA3, SCARA4 or COLEC12, SCARA5, SCARB1, SCARB2, SCARB3 or CD36, and the like. In certain embodiments the first targeting moiety comprise a moiety (e.g., a peptide) that binds to stabilin-1 and/or to stabilin-2.

Ligands that bind to scavenger receptors are well known to those of skill in the art and can readily be incorporated as a first targeting moiety in the tolerogenic nanoparticles described herein. In certain embodiments, for example, suitable ligand that binds to stabilin-1 and/or to stabilin-2 comprises a fragment of the apoB protein. In certain embodiments, the fragment ranges in length from about 5 up to about 50, or up to about 40, or up to about 30, or up to about 20 amino acids. In certain embodiments the fragment ranges in length from about 5 up to about 20, or up to about 10 amino acids. In certain embodiments the first targeting moiety is a peptide comprising the amino acid sequence RKRGLK (SEQ ID NO:2). In certain embodiments the first targeting moiety is a peptide comprising the amino acid sequence RLYRKRGLK (SEQ ID NO:3). In certain embodiments the first targeting moiety is a peptide comprising the amino acid sequence CGGKLGRKRYLR (SEQ ID NO:1). In certain embodiments the surface can be coated by sugars such as mannan as well as targeting moieties such as aptamers and the like. Aptamers are oligonucleotide molecules that exhibit 3D structure to allow them to bind to specific target molecules. Aptamers are usually created by selecting them from a random sequence pool but natural aptamers also exist.

The mannose receptor (cluster of differentiation 206, CD206) is a C-type lectin primarily present on the surface of macrophages, immature dendritic cells and liver sinusoidal endothelial cells. Ligands that bind to the mannose receptor are well known to those of skill in the art and can readily be incorporated as a second targeting moiety into the tolerogenic nanoparticles described herein. Illustrative, but non-limiting examples of ligands for the mannose receptor include, but are not limited to mannan, mannose, N-acetyl-glucosamine, and fucose. In certain embodiments the second targeting moiety comprises a mannan (e.g., a mannan ranging from about 35 to about 30 kDa).

That Binds to Hepatocytes

Ligands that bind to hepatocytes are well known to those of skill in the art and can readily be incorporated as a third targeting moiety targeting moiety in the tolerogenic nanoparticles described herein. Thus, for example, asialooorosomucoid, galactoside, a galactosamine (e.g., GalNAC), asialofetuin, sterylglucoside, lactose/lactobionic acid, PVLA (poly-(N-p-vinylbenzyl-O-beta-D-galactopyranosyl-[1-4]-D-gluconamide) target asialoglycoprotein receptors on hepatocytes. Apolipoprotein A-I is a ligand for scavenger receptor class B type I receptors present on hepatocytes. Linoleic acid targets plasma membrane fatty acid binding protein hepatocytes, while glycyrrhizin receptors are targeted by glycyrrhizin and heparan sulphate receptors by acetyl-CKNEKKNKIERNNKLKQPP-amide (SEQ ID NO:4) ligand; both receptors present on hepatocytes.

The foregoing targeting moieties are illustrative and non-limiting. Using the teachings provided herein, other targeting moieties for a scavenger receptor in the liver (and/or on macrophages in the liver) or for a mannose receptor in the liver, or for binding to hepatocytes will be available to one of skill in the art and readily incorporated into the nanoparticles described herein.

In certain embodiments the first targeting moiety and/or the second targeting moiety, and/or third targeting moiety can be attached to the nanoparticle by simple adsorption or by non-covalent linkages. Useful non-covalent linkages include, but are not limited to, affinity binding pairs, such as biotin-streptavidin and immunoaffinity, having sufficiently high affinity to maintain the linkage during use. Such non-covalent linkers/linkages are well known to those of skill in the art.

In certain embodiments the first targeting moiety and/or the second targeting moiety, and/or the third targeting moiety can be covalently coupled to the nanoparticle directly or through a linker. The art is also replete with conjugation chemistries useful for covalently linking a targeting moiety to a second moiety (e.g., a biocompatible polymer). Art-recognized covalent coupling techniques are disclosed, for instance, in U.S. Pat. Nos. 5,416,016, 6,335,435, 6,528,631, 6,861,514, 6,919,439, and the like. Other conjugation chemistries are disclosed in U.S. Patent Publication No. 2004/0249178. Still, other conjugation chemistries include: p-hydroxy-benzoic acid linkers (see, e.g., Chang-Po et al. (2002) *Bioconjugate Chem.* 13(3): 525-529), native ligation (see, e.g., Stetsenko et al. (2000) *J. Org. Chem.* 65: 4900-4908), disulfide bridge conjugates (see, e.g., Oehlke et al. (2002) *Eur. J. Biochem.* 269: 4025-4032; Rogers et al. (2004) *Nucl. Acids Res.* 32(22): 6595-6604), maleimide linkers (see, e.g. Zhu et al. (1993) *Antisense Res Dev.* 3: 265-275), thioester linkers (see, e.g., Ede et al. (1994) *Bioconjug. Chem.* 5: 373-378), Diels-Alder cycloaddition (see, e.g., Marchan et al. (2006) *Nucl. Acids Res.* 34(3): e24); U.S. Pat. No. 6,656,730 and the like). For reviews of conjugation chemistries, see also Tung et al. (2000) *Bioconjugate Chem.* 11: 605-618, Zatsepin et al. (2005) *Curr. Pharm. Des.* 11(28): 3639-3654, Juliano (2005) *Curr. Opin. Mol. Ther.* 7(2): 132-136, and the like. While certain of the foregoing chemistries are utilized for nucleic acid-peptide conjugation one of skill will recognize that they can readily be modified for attachment of first and/or second targeting moieties to the nanoparticles.

In one illustrative, but non-limiting embodiment the first targeting moiety is attached to the nanoparticle using a linker (e.g., the NAEM maleimide) while the second targeting moiety is attached to the nanoparticle by adsorption, or by direct covalent conjugation (e.g., via conjugation of the hydroxyl-terminus of a peptide targeting moiety to a COOH terminal group on the nanoparticle polymer), e.g., as described in Example 1.

The foregoing targeting moieties and methods of attachment to the nanoparticle(s) are illustrative and non-limiting. Using the teaching provided herein numerous other targeting moieties and attachment chemistries will be available to one of skill in the art.

Antigen(s)

In various embodiments the antigen(s) comprising the tolerogenic nanoparticles comprise any moiety to which it is desired to induce tolerance and/or to reduce an immune response. It will be recognized that in certain embodiments the tolerogenic nanoparticles comprise a single antigen, while in other embodiments the tolerogenic nanoparticles comprise 2, 3, 4, 5, 6, 7, 8, 9, or 10, or more antigen(s). In certain embodiments where the nanoparticles comprise two or more antigens, the antigens can be provided as separate molecules/moieties. In certain embodiments the antigens can be provided so that they are presented as separate epitopes on a single molecule/moiety (e.g., as separate epitopes on a single protein). In certain embodiments the antigen(s) are disposed within the biocompatible polymer, while in other embodiments one or more of the antigen(s) can be provided attached to the surface of the biocompatible polymer.

Illustrative antigens include, but are not limited to a material selected from the group consisting of a peptide, a nucleic acid, a glycoprotein, sugar, a nucleoprotein and a carbohydrate. In certain embodiments the antigen(s) comprise one or more peptides. In certain embodiments such peptides ranging in length from about 5 amino acids, or from about 8 amino acids, or from about 10 amino acids, or from about 15 amino acids up to about 60 amino acids, or up to about 50 amino acids, or up to about 40 amino acids, or up to about 30 amino acids.

In certain embodiments the tolerogenic nanoparticles are designed for the treatment and/or prophylaxis of an allergic disease/susceptibility or an autoimmune disorder.

With respect to the treatment or prophylaxis of an allergic disease (or allergic susceptibility) it will be recognized that suitable antigens include, but are not limited to airborne allergens, such as pollen, animal dander, dust mites and mold, to food allergens, e.g., food allergens associated with peanuts, tree nuts, wheat, soy, fish, shellfish, eggs, milk, and the like, and medications known to frequently produce an allergic response (e.g., penicillin or penicillin-based antibiotics).

In certain embodiments the allergen comprises an allergen associated with asthma and/or other airway inflammation. Illustrative antigen(s) for inducing asthma/airway-related immune tolerance include, but are not limited to an antigen selected from the group consisting of ovalbumin or tolerogenic epitope thereof. Api m 1(PLA$_2$) (bee) or a tolerogenic fragment thereof, Ara 2 h or an epitope thereof for peanut allergy and Fel d 1 (cat) or a tolerogenic fragment thereof. In certain embodiments the antigen comprises an antigen selected from the group consisting of OVA$_{323-339}$ ISQAVHAAHAEINEAGR (SEQ ID NO:5), OVA$_{263-278}$ KLTEWTSSNVMEERKI (SEQ ID NO:6), and OVA$_{257-264}$ SIINFEKL (SEQ ID NO:7).

In certain embodiments the tolerogenic nanoparticles are for the treatment or prophylaxis of a food allergy such a gluten intolerance or lactose intolerance. Accordingly, in certain embodiments, the antigen comprises gluten/gliadin or tolerogenic epitope thereof, or lactose or a tolerogenic epitope thereof.

In certain embodiments antigen comprises an antigen associated with an autoimmune disorder (e.g., rheumatoid arthritis, type 1 diabetes, multiple sclerosis, Crohn's disease, systemic lupus erythematosus, scleroderma, alopecia areata, antiphospholipid antibody syndrome, autoimmune hepatitis, celiac disease, Graves' disease, Guillain-Barre syndrome, Hashimoto's disease, hemolytic anemia, idiopathic thrombocytopenic purpura, inflammatory bowel disease, ulcerative colitis, inflammatory myopathies, polymyositis, myasthenia gravis, primary biliary cirrhosis, psoriasis, Sjogren's syndrome, vitiligo, gout, atopic dermatitis, auto-immune bullous skin disease (e.g., pemphigus, pemphigoid), auto-immune hepatitis, autoimmune pancreatitis, and the like).

In certain embodiments the tolerogenic nanoparticles are for the treatment or prophylaxis of rheumatoid arthritis. Accordingly, in certain embodiments, the antigen comprises a citrinullated peptide (e.g., citrinullated collagen type II, a citrinullated filaggrin, a citrinullated beta-fibrinogen, a citrinullated vimentin, and the like. Illustrative tolerogenic citrinullated peptides for rheumatoid arthritis include, but are not limited to citrullinated (cit)-collagen type 11(359-369) ACitGLTGCitPGDAK (SEQ ID NO:8); cit-filaggrin (306-326), HQCHQESTCitGRSRGRCGRSGS (SEQ ID NO:9); cit-β-fibrinogen (60-74), CitPAPPPISGGGYCitACit (SEQ ID NO:10); cit-vimentin (65-77) SAVRACitSSVPGVRK (SEQ ID NO:11), and the like. Other RA antigens include, but are not limited to, collagen and glucose-6 phosphate isomerase.

In certain embodiments the tolerogenic nanoparticles are for the treatment or prophylaxis of type 1 diabetes. Accordingly, in certain embodiments the antigen comprises a pancreatic cell antigen or a tolerogenic fragment thereof. Illustrative pancreatic cell antigens include, but are not limited to of insulin, proinsulin, glutamic acid decarboxylase-65 (GAD65), insulinoma-associated protein 2, heat shock protein 60, ZnT8, and islet-specific glucose-6-phosphatase catalytic subunit.

Illustrative tolerogenic epitopes for type 1 diabetes are shown in Table 1.

TABLE 1

Illustrative class I-restricted epitopes for type 1 diabetes (see, e.g., U.S. Patent Pub. No: 2009/0155292).

| Antigen | Epitope | Sequence | SEQ ID NO |
|---------|---------|----------|-----------|
| GAD65   | 114-123 | VMNILLQYVV | 12 |
|         | 563-545 | RMMEYGTTMV | 13 |
| GFAP    | 143-151 | NLAQTDLATV | 14 |
|         | 214-222 | QLARQQVHV  | 15 |
| IA-2    | 172-180 | SLSPLQAEL  | 16 |
|         | 482-490 | SLAAGVKLL  | 17 |
|         | 805-813 | VIVMLTPLV  | 18 |
| ppIAPP  | 5-13    | KLQVFLIVL  | 19 |
|         | 9-17    | FLIVLSVAL  | 20 |
| IGRP    | 152-160 | FLWSVFMLI  | 21 |
|         | 211-219 | NLFLFLFAV  | 22 |
|         | 215-223 | FLFAVGFYL  | 23 |
|         | 222-230 | YLLRVLNI   | 24 |

TABLE 1-continued

Illustrative class I-restricted epitopes for type 1 diabetes (see, e.g., U.S. Patent Pub. No: 2009/0155292).

| Antigen | Epitope | Sequence | SEQ ID NO |
|---|---|---|---|
| | 228-236 | LNIDLLWS | 25 |
| | 265-273 | VLFGLGFAI | 26 |
| | 293-301 | RLLCALTSL | 27 |
| Pro-insulin | L2-10 | ALWMRLLPL | 28 |
| | L3-11 | LWMRLLPLL | 29 |
| | L6-14 | RLLPLLALL | 30 |
| | B5-14 | HLCGSHLVEA | 31 |
| | B10-18 | HLVEALYLV | 32 |
| | B14-22 | ALYLVCGER | 33 |
| | B15-24 | LYLVCGERGF | 34 |
| | B17-25 | LVCGERGFF | 35 |
| | B18-27 | VCGERGFFYT | 36 |
| | B20-27 | GERGFFYT | 37 |
| | B21-29 | ERGFFYTPK | 38 |
| | B25-C1 | FYTPKTRRE | 39 |
| | B27-C5 | TPKTRREAEDL | 40 |
| | C20-28 | SLQPLALEG | 41 |
| | C25-33 | ALEGSLQKR | 42 |
| | C29-A5 | SLQKRGIVEQ | 43 |
| | A1-10 | GIVEQCCTSI | 44 |
| | A2-10 | IVEQCCTSI | 45 |
| | A12-20 | SLYQLENYC | 46 |

In certain embodiments the tolerogenic nanoparticles are for the treatment or prophylaxis of a demyelinating disease. In certain embodiments the demyelinating disease comprises multiple sclerosis or acute disseminated encephalomyelitis (ADEM). Illustrative tolerogenic antigens for the treatment or prophylaxis of demyelinating diseases include, but are not limited to myelin basic protein or a tolerogenic fragment thereof, myelin proteolipid protein or a tolerogenic fragment thereof, and myelin-associated oligodendrocyte basic protein or a tolerogenic fragment thereof, and the like. In certain embodiments the antigen comprises encephalitogenic proteolipid peptides PLP139-151 (HSLGKWLGHPDKF, SEQ ID NO:47) or PLP178-191 (NTWTTSQSIAFPSK, SEQ ID NO:48). In certain embodiments the tolerogenic antigen comprises one or more peptides selected from the group consisting of myelin basic protein $MBP_{84-104}$ (VHFFKNIVTPRTPPPSQGKGR, SEQ ID NO:49), $MBP_{134}$-148 (YKSAHKGFKGVDAQG, SEQ ID NO:50), $MBP_{135-149}$ (KSAHKGFKGVDAQGT, SEQ ID NO:51), $MBP_{136-150}$ (SAHKGFKGVDAQGTL, SEQ ID NO:52), $MBP_{137-151}$ (AHKGFKGVDAQGTLS, SEQ ID NO:53), $MBP_{138-152}$ (HKGFKGVDAQGTLSK, SEQ ID NO:54), $MBP_{140-151}$ (GFKGVDAQGTLSKIF, SEQ ID NO:55), myelin oligodendrocyte protein $(MOG)_{35-55}$ (MEVGWYRSPFSRVVHLYRNGK, SEQ ID NO:56), $MOG_{92-106}$ (DEGGYTCFFRDHSYQ, SEQ ID NO:57), $OVA_{323-339}$ (ISQAVH A AH AEINEAGR, SEQ ID NO:58), J5 (EKPKVEAYKAAAAPA, SEQ ID NO:59), and the like (see, e.g., U.S. Patent Publication 2005/0058643, and Canadian patent application no: CA2473469C).

Various illustrative tolerogenic epitopes for multiple sclerosis are shown in Table 2.

TABLE 2

Illustrative class I-restricted epitopes for MS (see, e.g., U.S Patent Pub. No: 2009/0155292).

| Antigen | Epitope | Amino Acid Sequence | SEQ ID NO |
|---|---|---|---|
| MAG | 287-295 | SLLLELEEV | 60 |
| | 509-517 | LMWAKIGPV | 61 |
| | 556-564 | VLFSSDFRI | 62 |
| MBP | 110-118 | SLSRFSWGA | 63 |
| MOG | 114-122 | KVEDPFYWV | 64 |
| | 166-175 | RTFDPHFLRV | 65 |
| | 172-180 | FLRVPCWKI | 66 |
| | 179-188 | KITLFVIVPV | 67 |
| | 188-196 | VLGPLVALN | 68 |
| | 181-189 | TLFVIVPVL | 69 |
| | 205-214 | RLAGQFLEEL | 70 |
| PLP | 80-88 | FLYGALLLA | 71 |

In certain embodiments the tolerogenic nanoparticles are for the treatment or prophylaxis of acquired factor VIII (FVIII) deficiency or acquired hemophilia A (AHA). Accordingly, in certain embodiments the tolerogenic antigen comprises coagulation factor FVII or a tolerogenic fragment thereof.

Other than preventing immune recognition of factor VIII, leading to the formation of anti-factor VIII antibodies in hemophiliacs, the TNP technology can also be used for a host of other proteinaceous agents that are used in clinical medicine and can give rise to anaphylaxis. Examples include the administration of animal sera to treat snakebites, enzymes (e.g., uricase), the administration of various monoclonal antibodies (including checkpoint inhibitors). In addition, there is also a huge number of therapeutic agent such as penicillin, antibiotics, antiepileptics, etc., that can elicit IgE mediated anaphylactic reactions or may lead to serious cellular-mediated delayed hypersensitivity skin disorders such as Stevens-Johnson syndrome and toxic epidermal necrolysis that could be beneficiaries of this technology.

In certain embodiments the tolerogenic nanoparticles are used as a component in gene therapy treatment regimen to reduce or eliminate the production of antibodies (e.g., neutralizing antibodies) directed against the genes therapy vector used in the treatment. Accordingly, in certain embodiments the antigen comprises a gene therapy vector or a protein comprising a protein from the protein coat of a gene therapy vector (or an immunogenic fragment thereof). In certain embodiments the antigen comprises a gene therapy vector or a protein comprising a protein coat from a gene therapy vector selected from the group consisting of a lentiviral vector (lentivector), an adenovirus vector, and an adeno-associated viral (AAV) vectors. In certain embodiments the antigen comprises an AAV gene therapy vector or a protein comprising a protein coat from an AAV gene therapy vector. In certain embodiments the antigen comprises a protein comprising a protein coat of a gene therapy vector or an immunogenic fragment thereof. In certain embodiments the antigen comprises a gene therapy viral vector (virion). FIG. 27, provides an illustrative, but non-limiting example of the production of a tolerogenic nanoparticle comprising an AAV protein and an immunomodulator (e.g., rapamycin).

In certain embodiments, the tolerogenic nanoparticles are used to reduce or eliminate drug allergy reactions. Drug allergies present a significant challenge to hospitalized patients. Such drug allergies can interfere with potentially life-saving medications. While there exist good measures for diagnosing and preventing penicillin drug reactions, many of the other drug allergies do not have good treatment options and allergists frequently used provocative dose testing, which is a form of tolerizing therapy that is not well developed. Accordingly, in certain embodiments the tolerogenic nanoparticles described herein comprises one or more antigens that induce a tolerogenic response to various drugs. Such tolerogenic nanoparticles can be lifesaving and allow large number of people to be treated with the best available drug even if they are generally allergic to that drug.

A drug allergy is an allergy to a drug, most commonly a medication, and is a form of adverse drug reaction. Medical attention should be sought immediately if an allergic reaction is suspected. Often, an allergic reaction will not occur on the first exposure to a substance. The first exposure allows the body to create antibodies and memory lymphocyte cells for the antigen. Symptoms of an immediate drug hypersensitivity reactions, often ige mediated, include, but are not limited to hives, itching, rash, fever, facial swelling, shortness of breath due to the short-term constriction of lung airways or longer-term damage to lung tissue, anaphylaxis, a life-threatening drug reaction (produces most of these symptoms as well as low blood pressure), and the like. Other symptoms include, but are not limited to cardiac symptoms such as chest pain, shortness of breath, fatigue, chest palpitations, light headedness, and syncope due to a rare drug-induced reaction, eosinophilic myocarditis. Another category of allergic drug interactions includes so-called delayed hypersensitivity responses that involve T cells and can lead to serious life-threatening disorders, such as Stevens-Johnson syndrome, exfoliative dermatitis etc. There are two broad mechanisms for a drug allergy to occur: IgE or non-IgE mediated. Drug allergies or hypersensitivities can be broadly divided into two types: immediate reactions and delayed reactions. Immediate reactions take place within an hour of administration and are IgE mediated, while delayed reactions take place hours to weeks after administration and are T-cell mediated. The first category is mostly mediated through specific IgE, whereas the latter is specifically T-cell mediated. The T-cell mediated drug reactions can be as dangerous as the immediate hypersensitivity responses. Examples include Stevens-Johnson syndrome and exfoliative dermatitis. Some classes of medications have a higher rate of drug reactions than others. These include antiepileptics, antibiotics, antiretrovirals, NSAIDs, and general and local anesthetics.

While, in principle, the tolerogenic nanoparticles described herein could simply be loaded with the drug of interest to ameliorate an immune response (e.g., allergic response) to that drug, most drugs are chemicals that are too small to elicit immune responses. However, some drugs have or gain the ability to bind covalently to proteins, which can transform a self-protein to a new antigen (hapten protein or hapten-peptide complex). Such hapten-protein complexes act like classical antigens and thus elicit immune reactions to the hapten-modified protein/peptide, which can be mediated by IgE, IgG, or by lymphocytes.

If one should make tolerogenic nanoparticles for treatment intervention, it would be possible to use the drug as small molecules alone in the hope that they may encounter hapten binding proteins in cells of the immune system for presentation as hapten-protein complexes to B- and T cells. Another approach would be to use deliberate protein carriers for covalent drug coupling. Thus, for example, for some drugs, and drug derivatives, such as penicillin, there are known hapten-carrier complexes that can be used as tolerogenic antigens.

Illustrative, but non-limiting examples of drug reactions include, but are not limited to type I reactions, type II reactions, type III reactions, and type IV reactions.

Type I reactions require the presence of drug-specific IgE. Drugs commonly implicated in type I reactions include but are not limited to Beta-lactam drugs (e.g., penicillins and cephalosporins), neuromuscular blocking agents, quinolone antibiotics, and platinum-containing chemotherapeutic agents, such as carboplatin and oxaliplatin. Type II reactions are uncommon and involve antibody-mediated cell destruction. Type II reactions may arise when drugs bind to surfaces of certain cell types and act as antigens. Subsequent binding of antibodies to the cell surface results in the cells being targeted for clearance by macrophages.

Type II drug reactions usually present as hemolytic anemia, thrombocytopenia, or neutropenia, since these are the cell types that are most often affected. The drugs most commonly implicated in hemolytic anemia are cephalosporins, penicillins, nonsteroidal anti-inflammatory drugs (NSAIDs), and quinine-quinidine. Drugs implicated in thrombocytopenia include heparin, abciximab, quinine and quinidine, sulfonamides, vancomycin, gold compounds, beta-lactam antibiotics, carbamazepine, NSAIDs, and others.

Type III reactions are mediated by antigen-antibody complexes and usually present as serum sickness, vasculitis, or drug fever. The most common drugs implicated in type III reactions include, but are not limited to penicillins, cephalosporins, sulfonamides (including most loop and thiazide-type diuretics), phenytoin, and allopurinol.

Type IV reactions are not mediated by antibodies, in contrast to the other three types above. Rather, type IV drug reactions involve the activation and expansion of T cells, which requires time (normally many hours or days after antigen exposure), hence the name delayed-type hypersensitivity (DTH). Type IV reactions can take many different forms, which vary in significance from inconvenient to life threatening. Drugs implicated in type IV reactions include, but are not limited to carbamazepine, oxcarbazepine, abacavir, allopurinol, dapsone, flucloxacillin, amoxicillin-clavulanate potassium, nitrofurantoin, azathioprine, sulfasalazine, minocycline, trimethoprim-sulfamethoxazole, sirolimus, and tacrolimus, piperacillin-tazobactam. Examples of life-threatening reactions include Stevens-Johnson syndrome/toxic epidermal necrolysis (SJS/TEN) and drug rash with eosinophilia and systemic symptoms/drug-induced hypersensitivity syndrome (DRESS/DiHS), the most dangerous of the delayed drug hypersensitivity reactions. Other delayed hypersensitivity presentations include contact dermatitis (e.g., a reaction to topically applied drugs, which is characterized by erythema and edema with vesicles or bullae that often rupture), maculopapular (including morbilliform) eruptions, acute generalized exanthematous pustulosis. In some instances, fever can be the sole symptom or the most prominent symptom of drug hypersensitivity. Other drug reactions include for example, Stevens-Johnson syndrome and toxic epidermal necrolysis.

Drug-induced hypersensitivity syndrome (DiHS), also called DRESS, is a severe drug hypersensitivity reaction involving rash, fever (38 to 40° C.) and multiorgan failure. Drug-induced autoimmunity can occur in response to certain drugs. The best known example is a lupus-like disease, which can develop after exposure to procainamide, phenytoin, isoniazid, sulfasalazine, amiodarone, minocycline, and penicillamine. Penicillamine can also cause a pemphigus-like disorder. Additionally, bullous dermatosis has been associated with vancomycin and various other drugs, including ceftriaxone, ciprofloxacin, and metronidazole.

Accordingly, in certain embodiment the tolerogenic nanoparticles include a drug or a drug hapten complex as an antigen to reduce or eliminate an allergic response to that drug. In certain embodiments, the antigen comprises one or more drugs selected from the group consisting of beta-lactam drugs (e.g., penicillins and cephalosporins), neuromuscular blocking agents, quinolones, platinum-containing chemotherapeutic agents (e.g., carboplatin, oxaliplatin, etc.), nonsteroidal anti-inflammatory drugs (NSAIDs), quinine, quinidine, heparin, abciximab, sulfonamides, vancomycin, gold compounds, carbamazepine, sulfonamides (including most loop and thiazide-type diuretics), phenytoin, allopurinol, oxcarbazepine, abacavir, allopurinol, dapsone, flucloxacillin, amoxicillin-clavulanate potassium, nitrofurantoin, azathioprine, sulfasalazine, minocycline, trimethoprim-sulfamethoxazole, sirolimus, tacrolimus, piperacillin-tazobactam, penicillamine, ceftriaxone, ciprofloxacin, and metronidazole, or a hapten complexes comprising that drug.

The foregoing tolerogenic antigens are illustrative and non-limiting. Using the teaching provided herein numerous other tolerogenic antigens can be incorporated into the tolerogenic nanoparticles described herein and used for the treatment and/or prophylaxis of a wide range of conditions.
Immunomodulators.

In various embodiments the tolerogenic activity of the nanoparticles described herein can be enhanced by incorporation of one or more immune modulators (e.g., immune suppressors. It was discovered that incorporation of an immune modulator (e.g., an immune inhibitor such as rapamycin and/or a rapamycin analog) can significantly enhance the activity of the tolerogenic nanoparticles described herein. Not only does the rapamycin offer the possibility of reprogramming the targeted antigen presenting cells in the liver, but is also known to promote Fox P3 expression on Tregs, in addition to expanding Treg populations.

Accordingly, in certain illustrative, but non-limiting embodiments, the immune modulator(s) comprise rapamycin (sirolimus). In certain illustrative, but non-limiting embodiments, the immune modulator(s) comprise one or rapamycin analogs including, but not limited to rapamycin analogs selected from the group consisting of temsirolimus, everolimus, and ridaforolimus. These rapamycin analogs (rapalogs) are illustrative and non-limiting. Numerous other rapalogs are known to those of skill in the art. Thus, for example, the preparation of mono- and di-ester derivatives of rapamycin is described in WO 92/005179, 27-oximes of rapamycin are described in EPO Patent Application No: EPO 467606, 42-oxo analog of rapamycin are described in U.S. Pat. No. 5,023,262, bicyclic rapamycins are described in U.S. Pat. No. 5,120,725, rapamycin dimers are described in U.S. Pat. No. 5,120,727, silyl ethers of rapamycin are described in U.S. Pat. No. 5,120,842, and rapamycin arylsulfonates and sulfamates are described in U.S. Pat. No. 5,177,203. The foregoing applications are incorporated herein by reference for the rapamycin analogs described therein.

Using the teaching provided herein, numerous other immunomodulators can be incorporated into the tolerogenic nanoparticles described herein. These include, but are not limited to, immunomodulators that specifically strengthen the duration and immune suppressive effects of regulatory T cells, in addition to the effect that they may exert in reprogramming antigen presenting cells towards a tolerogenic response. Additional immunomodulators that can modify the quality of the Treg response, in addition to rapamycin, can be incorporated, e.g., as described below are shown below in Table 3. Such immunomodulators include, but are not limited to All-trans Retinoic Acid (ATRA) and nucleoside DNA methyl transferase inhibitors (e.g., 5-Azacitidine). Mechanisms of action are described in Table 3.

TABLE 3

Illustrative immunomodulators that can modify the Treg response and their mechanisms of action.

| Agent | Mechanism of action | Treg impact |
| --- | --- | --- |
| Rapamycin | mTOR inhibitor | Promotes FoxP3 expression; Expands iTregs populations; Synergize with ATRA to enhance Treg immune suppression |
| All-trans Retinoic Acid (ATRA) | Vitamin A derivative (tretinoin) operating via nuclear receptors | Enhances TGF-β induced Treg induction; Increases CCR9 expression on Tregs to home to inflammatory sites in mucosal tissues such as the GALT, binding to the $\alpha_4\beta_7$ integrin |
| 5-Azacitidine Decitabine | Nucleoside DNA methyl transferase inhibitors | Enhanced FoxP3 expression (demethylation of TSDR promoter region; Treg expansion and improved control of chronic GVHD |

The foregoing immunomodulators are illustrative and non-limiting. Using the teaching provided herein, numerous other immunomodulators will be available to one of skill in the art for incorporation into the tolerogenic nanoparticles described herein.
Pharmaceutical Formulations and Administration.

In various embodiments tolerogenic nanoparticles are provided for preventing or ameliorating an autoreactive condition (e.g., an allergic condition, immune-mediated adverse events to therapeutics, autoimmune disease, transplant rejection, and the like).

In certain embodiments the tolerogenic nanoparticles are provided for administration as a pharmaceutical formulation. In certain embodiments such formulations comprise the tolerogenic nanoparticles and a pharmaceutically acceptable carrier. In certain embodiments such pharmaceutical formulation can be administered with and/or can incorporate one or more modulators of the immune system (e.g., immunosuppressants such as rapamycin, fujimycin, methotrexate, etc.). The phrases "pharmaceutically acceptable" or "pharmacologically acceptable" refer to molecular entities and compositions that do not produce an adverse, allergic, or other untoward reaction when administered to an animal, or human. As used herein, "pharmaceutically acceptable carrier" includes any and all solvents, dispersion media, coatings, antibacterial and antifungal agents, isotonic and absorption delaying agents, and the like. The use of such media and agents for pharmaceutically active substances is well known in the art.

In certain embodiments the tolerogenic nanoparticles described herein can be formulated for parenteral administration, e.g., formulated for injection via the intravenous, intramuscular, subcutaneous, intrathecal or even intraperitoneal routes. Methods of preparing an aqueous composition that contains tolerogenic nanoparticles described herein will be known to those of skill in the art in light of the present disclosure. Typically, such compositions can be prepared as injectables, either as liquid solutions or suspensions; solid forms suitable for use to prepare solutions or suspensions upon the addition of a liquid prior to injection can also be prepared; and, the preparations can also be emulsified.

Illustrative pharmaceutical forms suitable for injectable use include sterile aqueous solutions or dispersions; formulations including various oils and/or propylene glycol; and sterile powders for the extemporaneous preparation of sterile injectable solutions or dispersions. Typically the form must be sterile and must be fluid to the extent that it may be easily injected. It also should be stable under the conditions of manufacture and storage and is desirably preserved against the contaminating action of microorganisms, such as bacteria and fungi.

In certain embodiments the active pharmaceutical ingredients in tolerogenic nanoparticles described herein can be formulated into a neutral or salt form. Pharmaceutically acceptable salts, include the acid addition salts (formed with the free amino groups of the protein) and which are formed with, e.g., inorganic acids such as, for example, hydrochloric or phosphoric acids, or such organic acids as acetic, oxalic, tartaric, mandelic, and the like. Salts formed with free carboxyl groups can also be derived from inorganic bases such as, for example, sodium, potassium, ammonium, calcium, or ferric hydroxides, and such organic bases as isopropylamine, trimethylamine, histidine, procaine and the like.

In certain embodiments the carrier also can be a solvent or dispersion medium containing, for example, water, ethanol, polyol (for example, glycerol, propylene glycol, and liquid polyethylene glycol, and the like), suitable mixtures thereof, and various oils. The proper fluidity can be maintained, for example, by the use of a coating, such as lecithin, by the maintenance of the required particle size in the case of dispersion, and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride.

Sterile injectable solutions are prepared by incorporating the required amount of tolerogenic nanoparticles described herein in the appropriate solvent with various of the other ingredients enumerated above, as required, followed, e.g., by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, illustrative methods of preparation are vacuum-drying and freeze-drying techniques, which yield a powder of the active ingredient, plus any additional desired ingredient from a previously sterile-filtered solution thereof.

In certain embodiments the tolerogenic nanoparticles described herein are formulated for oral administration, rectal administration, administration via inhalation, and the like. Methods of formulation compositions for such routes of administration are well known to those of skill in the art.

Administration of the tolerogenic nanoparticles described herein or formulations thereon will typically be via any common route. This includes, but is not limited to orthotopic, intradermal, subcutaneous, intramuscular, intraperitoneal, or intravenous injection, oral administration, inhalation, and the like. Methods of formulation compounds for administration via inhalation are described, for example, in U.S. Pat. No. 6,651,655.

In various embodiments, an effective amount of the tolerogenic nanoparticles described herein (e.g., a therapeutically effective or prophylactically effective amount) can be based on the desired objective. The term "unit dose" or "dosage" refers to physically discrete units suitable for use in a subject, each unit containing a predetermined quantity of the composition calculated to produce the desired responses in association with its administration, i.e., the appropriate route and regimen. The quantity to be administered, both according to number of treatments and unit dose, depends on the result (e.g., immune tolerance and/or reduction in immune response) desired.

In certain embodiments precise amounts of the composition also depend on the judgment of the practitioner and are peculiar to each individual. Factors affecting dose include physical and clinical state of the subject, route of administration, intended goal of treatment (e.g., alleviation of symptoms versus cure), and potency, stability, and toxicity of the particular composition. Upon formulation, solutions will be administered in a manner compatible with the dosage formulation and in such amount as is therapeutically or prophylactically effective. The formulations are easily administered in a variety of dosage forms, such as the type of injectable solutions described above.

Uses of the Tolerogenic Nanoparticles.

It will be recognized that the tolerogenic nanoparticles described herein can be used to treat or ameliorate a number of immune-mediated or autoimmune diseases, e.g., diabetes, graft rejection, etc. "Autoimmune disease" includes diseases or disorders arising from and directed against an individual's own cells, tissues, or organs or manifestation thereof or a condition resulting therefrom. In one embodiment, it refers to a condition that results from, or is aggravated by, the production of auto-reactive T-cells (e.g., cytotoxic T cells) that are reactive with normal body tissues and antigens. Illustrative autoimmune diseases or disorders include, but are not limited to, arthritis (rheumatoid arthritis such as acute arthritis, chronic rheumatoid arthritis, gout or gouty arthritis, acute gouty arthritis, acute immunological arthritis, chronic inflammatory arthritis, degenerative arthritis, type II collagen-induced arthritis, infectious arthritis, Lyme arthritis, proliferative arthritis, psoriatic arthritis, Still's disease, vertebral arthritis, and juvenile-onset rheumatoid arthritis, osteoarthritis, arthritis chronica progrediente, arthritis deformans, polyarthritis chronica primaria, reactive arthritis, serum sickness syndrome and ankylosing spondylitis), inflammatory hyperproliferative skin diseases, psoriasis such as plaque psoriasis, gutatte psoriasis, pustular psoriasis, and psoriasis of the nails, atopy including atopic diseases such as hay fever and Job's syndrome, dermatitis including contact dermatitis, chronic contact dermatitis, exfoliative dermatitis, allergic dermatitis, allergic contact dermatitis, dermatitis herpetiformis, nummular dermatitis, seborrheic dermatitis, non-specific dermatitis, primary irritant contact dermatitis, and atopic dermatitis, x-linked hyper IgM syndrome, allergic intraocular inflammatory diseases, urticaria such as chronic allergic urticaria and chronic idiopathic urticaria, including chronic autoimmune urticaria, myositis, polymyositis/dermatomyositis, juvenile dermatomyositis, toxic epidermal necrolysis, scleroderma (including systemic scleroderma), sclerosis such as systemic sclerosis, multiple sclerosis (MS) such as spino-optical MS, primary progressive MS (PPMS), and relapsing remitting MS (RRMS), progressive systemic sclerosis, atherosclerosis, arteriosclerosis, sclerosis disseminata, ataxic sclerosis, neuromyelitis optica (NMO), inflammatory bowel disease (IBD) (e.g., Crohn's disease, autoimmune-mediated gastrointestinal diseases, colitis such as ulcerative colitis, colitis ulcerosa, microscopic colitis, collagenous colitis, colitis polyposa, necrotizing enterocolitis, and transmural colitis, and autoimmune inflammatory bowel disease), bowel inflammation, pyoderma gangrenosum, erythema nodosum, primary sclerosing cholangitis, respiratory distress syndrome, including adult or acute respiratory distress syndrome (ARDS), meningitis, inflammation of all or part of the uvea, iritis, choroiditis, an autoimmune hematological disorder, rheumatoid spondylitis, rheumatoid synovitis, hereditary angioedema, cranial nerve damage as in meningitis, herpes gestationis, pemphigoid gestationis, pruritis scroti, autoimmune premature ovarian failure, sudden hearing loss due to an autoimmune condition, IgE-mediated diseases such as anaphylaxis and allergic and atopic rhinitis, encephalitis such as Rasmussen's encephalitis and limbic and/or brainstem encephalitis, uveitis, such as anterior uveitis, acute anterior uveitis, granulomatous uveitis, nongranulomatous uveitis, phacoantigenic uveitis, posterior uveitis, or autoimmune uveitis, glomerulonephritis (GN) with and without nephrotic syndrome such as chronic or acute glomerulonephritis such as primary GN, immune-mediated GN, membranous GN (membranous nephropathy), idiopathic membranous GN or idiopathic membranous nephropathy, membrano- or membranous proliferative GN (MPGN), including Type I and Type II, and rapidly progressive GN, proliferative nephritis, autoimmune polyglandular endocrine failure, balanitis including balanitis circumscripta plasmacellularis, balanoposthitis, erythema annulare centrifugum, erythema dyschromicum perstans, eythema multiform, granuloma annulare, lichen nitidus, lichen sclerosus et atrophicus, lichen simplex chronicus, lichen spinulosus, lichen planus, lamellar ichthyosis, epidermolytic hyperkeratosis, premalignant keratosis, pyoderma gangrenosum, allergic conditions and responses, allergic reaction, eczema including allergic or atopic eczema, asteatotic eczema, dyshidrotic eczema, and vesicular palmoplantar eczema, asthma such as asthmatic bronchitis, bronchial asthma, conditions involving infiltration of T cells and chronic inflammatory responses, immune reactions against foreign antigens such as fetal A-B-O blood groups during pregnancy, chronic pulmonary inflammatory disease, autoimmune myocarditis, leukocyte adhesion deficiency, lupus, including lupus nephritis, lupus cerebritis, pediatric lupus, non-renal lupus, extra-renal lupus, discoid lupus and discoid lupus erythematosus, alopecia lupus, systemic lupus erythematosus (SLE) such as cutaneous SLE or subacute cutaneous SLE, neonatal lupus syndrome (NLE), and lupus erythematosus disseminatus, juvenile onset (Type I) diabetes mellitus, including pediatric insulin-dependent diabetes mellitus (IDDM), and adult onset diabetes mellitus (Type II diabetes). Also contemplated are immune responses associated with acute and delayed hypersensitivity mediated by cytokines and T-lymphocytes, sarcoidosis, granulomatosis including lymphomatoid granulomatosis, Wegener's granulomatosis, agranulocytosis, vasculitides, including vasculitis, large-vessel vasculitis (including polymyalgia rheumatica and gianT cell (Takayasu's) arteritis), medium-vessel vasculitis (including Kawasaki's disease and polyarteritis nodosa/periarteritis nodosa), microscopic polyarteritis, immunovasculitis, CNS vasculitis, cutaneous vasculitis, hypersensitivity vasculitis, necrotizing vasculitis such as systemic necrotizing vasculitis, and ANCA-associated vasculitis, such as Churg-Strauss vasculitis or syndrome (CSS) and ANCA-associated small-vessel vasculitis, temporal arteritis, aplastic anemia, autoimmune aplastic anemia, Coombs positive anemia, Diamond Blackfan anemia, hemolytic anemia or immune hemolytic anemia including autoimmune hemolytic anemia (AIHA), Addison's disease, autoimmune neutropenia, pancytopenia, leukopenia, diseases involving leukocyte diapedesis, CNS inflammatory disorders, Alzheimer's disease, Parkinson's disease, multiple organ injury syndrome such as those secondary to septicemia, trauma or hemorrhage, antigen-antibody complex-mediated diseases, anti-glomerular basement membrane disease, anti-phospholipid antibody syndrome, allergic neuritis, Behcet's disease/syndrome, Castleman's syndrome, Goodpasture's syndrome, Reynaud's syndrome, Sjogren's syndrome, Stevens-Johnson syndrome, pemphigoid such as pemphigoid bullous and skin pemphigoid, pemphigus (including pemphigus vulgaris, pemphigus foliaceus, pemphigus mucus-membrane pemphigoid, and pemphigus erythematosus), autoimmune polyendocrinopathies, Reiter's disease or syndrome, thermal injury, preeclampsia, an immune complex disorder such as immune complex nephritis, antibody-mediated nephritis, polyneuropathies, chronic neuropathy such as IgM polyneuropathies or IgM-mediated neuropathy, autoimmune or immune-mediated thrombocytopenia such as idiopathic thrombocytopenic purpura (ITP) including chronic or acute ITP, scleritis such as idiopathic cerato-scleritis, episcleritis, autoimmune disease of the testis and ovary including autoimmune orchitis and oophoritis, primary hypothyroidism, hypoparathyroidism, autoimmune endocrine diseases including thyroiditis such as autoimmune thyroiditis, Hashimoto's disease, chronic thyroiditis (Hashimoto's thyroiditis), or subacute thyroiditis, autoimmune thyroid disease, idiopathic hypothyroidism, Grave's disease, polyglandular syndromes such as autoimmune polyglandular syndromes (or polyglandular endocrinopathy syndromes), paraneoplastic syndromes, including neurologic paraneoplastic syndromes such as Lambert-Eaton myasthenic syndrome or Eaton-Lambert syndrome, stiff-man or stiff-person syndrome, encephalomyelitis such as allergic encephalomyelitis or encephalomyelitis allergica and experimental allergic encephalomyelitis (EAE), myasthenia gravis such as thymoma-associated myasthenia gravis, cerebellar degeneration, neuromyotonia, opsoclonus or opsoclonus myoclonus syndrome (OMS), and sensory neuropathy, multifocal motor neuropathy, Sheehan's syndrome, autoimmune hepatitis, chronic hepatitis, lupoid hepatitis, gianT cell hepatitis, chronic active hepatitis or autoimmune chronic active hepatitis, lymphoid interstitial pneumonitis (LIP), bronchiolitis obliterans (non-transplant) vs NSIP, Guillain-Barre syndrome, Berger's disease (IgA nephropathy), idiopathic IgA nephropathy, linear IgA dermatosis, acute febrile neutrophilic dermatosis, subcorneal pustular dermatosis, transient acantholytic dermatosis, cirrhosis such as primary biliary cirrhosis and pneumonocirrhosis, autoimmune enteropathy syndrome, Celiac or Coeliac disease, celiac sprue (gluten enteropathy), refractory sprue, idiopathic sprue, cryoglobulinemia, amylotrophic lateral sclerosis (ALS; Lou Gehrig's disease), coronary artery disease, autoimmune ear disease such as autoimmune inner ear disease (AIED), autoimmune hearing loss, polychondritis such as refractory or relapsed or relapsing polychondritis, pulmonary alveolar proteinosis, Cogan's syndrome/nonsyphilitic interstitial keratitis, Bell's palsy, Sweet's disease/syndrome, rosacea autoimmune, zoster-associated pain, amyloidosis, a non-cancerous lymphocytosis, a primary lymphocytosis, which includes monoclonal B cell lymphocytosis (e.g., benign monoclonal gammopathy and monoclonal gammopathy of undetermined significance, MGUS), peripheral neuropathy, paraneoplastic syndrome, channelopathies such as epilepsy, migraine, arrhythmia, muscular disorders, deafness, blindness, periodic paralysis, and channelopathies of the CNS, autism, inflammatory myopathy, focal or segmental or focal segmental glomerulosclerosis (FSGS), endocrine opthalmopathy, uveoretinitis, chorioretinitis, autoimmune hepatological disorder, fibromyalgia, multiple endocrine failure, Schmidt's syndrome, adrenalitis, gastric atrophy, presenile dementia, demyelinating diseases such as autoimmune demyelinating diseases and chronic inflammatory demyelinating polyneuropathy, Dressler's syndrome, alopecia greata, alopecia totalis, CREST syndrome (calcinosis, Raynaud's phenomenon, esophageal dysmotility, sclerodactyl), and telangiectasia), male and female autoimmune infertility, e.g., due to anti-spermatozoan antibodies, mixed connective tissue disease, Chagas' disease, rheumatic fever, recurrent abortion, farmer's lung, erythema multiforme, post-cardiotomy syndrome, Cushing's syndrome, bird-fancier's lung, allergic granulomatous angiitis, benign lymphocytic angiitis, Alport's syndrome, alveolitis such as allergic alveolitis and fibrosing alveolitis, interstitial lung disease, transfusion reaction, leprosy, malaria, parasitic diseases such as leishmaniasis, kypanosomiasis, schistosomiasis, ascariasis, aspergillosis, Sampter's syndrome, Caplan's syndrome, dengue, endocarditis, endomyocardial fibrosis, diffuse interstitial pulmonary fibrosis, interstitial lung fibrosis, pulmonary fibrosis, idiopathic pulmonary fibrosis, cystic fibrosis, endophthalmitis, erythema elevatum et diutinum, erythroblastosis fetalis, eosinophilic faciitis, Shulman's syndrome, Felty's syndrome, flariasis, cyclitis such as chronic cyclitis, heterochronic cyclitis, iridocyclitis (acute or chronic), or Fuch's cyclitis, Henoch-Schonlein purpura, human immunodeficiency virus (HIV) infection, SCID, acquired immune deficiency syndrome (AIDS), echovirus infection, sepsis, endotoxemia, pancreatitis, thyroxicosis, parvovirus infection, rubella virus infection, post-vaccination syndromes, congenital rubella infection, Epstein-Barr virus infection, mumps, Evan's syndrome, autoimmune gonadal failure, Sydenham's chorea, post-streptococcal nephritis, thromboangitis ubiterans, thyrotoxicosis, tabes dorsalis, chorioiditis, gianT cell polymyalgia, chronic hypersensitivity pneumonitis, keratoconjunctivitis sicca, epidemic keratoconjunctivitis, idiopathic nephritic syndrome, minimal change nephropathy, benign familial and ischemia-reperfusion injury, transplant organ reperfusion, retinal autoimmunity, joint inflammation, bronchitis, chronic obstructive airway/pulmonary disease, silicosis, aphthae, aphthous stomatitis, arteriosclerotic disorders, asperniogenese, autoimmune hemolysis, Boeck's disease, cryoglobulinemia, Dupuytren's contracture, endophthalmia phacoanaphylactica, enteritis allergica, erythema nodosum leprosum, idiopathic facial paralysis, chronic fatigue syndrome, febris rheumatica, Hamman-Rich's disease, sensoneural hearing loss, haemoglobinuria paroxysmatica, hypogonadism, ileitis regionalis, leucopenia, mononucleosis infectiosa, traverse myelitis, primary idiopathic myxedema, nephrosis, ophthalmia symphatica, orchitis granulomatosa, pancreatitis, polyradiculitis acuta, pyoderma gangrenosum, Quervain's thyreoiditis, acquired spenic atrophy, non-malignant thymoma, vitiligo, toxic-shock syndrome, food poisoning, conditions involving infiltration of T cells, leukocyte-adhesion deficiency, immune responses associated with acute and delayed hypersensitivity mediated by cytokines and T-lymphocytes, diseases involving leukocyte diapedesis, multiple organ injury syndrome, antigen-antibody complex-mediated diseases, antiglomerular basement membrane disease, allergic neuritis, autoimmune polyendocrinopathies, oophoritis, primary myxedema, autoimmune atrophic gastritis, sympathetic ophthalmia, rheumatic diseases, mixed connective tissue disease, nephrotic syndrome, insulitis, polyendocrine failure, autoimmune polyglandular syndrome type I, adult-onset idiopathic hypoparathyroidism (AOIH), cardiomyopathy such as dilated cardiomyopathy, epidermolisis bullosa acquisita (EBA), hemochromatosis, myocarditis, nephrotic syndrome, primary sclerosing cholangitis, purulent or nonpurulent sinusitis, acute or chronic sinusitis, ethmoid, frontal, maxillary, or sphenoid sinusitis, an eosinophil-related disorder such as eosinophilia, pulmonary infiltration eosinophilia, eosinophilia-myalgia syndrome, Loffler's syndrome, chronic eosinophilic pneumonia, tropical pulmonary eosinophilia, bronchopneumonic aspergillosis, aspergilloma, or granulomas containing eosinophils, anaphylaxis, seronegative spondyloarthritides, polyendocrine autoimmune disease, sclerosing cholangitis, sclera, episclera, chronic mucocutaneous candidiasis, Bruton's syndrome, transient hypogammaglobulinemia of infancy, Wiskott-Aldrich syndrome, ataxia telangiectasia syndrome, angiectasis, autoimmune disorders associated with collagen disease, rheumatism, neurological disease, lymphadenitis, reduction in blood pressure response, vascular dysfunction, tissue injury, cardiovascular ischemia, hyperalgesia, renal ischemia, cerebral ischemia, and disease accompanying vascularization, allergic hypersensitivity disorders, glomerulonephritides, reperfusion injury, ischemic re-perfusion disorder, reperfusion injury of myocardial or other tissues, lymphomatous tracheobronchitis, inflammatory dermatoses, dermatoses with acute inflammatory components, multiple organ failure, bullous diseases, renal cortical necrosis, acute purulent meningitis or other central nervous system inflammatory disorders, ocular and orbital inflammatory disorders, granulocyte transfusion-associated syndromes, cytokine-induced toxicity, narcolepsy, acute serious inflammation, chronic intractable inflammation, pyelitis, endarterial hyperplasia, peptic ulcer, valvulitis, and endometriosis.

As noted above, by incorporating one or more antigen implicated in the etiology of the disorder, tolerogenic nanoparticles can readily be produced that can be used to induce immune tolerance and/or to reduce an immune response and thereby treat or slow the onset of and/or progression of any of the disorders described herein.

By way of illustration, for example, for the treatment or prophylaxis of an airway disease (e.g., allergy and/or asthma) illustrative antigens include, but are not limited to of ovalbumin or a tolerogenic epitope thereof, Api m 1(PLA$_2$) (bee) or a tolerogenic fragment thereof, Fel d 1 (cat) or a tolerogenic fragment thereof, pollen or pollen components, dust mites or components thereof (see, e.g., U.S. Patent Publication No: 2019/0202875 which is incorporated herein by reference for the immunogenic proteins and fragments described therein), mold or mold components, and the like.

For the treatment or prophylaxis of a food allergy such a gluten intolerance, lactose intolerance, shellfish or peanut allergies, illustrative, antigens include but are not limited to gluten or tolerogenic fragment thereof, or lactose or a tolerogenic fragment thereof, tolerogenic components of shellfish or peanuts, and the like. In the contemplated preventative and remedial treatment of peanut-induced anaphylaxis, it is possible to incorporate crude peanut allergen extracts, as well as recombinant Ara h proteins (e.g., Ara h1, -h2 -h3, -h4) in the tolerogenic nanoparticles, as well as representative Ara h epitopes. These epitopes were mapped using the NIAID-funded IEDB resource to make predictions about possible 15-mer peptides that could serve as dominant non-IgE interactive T-cell epitopes for Ara h1-h4 peanut proteins. Four top scoring peptides were selected by setting cut-off IC50 values of 500 nM. We selected the T-cell epitopes that do not overlap with the well-known Ara h2 IgE binding epitopes through sequence lining. The results are shown in the table below:

TABLE 4

Illustrative Ara h protein epitopes.

| Protein | T cell epitope | Specifications | Sequence |
|---|---|---|---|
| Peanut Ara h2 | Ara-h 1 | Ara h2 10-24 | LALFLLAAHASARQQ (SEQ ID NO: 72) |
| | Ara-h 2 | Ara h2 145-159 | LRNLPQQCGLRAPQR (SEQ ID NO: 73) |
| | Ara-h 3 | Ara h2 1-15 | MAKLTILVALALFLL (SEQ ID NO: 74) |
| | Ara-h 4 | Ara h2 59-73 | SYGRDPYSPSQDPYS (SEQ ID NO: 75) |
| | IgE binding epitope | Ara h2 15-24 | HASARQQWEL (SEQ ID NO: 76) |

For the treatment or prophylaxis of rheumatoid arthritis, illustrative tolerogenic antigen(s) include, but are not limited to citrullinated (cit)-collagen type II (359-369), cit-filaggrin (306-326), cit-β-fibrinogen (60-74), CitPAPPPISGG-GYCitACit (SEQ ID NO:77) cit-vimentin (65-77), and the like. Note that cit refers to citrulline.

For the treatment or prophylaxis of type 1 diabetes illustrative tolerogenic antigen(s) include, but are not limited to pancreatic cell antigens (e.g., insulin, proinsulin, glutamic acid decarboxylase-65 (GAD65), insulinoma-associated protein 2, heat shock protein 60, ZnT8, islet-specific glucose-6-phosphatase catalytic subunit, and tolerogenic fragments thereof).

For the treatment or prophylaxis of a demyelinating disease (e.g., MS or acute disseminated encephalomyelitis (ADEM)) illustrative tolerogenic antigen(s) include, but are not limited to myelin basic protein or a tolerogenic fragment thereof, myelin proteolipid protein or a tolerogenic fragment thereof, and myelin-associated oligodendrocyte basic protein or a tolerogenic fragment thereof, and the like. In certain embodiments the antigen comprises encephalitogenic proteolipid peptides PLP139-151 or PLP178-191. In certain embodiments the tolerogenic antigen comprises one or more peptides selected from the group consisting of myelin basic protein $MBP_{84-104}$, $MBP_{134-148}$, $MBP_{135-149}$, $MBP_{136-150}$, $MBP_{137-151}$, $MBP_{138-152}$, $MBP_{140-151}$, myelin oligodendrocyte protein $(MOG)_{35-55}$, $MOG_{92-106}$, $OVA_{323-339}$, J5, and the like.

For the treatment or prophylaxis of acquired factor VIII (FVIII) deficiency, or acquired hemophilia A (AHA) illustrative tolerogenic antigen(s) include, but are not limited to coagulation factor FVII or a tolerogenic fragment thereof.

In certain embodiments the tolerogenic nanoparticles described herein can be used for the treatment/prevention of adverse reactions to therapeutic substances that induce allergic reactions or serious immune related adverse effects. Such therapeutics include, for example, animal sera, monoclonal antibodies, acute allergic and delayed hypersensitivity drug reactions (e.g., penicillin). There is a huge need for tolerization to drugs that people react to in the hospital and are subjected to so-called drug desensitization protocols that could be ameliorated by a TNP.

In certain embodiments the tolerogenic nanoparticle described herein are used in various gene therapy protocols, e.g., to reduce or prevent an immune response in the treated subject against the gene therapy vector. Accordingly, in various embodiments methods are provided for performing gene therapy on a subject, where the method involves reducing or preventing an immune response in the subject directed against a gene therapy vector by administering to the subject an effective amount of a tolerogenic nanoparticle as described herein wherein an antigen in (or on) said nanoparticle comprises a gene therapy vector or a protein comprising a protein from the protein coat of a gene therapy vector. In certain embodiments the tolerogenic nanoparticle is administered prior to administration of a gene therapy vector to said subject. In certain embodiments the tolerogenic nanoparticle is administered at the same time or overlapping time of administration of a gene therapy vector to said subject. In certain embodiments the antigen comprises a gene therapy vector or a protein comprising a protein coat from a gene therapy vector selected from the group consisting of a lentiviral vector (lentivector), an adenovirus vector, and an adeno-associated viral (AAV) vectors. In certain embodiments the antigen comprises an AAV gene therapy vector or a protein comprising a protein coat from an AAV gene therapy vector. In certain embodiments the antigen comprises a protein comprising a protein coat of a gene therapy vector. In certain embodiments the antigen comprises a gene therapy viral vector (virion).

As noted above, in various embodiments the tolerogenic nanoparticles described herein can contain one or more immune modulators. Accordingly, in certain embodiments the nanoparticles used in gene therapy protocols can contain one or more immune modulator(s) (e.g., an immune suppressant(s)). In certain embodiments the immune modulator comprises rapamycin or a rapamycin analog as described herein. In certain embodiments the immune modulator comprises rapamycin (sirolimus). In certain embodiments the immune modulator comprises a rapamycin analog selected from the group consisting of temsirolimus, everolimus, and ridaforolimus. In other embodiments the tolerogenic nanoparticles may contain drugs that strengthen the effect of Tregs as highlighted above.

The foregoing pathologies and tolerogenic antigens are illustrative and non-limiting. Using the teaching provided herein numerous other tolerogenic antigens can be incorporated into the tolerogenic nanoparticles described herein and used for the treatment and/or prophylaxis of a wide range of conditions.

Kits Comprising Tolerogenic Nanoparticles.

In various embodiments kits are provided for inducing immune tolerance (e.g., epitope-specific immune tolerance) and/or for reducing an immune response to a particular antigen. In various embodiments the kits comprise a container containing one or more of the tolerogenic nanoparticles described herein.

In addition, the kits optionally include labeling and/or instructional materials providing directions (e.g., protocols) for the use of the tolerogenic nanoparticles described herein, e.g., alone or in with, e.g., various immune suppressants, for the treatment or prophylaxis of various allergic and/or autoimmune, or transplant-related pathologies.

While the instructional materials in the various kits typically comprise written or printed materials they are not limited to such. Any medium capable of storing such instructions and communicating them to an end user is contemplated by this invention. Such media include, but are not limited to electronic storage media (e.g., magnetic discs, tapes, cartridges, chips), optical media (e.g., CD ROM), and the like. Such media may include addresses to internet sites that provide such instructional materials.

EXAMPLES

The following examples are offered to illustrate, but not to limit the claimed invention.

Example 1

Use of Polymeric Nanoparticle Platform Targeting the Liver to Induce Treg-Mediated Antigen-Specific Immune Tolerance in a Pulmonary Allergen Sensitization Model Nanoparticles (NPs) can be used to accomplish antigen-specific immune tolerance in allergic and autoimmune diseases. The available options for custom-designing tolerogenic NPs include the use of nanocarriers that introduce antigens into natural tolerogenic environments, such as the liver, where antigen presentation promotes tolerance to self- or foreign antigens. In this example, we demonstrate the engineering of a biodegradable polymeric poly(lactic-co-glycolic acid) (PLGA) nanocarrier for the selective delivery of the murine allergen, ovalbumin (OVA), to the liver. This was accomplished by developing a series of NPs in the 200-300 nm size range as well as decorating particle surfaces with ligands that target scavenger and mannose receptors on liver sinusoidal endothelial cells (LSECs). LSECs represent a major antigen-presenting cell type in the liver capable of generating regulatory T-cells (Tregs). In vitro exposure of LSECs to $NP^{OVA}$ induced abundant TGF-β, IL-4, and IL-10 production, which was further increased by surface ligands. Animal experiments showed that, in the chosen size range, $NP^{OVA}$ was almost exclusively delivered to the liver, where the colocalization of fluorescent-labeled particles with LSECs could be seen to increase by surface ligand decoration. Moreover, prophylactic treatment with $NP^{OVA}$ in OVA-sensitized and challenged animals (aerosolized inhalation) could be seen to significantly suppress anti-OVA IgE responses, airway eosinophilia, and TH2 cytokine production in the bronchoalveolar lavage fluid. The suppression of allergic airway inflammation was further enhanced by attachment of surface ligands, particularly for particles decorated with the ApoB peptide, which induced high levels of TGF-β production in the lung along with the appearance of Foxp3+ Tregs. The ApoB-peptide-coated NPs could also interfere in allergic airway inflammation when delivered post-sensitization. The significance of these findings is that liver and LSEC targeting PLGA NPs could be used for therapy of allergic airway disease, in addition to the potential of using their tolerogenic effects for other disease applications.

Results

Synthesis of the PLGA NP Platform for OVA Delivery.

Figure 1:
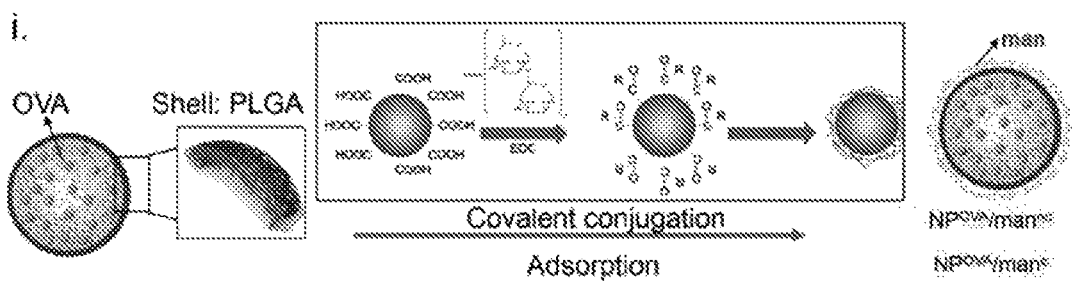
FIG. 1, panels A-D, illustrates synthesis and characterization of the LSEC-targeting PLGA NP platform for OVA delivery. Panel (A): Schematic showing particle surface decoration with mannan and ApoBP: (i) mannan (man) was either physically adsorbed to the particle surface or its hydroxyl-terminus used for covalent conjugation to the PGLA COOH-terminal groups; (ii) ApoBP was linked to the NP surface by a NAEM spacer, using a two-step conjugation process between the ApoBP cysteine tag and the NAEM maleimide group. ApoB peptide containing a GGC tag: CGGKLGRKRYLR (SEQ ID NO: 1). Panel (B): Scanning electron microscopy pictures to show NP morphology, in the presence of attached ligands. Panel (C): Fourier transform infrared spectra of the NAEM-conjugated NPs. Panel (D): $^{1}$H NMR spectra of the synthesized particles with and without the ApoBP attachment, showing the appearance of the newly conjugated peptide at 7 ppm.
Figure 1:
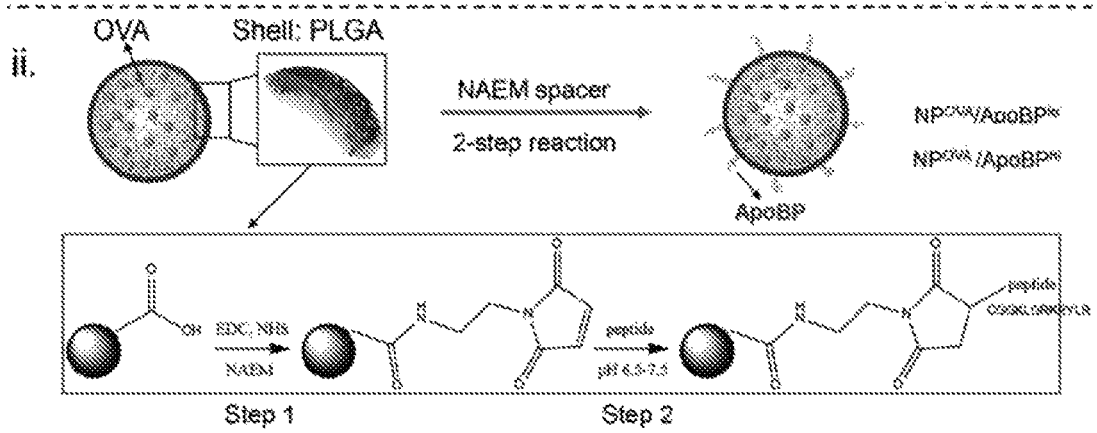
Figure 1:
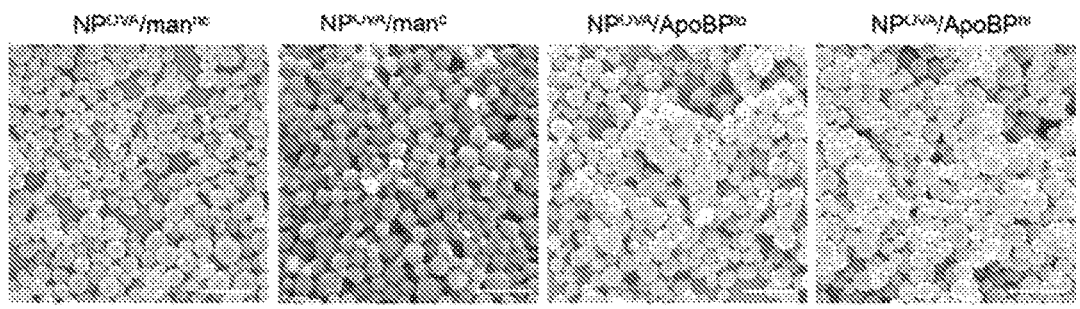

The PLGA polymer was selected for NP synthesis because it is biodegradable, biocompatible, and FDA-approved for drug delivery.[39-41] A double-emulsion method, involving solvent evaporation, was used to fabricate PLGA NPs entrapping 50 μg/mg OVA. Because most NPs in the size range above 500 nm are phagocytosed by KC in the liver or macrophages in the liver and spleen,[15,21] our aim was to develop smaller, easy-to-synthesize particles using a water-in-oil-in-water (w/o/w) emulsion method (FIG. 1, panel A). We settled on the synthesis of a primary particle size of 230 nm (FIG. 1, panel B, and Table 5), which yielded a size range of 246-297 nm following the attachment of surface ligands that could target mannose and stabilin receptors on liver cells.[42,43] Mannan (man) was selected to target the mannose receptor, whereas an ApoB peptide (ApoBP), RLYRKRGLK (SEQ ID NO:3), was used as a ligand for stabilin receptors.[15,44-46] Whereas the stabilin receptors are exclusively expressed on LSECs, the mannose receptor is also present in low abundance on the surface of KCs. Mannan attachment to PLGA particle surfaces was achieved by physical adsorption or using a one-step covalent conjugation method to yield $NP^{OVA}/man^{nc}$ and $NP^{OVA}/man^c$ NP, respectively. For the attachment of ApoBP peptide, lower and higher molar ratios were used for conjugation to the polymer backbone by a two-step procedure, making use of a NAEM spacer; these particles were designated as $NP^{OVA}/ApoBP^{lo}$ and $NP^{OVA}/ApoBP^{hi}$, respectively (FIG. 1, panel A).

TABLE 5

Comparison of Different NP Formulations for Hydrodynamic Size, Zeta-Potential, OVA Content, Ligand Content, and Molar Ratios

| Nanoparticle | Hydrodynamic size (nm) | Polydispersity index (PDI) | Zeta-potential (mV) | OVA content (μg/mg NPs) | Ligand content (μg/mg NPs) | Mol % of PLGA |
|---|---|---|---|---|---|---|
| NP only | 231.2 ± 2.17 | 0.096 | −42.55 ± 2.99 | NA | NA | NA |
| $NP^{OVA}$ | 246.5 ± 3.01 | 0.105 | −44.37 ± 2.81 | 51.61 ± 2.32 | NA | NA |
| $NP^{OVA}/man^{nc}$ | 279.5 ± 2.74 | 0.121 | −51.63 ± 4.05 | 50.31 ± 3.52 | 139 ± 21 | NA |
| $NP^{OVA}/man^c$ | 297.2 ± 2.98 | 0.113 | −54.82 ± 5.18 | 50.98 ± 3.88 | 346 ± 52 | NA |
| $NP^{OVA}/ApoBP^{lo}$ | 268.8 ± 4.96 | 0.109 | −8.63 ± 1.38 | 50.77 ± 3.08 | 6.86 ± 0.89 | 2.8 |
| $NP^{OVA}/ApoBP^{hi}$ | 270.8 ± 4.96 | 0.113 | −4.56 ± 2.25 | 50.12 ± 2.18 | 12.96 ± 0.77 | 5.3 |

The NP formulations were characterized for hydrodynamic size, zeta-potential, OVA content, and ligand density as outlined in Table 5. The physicochemical characterization demonstrated a mean hydrodynamic diameter of 230-290 nm, with the larger size being due to the attachment of surface ligands. NP without OVA (designated NP-only) or encapsulating OVA only ($NP^{OVA}$) exhibited a negative surface charge in water, with zeta-potentials of −42.55 and −44.37 mV, respectively. Mannan attachment increased the negative charge, whereas ApoBP conjugation brought the zeta-potential to −8.63 and −4.56 mV for $NP^{OVA}/ApoBP^{lo}$ and $NP^{OVA}/ApoBP^{hi}$, respectively.

The relative abundance of mannan incorporation was assessed by calculating the difference between the total amount offered for conjugation versus the amount recovered in the supernatant. Mannan quantity was determined by a colorimetric method (using phenol-sulfuric acid[45]) to demonstrate a mannan content of 346±52 µg per mg of NPs after covalent attachment, whereas physical adsorption amounted to 139±21 µg/mg. The ApoBP conjugation to the NAEM spacer was determined by Fourier transform infrared spectroscopy, which demonstrated the presence of two amide bonds (stretching peaks at ~1600 $cm^{-1}$) as well as a maleimide ring (vibration peak at ~1100 $cm^{-1}$) (FIG. 1, panel C). We also assessed the proton NMR spectra of the pristine particles, showing the presence of the lactide (—CH and —$CH_3$) and glycolide (—$CH_2$) peaks in the PLGA backbone, as well as the appearance of an ApoBP tyrosine peak (~7 ppm) in conjugated particles (FIG. 1, panel D). The abundance of peptide conjugation was assessed by a microBCA assay and a nanodrop method. Both methods showed a peptide quantity of ~2.8 and 5.3 mol % in the completed PLGA construct.

Figure 8:
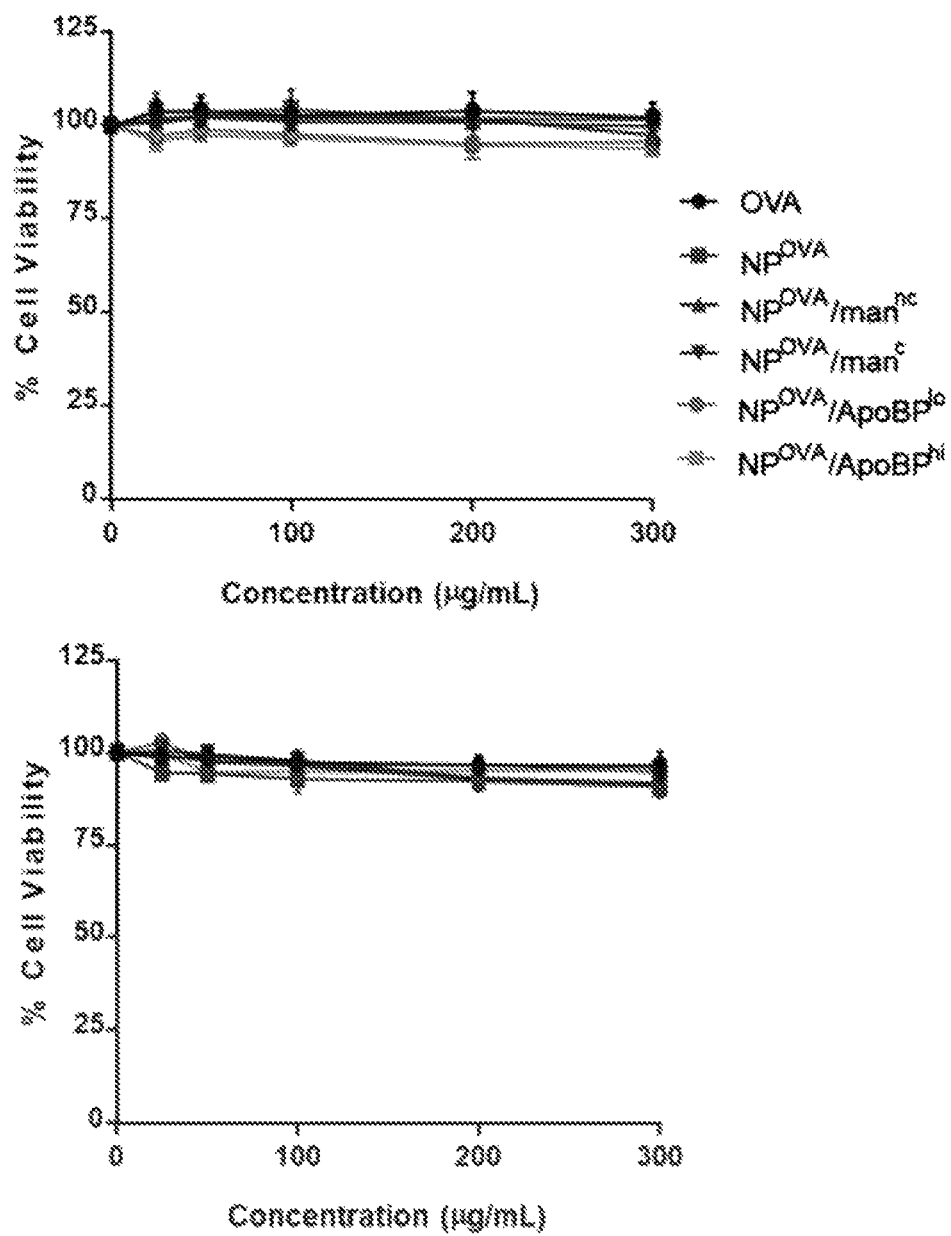
FIG. 8 illustrates the results of a cytotoxicity assessment of the NPs, using an ATP assay. The viability assay was carried out in LSECs (left) and KUP5 cells (right), following their exposure to the nanoparticles at 25-300 μg/mL for 24 h. Data are expressed as the mean±SEM. *p<0.05; p<0.01; *p<0.00 (one-way ANOVA followed by a Tukey's test).

Scanning electron microscopy was performed to show the morphology of the spherical NPs, which were demonstrated to be of uniform size (FIG. 1, panel B). The biocompatibility of these materials in LSECs and Kupffer cells was assessed using an ATP assay, following particle addition at concentrations ranging from 25 to 300 µg/mL. No evidence of cytotoxicity was observed (FIG. 8).

NP-Mediated OVA Uptake in LSECs and Kupffer (KUP5) Cells.

Figure 2:
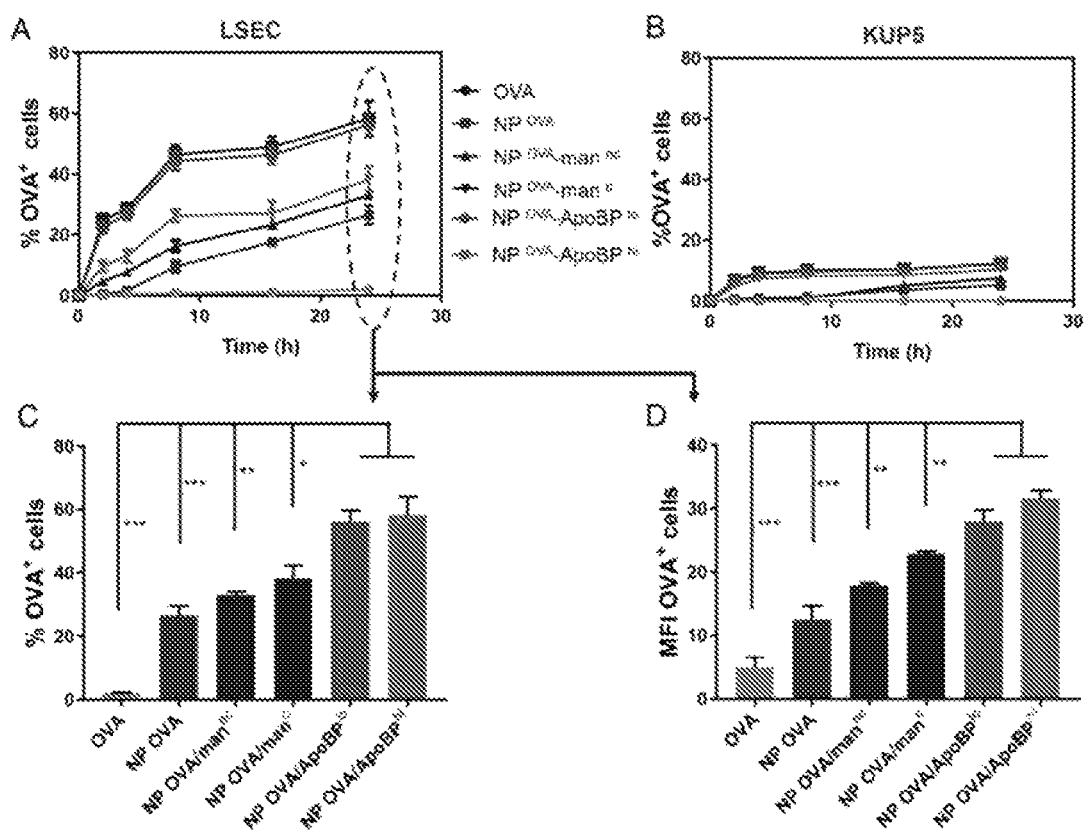
FIG. 2, panels A-D, shows the results of a quantitative analysis of particle-associated antigen uptake in LSECs and KUP5 cells, using flow cytometric analysis. Following OVA-FITC labeling, the antigen was encapsulated in NPs as described in Example 1 Materials and Methods. LSECs and KUP5 cells were incubated with FITC-OVA or NP$^{FITC}$-OVA for the indicated time periods. After being washed in PBS, the % FITC-OVA$^+$ cells and the cellular mean fluorescence intensity (MFI) were analyzed in a BD LSRII (IMED) analytic flow cytometer by Flowjo® software. Panels (A, B): Kinetics of NP-mediated antigen uptake in LSECs and KUP5 cells, respectively. Panels (C, D): Histograms depicting the % and MFI of antigen-positive LSECs. Data are expressed as the mean±SEM (n=6); *$p<0.05$; $p<0.01$; *$p<0.00$ (one-way ANOVA followed by Tukey's test).

The encapsulation of fluorescein isothiocyanate (FITC)-labeled OVA in the NPs allowed us to use flow cytometry to follow $NP^{OVA}$ uptake in LSEC and KUP5 cells. This demonstrated a time-dependent increase in OVA fluorescence intensity in LSECs, with the ApoBP-decorated particle showing an uptake significantly higher than that of either nondecorated ($p<0.001$) or mannan-decorated particles ($p<0.01$) (FIG. 2). The maximum particle uptake was seen for $NP^{OVA}/ApoBP^{hi}$, which showed a ~2-fold increase in the percentage of OVA-positive cells compared to that of $NP^{OVA}$ without ligands. No significant uptake was seen for non-encapsulated FITC-OVA. In contrast to LSECs, the uptake of encapsulated OVA in KUP5 cells was poor, with only 5-10% of the cells showing a fluorescence signal, mostly for particles decorated with the ApoBP ligand. All considered, these data demonstrate that ApoBP and (to lesser extent) mannan are capable of augmenting OVA uptake in LSECs but not Kupffer cells.

Induction of a Tolerogenic Cytokine Profile in LSECs and Kupffer Cells by Ligand-Decorated NPs.

Figure 3:
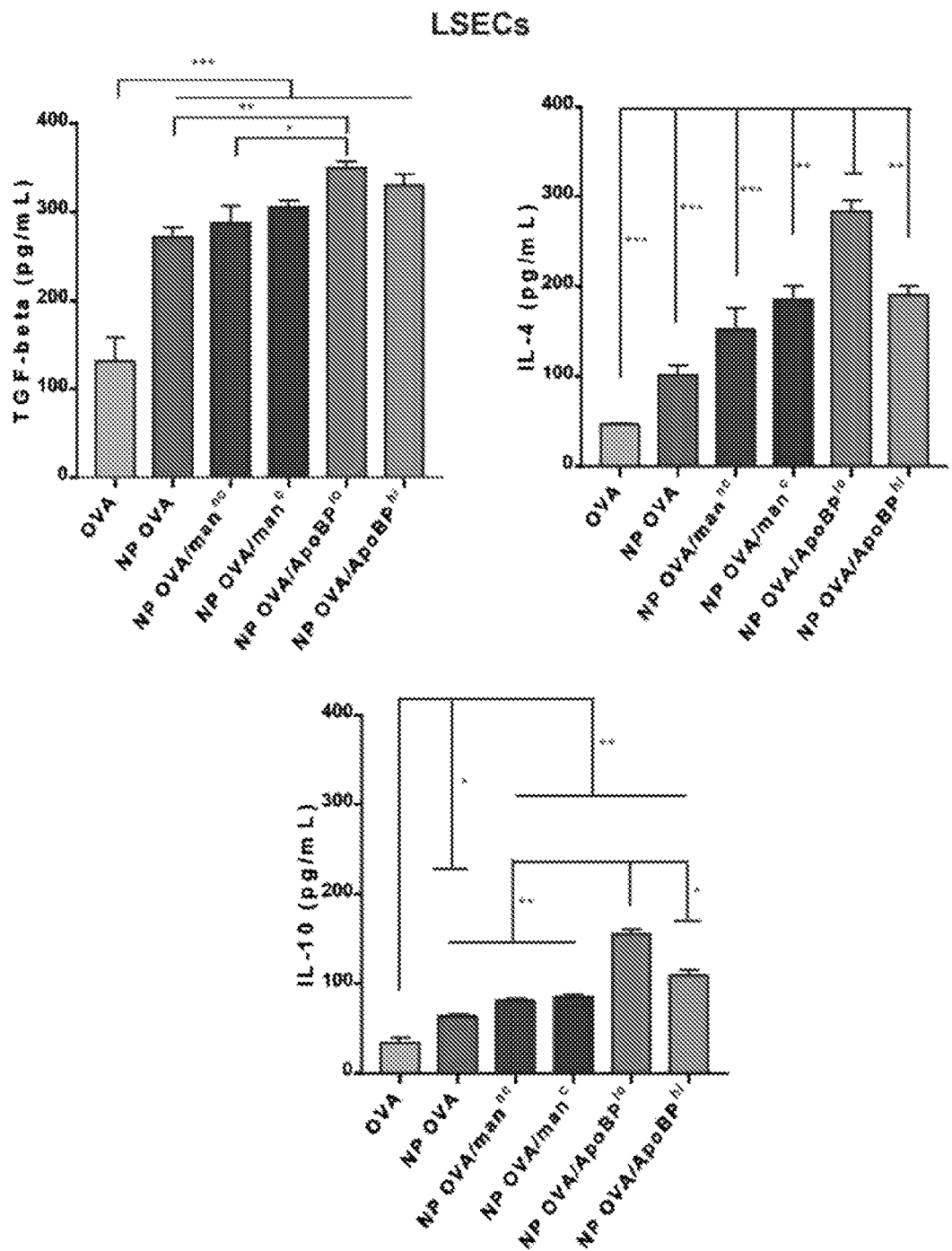
FIG. 3, panels A-B, shows the results of an assessment of the effect of NPs on tolerogenic cytokine production, including TGF-β, IL-4, IL-6, and IL-10 in LSECs (panel A) and KUP5 cells (panel B). These cells were treated with NPs for 24 h, before removal of supernatants and assessment of cytokine content, using ELISA kits according to the manufacturer's instructions. Data are expressed as the mean±SEM (n=6); *p<0.05; p<0.01; *p<0.00 (one-way ANOVA followed by Tukey's test).
Figure 9:
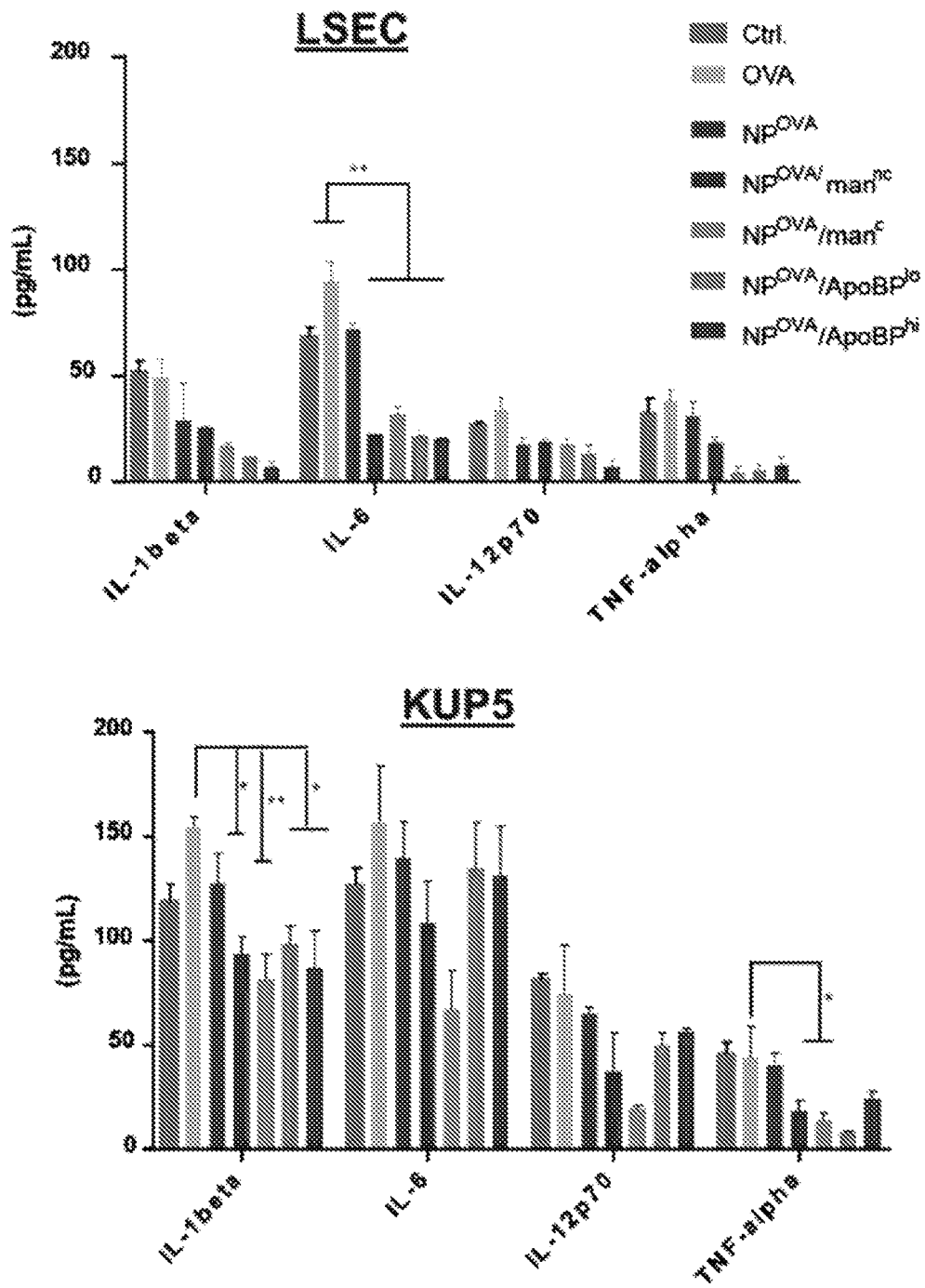
FIG. 9 illustrates the results of an assessment of NP effect on pro-inflammatory cytokine production, including IL1-beta, IL-6, IL-12p70, and TNF-alpha of LSECs and KUP5 cells in vitro. Data are expressed as the mean±SEM. *p<0.05; p<0.01; *p<0.001 (one-way ANOVA followed by a Tukey's test).

APCs in the liver are capable of promoting immune tolerance by a variety of mechanisms, including TGF-β production.[18,19,46] LSECs, in particular, are capable of converting CD4+/Foxp3− T-cells into CD4+/Foxp3+ Tregs through tethered TGF-β on their cell surfaces.[15,18,20] Moreover, following antigen capture, LSECs are capable of producing anti-inflammatory cytokines to further assist generation of antigen-specific immune tolerance.[47] In order to determine if PLGA NPs impact the production of tolerogenic/anti-inflammatory (TGF-β, IL-10, IL-4) or pro-inflammatory (e.g., IL-1β, IL-6, IL-12p70, and TNF-α) cytokines, LSECs and KUP5 cells were exposed for 24 h and cellular supernatants were collected for the performance of ELISA (FIG. 3). All NP formulations induced a significant increase ($p<0.001$) in TGF-β production compared to OVA alone in LSECs (FIG. 3, panel A). Moreover, the cytokine response was significantly higher for $NP^{OVA}/ApoBP^{lo}$ than for $NP^{OVA}$ ($p<0.01$) or $NP^{OVA}$/man ($p<0.05$). A similar trend was seen for IL-4 and IL-10 production in LSECs, with $NP^{OVA}/ApoBP^{lo}$ inducing more robust responses than $NP^{OVA}/ApoBP^{hi}$ ($p<0.05$) or any other particles in the panel ($p<0.05$). In contrast, the quantities of TGF-β and IL-4 released from KUP5 cells were much lower, with $NP^{OVA}/ma^{nc}$ inducing more IL-4 and IL-10 than other NPs (FIG. 3, panel B). This is consistent with the ability of covalently attached mannan to improve OVA uptake in KCs (FIG. 2). In contrast to the effect on anti-inflammatory cytokines, all NPs (irrespective of ligation status) trended toward decreasing the production of IL-1β, IL-6, IL-12p70, and TNF-α in LSECs and KCs (FIG. 9). All considered, these data demonstrate that ligand-decorated nanoparticles induce significantly more tolerogenic cytokines and TGF-β in LSECs than KC, suggesting that in vivo targeting of sinusoidal endothelial cells could provide an effective means of inducing immune tolerization.

Hepatic Biodistribution of NPs Decorated with Surface Ligands.

Figure 4:
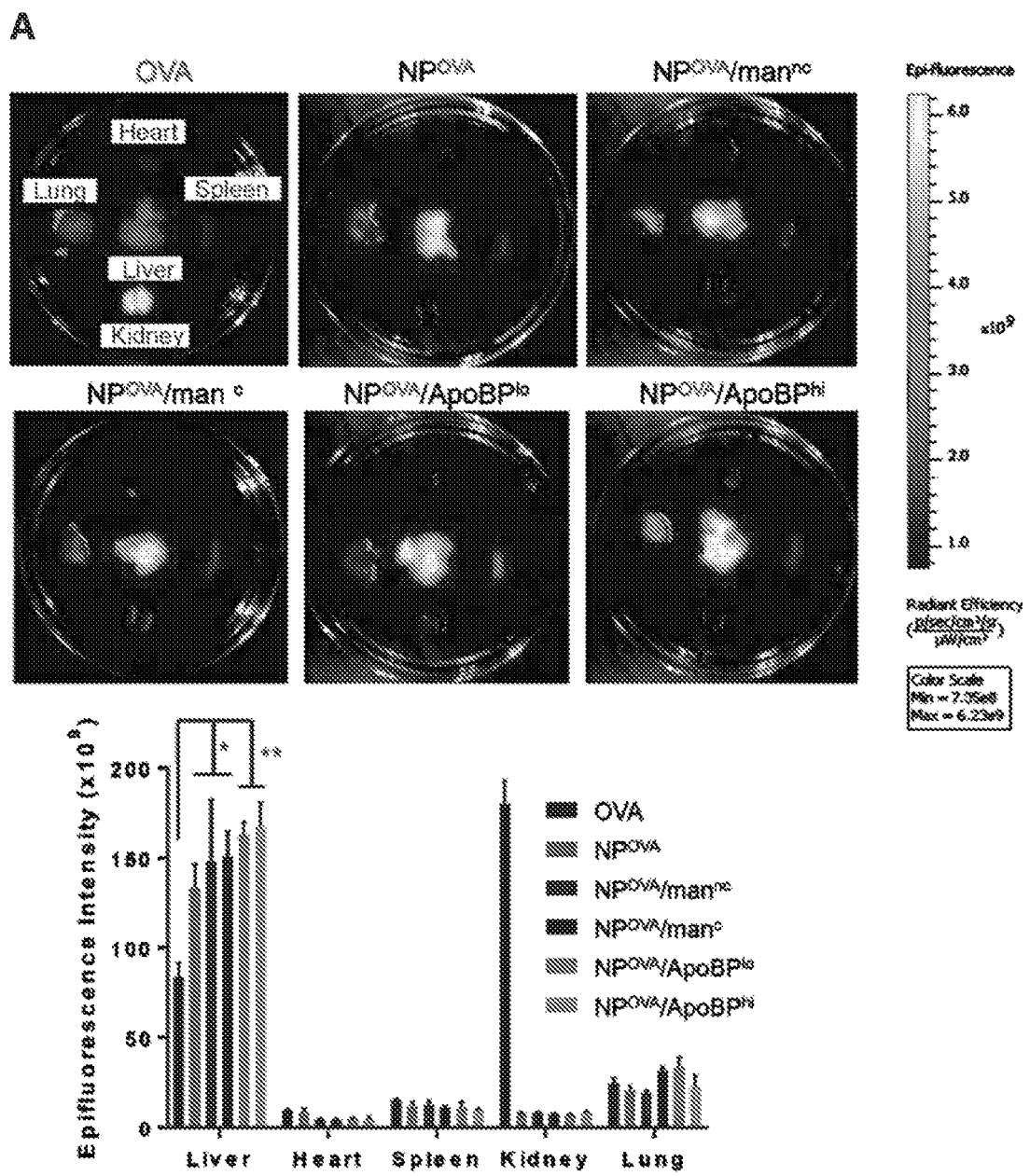
FIG. 4, panels A-B, shows representative ex vivo IVIS images (panel A) of the explanted hearts, livers, spleens, lungs, and kidneys collected from animals 24 h after injecting each animal with 500 μg of NPs, containing 25 μg of DyLight680-labeled OVA (n=6). The histogram in FIG. 4, panel A, shows the fluorescence intensity of the particles in the main organs. Panel (B): Confocal microscopy to show the intrahepatic distribution of free or encapsulated labeled OVA. Encapsulation of the labeled protein did not change the NP properties. The red and green fluorescence colors represent DyLight680-labeled OVA and isolectin B4 stained LSECs, respectively. Scale bars correspond to 50 μm. Data are expressed as the mean±SEM (n=6); *p<0.05; p<0.01; *p<0.00 (one-way ANOVA followed by Tukey's test).
Figure 10:
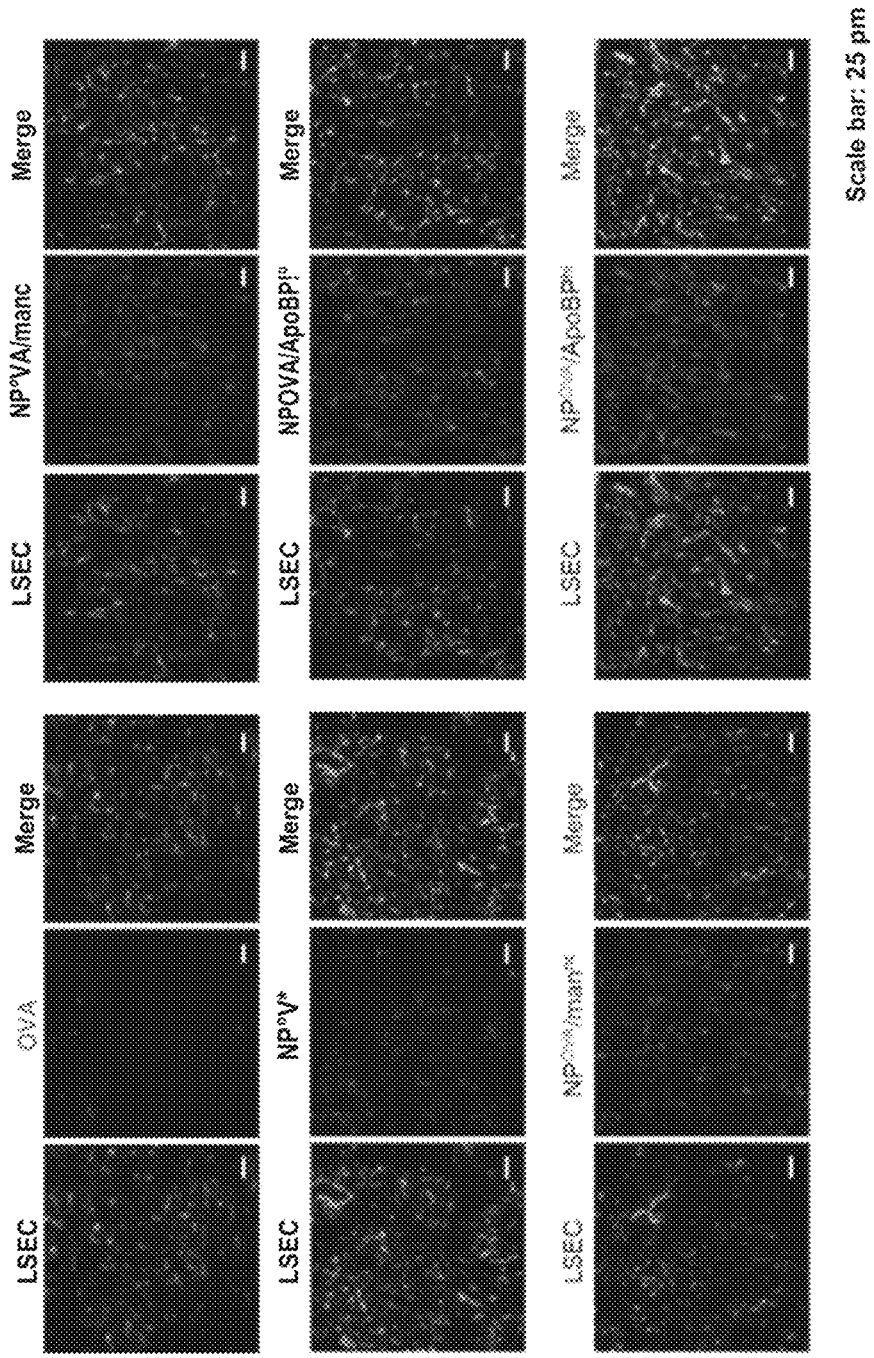
FIG. 10 shows low magnification view of the confocal microscopy images in FIG. 4B to show the intrahepatic distribution pattern of the NP in relation to LSECs. Scale bars correspond to 25 μm.
Figure 11:
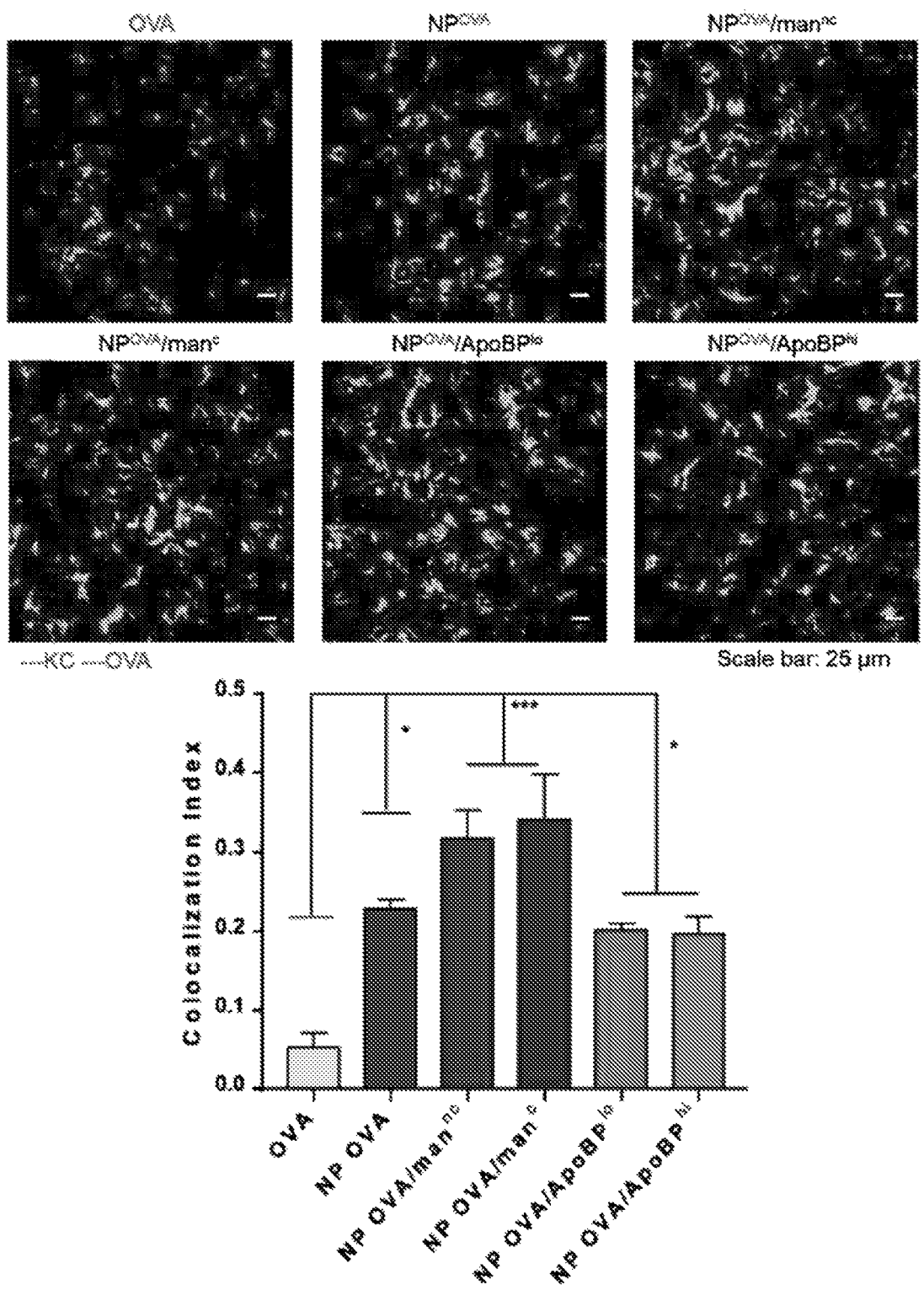
FIG. 11. Confocal microscopy images to show the intrahepatic distribution pattern of the NP in relation to KCs. The red and green fluorescence colors represent Dylight680-labeled OVA and F4/80 stained KCs, respectively. While mannan (man) decoration increases the co-localization with KC compared to $NP^{OVA}$ only, no change in KC uptake was seen for NPs decorated with ApoBP. The scale bars represent 25 μm. Data are expressed as the mean±SEM. *p<0.05; p<0.01; *p<0.00 (one-way ANOVA followed by a Tukey's test).

In order to image the in vivo biodistribution of decorated or non-decorated NPs, DyLight680-labeled OVA was incorporated into the particles. These particles were intravenously (IV) injected in mice to deliver 25 µg of OVA in 500 µg of NPs per animal, before being sacrificed after 24 h. Major organs such as the liver, spleen, heart, lung, and kidney were harvested and mounted in a Petri dish for IVIS imaging. Compared to the distribution of non-encapsulated fluorescent OVA to the kidney, NP-encapsulated OVA mainly accumulated in the liver, with lower levels in the lung and the spleen; little or no distribution occurred in the heart and kidney (FIG. 4, panel A, upper panel). Quantitative expression of fluorescence intensity demonstrated that ApoBP-decorated particles showed the highest liver accumulation, compared to particles decorated with mannan or nondecorated $NP^{OVA}$ (FIG. 4, panel A, lower panel). In order to visualize the intrahepatic distribution of the labeled NPs, isolectin B4 immunostaining was used to locate sinusoidal endothelial cells in liver tissue sections (FIG. 4, panel B and FIG. 11). Confocal microscopy showed that, compared to fluorescent-labeled OVA only or DyLight-labeled $NP^{OVA}$, the colocalization of mannan or ApoBP-coated particles with isolectin-stained endothelial cells could be seen to increase (FIG. 4, panel B and FIG. 10). Calculation of the colocalization frequency (Pearson correlation coefficient) using Image-Pro Plus 6.0 software demonstrated a colocalization index for the ApoBP-decorated particles significantly higher than that of particles decorated with mannan ($p<0.5$) or delivering OVA only ($p<0.01$). These results are in agreement with the expression of stabilin-1 and stabilin-2 scavenger as well as mannose receptors on LSECs. Similar analysis was performed to evaluate the colocalization of the DyLight-labeled NPs with KC, which were immunostained with F4/80 (FIG. 11). Although confocal microscopy demonstrated that $NP^{OVA}$ are taken up by KC, the frequency of colocalization was increased for NP$^{OVA}$/man$^c$ and NP$^{OVA}$/man$^c$ (FIG. 11). In contrast, there was no change in colocalization of ApoBP-decorated NPs with KC, which lack stabilin receptors.

Pretreatment with NPs Exhibit Tolerogenic Effects on the Humoral Immune Response and Generation of Allergic Inflammation in the Lungs of OVA-Sensitized Mice.

Figure 5:
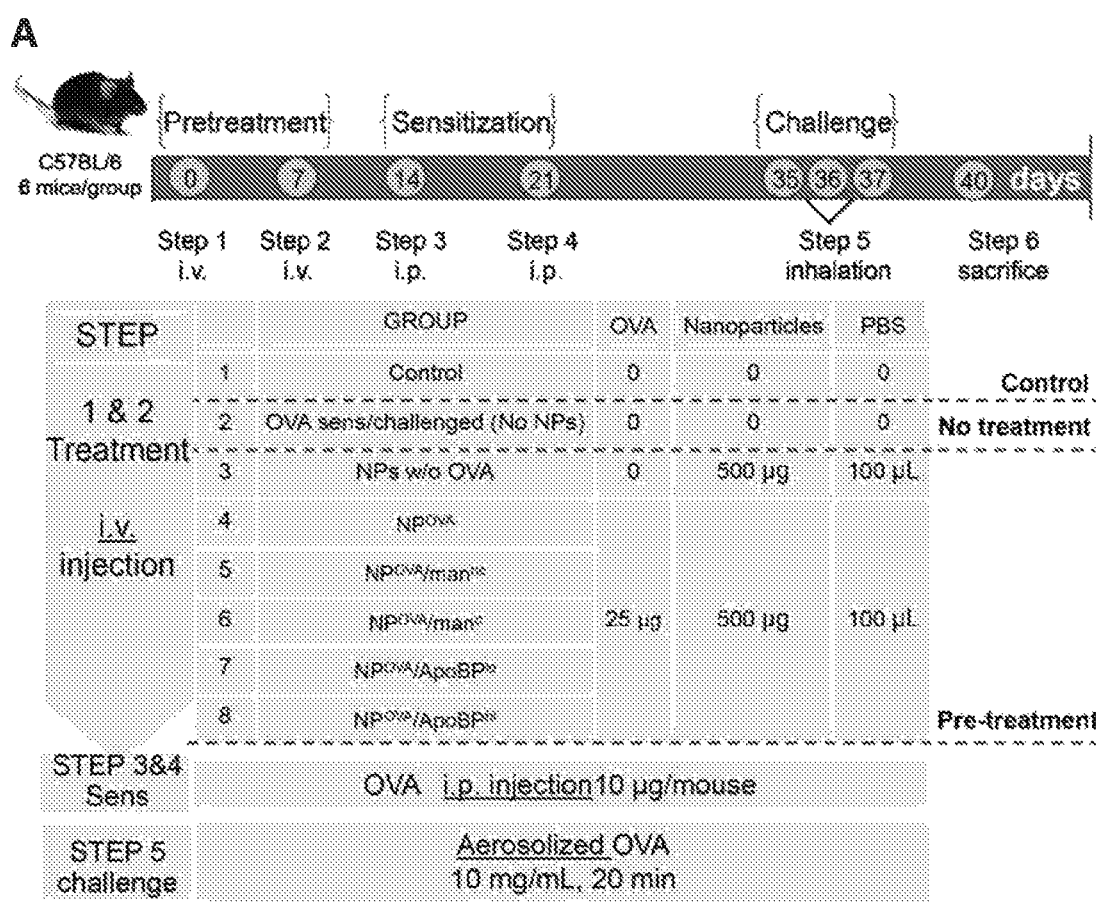
FIG. 5, panels A-B, shows that NP pretreatment interferes in OVA-induced antibody responses in an OVA sensitization model. Panel (A): Outline of the experimental animal protocol. Six to eight week old C57/BL6 mice received IV injection of $NP^{OVA}$ to deliver 25 μg OVA in 500 μg particles per mouse on days 0 and 7. The animals were subsequently sensitized by two IP doses of OVA (10 μg/mouse) on days 14 and 21, prior to being exposed to aerosolized OVA inhalation (10 mg/mL) for 20 min on days 35-37. Animals were sacrificed for tissue harvesting and BALF on day 40. The treatment groups (n=6) in the experiment included: (1) a control group without NP pretreatment, sensitization, or challenge; (2) no pretreatment before sensitization and challenge; (3) pretreatment with NPs w/o OVA before sensitization and challenge; or pretreatment with (4) $NP^{OVA}$, (5) $NP^{OVA}/man^{nc}$, (6) $NP^{OVA}/man^c$, (7) $NP^{OVA}/ApoBP^{lo}$, (8) $NP^{OVA}/ApoBP^{hi}$ before sensitization and challenge. Panel B) Serum anti-OVA IgE and IgG1 antibody titers were determined by ELISA. Data are expressed as the mean±SEM; *p<0.05; p<0.01; *p<0.00 (one-way ANOVA followed by Tukey's test).

Based on the observation that mannan and ApoBP-decorated NPs are capable of LSEC targeting and induction of tolerogenic cytokines, we asked whether these particles could be used for tolerance induction in a mouse model of OVA-induced allergic inflammation in the lung. This was accomplished by pretreating Balb/c mice on days 0 and 7 with OVA-encapsulated NPs, with and without surface ligand decoration (FIG. 5, panel A). The controls included animals receiving no particles or PLGA particles that do not contain OVA. The mice were subsequently sensitized to OVA by intraperitoneal (IP) administration of the antigen on days 14 and 21, followed by inhalation challenge with aerosolized OVA on days 35-37. The animals were sacrificed on day 40 for performance of bronchoalveolar lavage (BAL) and organ harvesting (FIG. 5, panel A). The allergic response to OVA is accompanied by TH2-driven IgE and IgG1 antibody production, which could be measured in the serum (FIG. 5, panel B). This demonstrated that the IgE response to OVA could be significantly decreased by pretreatment with OVA-containing nanoparticles, with the strongest (15-fold) response observed in animals pretreated with NP$^{OVA}$/ApoBP$^{hi}$ ($p<0.001$). No decline was seen in the group receiving NPs w/o OVA. A similar trend was seen for the IgG1 response to OVA, with the antibody titer decreasing ~10-fold in animals pretreated with NP$^{OVA}$/ApoBP$^{hi}$ (FIG. 5, panel B). In contrast, the TH1-mediated IgG2a antibody response to OVA was not affected by pretreatment (not shown).

Figure 6:
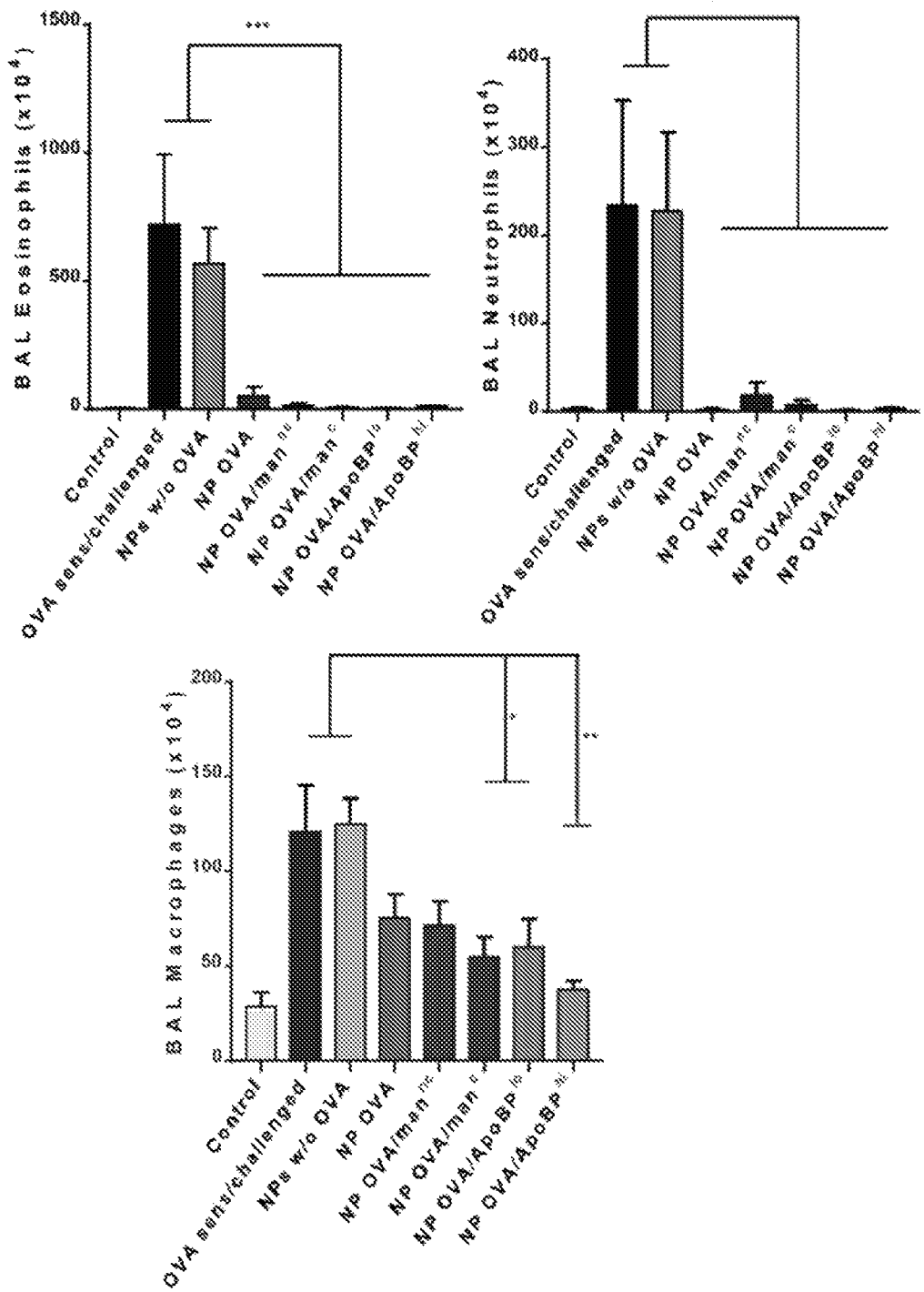
FIG. 6, panels A-E, shows that NP pretreatment alleviates allergic airway inflammation. Lung tissue and BALF from the experiment in FIG. 5, panel A, were used for the following analysis. Panel (A): Differential eosinophil, neutrophil, and macrophage cell counts on BALF. BAL was performed using 1 mL of PBS buffer for each animal, following which the BALF was cytospun onto slides for staining and counting. Panel (B): Representative histological sections of lung tissue used for formalin fixing and H&E staining. The scale bars represent 200 μm. Panel (C): TH2 cytokine (IL-4, IL-5, and IL-13) levels in the BALF, determined by ELISA. Panel (D): TGF-β, IL-10, and INF-γ levels in the BALF, determined by ELISA. Panel (E): Foxp3+ T-cell recruitment to the lung in response to pretreatment with tolerogenic NP. The lung tissues from the experiment in FIG. 5, panel A, were used for the immunohistochemistry (IHC) staining protocol to detect Foxp3+ T cells. The scale bar represents 100 μm. Image-Pro Plus 6.0 software was used to detect cell nuclei and calculation of the percent-positive cells, under 10× magnification. A total of 12 independent fields were counted for each experimental group. The histogram shows the % Foxp3+ T-cells in each group. Data are expressed as the mean±SEM; *p<0.05; p<0.01; *p<0.00 (one-way ANOVA followed by Tukey's test).

The assessment of BAL cell counts in the same experiment (FIG. 5, panel A) demonstrated that the rise in eosinophil cell number was significantly suppressed by pretreatment with OVA-containing NPs, leading to almost total disappearance of the cell type from the BAL fluid (BALF) of animals previously treated with ApoBP-decorated NPs (FIG. 6, panel A). Similar effects were seen for neutrophil influx, which was less abundant in the BALF. There was also a significant reduction in macrophage cell counts in animals treated with NP$^{OVA}$/ApoBP$^{hi}$, NP$^{OVA}$/ApoBP$^{lo}$, and NP$^{OVA}$/man$^{nc}$ (FIG. 6, panel A). The performance of lung histology and H&E staining demonstrated that, compared to the lack of inflammation in nonsensitized animals, the lungs of OVA-sensitized and challenged mice showed extensive mononuclear and eosinophilia inflammation with perivascular and peribronchial cuffing (FIG. 6, panel B). Whereas animals pretreated with NPs w/o OVA showed equally severe inflammation, mice receiving NP$^{OVA}$, NP$^{OVA}$/man$^C$, and NP$^{OVA}$/man$^{NC}$ showed a dramatic reduction in the eosinophilic pulmonary infiltrates. Strikingly, pretreatment with NP$^{OVA}$/ApoBP$^{lo}$ and NP$^{OVA}$/ApoBP$^{hi}$ could reduce the tissue inflammation to near-background levels.

OVA challenge in previously sensitized animals (FIG. 5, panel A) could also be seen to induce TH2 cytokine responses, as evidenced by increased IL-4, IL-5, and IL-13 levels in the BALF (FIG. 6, panel C). Compared to the animals receiving no pretreatment, IL-4, IL-5, and IL-13 levels were significantly reduced by pretreatment with OVA-containing NPs. For NP$^{OVA}$/ApoBP$^{hi}$ pretreated animals, this achieved significant levels of $p<0.001$ for IL-4 and IL-5, whereas the corresponding level for IL-13 was $p<0.05$. No effect was seen in the animal group treated with NPs w/o OVA. In addition to TH2 cytokines, BALF was also used to assess TGF-β and IL-10 levels. This demonstrated a significant increase in TGF-β levels in animals pretreated with NP$^{OVA}$/ApoBP$^{lo}$ or NP$^{OVA}$/ApoBP$^{hi}$ compared to treatment with mannan-decorated particles or NP$^{OVA}$ (FIG. 6, panel D). In contrast, there was no significant effect on IL-10 levels or the TH1 cytokine, IFN-γ (FIG. 6, panel D).

Figure 13:
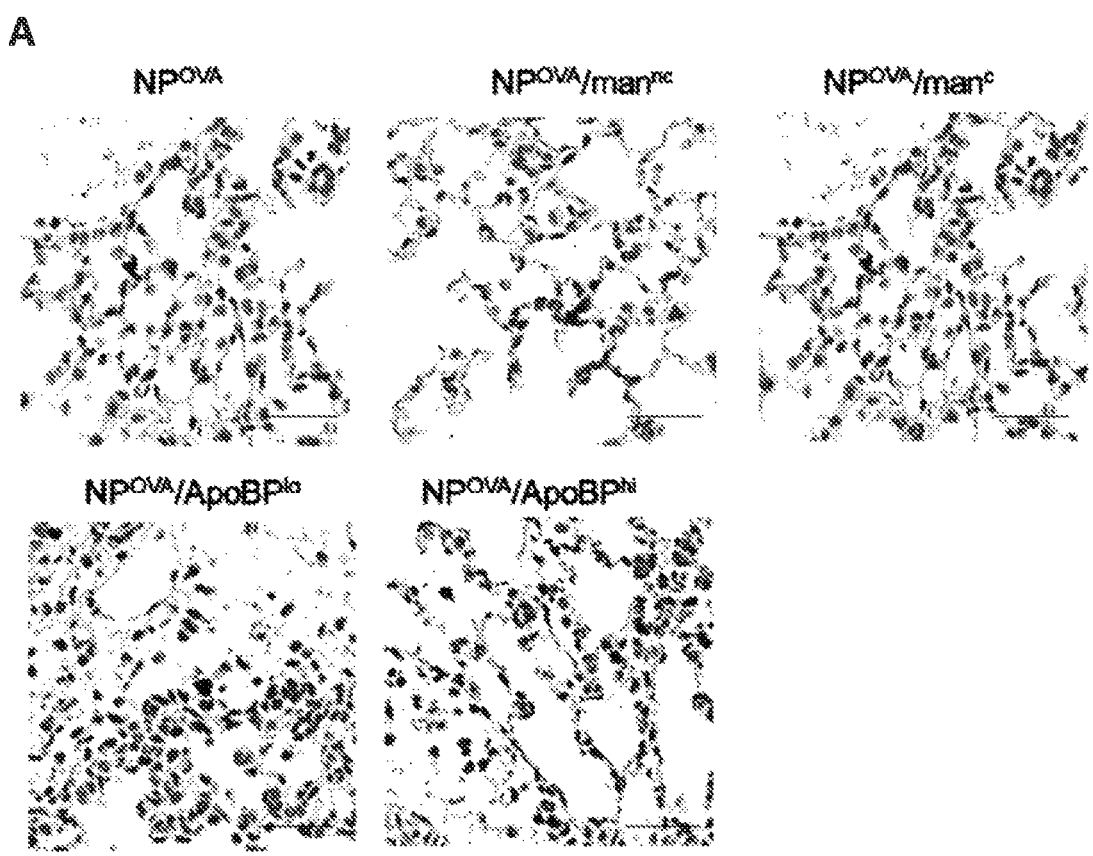
FIG. 13, panels A-B, illustrate Foxp3+ T-cell recruitment to the lung in response to pretreatment (panel A) and posttreatment (panel B) with tolerogenic NPs. The lung tissues from the experiment were used for the IHC staining protocol to detect Foxp3+ T-cells. The scale bar represents 40 µm.
Figure 14:
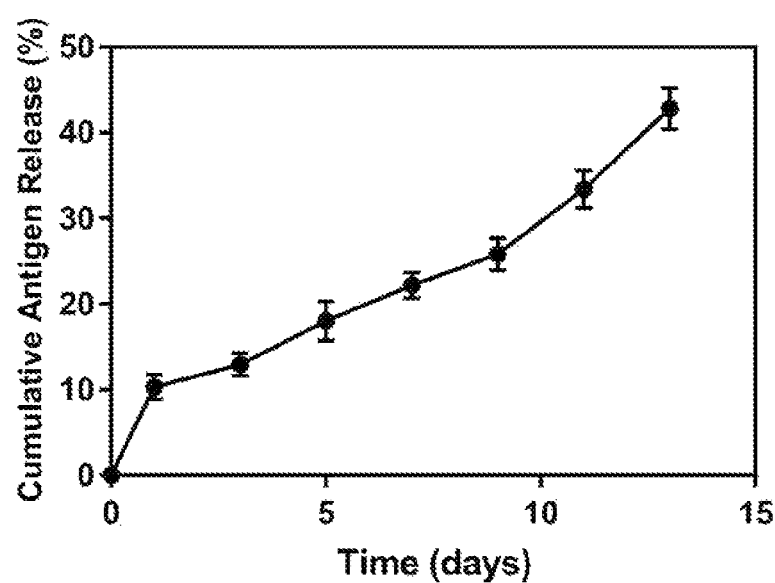
FIG. 14 illustrates in vitro OVA release profile of PLGA NPs. Five mg of PLGA NPs encapsulating OVA were suspended in 2 mL of PBS (10 mM, pH 7.4) and incubated at 37° C. with continuously gentle shaking. At different time points, supernatants were collected by centrifugation at 15,000 g for 5 min and analyzed for protein content by the Micro BCA kit. The cumulative percentage of released OVA was expressed as the mean SEM (n=3).

Based on the decline in allergic inflammation and an increase in TGF-β production in the lung, IHC staining was performed to assess Foxp3+ cell expression (FIG. 6, panel E and FIG. 13, panel A). Although relatively sparse compared to the density of eosinophilic airway infiltrates, the presence of Foxp3+ cells in the lung could clearly be confirmed in animals exposed to OVA-containing NPs of all varieties (FIG. 6, panel E and FIG. 13, panel A). The increase was especially prominent in animals previously treated with ApoBP-coated NPs. Quantitative assessment of the number of positively stained cells, expressed as the % Foxp3+ T-cells for the total number of cells observed under 10× magnification, showed a statistically significant ($p<0.01$) increase in NP$^{OVA}$/ApoBP pretreated animals compared to those receiving mannan-coated particles (FIG. 6, panel E and FIG. 13, panel A). These data are compatible with Treg generation in the liver, leading to suppression of allergic inflammation in the lung. The results do not exclude the participation of other suppresser T-cell subsets in immune regulation, including Tr1 and Tr3 CD4+ T-cells and natural killer cells.

Postsensitization NP Treatment has a Tolerogenic Effect in Allergic Inflammation.

Figure 7:
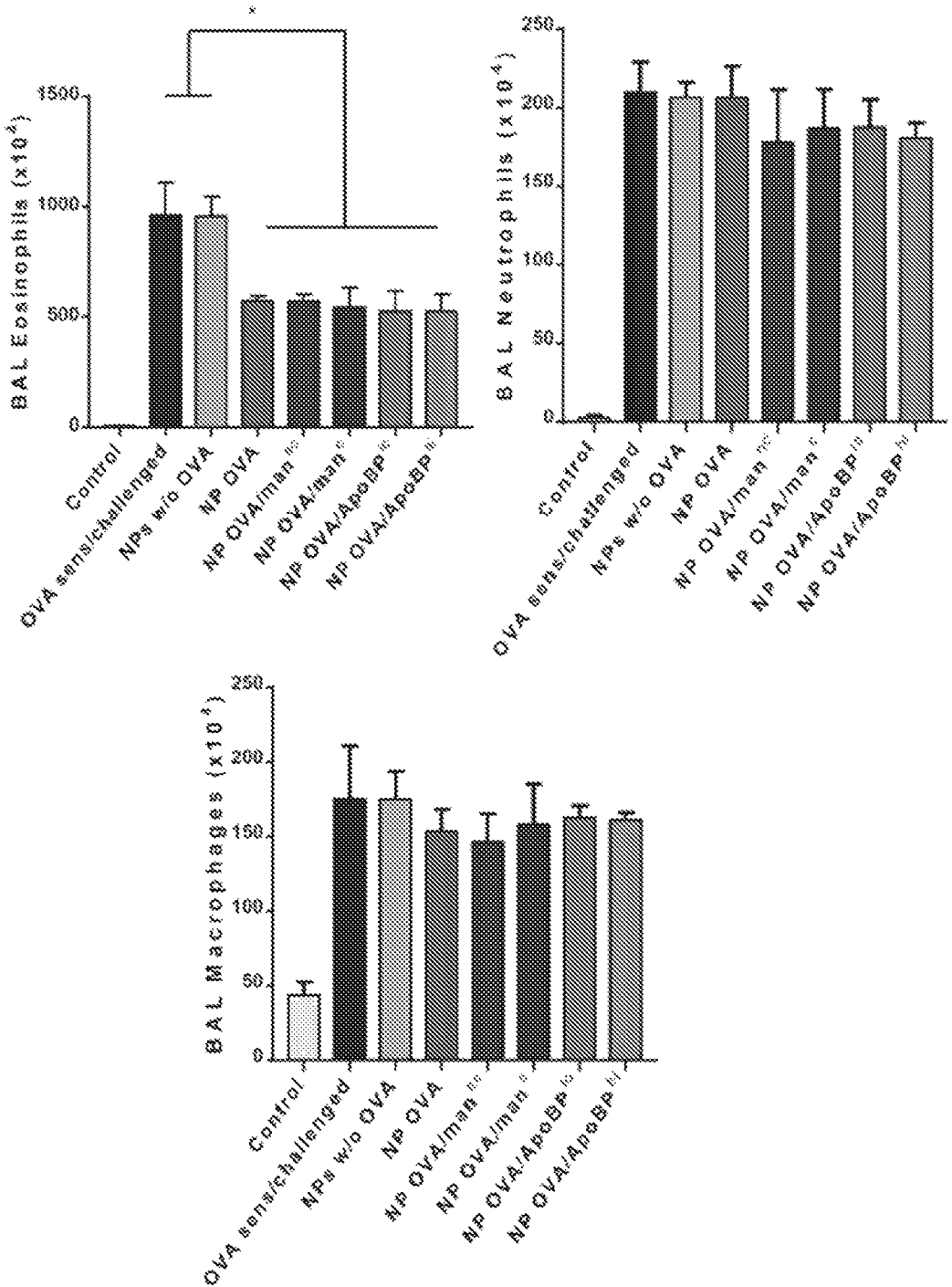
FIG. 7, panels A-D, shows that NP treatment post-sensitization alleviates allergic airway inflammation. The scheme is outlined in FIG. 12, panel A. Briefly, 6-8 week old C57/BL6 mice were IP sensitized with OVA (10 μg/mouse) on days 0 and 7. Subsequently, the animals received IV injection of $NP^{OVA}$ (with or without ligands) on two occasions days 14 and 21. The administered OVA and NP doses were similar to that in FIG. 5. The post-treatment groups included: (1) a control group without any pretreatment or any sensitization or challenge; (2) no pretreatment before sensitization and challenge; (3) NPs w/o OVA; (4) $NP^{OVA}$; (5) $NP^{OVA}/man^c$; (6) $NP^{OVA}/man^c$; (7) $NP^{OVA}/ApoB^{Plo}$; (8) $NP^{OVA}/ApoBP^{hi}$. Finally, the animals received aerosolized OVA inhalation on days 35-37, as described in FIG. 5. Subsequent to animal sacrifice, BALF and lung tissue were harvested on day 40 to study the following endpoints. Panel (A): Differential cell counts in the BALF. Panel (B): Representative lung histology; scale bars correspond to 200 μm. Panel (C): TH2 cytokine (IL-4 and IL-5) and TGF-β levels in BALF by ELISA. Panel (D): IHC for Foxp3+ T-cell recruitment to the lung. Data are expressed as the mean±SEM; *p<0.05; p<0.01; *p<0.00 (one-way ANOVA followed by Tukey's test).
Figure 12:
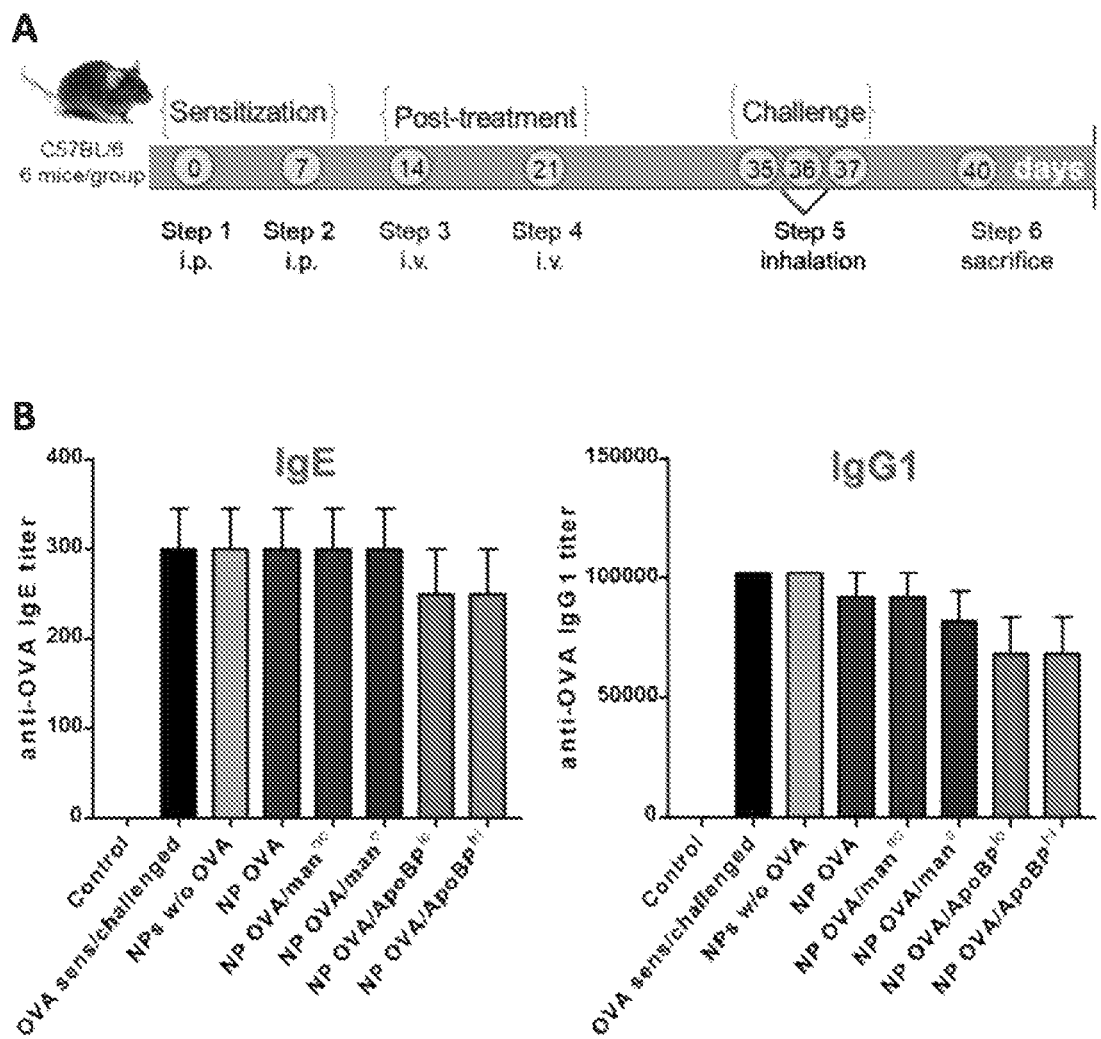
FIG. 12, panels A-B, shows that post-treatment with the NPs in sensitized mice did not significantly change the immune response to OVA. Panel (A): Outline of the experimental animal protocol (n=6). In the first step, mice were sensitized IP with 10 μg OVA per mouse on days 0 and 7. The second step involved IV injection of $NP^{OVA}$ (with or without ligands) to deliver 25 μg OVA in 500 μg NPs per mouse on days 14 and 21. Post-treatment groups were as follows: (1) control group without any pretreatment or any sensitization or challenge; (2) no pretreatment before sensitization and challenge; (3) NPs w/o OVA; (4) $NP^{OVA}$; (5) $NP^{OVA}/man^{nc}$; (6) $NP^{OVA}/man^c$; (7) $NP^{OVA}/ApoBP^{lo}$; (8) $NP^{OVA}/ApoBP^{hi}$. In the next step, mice received aerosolized OVA inhalation (10 mg/mL) for 20 min on days 35-37, prior to animal sacrifice and tissue harvesting on day 40. Panel B) IgE and IgG1 anti-OVA antibody titers in the same animal experiment as FIG. S5A. Data are expressed as the mean±SEM. *p<0.05; p<0.01; *p<0.00 (one-way ANOVA followed by a Tukey's test).

To determine whether NP$^{OVA}$ could induce tolerogenic effects in already-sensitized animals, the particles were IV administered on days 14 and 21 to animals previously sensitized by OVA injection IP on days 0 and 7 (FIG. 12, panel A). Inhalation OVA challenge was performed as before. While there was a trend toward decreased anti-OVA IgE and IgG1 levels in animals treated with ApoBP-coated NPs, the decline was not statistically significant (FIG. 12, panel B). We did, however, observe decreased eosinophil numbers in the BALF in all animals exposed to NP$^{OVA}$, without a differential effect of decorated versus non-decorated particles (FIG. 7, panel A). No significant effects were seen on neutrophil or macrophage cell numbers. Nonetheless, histological analysis revealed a noticeable reduction in airway inflammation and perivascular cuffing in all animal lungs receiving post sensitization NP$^{OVA}$ administration (FIG. 7, panel B). This was particularly obvious for animals treated with ApoBP-decorated NP and less so for mannan-coated particles (FIG. 7, panel C). It could also be demonstrated that the reduction in the severity of airway inflammation showed excellent correlation with TGF-β levels in the BALF for animals treated with ApoBP-decorated NPs but less so for mannan-coated NPs (FIG. 7, panel C). Interestingly, the reduction in airway inflammation was not accompanied by decreases in IL-4 and IL-5 production. Finally, performance of IHC staining to discern the appearance of Foxp3+ cells demonstrated the appearance of Tregs for decorated NPs, particularly ApoBP-coated NPs (FIG. 7, panel D and FIG. 13, panel B).

A possible explanation for the difference of the tolerizing effect of the NPs on humoral versus cell-mediated immunity is that IgE class switching in B-lymphocytes is more difficult to downregulate once induced by TH2 stimuli than the already-triggered allergic inflammatory T-cell responses with eosinophilic infiltrates in the lung (FIG. 7, panels A, B). The same finding has also been demonstrated by Smarr et al.[48] Although the exact explanation for this finding is unknown, it is well-known that it is easier to tolerize a primary immune response than an already induced immune response in the setting of auto-immune disease.[20,36] One possibility is that it is more difficult to turn off clonally diverse immune responses that involve epitope spreading compared to an epitope-restricted primary immune response.[49]

DISCUSSION

In this study, we took advantage of the liver's natural ability to generate systemic immune tolerance to alleviate allergic airway inflammation by LSEC-targeting nanoparticles. These carriers were produced by using biodegradable PLGA polymers to encapsulate OVA in 230-290 nm nanoparticles, that were decorated with surface ligands targeting mannose and scavenger receptors. We confirmed particle distribution to the liver, where the presence of mannan and ApoBP contributed to increased uptake by LSECs. APC processing of the encapsulated OVA induced the production of anti-inflammatory cytokines as well as of the tolerogenic cytokine transforming growth factor, TGF-β. These effects were dramatically enhanced in vitro and in vivo by targeting ligands, allowing $NP^{OVA}$ to dramatically suppress allergen-induced allergic airway inflammation by tissue infiltrating Tregs. These findings demonstrate the potential utility of LSEC-targeting NPs for tolerogenic immunotherapy.

The major finding in the study is the use of liver-targeting NPs, capable of inducing tolerogenic effects that suppress TH2-induced allergic airway disease in the lung. Although it is well-known that liver can induce immune tolerance, this knowledge has not been effectively translated into immunotherapy for allergic disorders in the clinic, including for respiratory allergies. Whereas there is cumulative evidence indicating that oral administration of peanut allergen can induce immune tolerance to prevent a potentially fatal food allergic disorder in children,[50] it still needs to be confirmed that the liver is involved. There are limited reports using a liver targeting approach to treat experimental allergic encephalomyelitis (EAE) in an animal model, where IV injection of small (~10 nm) nontargeted superparamagnetic iron oxide NPs (coated with a polymer) could be used to deliver myelin basic protein (MBP) peptides to the liver.[20] Although the mechanism of biodistribution was uncertain, confocal microscopy confirmed that decorated iron oxide NP colocalized with LSECs.[20] Nonetheless, the iron oxide NPs were effective in preventing EAE when administered early after MBP exposure while also providing therapeutic benefits in animals with established disease.[20] Treatment efficacy correlated with the induction of Tregs in the spleens of the NPMBP exposed mice.[20] In contrast to the EAE study, we used larger particles comprising an FDA-approved polymer, PLGA. These particles mainly distributed to the liver, where KC and LSEC uptake was enhanced by surface coating with mannan, whereas the attachment of a stabilin receptor ligand selectively promoted LSEC uptake (FIG. 4). We further demonstrated that OVA encapsulation and targeted delivery to LSECs was effective for reducing the allergic inflammation in the lung, accompanied by increased TGF-β production and the recruitment of Foxp3+ T-cells (FIG. 7). Whereas a decrease of allergic inflammation in the lung in OVA-sensitized mice was previously demonstrated through the use of ~700 nm OVA-encapsulating PLGA NPs, there was no demonstration of particle biodistribution to the liver, use of a targeting ligand, or the induction of Tregs.[48] We propose that the combination of particle composition, particle size, and decorating the particle surface with ligands played a key role in targeting and endocytic uptake in LSECs, which sets our study apart from previous publications.

Although there are a variety of cell types that can serve as APCs in the liver, LSECs are well-known for their capacity to induce immune tolerance.[13,51] Not only are LSECs the most abundant cell type in the liver, other than hepatocytes, but their flattened shape provides a large surface area, allowing them to engage in more frequent interactions with antigens and particulate matter than KCs.[46,52] LSECs do not display a basal lamina and exhibit numerous fenestrae (~150 nm) that act as a selective ultrafiltration barrier, allowing the transition of molecules from the sinusoidal lumen to adjacent hepatocytes.[15] Moreover, different from KCs, LSECs rarely phagocytose particles>500 nm in size and are extremely active in clathrin-mediated uptake, an endocytic mechanism that is frequently used for soluble macromolecules, waste products, viruses, and smaller particles (~200 nm).[15,53-55] This allows LSECs to play an assist role in the reticuloendothelial system, which differs from the effects of professional phagocytes such as KCs, macrophages, and DCs. One of the distinctive functions of LSECs is antigen uptake by scavenger receptors, which is further assisted by low-level expression of MHC-II and costimulatory molecules (e.g., CD40, CD80, and CD86).[19] However, different from DCs, LSECs do not participate in antigen presentation to CD4+ T-cells that control TH1 or TH17 immunity. Instead, LSECs present antigens to CD4+/Foxp3− non-Tregs, which are induced to transform into CD4+/Foxp3+ Tregs.[14,47] In the process, LSECs rely on TGF-β tethering to their surface membrane.[1856] Moreover, LSECs also cross-present exogenous antigens to CD8+ T-cells for induction of CD8+-mediated tolerance.[17] LSECs are also capable of producing anti-inflammatory cytokines (e.g., IL-10) that participate in tolerance induction.

In addition to constructing 200-300 nm PLGA nanoparticles for antigen delivery to LSECs, we show that surface coating with mannan and ApoBP is important for achieving their full potential of exerting tolerogenic effects in the liver. Whereas the mannose receptor is expressed in several mammalian cell types such as LSECs, lymph node sinusoidal endothelial cells, or immature DC subpopulations, this receptor is not expressed in human KC and is only present in low abundance on murine KCs.[15] This is compatible with the demonstration of increased OVA colocalization with KC in mannan-coated particles (FIG. 11). It is also worth commenting that KCs contribute to tolerogenic effects in the liver, in addition to providing an exogenous source of TGF-β that can be used by LSECs.[13,57] Noteworthy, the ability to induce TGF-β production and Foxp3+ infiltration in the lung was significantly augmented by covalent attachment of ApoBP (FIG. 6, panels D, E). ApoBP interacts with stabilin-1 and stabilin-2 receptors, which play a role in clathrin-mediated uptake of oxidized LDL in the liver.[15,58] Recent studies have shown that, in addition to LSECs and KCs, other immunosuppressive cell types such as myeloid-derived suppressor cells (MDSCs) may be involved in suppressing allergic inflammation in asthma.[59,60] However, MDSCs have mostly been shown to be involved in inflammatory conditions of the liver or in liver fibrosis,61-63 a setting that differs from the animals with normal liver function used in this study.

Our study introduces an approach for employing tolerogenic nanoparticles to treat allergic diseases, and the platform could also apply to the immunotherapy of autoimmune disease or transplant rejection. Another approach that holds great promise is the use of nanoparticles encapsulating pharmaceutical agents with an antigen, thereby locking APCs into a functional or metabolic state that favors antigen presentation to Tregs.[21] For instance, the encapsulation of rapamycin by PLGA nanoparticles has shown to induce tolerization to porcine uricase (a highly immunogenic enzyme), leading to successful treatment of patients with disfiguring, tophaceous gout.[64] These particles are currently being tested in phase 2 clinical trials. It is also possible to use nanoparticles for delivery of antigens to lymphocytes by targeting tolerogenic receptors or exhibiting surface coating with peptide-MHC class I complexes for antigen presentation to T-cells in the absence of costimulatory molecules.[34,35,65] Attempts have also been made to induce oral tolerance through the use of PLGA particles that contain type II collagen for treatment of collagen-induced arthritis.[26]

Conclusion

In summary, we show that LSEC-targeting PLGA nanoparticles provide a safe and efficient approach for inducing antigen-specific immune tolerance in allergic airway disease. Proof-of-concept cellular studies demonstrated that antigen delivery to these cells induce OVA-specific tolerogenic effects in vitro. Moreover, animal studies confirmed that the particles are preferentially taken up by the liver, where surface coating with mannan and ApoB peptide enhances LSEC targeting, and are capable of inducing Tregs that suppress allergic inflammation in the lung. Not only could prophylactic administration of the OVA-encapsulating particles prevent the generation of allergic airway inflammation, but it was also possible, through stabilin-targeting, to substantially suppress allergic inflammation in already-sensitized animals. All considered, tolerogenic LSEC-targeting NPs could have far-reaching implications for treatment of allergic disease, food allergies, drug reactions leading to anaphylaxis, and treatment of autoimmune disorders.

Materials and Methods

Reagents.

The PLGA formulation obtained from Sigma (St. Louis, MO) has a lactide/glycolid molar ratio of 50:50, a viscosity of 0.45-0.60 dL/g, and includes a premixed content of ~5 kDa PEG. Ovalbumin (OVA), dichloromethane, sodium cholate (used as a stabilizer in the outer water phase), mannan (mw 35-60 kDa), 1-ethyl-3-(3-(dimethylamino)propyl)carbodiimide (EDC), FITC I, N-hydroxysuccinimide (NHS), and N-(2-aminoethyl)maleimide (NAEM) were purchased from Sigma. The immortalized mouse hepatic sinusoidal endothelial cells-SV40 (LSEC), Prigrow medium, and flasks for growing LSECs were purchased from Applied Biological Materials (Vancouver, BC, Canada). The mouse Kupffer cell line, KUP5, was purchased from RIKEN Cell Bank (Japan). The ATPlite luminescence assay kit was purchased from PerkinElmer (Santa Clara, CA). Hoechst 33342, DyLight680 NHS-Ester, and the isolectin GS-IB4 were purchased from Thermo Fisher Scientific (Waltham, MA). The ApoB peptide (ApoBP), RLYRKRGLK (SEQ ID NO:3), containing a GGC tag was synthesized by Biomatik (Cambridge, Ontario, Canada). ELISA kits for the measurement of murine TGF-β, IL-4, IL-10, IL-5, IL-13, TNF-α, IL-6, IFN-γ, and IL-1β were purchased from R&D (Minneapolis, MN). The horseradish peroxidase (HRP)-conjugated goat anti-mouse secondary antibody for detection of IgG2a (A-10685) and IgE (PA1-84764) were purchased from Invitrogen (Waltham, MA). The secondary antibody for detection of IgG1 (ab97240) was from Abcam (Cambridge, MA). The 3,3',5,5'-tetramethylbenzidine (TMB) substrate kit was purchased from BD Biosciences (San Jose, CA).

Fabrication and Characterization of the LSEC-Targeting NPs.

Pristine PLGA NPs were fabricated using a double-emulsion, w/o/w method, combined with solvent evaporation. Two hundred milligrams of PLGA was dissolved in 10 mL of dichloromethane. Thirty milligrams of an OVA solution (1 mL) was added to the PLGA solution to form the primary emulsion (w/o), which was sonicated for 40 s, using a probe sonicator that delivers a power output of 60 W and a 4/4 s on/off working pulse. The primary emulsion was poured into 60 mL of 1% sodium cholate solution, and the mixture was sonicated for 2 min and added into 90 mL of 0.5% sodium cholate solution. The double emulsion was stirred overnight to allow the evaporation of dichloromethane. The mixture was centrifuged and washed using DI water five times at 10000 g for 10 min to remove the non-encapsulated OVA, before suspension in DI water or PBS, as indicated.

Mannan attachment to the particle surface was achieved either through physical adsorption or covalent attachment. For physical adsorption, freeze-dried NPs (10 mg) were mixed with mannan (20 mg in 2 mL of PBS, pH 5.0) and stirred overnight at room temperature. The NPs were collected and washed to remove excess mannan by centrifugation at 35000 g for 15 min. Conjugation chemistry was performed using the COOH-terminus of PLGA for covalent attachment of mannan. Briefly, mannan, EDC, and sulfo-NHS were added to freeze-dried NPs [n(man)/n(COOH)/n(EDC)=0.4:1:10] and dispersed in PBS (2 mL, pH 5.0). The mixture was stirred overnight at room temperature. The NPs were collected, and the excess mannan was removed by centrifugation (35000 g, 15 min). The acquired NPs were designated as $NP^{OVA}/man^c$ and $NP^{OVA}/man^{nc}$.

For peptide conjugation, ApoBP was conjugated to $NP^{OVA}$ by a two-step reaction, using a N-(2-aminoethyl) maleimide (NAEM) spacer. The COOH-terminal PLGA groups in the NPs were attached to the succinimidyl ester, using EDC (n(COOH)/n(EDC)=1:10) and NHS. NAEM was subsequently added (n(COOH)/n(NAEM)=3:5), and the mixture stirred for 2 h to decorate the particle surfaces with NAEM (NPs-NAEM). To remove the excess NAEM, $NP^{OVA}$/NAEM was purified by spinning at 35000 g for 15 min. The ApoBP solution, containing a cysteine tag at the N-terminal end, was added to the suspension and stirred for an additional 2 h. This allowed the maleimide group on NAEM to react with the cysteine sulfhydryl group to form a stable thioether bond. The final product was washed to remove excess reactants. Two doses of ApoBP were used (10 or 20 mg/mL) to generate NPs with different ligand density, which were designated as $NP^{OVA}/ApoBP^{lo}$ and $NP^{OVA}/ApoBP^{hi}$.

The purified NPs were fully characterized using dynamic light scattering to determine particle size and surface charge, and scanning electron microscopy was performed to visualize particle morphology. The microBCA assay was used to detect OVA loading capacity and the conjugation efficiency of the peptide ligand, whereas the phenol-sulfuric acid method was used to determine mannan concentration. The endotoxin level was verified by a chromogenic LAL assay.

Cell Culture.

LSECs were grown in Prigrow medium, supplemented with 10% fetal bovine serum (FBS, Gemini, Sacramento, CA) and 100 U/mL/100 µg/mL of penicillin-streptomycin (Gibco, Waltham, MA). KUP5 cells were grown in high-glucose Dulbecco's modified Eagle medium (DMEM)

supplemented with 10% FBS, 250 µM 1-thioglycerol, 10 µg/mL bovine insulin, and 100 U/mL/100 µg/mL of penicillin-streptomycin.

Determination of NP Cytotoxicity.

Cytotoxicity assays were performed in LSECs and KUP5 cells using the ATP assay. Following the exposure of the cells to NPs at different concentrations for 24 h in a 96-well plate, the cell culture medium was replaced with an ATP solution. After centrifugation in a microplate centrifuge, 100 µL of each supernatant was removed to determine the luminescence intensity in a SpectraMax M5 microplate reader (Molecular Devices, Sunnyvale, CA).

Quantification of NP-Associated OVA Uptake by LSEC and Kupffer Cells.

To quantitatively evaluate antigen uptake into cells, OVA was labeled with FITC as previously described. Following the incorporation of FITC-OVA into NPs, LSECs and KUP5 cells were incubated with FITC-OVA or the labeled particles for 24 h. Cells were collected, washed with PBS, and analyzed in a BD LSRII (IMED) analytic flow cytometer. Flowjo software (Ashland, OR) was used to quantify the percentage and mean fluorescence intensity of the FITC-OVA+-labeled cells.

Determination of NP-Induced Cytokine Production by LSEC and Kupffer Cells.

LSEC and KUP5 cells were treated with NPs for 24 h. The culture medium supernatants were removed, and cytokines were quantified by ELISA kits for the detection of mouse TGF-β, IL-4, IL-10, TNF-α, IL-6, and IL-1β according to the manufacturer's instructions.

Labeled PLGA Nanoparticle Biodistribution to the Liver after IV Injection.

The near-infrared fluorescent dye, DyLight680 (ex=692, em=712), was used to label OVA, which was subsequently encapsulated in the NPs. Animals were IV injected with 25 mg/kg free OVA or 500 µg of ligand-decorated or nondecorated $NP^{OVA}$, containing the same amount of antigen (n=6). The mice were sacrificed after 24 h, followed by ex vivo IVIS imaging of organs (liver, lung, spleen, heart, and kidney) explanted in a Petri dish. The data were analyzed using Living Image software (PerkinElmer, version 4.5) and were expressed as the fluorescence intensity in the region of interest. Liver slices were soaked in OCT in stainless-steel molds, frozen, and sent to UCLA Jonsson Comprehensive Cancer Center Translational Pathology Core Laboratory. Liver sections of 4 µm thickness were mounted on glass slides, which were fixed in precooled acetone for 10 min. The slides were brought to room temperature, rinsed with PBS, and incubated with a diluted solution of Hoechst 33342 and AlexaFluor488-conjugated isolectin B4 in PBST (phosphate-buffered saline containing 0.05% Tween-20) for 1 h. For KC staining, rat anti-mouse F4/80 antibody and AlexaFluor594-conjugated goat anti-rat secondary antibodies were used for overnight or 2 h incubation, respectively. The slides were washed in tap water and PBS, dried, and mounted in a Prolong gold antifade solution (Invitrogen, Waltham, MA) before the addition of coverslips. A Leica SP8-MD confocal microscope was used to visualize the slides. High-magnification images were obtained under the 40× objective lens.

Use of Ligand-Decorated or Nondecorated $NP^{OVA}$ to Induce Tolerance in a Murine Allergic Airway Disease Model.

We used 6-8 week old C57/BL6 mice to establish an OVA sensitization and challenge model that results in TH2 skewing of the immune response and generation of allergic airway disease. The basic sensitization protocol for the pretreatment approach with $NP^{OVA}$ involved intraperitoneal (IP) administration of 0.5 mg/kg OVA on days 14 and 21, followed by aerosolized OVA inhalation (10 mg/mL) for 20 min on days 35-37. OVA nebulization was performed with a Schuco 2000 (Allied Health Care Products, St. Louis, MO), delivering OVA with a flow rate of 6 L/min at the nebulizer cup.[66,67] Animals were sacrificed on day 40, followed by collection of BALF (1 mM EDTA in PBS) and lung tissues for histology and immunohistochemistry. In order to assess the tolerogenic effects of $NP^{OVA}$ in the pretreatment protocol, mice received IV injection of $NP^{OVA}$ (1.25 mg/kg OVA, 25 mg/kg NPs) on days 0 and 7. In order to determine the tolerogenic effects of the particles in a post sensitization protocol, animals were sensitized by IP OVA on days 0 and 7, followed by IV particle administration on days 14 and 21. The animals were subsequently challenged by OVA inhalation as described above. Animal care was conducted according to the "Principles of Laboratory Animal Care" of the National Society for Medical Research (USA). The experimental protocol was approved by Division of Laboratory Animals Medicine (University of California, Los Angeles).

BAL Cell Counts, Lung Histology, and Quantification of Cytokines.

Total BALF cell counts were performed on cytospun samples, followed by fixing and staining with Hema3 solutions I and II (Fisher Healthcare, Waltham, MA). Differential cell counts were performed under a Fisherbrand microscope (Waltham, MA). Lungs were collected, fixed in formalin, embedded in paraffin, and stained with H&E. Slides were scanned by Aperio AT Turbo digital pathology scanner (Leica Biosystems) at 10× magnification. Cell-free BALF was assayed for the release of IL-4, IL-5, IL-13, TGF-β, IL-10, and IFN-γ by ELISA (R&D), as previously described.

Quantification of OVA-Specific Antibody Titers.

Blood was collected from sacrificed animals, and the serum fraction was used to quantify OVA-specific antibodies by enzyme-linked immunosorbent assays. Briefly, 96-well microplates were coated overnight with 2 µg of OVA per well in coating buffer (0.05 M CBS, pH 9.6) at 4° C. Plates were washed with PBST (0.01 M PBS containing 0.05% [m/v] Tween 20, pH 7.4) and blocked by incubating with 1% (m/v) BSA (Gemini, West, Sacramento, CA) in PBST for 60 min at 37° C. After being washed with PBST, 100 µL of serum diluted in PBST containing 0.1% [m/v], BSA was added to each well and incubated for 30 min at 37° C. Plates were washed and incubated with 100 µL of HRP-conjugated goat antibodies against either mouse IgE, IgG1, or IgG2a (IgE diluted 1:500; IgG1 diluted 10000; IgG2a diluted 1:2000) for 30 min at 37° C. The plates were washed with PBST, and 100 µL of TMB substrate was added to each well and incubated for 20 min at room temperature. The reaction was stopped by the addition of 50 µL of 2 M $H_2SO_4$ to each well, and the optical density (OD, 450 nm) was read in a SpectraMax M5 microplate reader. Antibody titers were expressed as the highest sample dilution resulting in a duplication of the OD values over serum obtained from nontreated animals.

Hematoxylin and Eosin (H&E) Staining and Immunohistochemistry Analysis.

In order to visualize the presence of allergic airway inflammation, lungs were collected from sacrificed animals and fixed in 10% formalin followed by paraffin embedding. Sections of 4 µm thickness were mounted on glass slides by the UCLA Jonsson Comprehensive Cancer Center Translational Pathology Core Laboratory for H&E staining. We also performed IHC analysis to determine the appearance of Foxp3+ cells in the lung, using a standardized protocol.68 Briefly, the slides were deparaffinized, incubated in 3% methanol-hydrogen peroxide, followed by 10 mM EDTA (pH 8) or 1 mM sodium citrate (pH 6) at 95° C. using the Decloaking NxGen Chamber (Biocare Medical, DC2012). The slides were brought to room temperature, rinsed in PBST (containing 0.05% Tween-20), and then incubated with a 1/200 dilution of the primary anti-Foxp3 antibody from eBioscience (Thermo Fisher, Waltham, MA) for 1 h. The slides were rinsed with PBST and incubated with the appropriate HRP-conjugated secondary antibody from Dako (Dako, K4003) for 30 min. After being rinsed with PBST, the slides were incubated with 3,3-diaminobenzidine (Biocare Medical, FR805) for visualization. After being washed in tap water, the slides were counterstained with Harris' hematoxylin, dehydrated in ethanol, and mounted in media, before being scanned by an Aperio AT Turbo digital pathology scanner (Leica Biosystems) for interpretation by an experienced veterinary pathologist.

Statistical Analysis.

Statistical analysis was performed on GraphPad Prism 7 software (GraphPad Software, La Jolla, CA) using one-way ANOVA or the Student t test for determination of significance. The results were expressed as mean±SEM of at least three independent experiments. Statistical significance thresholds were set at $*p<0.05$; $p<0.01$; $*p<0.001$.

REFERENCES (1) Wing, K.; Sakaguchi, S. Regulatory T Cells Exert Checks and Balances on Self Tolerance and Autoimmunity. Nat. Immunol. 2010, 11, 7-13.
(2) Sharabi, A.; Tsokos, M. G.; Ding, Y.; Malek, T. R.; Klatzmann, D.; Tsokos, G. C. Regulatory T Cells in the Treatment of Disease. Nat. Rev. Drug Discovery 2018, 17, 823-844.
(3) Smith, D. M.; Simon, J. K.; Baker, J. R., Jr. Applications of Nanotechnology for Immunology. Nat. Rev. Immunol. 2013, 13, 592-605.
(4) Getts, D. R.; Shea, L. D.; Miller, S. D.; King, N. J. C. Harnessing Nanoparticles for Immune Modulation. Trends Immunol. 2015, 36, 419-427.
(5) Gomes, A. C.; Mohsen, M.; Bachmann, M. F. Harnessing Nanoparticles for Immunomodulation and Vaccines. Vaccines 2017, 5, 6.
(6) Irvine, D. J.; Hanson, M. C.; Rakhra, K.; Tokatlian, T. Synthetic Nanoparticles for Vaccines and Immunotherapy. Chem. Rev. 2015, 115, 11109-11146.
(7) Irvine, D. J.; Swartz, M. A.; Szeto, G. L. Engineering Synthetic Vaccines Using Cues from Natural Immunity. Nat. Mater. 2013, 12, 978-990.
(8) Racanelli, V.; Rehermann, B. The Liver as an Immunological Organ. Hepatology 2006, 43, S54-S62.
(9) Madariaga, M. L. L.; Kreisel, D.; Madsen, J. C. Organ-Specific Differences in Achieving Tolerance. Curr. Opin. Organ Transplant. 2015, 20, 392-399.
(10) Beal, E. W.; Mumtaz, K.; Hayes, D.; Whitson, B. A.; Black, S. M. Combined Heart-Liver Transplantation: Indications, Outcomes and Current Experience. Transplant. Rev. 2016, 30, 261-268.
(11) Puri, V.; Eason, J. Simultaneous Liver • Kidney Transplantation. Current Transplantation Reports 2015, 2, 297-302.
(12) Luth, S.; Huber, S.; Schramm, C.; Buch, T.; Zander, S.; Stadelmann, C.; Brnck, W.; Wraith, D. C.; Herkel, J.; Lohse, A. W. Ectopic Expression of Neural Autoantigen in Mouse Liver Suppresses Experimental Autoimmune Neuroinflammation by Inducing Antigen-Specific Tregs. J. Clin. Invest. 2008, 118, 3403-3410.
(13) Thomson, A. W.; Knolle, P. A. Antigen-Presenting Cell Function in the Tolerogenic Liver Environment. Nat. Rev. Immunol. 2010, 10, 753-766.
(14) Crispe, I. N. Liver Antigen-Presenting Cells. J. Hepatol. 2011, 54, 357-365.
(15) Sorensen, K. K.; McCourt, P.; Berg, T.; Crossley, C.; Couteur, D. L.; Wake, K.; Smedsrod, B. The Scavenger Endothelial Cell: A New Player in Homeostasis and Immunity. Am. J. Physiol. Regul. Integr. Comp. Physiol. 2012, 303, R1217-R1230.
(16) Desjardins, M.; Griffiths, G. Phagocytosis: Latex Leads the Way. Curr. Opin. Cell Biol. 2003, 15, 498-503.
(17) Limmer, A.; Ohl, J.; Kurts, C.; Ljunggren, H.-G.; Reiss, Y.; Groettrup, M.; Momburg, F.; Arnold, B.; Knolle, P. A. Efficient Presentation of Exogenous Antigen by Liver Endothelial Cells to Cd8+ T Cells Results in Antigen-Specific T-Cell Tolerance. Nat. Med. 2000, 6, 1348-1354.
(18) Carambia, A.; Freund, B.; Schwinge, D.; Heine, M.; Laschtowitz, A.; Huber, S.; Wraith, D. C.; Korn, T.; Schramm, C.; Lohse, A. W.; Heeren, J.; Herkel, J. Tgf-B-Dependent Induction of Cd4+Cd25+Foxp3+ Tregs by Liver Sinusoidal Endothelial Cells. J. Hepatol. 2014, 61, 594-599.
(19) Tiegs, G.; Lohse, A. W. Immune Tolerance: What Is Unique About the Liver. J. Autoimmun. 2010, 34, 1-6.
(20) Carambia, A.; Freund, B.; Schwinge, D.; Bruns, O. T.; Salmen, S. C.; Ittrich, H.; Reimer, R.; Heine, M.; Huber, S.; Waurisch, C.; Eychmuller, A.; Wraith, D. C.; Korn, T.; Nielsen, P.; Weller, H.; Schramm, C.; Luth, S.; Lohse, A. W.; Heeren, J.; Herkel, J. Nanoparticle-Based Autoantigen Delivery to Treg-Inducing Liver Sinusoidal Endothelial Cells Enables Control of Autoimmunity in Mice. J. Hepatol. 2015, 62, 1349-1356.
(21) Kishimoto, T. K.; Maldonado, R. A. Nanoparticles for the Induction of Antigen-Specific Immunological Tolerance. Front. Immunol. 2018, 9, 230.
(22) Adams, A. B.; Ford, M. L.; Larsen, C. P. Costimulation Blockade in Autoimmunity and Transplantation: The CD28 Pathway. J. Immunol. 2016, 197, 2045-2050.
(23) Esensten, J. H.; Helou, Y. A.; Chopra, G.; Weiss, A.; Bluestone, J. A. CD28 Costimulation: From Mechanism to Therapy. Immunity 2016, 44, 973-988.
(24) Clemente-Casares, X.; Blanco, J.; Ambalavanan, P.; Yamanouchi, J.; Singha, S.; Fandos, C.; Tsai, S.; Wang, J.; Garabatos, N.; Izquierdo, C.; Agrawal, S.; Keough, M. B.; Yong, V. W.; James, E.; Moore, A.; Yang, Y.; Stratmann, T.; Serra, P.; Santamaria, P. Expanding Antigen-Specific Regulatory Networks to Treat Autoimmunity. Nature 2016, 530, 434.
(25) Tsai, S.; Shameli, A.; Yamanouchi, J.; Clemente-Casares, X.; Wang, J.; Serra, P.; Yang, Y.; Medarova, Z.; Moore, A.; Santamaria, P. Reversal of Autoimmunity by Boosting Memory-Like Autoregulatory T Cells. Immunity 2010, 32, 568-580.
(26) Kim, W.-U.; Lee, W.-K.; Ryoo, J.-W.; Kim, S.-H.; Kim, J.; Youn, J.; Min, S.-Y.; Bae, E.-Y.; Hwang, S.-Y.; Park, S.-H.; Cho, C.-S.; Park, J.-S.; Kim, H.-Y. Suppression of Collagen-Induced Arthritis by Single Administration of Poly (Lactic-Co-Glycolic Acid) Nanoparticles Entrapping Type II Collagen: A Novel Treatment Strategy for Induction of Oral Tolerance. Arthritis Rheum. 2002, 46, 1109-1120.
(27) Dhadwar, S. S.; Kiernan, J.; Wen, J.; Hortelano, G. Repeated Oral Administration of Chitosan/DNA Nanoparticles Delivers Functional FvIII with the Absence of Antibodies in Hemophilia a Mice. J. Thromb. Haemostasis 2010, 8, 2743-2750.
(28) Goldmann, K.; Ensminger, S. M.; Spriewald, B. M. Oral Gene Application Using Chitosan-DNA Nanoparticles Induces Transferable Tolerance. Clin. Vaccine Immunol. 2012, 19, 1758-1764.
(29) Ramani, K.; Miclea, R. D.; Purohit, V. S.; Mager, D. E.; Straubinger, R. M.; Balu-Iyer, S. V. Phosphatidylserine Containing Liposomes Reduce Immunogenicity of Recombinant Human Factor Viii
(Rfviii) in a Murine Model of Hemophilia a**Karthik Ramani and Razvan D. Miclea Contributed Equally to the Manuscript. J. Pharm. Sci. 2008, 97, 1386-1398.
(30) Birge, R. B.; Boeltz, S.; Kumar, S.; Carlson, J.; Wanderley, J.; Calianese, D.; Barcinski, M.; Brekken, R. A.; Huang, X.; Hutchins, J. T.; Freimark, B.; Empig, C.; Mercer, J.; Schroit, A. J.; Schett, G.; Herrmann, M. Phosphatidylserine Is a Global Immunosuppressive Signal in Efferocytosis, Infectious Disease, and Cancer. Cell Death Differ. 2016, 23, 962-978.
(31) Pearson, R. M.; Casey, L. M.; Hughes, K. R.; Miller, S. D.; Shea, L. D. In vivo Reprogramming of Immune Cells: Technologies for Induction of Antigen-Specific Tolerance. Adv. Drug Delivery Rev. 2017, 114, 240-255.
(32) Pearson, R. M.; Casey, L. M.; Hughes, K. R.; Wang, L. Z.; North, M. G.; Getts, D. R.; Miller, S. D.; Shea, L. D. Controlled Delivery of Single or Multiple Antigens in Tolerogenic Nanoparticles Using Peptide-Polymer Bioconjugates. Mol. Ther. 2017, 25, 1655-1664.
(33) Kontos, S.; Kourtis, I. C.; Dane, K. Y.; Hubbell, J. A. Engineering Antigens for in situ Erythrocyte Binding Induces T-Cell Deletion. Proc. Natl. Acad. Sci. U.S.A. 2013, 110, E60-E68.
(34) Duong, B. H.; Tian, H.; Ota, T.; Completo, G.; Han, S.; Vela, J. L.; Ota, M.; Kubitz, M.; Bovin, N.; Paulson, J. C.; Nemazee, D. Decoration of T-Independent Antigen with Ligands for Cd22 and Siglec-G Can Suppress Immunity and Induce B Cell Tolerance in vivo. J. Exp. Med. 2010, 207, 173-187.
(35) Macauley, M. S.; Pfrengle, F.; Rademacher, C.; Nycholat, C. M.; Gale, A. J.; von Drygalski, A.; Paulson, J. C. Antigenic Liposomes Displaying CD22 Ligands Induce Antigen-Specific B Cell Apoptosis. J. Clin. Invest. 2013, 123, 3074-3083.
(36) Maldonado, R. A.; LaMothe, R. A.; Ferrari, J. D.; Zhang, A.-H.; Rossi, R. J.; Kolte, P. N.; Griset, A. P.; O'Neil, C.; Altreuter, D. H.; Browning, E.; Johnston, L.; Farokhzad, O. C.; Langer, R.; Scott, D. W.; von Andrian, U. H.; Kishimoto, T. K. Polymeric Synthetic Nanoparticles for the Induction of Antigen-Specific Immunological Tolerance. Proc. Natl. Acad. Sci. U.S.A 2015, 112, E156-E165.
(37) Tostanoski, L. H.; Chiu, Y.-C.; Gammon, J. M.; Simon, T.; Andorko, J. I.; Bromberg, J. S.; Jewell, C. M. Reprogramming the Local Lymph Node Microenvironment Promotes Tolerance That Is Systemic and Antigen Specific. Cell Rep. 2016, 16, 2940-2952.
(38) LaMothe, R. A.; Kolte, P. N.; Vo, T.; Ferrari, J. D.; Gelsinger, T. C.; Wong, J.; Chan, V. T.; Ahmed, S.; Srinivasan, A.; Deitemeyer, P.; Maldonado, R. A.; Kishimoto, T. K. Tolerogenic Nanoparticles Induce Antigen-Specific Regulatory T Cells and Provide Therapeutic Efficacy and Transferrable Tolerance against Experimental Auto-immune Encephalomyelitis. Front. Immunol. 2018, 9, 281.
(39) Anderson, J. M.; Shive, M. S. Biodegradation and Biocompatibility of PLA and PLGA Microspheres. Adv. Drug Delivery Rev. 1997, 28, 5-24.
(40) Kumari, A.; Yadav, S. K.; Yadav, S. C. Biodegradable Polymeric Nanoparticles Based Drug Delivery Systems. Colloids Surf, B 2010, 75, 1-18.
(41) Soppimath, K. S.; Aminabhavi, T. M.; Kulkarni, A. R.; Rudzinski, W. E. Biodegradable Polymeric Nanoparticles as Drug Delivery Devices. J. Controlled Release 2001, 70, 1-20.
(42) Li, R.; Oteiza, A.; Sorensen, K. K.; McCourt, P.; Olsen, R.; Smedsrod, B.; Svistounov, D. Role of Liver Sinusoidal Endothelial Cells and Stabilins in Elimination of Oxidized Low-Density Lipoproteins. Am. J. Physiol. Gastrointest. Liver Physiol. 2011, 300, G71-G81.
(43) Van Berkel, T. J.; De Rijke, Y. B.; Kruijt, J. K. Different Fate in vivo of Oxidatively Modified Low Density Lipoprotein and Acetylated Low Density Lipoprotein in Rats. Recognition by Various Scavenger Receptors on Kupffer and Endothelial Liver Cells. J. Biol. Chem. 1991, 266, 2282-2289.
(44) Hirose, M.; Nishikawa, M.; Qian, W.; Haque, A.; Mashimo, M.; Inoue, M. Mannose-Conjugated Alendronate Selectively Depletes Kupffer Cells and Inhibits Endotoxemic Shock in the Mice. Hepatol. Res. 2006, 36, 3-10.
(45) Yamane, S.; Iwasaki, N.; Majima, T.; Funakoshi, T.; Masuko, T.; Harada, K.; Minami, A.; Monde, K.; Nishimura, S.-i. Feasibility of Chitosan-Based Hyaluronic Acid Hybrid Biomaterial for a Novel Scaffold in Cartilage Tissue Engineering. Biomaterials 2005, 26, 611-619.
(46) Crispe, I N.; Giannandrea, M.; Klein, I.; John, B.; Sampson, B.; Wuensch, S. Cellular and Molecular Mechanisms of Liver Tolerance. Immunol. Rev. 2006, 213, 101-118.
(47) Crispe, I. N. Hepatic T Cells and Liver Tolerance. Nat. Rev. Immunol. 2003, 3, 51-62.
(48) Smarr, C. B.; Yap, W. T.; Neef, T. P.; Pearson, R. M.; Hunter, Z. N.; Ifergan, I.; Getts, D. R.; Bryce, P. J.; Shea, L. D.; Miller, S. D. Biodegradable Antigen-Associated PLG Nanoparticles Tolerize Th2-Mediated Allergic Airway Inflammation Pre- and Postsensitization. Proc. Natl. Acad. Sci. U.S.A 2016, 113, 5059-5064.
(49) Vanderlugt, C. L.; Miller, S. D. Epitope Spreading in Immune-Mediated Diseases: Implications for Immunotherapy. Nat. Rev. Immunol. 2002, 2, 85-95.
(50) Hofmann, A. M.; Scurlock, A. M.; Jones, S. M.; Palmer, K. P.; Lokhnygina, Y.; Steele, P. H.; Kamilaris, J.; Burks, A. W. Safety of a Peanut Oral Immunotherapy Protocol in Children with Peanut Allergy. J. Allergy Clin. Immunol. 2009, 124, 286-291.
(51) Klugewitz, K.; Blumenthal-Barby, F.; Schrage, A.; Knolle, P. A.; Hamann, A.; Crispe, I. N. Immunomodulatory Effects of the Liver: Deletion of Activated Cd4+ Effector Cells and Suppression of Ifn-Γ-Producing Cells after Intravenous Protein Immunization. J. Immunol. 2002, 169, 2407-2413.
(52) Elvevold, K.; Smedsrod, B.; Martinez, I. The Liver Sinusoidal Endothelial Cell: A Cell Type of Controversial and Confusing Identity. Am. J. Physiol. Gastrointest. Liver Physiol. 2008, 294, G391-G400.
(53) Falkowska-Hansen, B.; Falkowski, M.; Metharom, P.; Krunic, D.; Goerdt, S. Clathrin-Coated Vesicles Form a Unique Net-Like Structure in Liver Sinusoidal Endothelial Cells by Assembling Along Undisrupted Microtubules. Exp. Cell Res. 2007, 313, 1745-1757.

(54) Kjeken, R.; Mousavi, S. A.; Brech, A.; Gjoen, T.; Berg, T. Fluid Phase Endocytosis of [125I]Iodixanol in Rat Liver Parenchymal, Endothelial and Kupffer Cells. Cell Tissue Res. 2001, 304, 221-230.

(55) Hansen, B.; Longati, P.; Elvevold, K.; Nedredal, G.-I.; Schledzewski, K.; Olsen, R.; Falkowski, M.; Kzhyshkowska, J.; Carlsson, F.; Johansson, S.; et al. Stabilin-1 and Stabilin-2 Are Both Directed into the Early Endocytic Pathway in Hepatic Sinusoidal Endothelium Via Interactions with Clathrin/Ap-2, Independent of Ligand Binding. Exp. Cell Res. 2005, 303, 160-173.

(56) Andersson, J.; Tran, D. Q.; Pesu, M.; Davidson, T. S.; Ramsey, H.; O'Shea, J. J.; Shevach, E. M. CD4+Foxp3+ Regulatory T Cells Confer Infectious Tolerance in a TGF-β-Dependent Manner. J. Exp. Med. 2008, 205, 1975-1981.

(57) Bissell, D. M.; Wang, S. S.; Jarnagin, W. R.; Roll, F. J. Cell-Specific Expression of Transforming Growth Factor-Beta in Rat Liver. Evidence for Autocrine Regulation of Hepatocyte Proliferation. J. Clin. Invest. 1995, 96, 447-455.

(58) Akhter, A.; Hayashi, Y.; Sakurai, Y.; Ohga, N.; Hida, K.; Harashima, H. Ligand Density at the Surface of a Nanoparticle and Different Uptake Mechanism: Two Important Factors for Successful Sirna Delivery to Liver Endothelial Cells. Int. J. Pharm. 2014, 475, 227-237.

(59) Shi, M.; Shi, G.; Tang, J.; Kong, D.; Bao, Y.; Xiao, B.; Zuo, C.; Wang, T.; Wang, Q.; Shen, Y.; Wang, H.; Funk, C. D.; Zhou, J.; Yu, Y. Myeloid-Derived Suppressor Cell Function Is Diminished in Aspirin-Triggered Allergic Airway Hyperresponsiveness In Mice. J. Allergy Clin. Immunol. 2014, 134, 1163-1174.

(60) Hirose, K.; Iwata, A.; Tamachi, T.; Nakajima, H. Allergic Airway Inflammation: Key Players Beyond the Th2 Cell Pathway. Immunol. Rev. 2017, 278, 145-161.

(61) Cripps, J. G.; Gorham, J. D. Mdsc in Autoimmunity. Int. Immunopharmacol. 2011, 11, 789-793.

(62) Hammerich, L.; Tacke, F. Emerging Roles of Myeloid Derived Suppressor Cells in Hepatic Inflammation and Fibrosis. World J. Gastrointest. Pathophysiol. 2015, 6, 43-50.

(63) Hochst, B.; Mikulec, J.; Baccega, T.; Metzger, C.; Welz, M.; Peusquens, J.; Tacke, F.; Knolle, P.; Kurts, C.; Diehl, L.; Ludwig-Portugall, I. Differential Induction of Ly6G and Ly6C Positive Myeloid Derived Suppressor Cells in Chronic Kidney and Liver Inflammation and Fibrosis. PLoS One 2015, 10, No. e0119662.

(64) Kishimoto, T. K.; Ferrari, J. D.; LaMothe, R. A.; Kolte, P. N.; Griset, A. P.; O'Neil, C.; Chan, V.; Browning, E.; Chalishazar, A.; Kuhlman, W.; Fu, F.-n.; Viseux, N.; Altreuter, D. H.; Johnston, L.; Maldonado, R. A. Improving the Efficacy and Safety of Biologic Drugs with Tolerogenic Nanoparticles. Nat. Nanotechnol. 2016, 11, 890-899.

(65) Shen, C.; He, Y.; Cheng, K.; Zhang, D.; Miao, S.; Zhang, A.; Meng, F.; Miao, F.; Zhang, J. Killer Artificial Antigen-Presenting Cells Deplete Alloantigen-Specific T Cells in a Murine Model of Alloskin Transplantation. Immunol. Lett. 2011, 138, 144-155.

(66) Whitekus, M. J.; Li, N.; Zhang, M.; Wang, M.; Horwitz, M. A.; Nelson, S. K.; Horwitz, L. D.; Brechun, N.; Diaz-Sanchez, D.; Nel, A. E. Thiol Antioxidants Inhibit the Adjuvant Effects of Aerosolized Diesel Exhaust Particles in a Murine Model for Ovalbumin Sensitization. J. Immunol. 2002, 168, 2560-2567.

(67) Hao, M.; Cornier, S.; Wang, M.; Lee, J. J.; Nel, A. Diesel Exhaust Particles Exert Acute Effects on Airway Inflammation and Function in Murine Allergen Provocation Models. J. Allergy Clin. Immunol. 2003, 112, 905-914.

(68) Lu, J.; Liu, X.; Liao, Y.-P.; Salazar, F.; Sun, B.; Jiang, W.; Chang, C. H.; Jiang, J.; Wang, X.; Wu, A. M.; Meng, H.; Nel, A. E. Nano-Enabled Pancreas Cancer Immunotherapy Using Immunogenic Cell Death and Reversing Immunosuppression. Nat. Commun. 2017, 8, 1811.

Example 2

Tolerogenic Nanoparticles can Induce Epitope-Specific Tolerance in Animal Ovalbumin (OVA) Allergic Sensitization Mode We have demonstrated that targeting of liver sinusoidal endothelial cells (LSECs) with ApoB-decorated PLGA nanoparticles that encapsulate the intact protein, ovalbumin (OVA), can induce OVA specific immune tolerance in mice (see Example 1, above). Integral to understanding this form of immune tolerance is that the nanocarrier induced OVA-specific Tregs that target epitope-specific helper T cells that respond to specific OVA epitopes.

In this current study, we hypothesized that it should be possible to demonstrate epitope-specific OVA induced immune tolerance, for example, using what is known as an OT II ($OVA_{323-339}$) peptide, which is specifically presented by MHC II molecules that activate epitope-specific CD4$^+$ T helper cells. In order to investigate the hypothesis that we can induce epitope-specific immune tolerance in animals, we purchased both OT I ($OVA_{257-264}$) and OT II ($OVA_{323-339}$) peptide for encapsulation into ApoB-peptide decorated PLGA nanoparticles for administration to OT II mice, which selectively express MHC II molecules for expression of $OVA_{323-339}$. In contrast to the OT II peptide, the OT I peptide is presented by MHC I, which is not expressed by OT II mice. The effect of nanoparticles encapsulating both the OT I and OT II peptides were subsequently compared for their effects on the generation of allergic inflammation in OT II mice, which were sensitized against whole OVA protein, as described in Example 1. The comparison also included a group of mice receiving PLGA nanoparticles encapsulating whole OVA, as demonstrated in Example 1.

Figure 15:
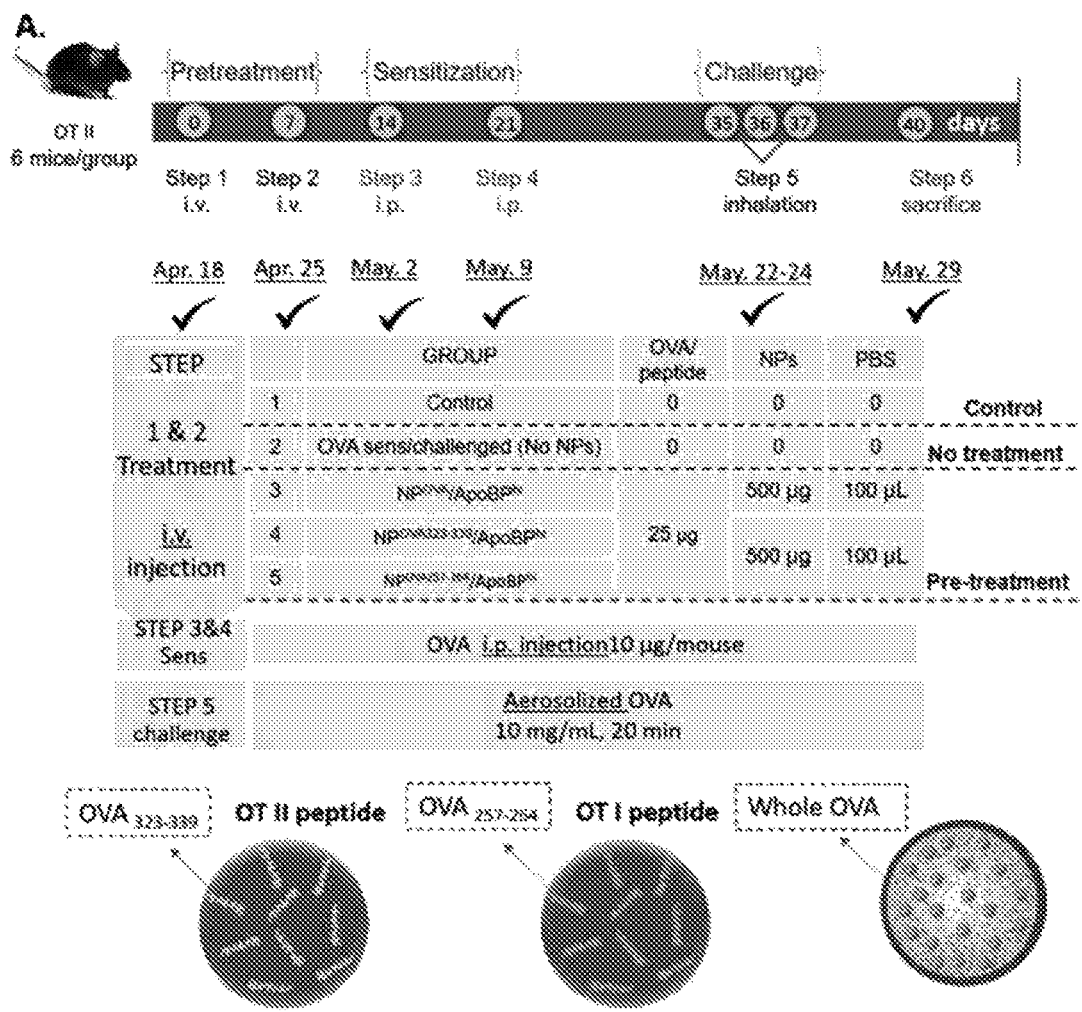
FIG. 15, panels A-B, shows that NP pretreatment interferes in OVA-induced antibody responses in an OVA sensitization and inhalation challenged OT II mouse model. Panel (A): Outline of the experimental animal protocol. Six to eight week old OT II mice received IV injection of $NP^{OT\,II}$, $NP^{OT\,I}$, and $NP^{OVA}$ to deliver 25 µg antigen in 500 µg particles per mouse on days 0 and 7. The animals were subsequently sensitized by two IP doses of OVA (10 µg/mouse) on days 14 and 21, prior to being exposed to aerosolized OVA inhalation (10 mg/mL) for 20 min on days 35-37. Animals were sacrificed for tissue harvesting and BALF on day 40. Panel (B): Serum anti-OVA IgE and IgG1 antibody titers were determined by ELISA.
Figure 16:
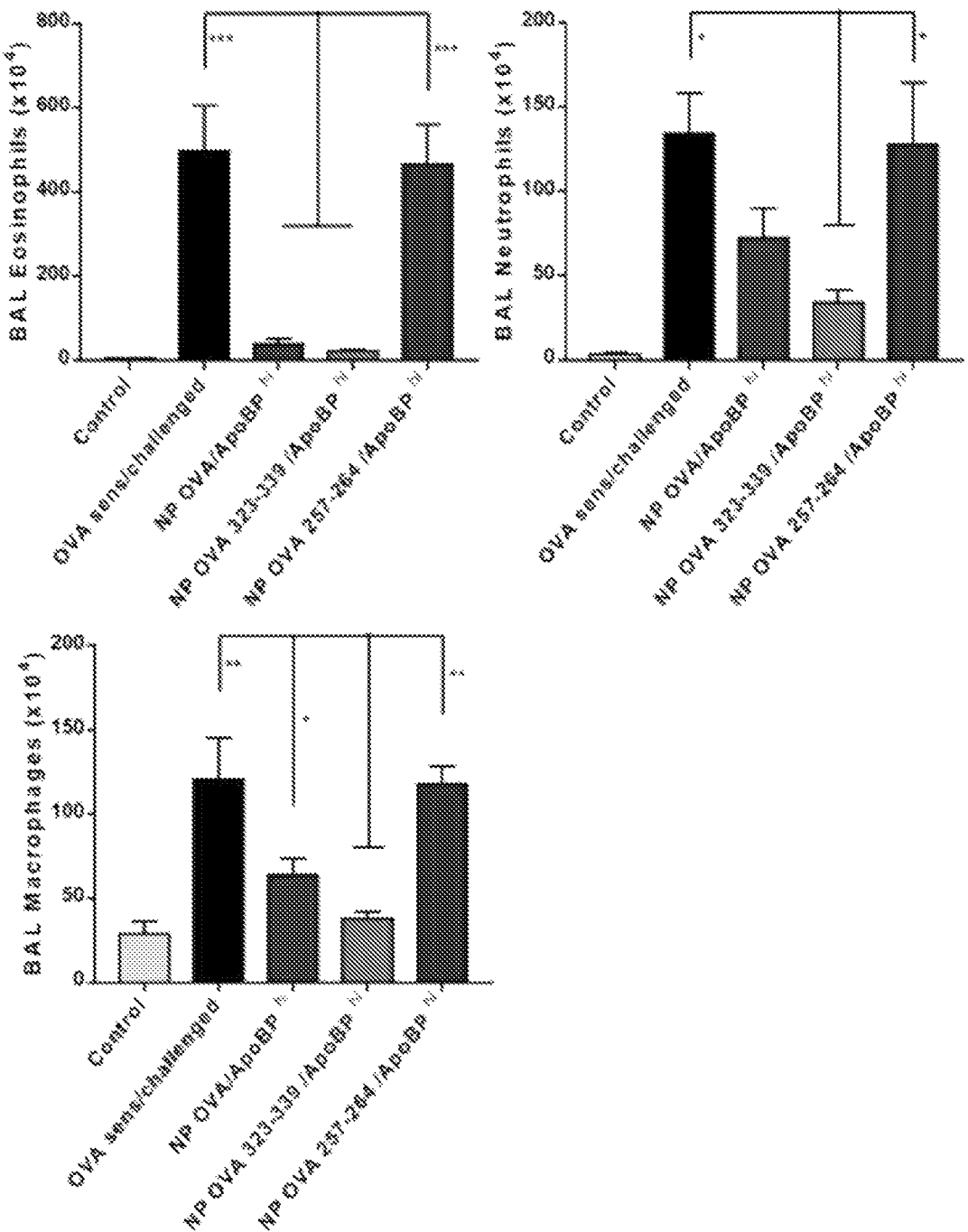
FIG. 16, panels A-D, shows that NP treatment alleviates allergic airway inflammation. Lung tissue and BALF from the experiment in FIG. 15, panel A were used for the following analysis. Panel (A): Differential eosinophil, neutrophil, and macrophage cell counts on BALF. BAL was performed using 1 mL of PBS buffer for each animal, following which the BALF was cytospun onto slides for staining and counting. Panel (B): Representative histological sections of lung tissue used for formalin fixing and H&E staining. The scale bars represent 200 µm. Panel (C): TH2 cytokine (IL-4, IL-5, and IL-13) levels in the BALF, determined by ELISA. Panel (D): TGF-β, IL-10, and IFN-γ levels in the BALF, determined by ELISA.

Prophylactic treatment with $NP^{OT\ II}$ in OVA-sensitized and challenged animals (aerosolized inhalation) (see, FIG. 15, panel A) could be seen to significantly suppress anti-OVA IgE and IgG1 (see, FIG. 15, panel B) responses, as well as TH2-mediated eosinophilic airway inflammation (see, FIG. 16, panels A and B) and cytokine production in the BAL fluid (BALF) (see, FIG. 16, panels C and D). These effects were also accompanied by abundant TGF-β production in the BALF.

The immunosuppressive effects were also seen for NPs encapsulating intact OVA, but not with the same degree of robustness as $NP^{OTII}$. However, no tolerogenic effects were seen for $NP^{OTI}$. These findings demonstrate that the designed NP platform is capable of inducing antigenic epitope-specific immune tolerance, with the prediction making that the nanoparticle platform will be useful for tolerization against a long list of epitopes involved in allergic and autoimmune disease, such as type I diabetes mellitus, autoimmune disease, immunological mediated drug and treatment events, etc.

Example 3

Liver-Targeting Tolerogenic Nanoparticles Encapsulating an Allergen T-Cell Epitope Impacts Eosinophilic Airway Inflammation with Comparable Efficacy as Pharmaceutical Tolerogenic Nanoparticles Summary of Example 3

Tolerogenic nanoparticles (TNPs) can accomplish antigen-specific immune tolerance to ovalbumin (OVA) in an animal asthma model. A promising TNP strategy is to harness the natural tolerogenic effects of liver sinusoidal endothelial cells (LSECs) to induce systemic tolerance by generating regulatory T-cells (Tregs). As one example, we demonstrated that OVA-encapsulating PLGA-TNPs can eliminate allergic airway inflammation in OVA-sensitized mice, prophylactically and remedially. A competing approach is encapsulation of pharmacological agents into PLGA nanoparticles for non-targeted biodistribution to antigen-presenting cells (APCs) that are locked into a tolerogenic state, e.g., through the delivery of inhibitors of the mTOR or NF-κB pathways. We compared OVA-encapsulating, LSEC-targeting NPs with non-targeted PLGA-NPs incorporating curcumin and rapamycin (Rapa) in the OVA model. Our data demonstrate slightly lesser efficacy for reducing allergic airway inflammation by stabilin-receptor targeting $TNP^{OVA}$ as non-targeted $NP^{OVA}$ incorporating Rapa. Curcumin was much less efficacious. The reduced eosinophilic airway inflammation and TH2 response parameters were accompanied by increased Foxp3$^+$ Treg recruitment and TGF-β production in the lung. Since OVA expresses IgE-binding as well as non-IgE binding epitopes, we further asked whether we could obtain immune tolerance with immunoregulatory, non-IgE binding T-cell epitopes. This was accomplished by incorporating $OVA^{323-339}$ and $OVA^{257-264}$ epitopes into targeted TNPs for experimentation in the transgenic OT-II mouse model. Importantly, this demonstrated that $OVA^{323-339}$ but not $OVA^{257-264}$ could inhibit allergic airway inflammation with even better efficacy than $TNP^{OVA}$. The epitope-specific effect was transduced by TGF-β producing Tregs. These results demonstrate that the tolerogenic efficacy of LSEC-targeting PLGA nanoparticles can be reproduced by an immunomodulatory T-cell epitope.

Introduction

The induction of effective and durable antigen-specific immune tolerance has now become a major objective for the long-term treatment allergy and autoimmune diseases.[1-3] This strategy avoids the immune suppressive effects of anti-inflammatory drugs, immunomodulatory agents, and monoclonal antibodies, which could enhance susceptibility to opportunistic infections or interfere in immune surveillance for cancer.[4-6] A number of important recent advances have demonstrated the promise of using antigen-specific immune tolerance to alleviate or eliminate overactive immunity in the setting of autoimmune disease (e.g., rheumatoid arthritis, type I diabetes, experimental autoimmune encephalomyelitis) or life-threatening allergic disorders (e.g., food allergy, anaphylaxis, asthma).[6-9] With this improved understanding comes the recognition of the powerful role of regulatory T-cells (Treg) in being able to generate antigen-specific tolerance.[1, 10, 11] Against this backdrop, the introduction of multifunctional nanoparticles offers the advantage to improve engagement of the pathways leading to Treg generation based on the ability to target antigen-presenting cells (APC), which play a key role in engaging complementary and competing arms of the immune system in their response to foreign and self-antigens.[2, 5, 12, 13] This awareness has sparked the development of a variety of tolerogenic nanoparticle (TNP) platforms that leverage the unique properties of nanomaterials to modify the outcome of the immune response to allergens and auto-immune antigens, including to immunogenic epitopes displayed by these proteins.

Figure 17A:
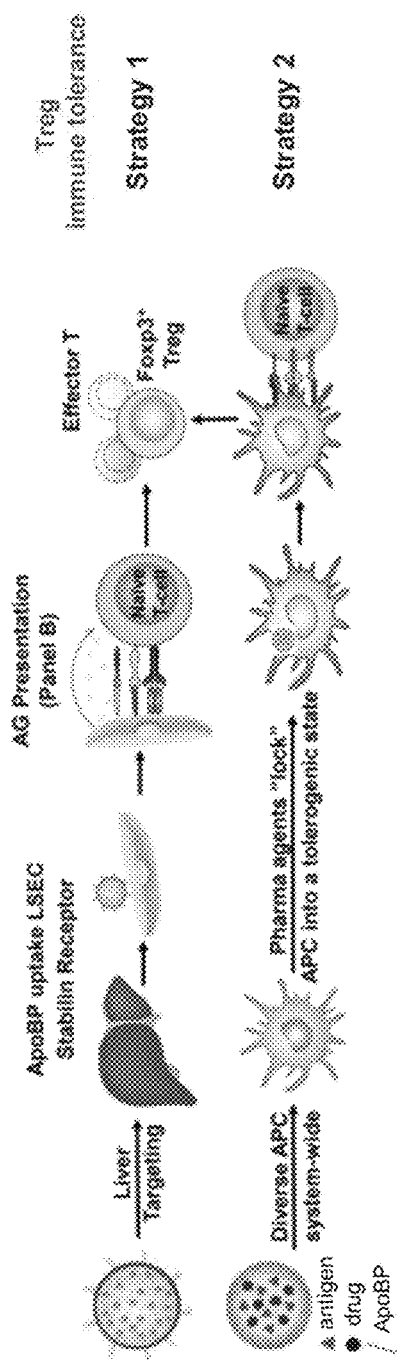
FIG. 17A schematically illustrates two main strategies for inducing immune tolerance. Strategy 1 depicts a liver-targeting nanoparticle for allergen delivery to LSEC in the liver, where allergen processing and presentation to naïve T-cells induce antigen-specific Foxp3$^+$ Tregs, which are recruited to the site of allergic inflammation in the lung. Strategy 2 shows nanoparticles with/without allergen encapsulation to be co-loaded with pharmaceutical agents that are capable of locking non-targeted APCs, which are distributed system-wide into a tolerogenic state.

Among the emerging nanoparticle platforms, there are currently two major approaches to achieve antigen-specific immune modulation by an impact on cognate immunity and APC function (FIG. 17A). The first approach is to directly interfere in the function or elimination of antigen-specific, autoreactive T-cells by perturbing tolerogenic pathways intrinsic to T- and B-lymphocytes.[14-18] These include nanocarriers that use antigens or specific epitopes to induce anergy and/or apoptosis of cognate autoreactive T- and/or B-cells. One example includes SIGLEC-engaging tolerance-inducing antigenic liposomes (STALs), which use the display of an antigen plus a glycan ligand for CD22 to induce apoptosis in mouse and human B-cells.[19, 20] This allows targeting of a selective repertoire of antigens among the diversity of immunogens that are responsible for allergic and autoimmune disorders.[13] The second approach seeks to induce dominant T- and B-cell tolerance by targeting APC that can expand or reprogram T-cell and/or B-cell effectors into disease-suppressing regulatory cells (FIG. 17A).[2, 5] The fundamental advantage of this approach is the sustained activation and expansion of regulatory cells, capable of comprehensively blocking the recruitment and activation pathways that allow adaptive and innate immune cells to participate in disease promotion.[21, 22] This approach includes delivering antigens to harness natural tolerogenic APCs or to employ pharmaceutical agents for locking the APCs into a tolerogenic stat.[5, 23-29] Our own preference is to target TNPs to the liver, which specializes in immune tolerance and prevention of inflammatory responses to the high load of microbial and foreign antigens coming from the gut via the portal circulation.[30, 31] In particular, our approach has been to target liver sinusoidal endothelial cells (LSECs), which are specialized APC that occupy a huge surface area, from where the capture and presentation foreign antigens by MHC-II molecules, plus the release of transforming growth factor-β (TGF-β) and IL-10 is capable of directing the differentiation of naïve T-cells into Tregs (FIG. 17C).[27, 32, 33]

Another approach is to use nanoparticles loaded with pharmacological agents such as rapamycin, curcumin, and quercetin to promote the development of tolerogenic APC.[34-37] Rapamycin (Rapa), a natural product derived from *Streptomyces hygroscopicus*, binds to the FK506-binding protein to form a complex that allosterically inhibits the mTOR pathway.[38, 39] This drug has potent immunosuppressive activity, and is capable of interfering in allograft rejection as well as induction of Tregs.[40] Kishimoto et al. have shown that Rapa-encapsulating PLGA nanoparticles are capable of inducing antigen-specific immune tolerance, either through the co-administration or co-encapsulation of a variety antigenic proteins or representative peptides.[35] Similarly, it has been demonstrated that the polyphenol, curcumin, can be used to induce immune tolerance by acting as an inhibitor of the NF-κB pathway, which is critical to APC function.[41, 42] In this regard, it has been shown that liposomal co-delivery of antigens with various NF-κB inhibitors, including curcumin, is capable of suppressing inflammatory arthritis in an antigen-specific manner.[34] However, in spite of the proven effectiveness of nanoparticles incorporating pharmaceutical agents, the nature of the non-targeted APCs is uncertain and no formal comparison has made to the liver-targeting platform.

With regards to the treatment of life-threatening allergic disorders, an important consideration in developing tolerogenic platforms for accomplishment of Treg-induced immune tolerance, is the use of immunomodulatory T-cell epitopes instead of encapsulating the whole allergen.[43, 44] This is advantageous from a manufacturing perspective as well as the ability to avoid peptide sequences that can trigger IgE-dependent hypersensitivity responses through cross-linking of mast cell and basophil FcεR1 receptors.[43, 44] T-cell epitopes are discreet, linear peptides of short lengths (~10-20 amino acids) that can be presented to the T-cell antigen receptors (TCR) on CD4+ T-cells by MHC-II molecules, as a prelude to Treg development.[44-46] It has been demonstrated in clinical trials that T-cell epitopes can be used for safe immunotherapy that avoids the induction of life-threatening or anaphylactic responses.[47, 48] However, in spite of the utility of epitopes, there are downsides as well, including short half-lives, poor solubility, rapid in vivo dilution and poor bioavailability of the peptides.[49] At the same time, these pitfalls serves as a good justification for encapsulating T-cell epitopes in TNPs that can improve the immunotherapy response in addition to uptake in the liver, which specializes in the immune tolerance.

In this communication, we compared the tolerogenic efficacy of LSEC-targeting TNP$^{OVA}$ nanoparticles to PLGA particles that deliver pharmaceutical agents (rapamycin and curcumin), with and without the co-encapsulation of OVA. We demonstrate that while targeting of TNP$^{OVA}$ to stabilin receptors on LSECs has roughly similar or slightly less efficient for suppressing allergic airway inflammation compared to Rapa-encapsulating nanoparticles, that curcumin delivery is ineffective. We also observed that the encapsulation of a T-cell epitope, presented by a murine MHC-II allele, allowed LSEC-targeting nanoparticles to induce a robust tolerogenic response, even better than whole OVA in a sensitized OT-II mice model. These results demonstrate the potential to use a number of strategies to develop immune tolerization by nanoparticles for the treatment of severe allergic disorders.

Results
Fabrication and Characterization of PLGA NPs

Figure 17B:
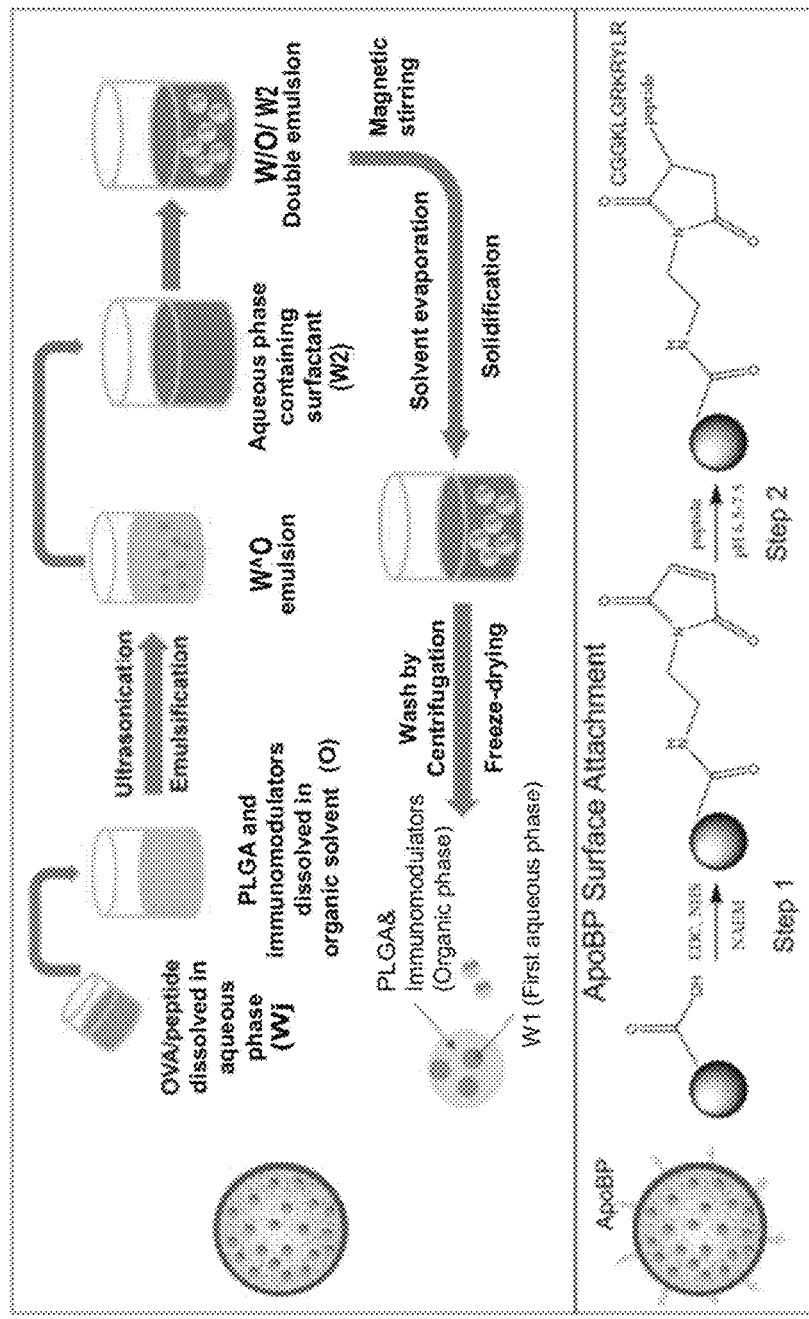
FIG. 17B schematically illustrates the PLGA nanoparticle synthesis process, including carrier loading with cargo (allergen, epitopes, pharmaceutical agents), by a w/o/w double emulsion method combined with solvent removal. The lower panel describes the ApoBP peptide (in this illustration CGGKLGRKRYLR, SEQ ID NO:1) surface attachment onto the particle surface by a NAEM spacer, using a two-step conjugation process between the ApoBP cysteine tag and the NAEM maleimide group.

Since the goal of our study is to compare liver-targeting problem NP$^{OVA}$ with particles incorporating pharmaceutical agents, the purpose of the synthesis procedure was to generate particles with comparable characteristics (FIG. 17B). LSEC-targeting PLGA nanoparticles were constructed using a double emulsion technique (FIG. 17B, upper panel), previously described by us.[50] OVA was passively encapsulated in the polymer matrix to achieve a loading capacity of 59 μg protein per mg PLGA. These carriers were constructed, either as bare particles (NP$^{OVA}$) or particles in which the ApoB peptide (RLYRKRGLK, containing a GGC tag) was covalently attached to the particle surface (NP$^{OVA/ApoBP}$) with a NAEM spacer (FIG. 17B, lower panel).[50] The coupling density of the peptide was 5 molar % compared to PLGA weight PLGA (Table 6). We have previously described the efficacy of ApoBP for targeting liver LSECs through the ability to interact with the stabilin scavenger receptor network that is expressed on the LSEC surface, but not on Kupffer cells.[51] The schematic in FIG. 17C explains the mechanism of ApoBP targeting to clathrin-coated pits on LSECs, where ligand binding leads to endocytosis, release of the cargo, and antigen presentation to naïve T-cells.

TABLE 6

Nanoparticle properties.

| Nanoparticle | Hydrodynamic Size (nm) | PDI | Zeta Potential (mV) | Loading capacity (μg/mg NPs) | Encapsulation Efficiency (%) | OVA content (μg/mg NPs) |
|---|---|---|---|---|---|---|
| Empty NP | 231.2 ± 2.17 | 0.096 | −42.55 ± 2.99 | NA | NA | NA |
| NP$^{OVA}$ | 246.5 ± 3.01 | 0.105 | −44.37 ± 2.81 | NA | NA | 51.61 ± 2.32 |
| NP$^{OVA/ApoBP}$ | 270.8 ± 4.96 | 0.113 | −4.56 ± 2.25 | 12.96 ± 0.77 (ApoBP ligand) | 5.3 (mol % of PLGA) | 50.92 ± 2.18 |
| NP$^{Curcumin}$ | 251.2 ± 3.27 | 0.108 | −35.77 ± 3.52 | 66.12 ± 3.70 | 38.94 ± 2.14 | NA |
| NP$^{OVA-Curcumin}$ | 255.7 ± 4.44 | 0.129 | −38.42 ± 2.95 | 64.52 ± 2.69 | 37.06 ± 3.62 | 50.66 ± 2.68 |
| NP$^{Rapa}$ | 246.3 ± 5.47 | 0.120 | −36.28 ± 3.41 | 23.44 ± 3.56 | 33.66 ± 5.24 | NA |
| NP$^{OVA-Rapa}$ | 252.5 ± 3.88 | 0.139 | −39.38 ± 2.99 | 22.31 ± 6.58 | 31.77 ± 3.94 | 46.88 ± 2.76 |

Figure 18:
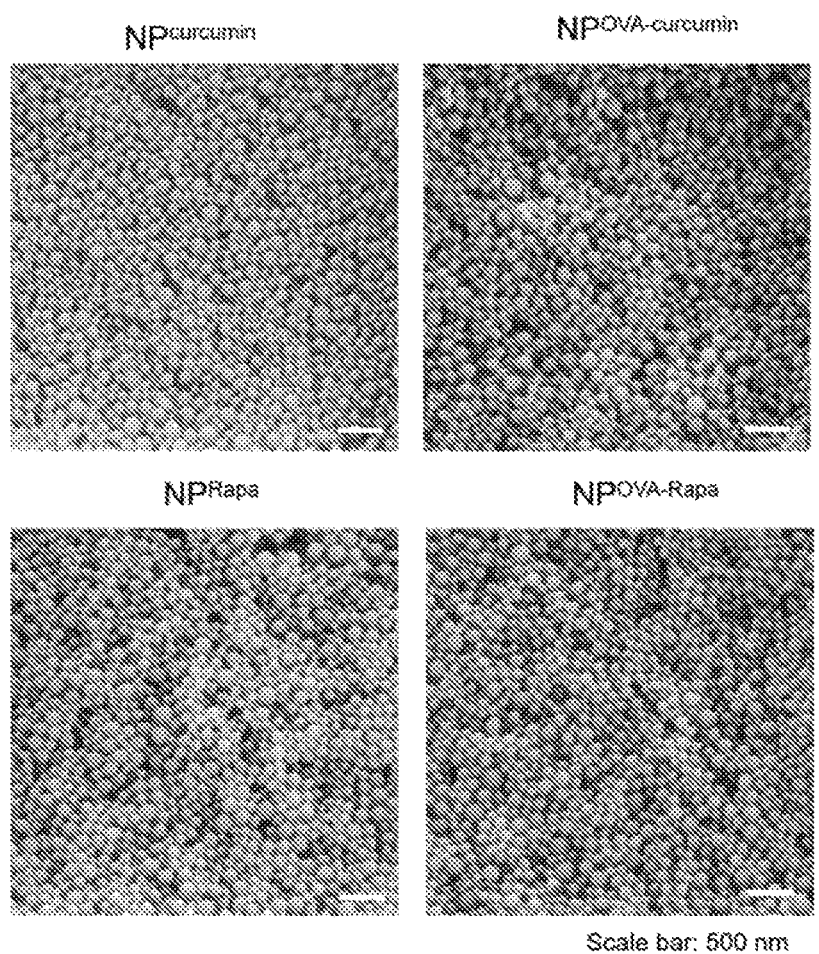
FIG. 18 shows SEM pictures to illustrate the morphology of PLGA nanoparticles prepared by encapsulation of pharmacological regulators, with or without the co-delivery of OVA. The morphology of liver-targeting particles is shown in FIG. 25.

In contrast to the synthesis of targeted particles, the TNPs incorporating the pharmaceutical agents, curcumin and rapamycin, were constructed by passive encapsulation to achieve loading capacities of ~65 μg and ~22 μg per mg particle, respectively (Table 6). These particles were constructed to deliver the pharmaceutical ingredients independently (NP$^{curcumin}$ or NP$^{Rapa}$) of the antigen or combined with OVA (50 μg/mg) in particles, designated NP$^{OVA-Curcumin}$ or NP$^{OVA-Rapa}$. All the fabrication processes were optimized to allow the creation of particles with uniform sizes ~230-250 nm and a PDI≤0.1. SEM images revealed that all the particles were roughly of similar size, spherical shape, and smooth surfaces (FIG. 18). The assessment of zeta potential showed that most particles displayed negative surface charges (around −40 mV), except for ApoB-conjugated particles, where the peptide attachment decreased the zeta potential to −4.56 mV (Table 6). Table 6 also shows the encapsulation efficacy of curcumin and or Rapa were ~38 wt % and ~32 wt %, respectively.

Figure 17C:
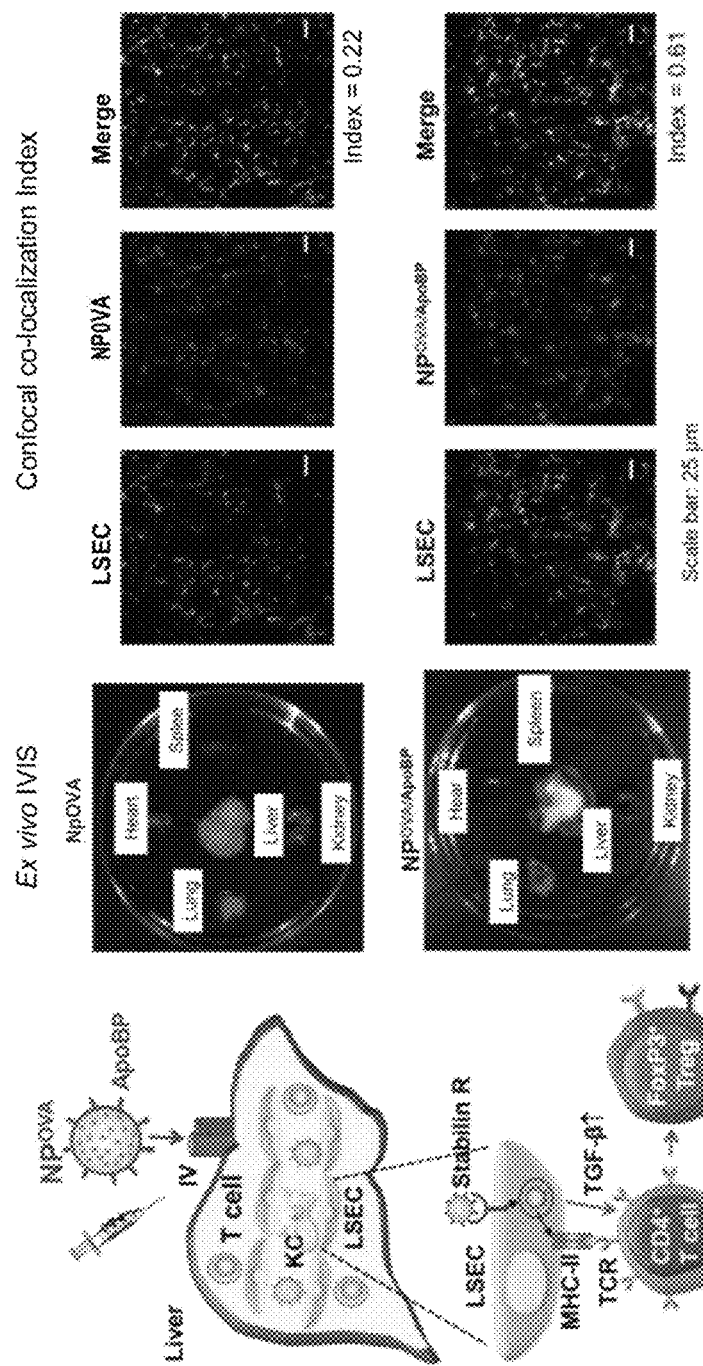
FIG. 17C) The schematic in the left panel shows the working model of liver-targeting tolerogenic nanoparticles. Particles in the size range ~200 nm and attached ApoBP ligand delivers antigen to LSECs in the liver through endocytic uptake. Antigen processing and presentation to naïve T-cells are capable of generating Foxp3$^+$ Tregs, which are recruited to the site of pathology, where they exert their immunosuppressive effects. The middle panel shows representative ex vivo IVIS images of the explanted hearts, livers, spleens, lungs, and kidneys collected from animals 24 h after injecting with 500 µg decorated or non-decorated NPs, containing 25 µg Dylight680-labeled OVA (n=6). The right panel shows confocal microscopy graphs that reflect the intrahepatic distribution of free and encapsulated OVA. The red and green fluorescence colors represent Dylight680-labeled OVA and isolectin B4 stained LSECs, respectively.

Assessment of the Biodistribution of ApoBP-Decorated Versus Non-Decorated Particles The tolerogenic particles were injected IV to deliver 25 μg OVA in 500 μg NPs per animal, before sacrifice after 24 h. Major organs such as the liver, spleen, heart, lung and kidney were harvested and mounted in a Petri dish for IVIS imaging. The particle-encapsulated OVA mainly accumulated in the liver, with lower levels in the lung and spleen; little or no distribution was observed in the kidney and heart (FIG. 17C, middle panel). The ApoBP-decorated particles were sequestered in the liver with higher abundance than non-decorated NP$^{OVA}$ (FIG. 17C, middle panel). In order to visualize the intrahepatic distribution of the labeled NPs, isolectin B4 immunostaining was used to locate LSECs in liver tissue sections. Confocal microscopy showed that, compared to DyLight-labeled NP$^{OVA}$, the co-localization of ApoBP-coated particles with isolectin-stained endothelial cells could be seen to increase (FIG. 17C, right panel). This was expressed as a co-localization index between the labeled particles and the isolectin B4-stained LSECs, demonstrating that the index value increased from 0.22 to 0.61.

The Impact of TNPs on Tolerogenic Cytokine Production in Cultured LSECs

Figure 19:
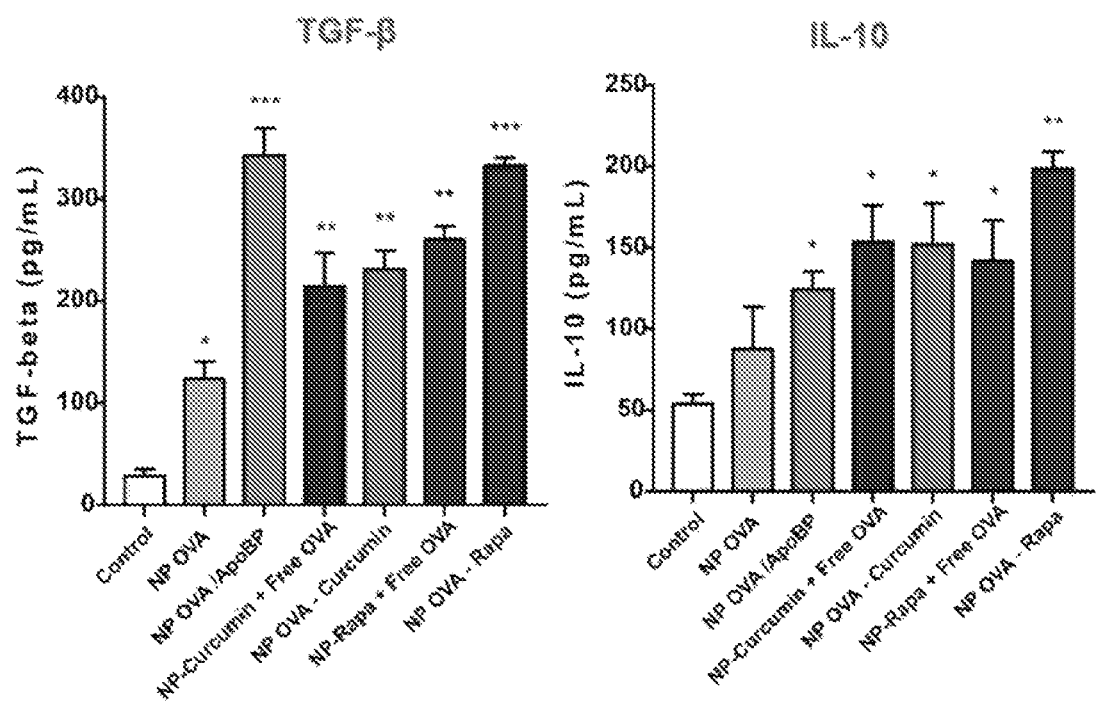
FIG. 19 shows the results of an assessment of the effect of NPs on tolerogenic TGF-β and IL-10 production in tissue culture LSECs. LSECs were treated with NPs for 24 h, before supernatant removal and assessment of the cytokine content by ELISA kits. Data are expressed as the mean±SEM (n=6). *p<0.05; p<0.01; *p<0.00 (one-way ANOVA followed by a Tukey's test).

LSECs represent a major tolerogenic antigen presenting cell subset, which occupies a large collective surface area in the liver and are capable of generating antigen-specific Tregs in vivo.[32] To assess the impact of TNPs on cytokine production in tissue culture LSECs, TGF-β and IL-10 levels in the supernatant were measured after cellular exposure to 100 μg/mL particles for 24 h. All particles triggered TGF-β production, with $NP^{OVA/ApoBP}$ and $NP^{OVA-Rapa}$ generating the most significant increases (FIG. 19). TGF-β plays an important role in Treg generation as well as execution of their tolerogenic effects at the site of pathology.[52, 53] Similarly, all nanoparticles with the exception of $NP^{OVA}$, induced a significant increase in IL-10 production. IL-10 is an important anti-inflammatory cytokine that also potentiates Treg differentiation.[54, 55] In this assay, the effect of $NP^{OVA-Rapa}$ was more robust than $NP^{OVA/ApoBP}$.

Figure 20:
FIG. 20, panels A-B, show that TNP pretreatment interferes in OVA-induced antibody responses in a murine sensitization model. Panel A) Outline of the experimental animal protocol. Six to eight week old C57/BL6 mice received IV injection of $NP^{OVA}$ to deliver 25 µg OVA in 500 µg particles per animal on days 0 and 7. The animals were subsequently sensitized with two doses of OVA (10 µg/mouse) IP on days 14 and 21, prior to being exposed to aerosolized OVA inhalation (10 mg/mL) for 20 min on days 35-37. Animals were sacrificed for tissue harvesting and collection of BALF on day 40. The treatment groups (n=6) in the experiment included: (i) a control group without NP pretreatment, sensitization or challenge; (ii) no pretreatment before sensitization and challenge, or pretreatment with: (iii) $NP^{OVA}$, (iv) $NP^{OVA/ApoBP}$, (v) $NP^{Curcumin}$+free OVA, (vi) $NP^{OVA\text{-}Curcumin}$, (vii) $NP^{Rapa}$+free OVA, (viii) $NP^{OVA\text{-}Rapa}$ before sensitization and challenge. Panel B) Serum anti-OVA IgE, IgG$_1$ and IgG$_{2a}$ antibody titers, as determined by ELISA. Data are expressed as the mean±SEM. *p<0.05; p<0.01; *p<0.00 (one-way ANOVA followed by a Tukey's test).

Differential Tolerogenic Effects of TNPs on Allergic Airway Inflammation in an OVA-Sensitization Model We have previously demonstrated that of $NP^{OVA/ApoBP}$ can be used to target LSECs in vivo, with the ability to generate Tregs, capable of suppressing allergic inflammation in the lung.[50] In order to determine how the effect of this delivery system compare with the effects of Rapa and curcumin delivering nanoparticle without ($NP^{curcumin}$, $NP^{Rapa}$) or including OVA ($NP^{OVA-curcumin}$, $NP^{OVA-Rapa}$), a prophylactic TNP administration protocol was established before proceeding with animal sensitization and challenge (FIG. 20, panel A). C57BL/6 mice received intravenous particle injection via the tail vein, using a dose of 500 μg of NPs that contain 25 μg OVA. Particles to deliver curcumin and Rapa, were injected at doses of 32 and 10 μg, respectively, in each animal. Pretreatment was performed on days 0 and 7, followed by intraperitoneal (IP) sensitization with 10 μg OVA on days 14 and 21, before inhalation challenge with 10 mg/mL aerosolized OVA (for 20 min) on days 35 to 37. Animals were sacrificed on day 40 to allow blood withdrawal and the harvesting of organs and BAL fluid for the analysis described below.

The serum was used to assess OVA-specific IgE, $IgG_1$ and $IgG_{2a}$ antibody titers. Measurement of IgE titers, as a reflection of IL-4/CD40-mediated Ig class switching in B-cells, demonstrated that while all nanoparticles decreased IgE production, the effect of ApoBP-decorated particles or particles incorporating mTOR and curcumin inhibitors were more potent than $NP^{OVA}$ (FIG. 20, panel B). $IgG_1$ levels, another hallmark of IL-4 induced TH2 immunity, were also suppressed by all nanoparticles, with the most robust effect obtained with $NP^{OVA/ApoBP}$, $NP^{OVA-Rapa}$ and $NP^{Rapa}$ (FIG. 20, panel B). In contrast, $IgG_{2a}$ levels, a marker of TH1-assisted Ig class switching, did not show any increase in response to OVA sensitization and challenge.

Figure 21:
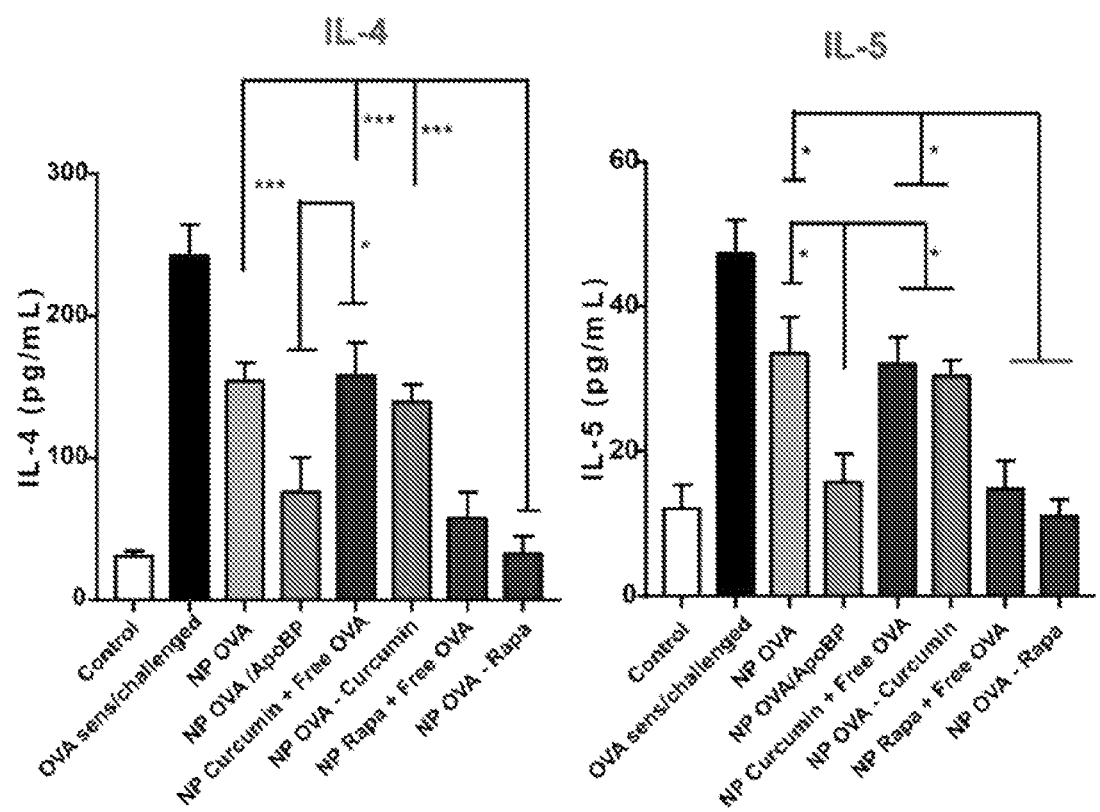
FIG. 21, panels A-C, shows the impact of TNP pretreatment on cytokine levels. Lung tissue and BALF from the experiment in FIG. 20, panel A were used for the following analysis: Panel A) TH2 cytokine (IL-4 and IL-5) levels in the BALF, determined by ELISA. Panel B) TGF-β, INF-γ and IL-10 levels in the BALF, determined by ELISA. Panel C) Differential eosinophil, neutrophil and macrophage cell counts on BALF. BAL was performed using 1 mL of PBS lavage from each animal, for cytospinning and counting on slides. Data are expressed as the mean±SEM. *p<0.05; p<0.01; *p<0.00 (one-way ANOVA followed by a Tukey's test).

The TNP treatment impact on antibody responses to OVA was also compared to the treatment impact on TH2 cytokines (IL-4, IL-5), IFN-γ (TH1 cytokine) and tolerogenic cytokines (IL-10 and TGF-β) in the lung (FIG. 21, panels A-C). This was accomplished by measuring cytokine levels in the bronchoalveolar lavage fluid (BALF) by ELISA. In addition to a role in Ig class switching, IL-4 is responsible for TH2 differentiation, expression of vascular cell adhesion molecules, eosinophil recruitment, and mucus secretion in inflamed airways.[56, 57] Prophylactic treatment with nanoparticles demonstrated a reduction of IL-4 levels by all therapies, with the best effect attributable to $NP^{OVA/ApoBP}$ and $NP^{OVA-Rapa}$ administration, i.e., a reduction from 243 to 76 and 33 μg/mL, respectively ($p<0.001$) (FIG. 21, panel A). The same trend was seen for IL-5, which plays a key role in generating eosinophilic airway inflammation (FIG. 21, panel A).[58, 59] IL-5 levels demonstrated a decrease from 47 μg/mL in untreated animals to 15, 14 and 11 μg/mL for animals treated with $NP^{OVA/ApoBP}$, $NP^{Rapa}$ plus free OVA, and $NP^{OVA-Rapa}$, respectively. As expected, there was no change in IFN-γ production (FIG. 21, panel A), which agrees with the $IgG_{2a}$ results. In contrast to decreased production of TH2 cytokines, there was a steep increase in TGF-β production in the BALF in response to TNP injection, with the highest release levels occurring in animals treated with $NP^{OVA-Rapa}$, $NP^{OVA-Rapa}$, $NP^{Rapa}$ plus free OVA and $NP^{OVA/ApoBP}$ (FIG. 21, panel B). In this regard, the response to the Rapa-delivering particles was higher ($p<0.05$) than the response to $NP^{OVA/ApoBP}$. In spite of obtaining an in vitro IL-10 response for TNP-exposed LSECs, prophylactic treatment with the particles had minimal effects on IL-10 release in the BALF (FIG. 21, panel B).

Differential cell counting of the BALF demonstrated robust eosinophil recruitment to the lung in response to OVA sensitization and challenge. This amounted to a total of 7,450,000 eosinophils appearing in the BALF from each animal FIG. 21, panel C). While pretreatment with most NPs could be seen to reduce the eosinophil counts, $NP^{OVA/ApoBP}$, $NP^{OVA-Rapa}$ and $NP^{Rapa}$ plus free OVA, exhibited the strongest inhibitory effects (FIG. 21, panel B). Again, the already significant response to $NP^{OVA-Rapa}$ was exceeded by the response to $NP^{OVA/ApoBP}$ ($p<0.05$). Roughly similar trends were seen for the impact on neutrophil and macrophage recruitment, with a tendency for $NP^{OVA-Rapa}$ to be slightly more effective than $NP^{OVA/ApoBP}$, although not statistically significant.

Figure 22:
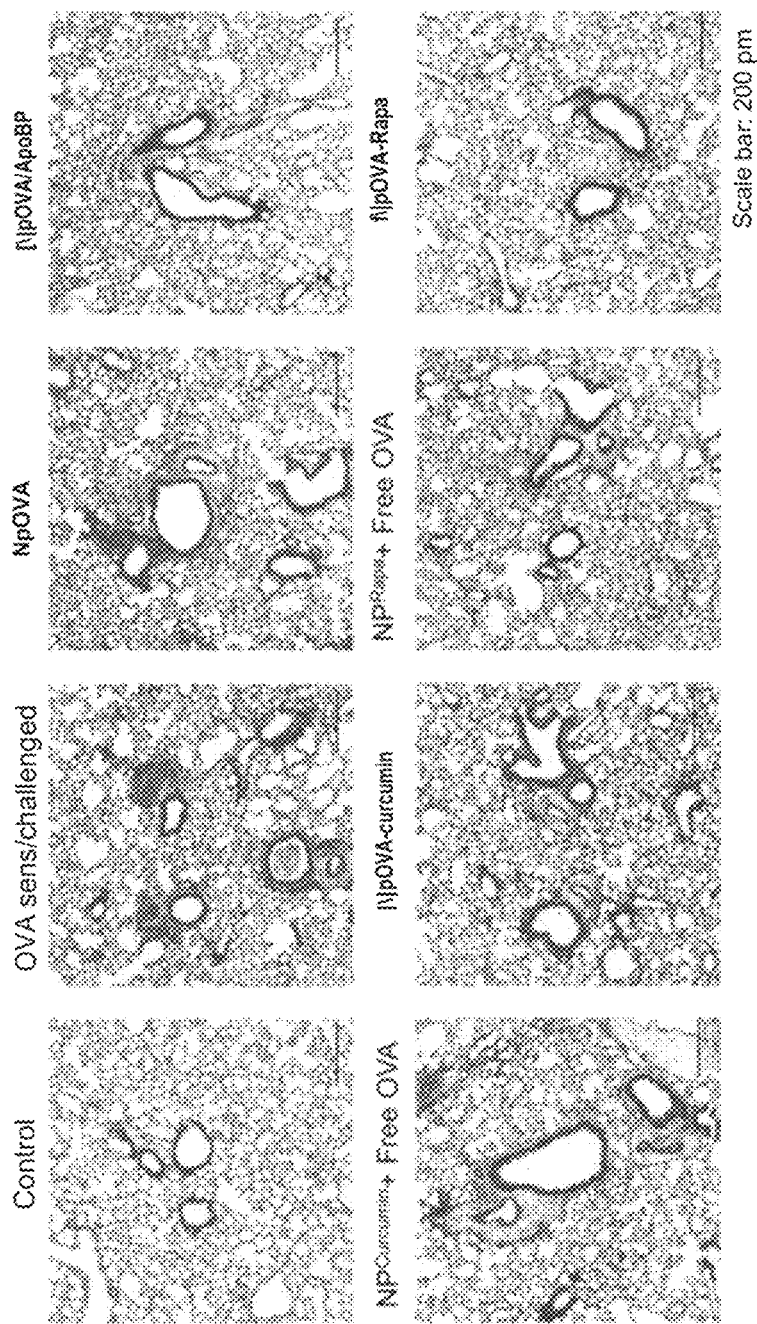
FIG. 22, panels A-C, illustrates histological results showing that TNP pretreatment reduces allergic airway inflammation in the experiment described in FIG. 20, panel A. Panel A) Representative lung tissue sections for formalin fixing and H&E staining. The scale bars represent 200 µm. Panel B) Foxp3$^+$ T-cell recruitment to the lung during IHC analysis of tissues from the experiment. The scale bar represents 100 µm. Image-Pro Plus 6.0 software was used to detect cell nuclei and to calculate % cells, under 10× magnification. Panel C) A total of 12 independent fields were counted for each experimental group. The histogram on the right shows the Foxp3$^+$ cell count for each group. Data are expressed as the mean±SEM. *p<0.05; p<0.01; *p<0.00 (one-way ANOVA followed by a Tukey's test).

Histological examination of the lung tissue confirmed that OVA sensitization and challenge was accompanied by significant eosinophilic lung inflammation, particularly in relation to smaller airways, alveolar ducts, alveoli and small blood vessels in the lung (FIG. 22, panel A). While some reduction in pulmonary inflammation was seen in response to all particles, treatment with $NP^{OVA/ApoBP}$ and $NP^{OVA-Rapa}$ eliminated all evidence of inflammation.

In order to determine whether Foxp3+ cells are involved in the immune tolerizing effects of the particles, immunohistochemistry (IHC) staining was performed to discern Foxp3 expression in the harvested lung tissues. This demonstrated a significant increase in the number of Foxp3+ cells in the lungs of animals treated with $NP^{OVA/ApoBP}$, $NP^{OVA-Rapa}$, and $NP^{Rapa}$ plus free OVA, compared to the untreated animals ($p<0.001$) (FIG. 22, panels B and C). Noteworthy, these cells were predominantly localized at pulmonary inflammation sites (FIG. 22, panel B). NPs loaded with curcumin also increased the number of Foxp3+ Tregs, although not as prominent as the aforementioned groups. Quantification of Treg numbers, showed that the response to $NP^{OVA-Rapa}$ was significantly higher than $NP^{OVA/ApoBP}$ (FIG. 22, panel C).

The Encapsulation of a MHC-II Binding T-Cell OVA Epitope Interferes in Allergic Airway Inflammation in an OT-II Mouse Model While treatment with nanoparticles encapsulating intact OVA was successful in alleviating allergic inflammation, an important consideration for TNP treatment in the clinic would be the avoidance of IgE binding epitopes that could trigger an anaphylactic response prior to tolerization to whole allergen. An important development in the area of allergen tolerance has been to substitute the whole allergen with immune modulatory T-cell epitopes, capable of inducing tolerogenic effects without the danger of mast cell triggering by integral IgE epitopes.[44, 60] With regards to OVA, two epitope sequences, $OVA_{257-264}$ (a.k.a. OT-I peptide) and $OVA_{323-339}$ (OT-II peptide), have been described that are recognized by the TCR ((V$\alpha$2/V$\beta$5.1$^+$) of transgenic animals in the context of MHC-I and MHC-II molecules, respectively, in OT-I and OT-II mouse models.[61-65] To determine if the transgenic TCR of the CD4$^+$ T-cells, during its interaction with $OVA_{323-339}$, presented by I-A$^b$, can support Treg generation and interfere in allergic airway inflammation, we used the same treatment regimen, as shown in FIG. 20, panel A, for experimentation in OT-II mice FIGS. 23 and 24). In this experiment, we compared the effect of NP$^{OVA/ApoBP}$ with NP$^{OT-II/ApoBP}$ and NP$^{OT-I/ApoBP}$. These nanoparticles were synthesized as described in FIG. 17, except that OT-I and OT-II peptides were used for encapsulation in particles decorated with ApoB peptide (FIG. 23, panel A). This yielded particles of ~270 nm, with were uniform size, PDI~0.1, epitope content of ~8 µg peptide per mg particle, and ApoBP coupling density of 5.3 mol % (Table 7).

TABLE 7

Characterization of tolerogenic nanoparticles encapsulating OVA and its T-cell epitopes.

| Nanoparticle | Hydrodynamic Size (nm) | PDI | Zeta Potential (mV) | OVA/ epitope content (µg/mg NPs) | ApoBP Ligand loading efficiency (%) |
|---|---|---|---|---|---|
| NP$^{OVA/ApoBP}$ | 270.8 ± 4.96 | 0.113 | −4.56 ± 2.25 | 50.12 ± 2.18 | 5.3 (mol % of PLGA) |
| NP$^{OT-II/ApoBP}$ | 273.8 ± 2.35 | 0.118 | −5.59 ± 4.29 | 8.46 ± 2.02 | |
| NP$^{OT-I/ApoBP}$ | 267.9 ± 6.07 | 0.101 | −6.39 ± 4.18 | 8.99 ± 1.49 | |

Prophylactic treatment with the particles was performed by IV injection on days 0 and 7, followed by IP OVA sensitization and inhalation challenge, prior to animal sacrifice on day 40. Assessment of OVA-specific IgE titers, demonstrated that NP$^{OVA/ApoBP}$ and NP$^{OT-II/ApoBP}$ pretreatment could significantly decrease the antibody titer, with the OT-II peptide significantly more effective (p value) than the whole protein (FIG. 23, panel A). In contrast, NP$^{OT-I/ApoBP}$ had no effect. The same trend was also seen during the assessment of OVA-specific IgG$_1$ levels (FIG. 23, panel A) as well as measuring TH2 cytokine levels (IL-4, IL-5 and IL-13) in the BALF (FIG. 23, panel B). Performance of differential cell counts also confirmed that NP$^{OT-II/ApoBP}$ could significantly suppress the eosinophil, neutrophil, and macrophages numbers in the BALF. NP$^{OVA/ApoBP}$ was equally effective as the OT-II peptide for eosinophils, but less so for neutrophils and macrophages. Assessment of TGF-β levels in the BALF, demonstrated that while NP$^{OT-II/ApoBP}$ treatment was associated with a significant increase of this tolerogenic cytokine, the response was much less robust during encapsulation OVA and comparatively weak for NP$^{OT-I/ApoBP}$ (FIG. 23, panel C). H&E staining showed severe inflammation in the untreated control and the NP$^{OT-I/ApoBP}$ group, while the lungs of animals treated with NP$^{OVA/ApoBP}$ and NP$^{OT-II/ApoBP}$ were essentially devoid of eosinophilic inflammation (FIG. 24, panel A). Moreover, IHC staining for Foxp3$^+$ showed significant increases for all the particles, with NP$^{OT-I/ApoBP}$ inducing a very robust effect, compared to a lesser (but still highly significant) response to NP$^{OVA/ApoBP}$. The response to the encapsulated OT-I peptide was weak (FIG. 24, panel B).

DISCUSSION

In this example, two main strategies to induce antigen-specific immune tolerance were compared by fabricating LSEC-targeting TNPs and TNPs loaded with immunomodulators. For LSEC-targeting TNPs, ApoB peptide as the targeting ligand, was conjugated to PLGA nanoparticles loaded with OVA. In contrast, particle synthesis to deliver curcumin and rapamycin, with or without OVA co-encapsulation and, was undertaken without the use of a surface ligand. In vitro studies in tissue culture, LSECs showed that both particle types could enhance the production of regulatory cytokines, with NP$^{OVA/ApoBP}$ and NP$^{Rapa-OVA}$ being most effective. Animal experimentation in an OVA-induced allergic airway inflammation model showed NP$^{OVA/ApoBP}$ and NP$^{Rapa-OVA}$ were also the most effective TNPs for reducing TH2 cytokine responses (IL-4 and IL-13), eosinophil recruitment, and airway inflammation. Delivery of the Rapa-OVA cargo combination provided the best outcome. We also assessed whether the delivery of OVA-related T-cell epitopes could induce immune tolerance in an OT-II allergic airway inflammation model, which was compared to NP$^{OVA/ApoBP}$. Our data demonstrated that NP$^{OT-II/ApoBP}$ was significantly more effective in reducing the allergic airway inflammation, while concurrently increasing Foxp3$^+$ recruitment and TGF-β production in the lung.

The liver is considered as a natural tolerogenic organ based on its physiological function of filtering food and microbial antigens from the portal circulation, with a predilection for staging an anti-inflammatory innate immune response.[66] LSECs represent the major tolerogenic APC type in the liver, which represents 15-20% of all hepatic cells with a combined a surface area of ~200 m$^2$.[32] Our liver-targeting PLGA platform has been constructed to deliver OVA and OVA peptides to LSECs through surface attachment of ApoBP, which interacts with stabilin 1 and 2 scavenger receptors on the endothelial cell surface.[51] This promotes particle uptake via clathrin-coated pits, which allows antigen processing and presentation by MHC-II gene translation products.[51] This leads to the activation of CD4$^+$ T-cells, which are induced to develop into peripheral Tregs in the presence of TGF-β. In contrast, Rapa-loaded particles was also effective at generating a tolerogenic effect in the OVA-induced eosinophilic airway model, without the need for liver targeting. This effect can be ascribed to the ability of the therapeutic nanoparticles to induce antigen specific immune tolerance without the need to target specific APC subsets, or the need to incorporate the allergen in the same particle.[5, 35] For instance, Kishimoto et al. have shown that Rapa-encapsulating PLGA particles are capable of inducing durable antigen-specific immune tolerance when co-administered with encapsulated or free proteins or peptide antigens.[35] The general assumption is that the systemic biodistribution of the Rapa particles, capable of locking unspecified APC into a tolerogenic state, can lead to a therapeutically beneficial effect, irrespective of the need to define the in-body distribution of these cells. It is important to clarify, however, that our own NP$^{Rapa}$ and NP$^{Rapa-OVA}$ nanoparticles were constructed in the 230-250 nm size range, which favors biodistribution to the liver, even though they do not target LSECs specifically. We have previously demonstrated that the liver biodistribution of non-decorated NP$^{OVA}$ is capable of exerting a tolerogenic effect through sequestration by Kupffer or phagocytosing APCs, which also exhibit significant immune suppressive effects, although not as robust as LSECs.[50] This notion is corroborated by the finding that non-decorated NP$^{OVA}$ could exert significant tolerogenic effects in the current experimentation, e.g., as demonstrated in FIGS. 20-22. Thus, it is possible that the Rapa particles in the 200 nm size range, may predominantly be sequestered in liver APCs, where the role of the Rapa could be reprogramming of APC activity as well as contributing to Treg expansion.[67, 68] In this regard, Rapa has been shown to promote FoxP3 expression, as well as being able to expand the proliferation of peripheral Tregs.[67, 69] Future studies will address the possibility that LSEC-targeting of pharmaceutical nanoparticles could further enhance their tolerogenic status.

Our study compared the effect of Rapa- versus curcumin-encapsulating NPs, demonstrating that the tolerogenic effects of NP$^{Rapa}$ was considerably more efficacious NP$^{Curcumin}$. These differences can be explained as follows: (i) Rapa inhibits the mTOR pathway that controls many different aspects of innate and cognate immunity to foreign and self-antigens;[38, 40] (ii) Rapa directly promotes Treg expansion and differentiation in diseases such as rheumatic diseases;[39] (iii) Rapa interferes in the immunostimulatory effects of APCs, allowing naïve CD4$^+$ T-cells to differentiate into antigen-specific Foxp3$^+$ Tregs;[40] (iv) Rapa-encapsulating particles are capable of disrupting B-cell activation and differentiation, germinal center formation, antibody production and anaphylaxis.[37, 70, 71] Although curcumin is also capable of inducing immune tolerance as a result of broad antioxidant effects and ability to interfere in the NF-κB pathway,[72, 73] it lacks the antigen specificity and efficacy of Rapa, as demonstrated by our experimentation.

A potential shortcoming of a TNP platform that delivers whole protein allergens is the appearance of linear and conformational IgE-binding epitopes that have the potential to induce mast cell degranulation.[74, 75] This is accompanied by a safety concern that systemic release of the allergen may trigger systemic allergic effects and anaphylaxis during the tolerization phase. Thus, it is necessary to consider developing NPs that incorporate allergen sequences that promote Treg development by MHC-II epitope presentation to naïve T cells. For example, T-cell peptide vaccines developed by Circassia Pharmaceuticals, has entered a phase 3 clinical trial for cat allergy and a phase 2b trial for house dust mite allergy.[76] Another company, Aravax has shown the safety and efficacy of an intradermal vaccine for peanut allergy, comprised of a mixture of synthetic peanut protein epitopes.[77] In similar fashion, we demonstrate that the use of an MHC-II interactive, non-IgE binding OVA epitope, is capable of tolerogenic effects that are comparable or even more effective than the whole protein (FIGS. 23 and 24). In contrast, an epitope sequence presented by a MHC-I gene product (OT-I peptide) had no tolerogenic effects and was not accompanied by Treg generation or TGF-β production in the lung. The ability to develop a TNP therapy with immunomodulatory T-cell epitopes hold obvious advantages in scaling up the technology, as well as expanding the approach to autoimmune peptides for a range of autoimmune disease processes. Future anaphylaxis studies are being planned.

All considered, strategies for combining the targeting of specific APC for cognate immune cells, pharmaceutical agents, and antigenic epitopes are likely to provide synergistic response augmentation beyond what is currently being offered by the treatment platforms depicted in FIG. 17. This is exemplified by the use of nanoparticles to encapsulate immunodominant epitope of the autoantigen, MOG (amino acid residues 35-55), plus IL-10 for prophylactic and therapeutic intervention in a chronic progressive experimental allergic encephalitis model.[78] A recent study described the use of hybrid particles encapsulating TGF-β surface protein constructs such as (i) MHC-I and -II multimers, presenting myelin basic protein peptides to autoreactive T-cells; (ii) anti-Fas mAb plus a recombinant PD-L1-Fc construct for apoptosis induction in autoreactive T-cells; or (iii) CD47-Fc for inhibiting NP sequestration, prolonging in vivo half-life.[79] We envisage the construction of a number of hybrid platforms that combine LSEC targeting, pharmaceutical enhancers of APC tolerogenic activity, enhancement of Treg generation and stability of FoxP3 expression, as well as T-cell epitopes for the custom design of TNPs that can be used for a range of antigen-specific immune disorders characterized by overactive immune function.

Conclusion

In summary, we compared the effectiveness of two major types of TNPs, liver-targeting PLGA nanoparticle and nanoparticle loaded with pharmaceutical agents. In vitro cellular studies demonstrated the effective induction of regulatory and tolerogenic cytokines by LSEC-targeting and rapamycin-loaded nanoparticles at roughly equivalent levels. In animal studies, prophylactic treatment by LSEC-targeting and Rapa-encapsulating particles suppressed allergic airway inflammation by increasing Treg presence and TGF-β production in the lung. In addition, we compared the effectiveness of the LSEC-targeting particles containing T-cell epitopes and whole protein. NPs loaded with OT-II T-cell epitopes showed higher tolerogenic efficacy than NPs loaded with OVA protein in the transgenic OT-II mice model of allergic airway inflammation. All considered, strategies to combine LSEC-targeting, pharmaceutical agents (e.g., rapamycin), and T-cell epitopes may enhance tolerogenic effects for treatment of not only allergy but also autoimmune disorders.

Materials and Methods

Reagents

A poly(D,L-lactide-co-glycolide) formulation, comprised of a 50:50 mix of lactide to glycolide co-polymers in molecular weight range of 38,000-54000, inclusive of ~5 kDa PEG, was purchased from Sigma (St Louis, MO). The model antigen, ovalbumin (OVA), was bought from Sigma. OT-II peptide, i.e. OVA$^{323-339}$, with the sequence of ISQAVHAAHAEINEAGR (SEQ ID NO:5), and OT-I peptide, i.e. OVA$^{257-264}$, with the sequence SIINFEKL (SEQ ID NO:7), were purchased from InvivoGen (San Diego, CA). Analytical grade curcumin, dichloromethane, sodium cholate, 1-ethyl-3-(3-dimethylaminopropyl) carbodiimide (EDC), N-hydroxysuccinimide (NHS), and N-(2-Aminoethyl) maleimide (NAEM spacer) were obtained from Sigma. Rapamycin was purchased from LC Laboratories (Woburn, MA). The ApoB peptide RLYRKRGLK (SEQ ID NO:3) (ApoBP), along with GCC tag, was synthesized by Biomatik (Cambridge, Ontario, Canada). SV40-immortalized murine liver sinusoidal endothelial cells (LSECs), cell growth medium and flasks were purchased from Applied Biological Materials (Vancouver, Canada). The ELISA kits for the measurement of cytokines, including TGF-β, IL-10, IL-4, IL-5, and IL-13, were purchased from R&D (Minneapolis, MN). The horseradish peroxidase (HRP)-conjugated goat anti-mouse secondary antibodies for serological titration of IgG2a (A-10685) and IgE (PA1-84764) were purchased from Invitrogen (Waltham, MA). An antibody to assess IgG$_{1 \ levels}$ (ab97240) was from Abcam (Cambridge, MA). The 3,3',5,5'-tetramethylbenzidine (TMB) substrate kit was purchased from BD Biosciences (San Jose, CA).

Fabrication and Characterization of LSEC-Targeting NPs Incorporating Pharmaceutical Agents and Antigen Epitopes Pristine PLGA NPs without a surface ligand were synthesized using a double-emulsion method (w/o/w), combined with solvent evaporation, as previously described by us.[50] Another particle was synthesized by conjugating the ApoB peptide (RLYRKRGLK (SEQ ID NO:3), containing a GGC tag) to the particle surface, using a two-step reaction, that makes use of a N-(2-aminoethyl) maleimide (NAEM) spacer. Particles incorporating pharmaceutical agents were also fabricated as above, with the inclusion of synthesis parameters to optimize drug encapsulation. Briefly, 220 mg PLGA and pharmaceutical agents (2.2 mg of curcumin or rapamycin) were co-dissolved in 10 mL of DCM. 30 mg of an OVA solution (1 mL) was incrementally added into the organic solution, and then emulsified using ultrasonication for 1 min with a 4 s on/4 s off pulse at an intensity of 30% (Branson 450). The water/oil (w/o) mixture was poured into 45 mL of 1% sodium cholate solution and sonicated for 2 min, using the same parameters, and then added into 45 mL of 0.5% sodium cholate solution. The double emulsion (w/o/w) was stirred overnight for DCM evaporation. The mixture was centrifuged and washed in DI water (10,000 g, 10 min) to remove the non-encapsulated payloads, before suspension in DI water. For the epitope encapsulation, the fabrication method was adjusted slightly. Briefly, 1 mg of epitope solution (1 mL) was added into the PLGA solution (200 mg in 12 mL of DCM), and then sonicated for 40 s with a pulse of 4/4 s on/off under 30 w. The primary emulsion was poured into 30 mL of 1% cholate solution and sonicated for 2 min, using the same parameters. The sonicate was poured into 35 mL of 0.5% cholate solution and stirred overnight for DCM removal. The purification process was the same as mentioned above.

The size and surface charge of the purified NPs were characterized using dynamic light scattering. The surface morphology was visualized by scanning electron microscopy. The microBCA assay and the nanodrop method were used to detect loading capacity of OVA and its T-cell epitopes and the conjugation efficiency of the peptide ligand. Before use, the endotoxin level was measured and clarified by a chromogenic LAL assay.

Determination of NP-Induced Cytokine Production by LSECs

LSECs were exposed to nanoparticles incorporating pharmacological inhibitors for 24 h. Supernatants were collected to determine the production of tolerogenic cytokines, including TGF-β, IL-4, IL-10, through the use of ELISA (R&D).

Use of LSEC-Targeting NPs Incorporating Pharmaceutical Agents and Antigenic Peptides to Induce Epitope-Specific Tolerance in a Murine Allergic Airway Disease Model OVA sensitization and inhalation challenge was used to test the efficacy of the nanoparticles in a well-established allergic airway disease model in CB57 BL/6 mice. The sensitization involved intraperitoneal injection of 0.5 mg/kg OVA on days 14 and 21, followed by inhalation challenge using aerosolized OVA (10 mg/mL) for 20 min. OVA nebulization was performed using a Schuco 2000 nebulizer (Allied Health Care Products, St. Louis, MO) for allergen delivery at a flow rate of 6 L/min in a nebulizer cup. The effect of the NPs encapsulating OVA and pharmacological inhibitors was assessed in 6 to 8-week-old female C57/BL6 mice, while the effect of the particles loaded with T-cell epitopes was assessed in transgenic OT-II animals (Jackson Laboratory, Bar Harbor, ME). OT-II mice express a transgenic T-cell antigen receptor that, with the assistance of CD4, recognizes OVA$^{323-339}$ peptide, presented by the murine MHC-II molecule, I-A$^b$. For the pretreatment protocol, the particles were intravenously administered on days 0 and 7, before animal sensitization and allergen challenge, as described above. Animals were sacrificed on day 40, followed by collection of BALF (1 mM EDTA in PBS) and lung tissues for further histology and immunohistochemistry analysis. The animal care was based on established principles of the National Society for Medical Research (USA), with animal protocol approval by the Division of Laboratory Animals Medicine (University of California, Los Angeles).

Assessment of Differential Cell Counts in the BAL and Assessment of Cytokines

Following animal sacrifice, bronchoalveolar lavage fluid (BALF) was cytospun onto glass slides for fixing and staining with Hema3 solutions I and II (Fisher Healthcare, Waltham, MA). Differential cell counts were performed under a Fisherbrand microscope. The cell-free BAL supernatants were used for the quantification of IL-4, IL-5, TGF-β, IL-10 and IFN-γ by ELISA (R&D), as per the manufacturers' instructions.

Determination of Antigen-Specific Antibody Titers

Blood was collected at sacrifice and the mouse serum separated at 4500 g. Antigen-specific antibody titers were determined by ELISA, as previously described. Briefly, the plates were coated with OVA (2 µg per well) in citrate-buffered saline buffer (0.05 M CBS, pH 9.6) overnight at 4° C. After washing using PBST (0.01 M PBS containing 0.05% [m/v] Tween 20, pH 7.4), PBS containing 10% FBS was used to block the plates for 2 hours. 100 µL of serum, serially diluted in PBS plus 1% FBS, was added into plates for 2-hour at 37° C. 100 µL of a diluted suspension of HRP-conjugated goat anti-mouse secondary antibodies, recognizing IgE, IgG$_1$, or IgG$_{2a}$ was added to the plates for 2 hours at 37° C., before the addition of 50 µL TMB substrate for 30 min. The reaction was stopped by the addition of 50 µL sulfuric acid (2 M). The plates were read using a SpectraMax M5 microplate reader to record the optical density at a wavelength of 450 nm (OD450). Antibody titers were expressed as the highest titer dilution resulting in a doubling of OD values, compared to sera from non-treated animals.

Hematoxylin-Eosin (H&E) Staining and Immunohistochemistry (IHC) Analysis

Lung tissues were collected from sacrificed animals, before fixing in formalin and dehydration in 50% ethanol. Tissue sectioning was performed to generate 4 µm thick sections, placed on glass slides, before H&E and immunohistochemistry staining in the Translational Pathology Core Laboratory (TPCL) at UCLA, as previously described. Slides were scanned in an Aperio AT Turbo digital pathology scanner (Leica Biosystems) at 10× magnification Statistical Analysis Statistical analysis was performed on GraphPad Prism 7 software (GraphPad Software, La Jolla, CA), using one-way ANOVA or the Student t test to determine the level of significance. The results were expressed as mean±SEM of at least three independent experiments. Statistical significance thresholds were set at *p<0.05; p<0.01; *p<0.001.

REFERENCES FOR EXAMPLE 3

1. Carballido, J. M.; Santamaria, P., Taming Autoimmunity: Translating Antigen-Specific Approaches to Induce Immune Tolerance. *Journal of Experimental Medicine* 2019, 216, 247-250.

2. Serra, P.; Santamaria, P., Antigen-Specific Therapeutic Approaches for Autoimmunity. *Nature Biotechnology* 2019, 37, 238-251
3. Shakya, A. K.; Nandakumar, K. S., Antigen-Specific Tolerization and Targeted Delivery as Therapeutic Strategies for Autoimmune Diseases. *Trends in Biotechnology* 2018, 36, 686-699
4. Ben-Akiva, E.; Est Witte, S.; Meyer, R. A.; Rhodes, K. R.; Green, J. J., Polymeric Micro- and Nanoparticles for Immune Modulation. *Biomaterials Science* 2019, 7, 14-30
5. Kishimoto, T. K.; Maldonado, R. A., Nanoparticles for the Induction of Antigen-Specific Immunological Tolerance. *Frontiers in Immunology* 2018, 9
6. Pozsgay, J.; Szekanecz, Z.; Sirmay, G., Antigen-Specific Immunotherapies in Rheumatic Diseases. *Nature Reviews Rheumatology* 2017, 13, 525-537
7. Stabler, C. L.; Li, Y.; Stewart, J. M.; Keselowsky, B. G., Engineering Immunomodulatory Biomaterials for Type 1 Diabetes. *Nature Reviews Materials* 2019, 4, 429-450
8. Vickery, B. P.; Scurlock, A. M.; Jones, S. M.; Burks, A. W., Mechanisms of Immune Tolerance Relevant to Food Allergy. *Journal of Allergy and Clinical Immunology* 2011, 127, 576-584
9. Sabatos-Peyton, C. A.; Verhagen, J.; Wraith, D. C., Antigen-Specific Immunotherapy of Autoimmune and Allergic Diseases. *Current Opinion in Immunology* 2010, 22, 609-615
10. Sakaguchi, S.; Yamaguchi, T.; Nomura, T.; Ono, M., Regulatory T Cells and Immune Tolerance. *Cell* 2008, 133, 775-787
11. Bacher, P.; Scheffold, A., The Effect of Regulatory T Cells on Tolerance to Airborne Allergens and Allergen Immunotherapy. *Journal of Allergy and Clinical Immunology* 2018, 142, 1697-1709
12. Jonuleit, H.; Bopp, T.; Becker, C., Treg Cells as Potential Cellular Targets for Functionalized Nanoparticles in Cancer Therapy. *Nanomedicine* 2016, 11, 2699-2709
13. Serra, P.; Santamaria, P., Nanoparticle-Based Approaches to Immune Tolerance for the Treatment of Autoimmune Diseases. *European Journal of Immunology* 2018, 48, 751-756
14. Yeste, A.; Takenaka, M. C.; Mascanfroni, I. D.; Nadeau, M.; Kenison, J. E.; Patel, B.; Tukpah, A.-M.; Babon, J. A. B.; DeNicola, M.; Kent, S. C.; Pozo, D.; Quintana, F. J., Tolerogenic Nanoparticles Inhibit T Cell-Mediated Autoimmunity through Socs2. *Science Signaling* 2016, 9, ra61-ra61
15. Anderson, B.; Park, B.-J.; Verdaguer, J.; Amrani, A.; Santamaria, P., Prevalent Cd8+ T Cell Response against One Peptide/Mhc Complex in Autoimmune Diabetes. *Proceedings of the National Academy of Sciences* 1999, 96, 9311-9316
16. Groux, H.; O'Garra, A.; Bigler, M.; Rouleau, M.; Antonenko, S.; de Vries, J. E.; Roncarolo, M. G., A Cd4+ T-Cell Subset Inhibits Antigen-Specific T-Cell Responses and Prevents Colitis. *Nature* 1997, 389, 737-742
17. Lieberman, S. M.; Evans, A. M.; Han, B.; Takaki, T.; Vinnitskaya, Y.; Caldwell, J. A.; Serreze, D. V.; Shabanowitz, J.; Hunt, D. F.; Nathenson, S. G.; Santamaria, P.; DiLorenzo, T. P., Identification of the B Cell Antigen Targeted by a Prevalent Population of Pathogenic Cd8+ T Cells in Autoimmune Diabetes. *Proceedings of the National Academy of Sciences* 2003, 100, 8384-8388
18. Duong, B. H.; Tian, H.; Ota, T.; Completo, G.; Han, S.; Vela, J. L.; Ota, M.; Kubitz, M.; Bovin, N.; Paulson, J. C.; Nemazee, D., Decoration of T-Independent Antigen with Ligands for Cd22 and Siglec-G Can Suppress Immunity and Induce B Cell Tolerance in vivo. *Journal of Experimental Medicine* 2009, 207, 173-187
19. Macauley, M. S.; Paulson, J. C., Siglecs Induce Tolerance to Cell Surface Antigens by Bim-Dependent Deletion of the Antigen-Reactive B Cells. *The Journal of Immunology* 2014, 193, 4312-4321
20. Macauley, M. S.; Pfrengle, F.; Rademacher, C.; Nycholat, C. M.; Gale, A. J.; von Drygalski, A.; Paulson, J. C., Antigenic Liposomes Displaying Cd22 Ligands Induce Antigen-Specific B Cell Apoptosis. *The Journal of Clinical Investigation* 2013, 123, 3074-3083
21. Sojka, D. K.; Huang, Y.-H.; Fowell, D. J., Mechanisms of Regulatory T-Cell Suppression—a Diverse Arsenal for a Moving Target. *Immunology* 2008, 124, 13-22
22. Corthay, A., How Do Regulatory T Cells Work? *Scandinavian Journal of Immunology* 2009, 70, 326-336
23. Clemente-Casares, X.; Blanco, J.; Ambalavanan, P.; Yamanouchi, J.; Singha, S.; Fandos, C.; Tsai, S.; Wang, J.; Garabatos, N.; Izquierdo, C.; Agrawal, S.; Keough, M. B.; Yong, V. W.; James, E.; Moore, A.; Yang, Y.; Stratmann, T.; Serra, P.; Santamaria, P., Expanding Antigen-Specific Regulatory Networks to Treat Autoimmunity. *Nature* 2016, 530, 434-440
24. Tsai, S.; Shameli, A.; Yamanouchi, J.; Clemente-Casares, X.; Wang, J.; Serra, P.; Yang, Y.; Medarova, Z.; Moore, A.; Santamaria, P., Reversal of Autoimmunity by Boosting Memory-Like Autoregulatory T Cells. *Immunity* 2010, 32, 568-580
25. Kuo, R.; Saito, E.; Miller, S. D.; Shea, L. D., Peptide-Conjugated Nanoparticles Reduce Positive Co-Stimulatory Expression and T Cell Activity to Induce Tolerance. *Molecular Therapy* 2017, 25, 1676-1685
26. Schneider, J. L.; Balu-Iyer, S. V., Phosphatidylserine Converts Immunogenic Recombinant Human Acid Alpha-Glucosidase to a Tolerogenic Form in a Mouse Model of Pompe Disease. *Journal of Pharmaceutical Sciences* 2016, 105, 3097-3104
27. Carambia, A.; Freund, B.; Schwinge, D.; Bruns, O. T.; Salmen, S. C.; Ittrich, H.; Reimer, R.; Heine, M.; Huber, S.; Waurisch, C.; Eychmuller, A.; Wraith, D. C.; Kom, T.; Nielsen, P.; Weller, H.; Schramm, C.; Luth, S.; Lohse, A. W.; Heeren, J.; Herkel, J., Nanoparticle-Based Autoantigen Delivery to Treg-Inducing Liver Sinusoidal Endothelial Cells Enables Control of Autoimmunity in Mice. *Journal of Hepatology* 2015, 62, 1349-1356
28. Yeste, A.; Nadeau, M.; Burns, E. J.; Weiner, H. L.; Quintana, F. J., Nanoparticle-Mediated Codelivery of Myelin Antigen and a Tolerogenic Small Molecule Suppresses Experimental Autoimmune Encephalomyelitis. *Proceedings of the National Academy of Sciences* 2012, 109, 11270-11275
29. Shen, C.; He, Y.; Cheng, K.; Zhang, D.; Miao, S.; Zhang, A.; Meng, F.; Miao, F.; Zhang, J., Killer Artificial Antigen-Presenting Cells Deplete Alloantigen-Specific T Cells in a Murine Model of Alloskin Transplantation. *Immunology Letters* 2011, 138, 144-155
30. Tiegs, G.; Lohse, A. W., Immune Tolerance: What Is Unique About the Liver. *Journal of Autoimmunity* 2010, 34, 1-6
31. Doherty, D. G., Immunity, Tolerance and Autoimmunity in the Liver: A Comprehensive Review. *Journal of Autoimmunity* 2016, 66, 60-75
32. Knolle, P. A.; Wohlleber, D., Immunological Functions of Liver Sinusoidal Endothelial Cells. *Cellular & Molecular Immunology* 2016, 13, 347-353

33. Crispe, I. N., Liver Antigen-Presenting Cells. *Journal of Hepatology* 2011, 54, 357-365

34. Capini, C.; Jaturanpinyo, M.; Chang, H—I.; Mutalik, S.; McNally, A.; Street, S.; Steptoe, R.; O'Sullivan, B.; Davies, N.; Thomas, R., Antigen-Specific Suppression of Inflammatory Arthritis Using Liposomes. *The Journal of Immunology* 2009, 182, 3556-3565

35. Maldonado, R. A.; LaMothe, R. A.; Ferrari, J. D.; Zhang, A.-H.; Rossi, R. J.; Kolte, P. N.; Griset, A. P.; O'Neil, C.; Altreuter, D. H.; Browning, E.; Johnston, L.; Farokhzad, O. C.; Langer, R.; Scott, D. W.; von Andrian, U. H.; Kishimoto, T. K., Polymeric Synthetic Nanoparticles for the Induction of Antigen-Specific Immunological Tolerance. *Proceedings of the National Academy of Sciences* 2015, 112, E156-E165

36. LaMothe, R. A.; Kolte, P. N.; Vo, T.; Ferrari, J. D.; Gelsinger, T. C.; Wong, J.; Chan, V. T.; Ahmed, S.; Srinivasan, A.; Deitemeyer, P.; Maldonado, R. A.; Kishimoto, T. K., Tolerogenic Nanoparticles Induce Antigen-Specific Regulatory T Cells and Provide Therapeutic Efficacy and Transferrable Tolerance against Experimental Autoimmune Encephalomyelitis. *Frontiers in Immunology* 2018, 9

37. Zhang, A.-H.; Rossi, R. J.; Yoon, J.; Wang, H.; Scott, D. W., Tolerogenic Nanoparticles to Induce Immunologic Tolerance: Prevention and Reversal of Fviii Inhibitor Formation. *Cellular Immunology* 2016, 301, 74-81

38. Thomson, A. W.; Turnquist, H. R.; Raimondi, G., Immunoregulatory Functions of Mtor Inhibition. *Nature Reviews Immunology* 2009, 9, 324-337

39. Perl, A., Activation of Mtor (Mechanistic Target of Rapamycin) in Rheumatic Diseases. *Nature Reviews Rheumatology* 2016, 12, 169-182

40. Turnquist, H. R.; Raimondi, G.; Zahorchak, A. F.; Fischer, R. T.; Wang, Z.; Thomson, A. W., Rapamycin-Conditioned Dendritic Cells Are Poor Stimulators of Allogeneic Cd4<Sup>+</Sup> T Cells, but Enrich for Antigen-Specific Foxp3<Sup>+</Sup> T Regulatory Cells and Promote Organ Transplant Tolerance. *The Journal of Immunology* 2007, 178, 7018-7031

41. Kim, G.-Y.; Kim, K.-H.; Lee, S.-H.; Yoon, M.-S.; Lee, H.-J.; Moon, D.-O.; Lee, C.-M.; Ahn, S.-C.; Park, Y. C.; Park, Y.-M., Curcumin Inhibits Immunostimulatory Function of Dendritic Cells: Mapks and Translocation of Nf-Kb as Potential Targets. *The Journal of Immunology* 2005, 174, 8116-8124

42. Olivera, A.; Moore, T. W.; Hu, F.; Brown, A. P.; Sun, A.; Liotta, D. C.; Snyder, J. P.; Yoon, Y.; Shim, H.; Marcus, A. I.; Miller, A. H.; Pace, T. W. W., Inhibition of the Nf-Kb Signaling Pathway by the Curcumin Analog, 3,5-Bis(2-Pyridinylmethylidene)-4-Piperidone (Ef31): Anti-Inflammatory and Anti-Cancer Properties. *International Immunopharmacology* 2012, 12, 368-377

43. Prickett, S. R.; Rolland, J. M.; O'Hehir, R. E., Immunoregulatory T Cell Epitope Peptides: The New Frontier in Allergy Therapy. *Clinical & Experimental Allergy* 2015, 45, 1015-1026

44. O'Hehir, R. E.; Prickett, S. R.; Rolland, J. M., T Cell Epitope Peptide Therapy for Allergic Diseases. *Current Allergy and Asthma Reports* 2016, 16, 14

45. Akdis, C. A.; Blaser, K., Bypassing Ige and Targeting T Cells for Specific Immunotherapy of Allergy. *Trends in Immunology* 2001, 22, 175-178

46. Pentier, J.; Sewell, A.; Miles, J., Advances in T-Cell Epitope Engineering. *Frontiers in Immunology* 2013, 4

47. Hafner, R. P.; Salapatek, A.; Patel, D.; Larché, M.; Laidler, P., Validation of Peptide Immunotherapy as a New Approach in the Treatment of Allergic Rhinoconjunctivitis: The Clinical Benefits of Treatment with Amb a 1 Derived T Cell Epitopes. *Journal of Allergy and Clinical Immunology* 2012, 129, AB368

48. Couroux, P.; Patel, D.; Armstrong, K.; Larché, M.; Hafner, R. P., Fel D 1-Derived Synthetic Peptide Immuno-Regulatory Epitopes Show a Long-Term Treatment Effect in Cat Allergic Subjects. *Clinical & Experimental Allergy* 2015, 45, 974-981

49. Wen, H.; Jung, H.; Li, X., Drug Delivery Approaches in Addressing Clinical Pharmacology-Related Issues: Opportunities and Challenges. *The AAPS Journal* 2015, 17, 1327-1340

50. Liu, Q.; Wang, X.; Liu, X.; Kumar, S.; Gochman, G.; Ji, Y.; Liao, Y.-P.; Chang, C. H.; Situ, W.; Lu, J.; Jiang, J.; Mei, K.-C.; Meng, H.; Xia, T.; Nel, A. E., Use of Polymeric Nanoparticle Platform Targeting the Liver to Induce Treg-Mediated Antigen-Specific Immune Tolerance in a Pulmonary Allergen Sensitization Model. *ACS Nano* 2019, 13, 4778-4794

51. Sorensen, K. K.; Simon-Santamaria, J.; McCuskey, R. S.; Smedsrod, B., Liver Sinusoidal Endothelial Cells. *Comprehensive Physiology* 2015, 5, 1751-1774

52. Wan, Y. Y.; Flavell, R. A., 'Yin-Yang' Functions of Transforming Growth Factor-Beta and T Regulatory Cells in Immune Regulation. *Immunol Rev* 2007, 220, 199-213

53. Letterio, J. J.; Roberts, A. B., Regulation of Immune Responses by Tgf-*Beta*. *Annu Rev Immunol* 1998, 16, 137-161

54. Ng, T. H. S.; Britton, G.; Hill, E.; Verhagen, J.; Burton, B.; Wraith, D., Regulation of Adaptive Immunity; the Role of Interleukin-10. *Frontiers in Immunology* 2013, 4

55. Couper, K. N.; Blount, D. G.; Riley, E. M., Il-10: The Master Regulator of Immunity to Infection. *The Journal of Immunology* 2008, 180, 5771-5777

56. Swain, S. L.; Weinberg, A. D.; English, M.; Huston, G., Il-4 Directs the Development of Th2-Like Helper Effectors. *Journal of Immunology* (Baltimore, Md.: 1950) 1990, 145, 3796-3806

57. Seder, R. A.; Paul, W. E.; Davis, M. M.; Fazekas de St Groth, B., The Presence of Interleukin 4 During in vitro Priming Determines the Lymphokine-Producing Potential of Cd4+ T Cells from T Cell Receptor Transgenic Mice. *The Journal of experimental medicine* 1992, 176, 1091-1098

58. Kouro, T.; Takatsu, K., Il-5- and Eosinophil-Mediated Inflammation: From Discovery to Therapy. *International Immunology* 2009, 21, 1303-1309

59. Huston, D. P.; Huston, M. M.; Dickason, R. R.; Martinez-Moczygemba, M., Interleukin-5, a Therapeutic Target in Allergic Inflammation. *Transactions of the American Clinical and Climatological Association* 2000, 111, 46-59; discussion 59-60

60. Akdis, M.; Akdis, C. A., Therapeutic Manipulation of Immune Tolerance in Allergic Disease. *Nature Reviews Drug Discovery* 2009, 8, 645-660

61. Rotzschke, O.; Falk, K.; Stevanović, S.; Jung, G.; Walden, P.; Rammensee, H. G., Exact Prediction of a Natural T Cell Epitope. *Eur J Immunol* 1991, 21, 2891-2894

62. McFarland, B. J.; Sant, A. J.; Lybrand, T. P.; Beeson, C., Ovalbumin(323-339) Peptide Binds to the Major Histocompatibility Complex Class Ii I-a(D) Protein Using Two Functionally Distinct Registers. *Biochemistry* 1999, 38, 16663-16670

63. Johnsen, G.; Elsayed, S., Antigenic and Allergenic Determinants of Ovalbumin—Iii. Mhc Ia-Binding Pep- 64. Bamden, M. J.; Allison, J.; Heath, W. R.; Carbone, F. R., Defective Ter Expression in Transgenic Mice Constructed Using Cdna-Based Alpha- and Beta-Chain Genes under the Control of Heterologous Regulatory Elements. *Immunology and cell biology* 1998, 76, 34-40
65. Hogquist, K. A.; Jameson, S. C.; Heath, W. R.; Howard, J. L.; Bevan, M. J.; Carbone, F. R., T Cell Receptor Antagonist Peptides Induce Positive Selection. *Cell* 1994, 76, 17-27
66. Horst, A. K.; Neumann, K.; Diehl, L.; Tiegs, G., Modulation of Liver Tolerance by Conventional and Nonconventional Antigen-Presenting Cells and Regulatory Immune Cells. *Cellular & molecular immunology* 2016, 13, 277-292
67. Chapman, N. M.; Chi, H., Mtor Signaling, Tregs and Immune Modulation. *Immunotherapy* 2014, 6, 1295-1311
68. Furukawa, A.; Wisel, S. A.; Tang, Q., Impact of Immune-Modulatory Drugs on Regulatory T Cell. *Transplantation* 2016, 100, 2288-2300
69. Battaglia, M.; Stabilini, A.; Migliavacca, B.; Horejs-Hoeck, J.; Kaupper, T.; Roncarolo, M.-G., Rapamycin Promotes Expansion of Functional Cd4<Sup>+</Sup>Cd25<Sup>+</Sup>Foxp3<Sup>+</Sup> Regulatory T Cells of Both Healthy Subjects and Type 1 Diabetic Patients. *The Journal of Immunology* 2006, 177, 8338-8347
70. Meliani, A.; Boisgerault, F.; Ronzitti, G.; Collaud, F.; Leborgne, C.; Kishimoto, T. K.; Mingozzi, F., 77. Antigen-Specific Modulation of Capsid Immunogenicity with Tolerogenic Nanoparticles Results in Successful Aav Vector Readministration. *Molecular Therapy* 2016, 24, S34
71. Mazor, R.; King, E. M.; Onda, M.; Cuburu, N.; Addissie, S.; Crown, D.; Liu, X.-F.; Kishimoto, T. K.; Pastan, I., Tolerogenic Nanoparticles Restore the Antitumor Activity of Recombinant Immunotoxins by Mitigating Immunogenicity. *Proceedings of the National Academy of Sciences* 2018, 115, E733-E742
72. Catanzaro, M.; Corsini, E.; Rosini, M.; Racchi, M.; Lanni, C., Immunomodulators Inspired by Nature: A Review on Curcumin and Echinacea. *Molecules* 2018, 23, 2778
73. Panda, A. K.; Chakraborty, D.; Sarkar, I.; Khan, T.; Sa, G., New Insights into Therapeutic Activity and Anticancer Properties of Curcumin. *J Exp Pharmacol* 2017, 9, 31-45
74. Galli, S. J.; Tsai, M., Ige and Mast Cells in Allergic Disease. *Nat Med* 2012, 18, 693-704
75. Handlogten, M. W.; Kiziltepe, T.; Serezani, A. P.; Kaplan, M. H.; Bilgicer, B., Inhibition of Weak-Affinity Epitope-Ige Interactions Prevents Mast Cell Degranulation. *Nat Chem Biol* 2013, 9, 789-795
76. Pfaar, O.; Bonini, S.; Cardona, V.; Demoly, P.; Jakob, T.; Jutel, M.; Kleine-Tebbe, J.; Klimek, L.; Klysner, S.; Kopp, M. V.; Kuna, P.; Larché, M.; Muraro, A.; Schmidt-Weber, C. B.; Shamji, M. H.; Simonsen, K.; Somoza, C.; Valovirta, E.; Zieglmayer, P.; Zuberbier, T.; Wahn, U.; group, t. F., Perspectives in Allergen Immunotherapy: 2017 and Beyond. *Allergy* 2018, 73, 5-23
77. Hoffmann, H. J.; Valovirta, E.; Pfaar, O.; Moingeon, P.; Schmid, J. M.; Skaarup, S. H.; Cardell, L.-O.; Simonsen, K.; Larché, M.; Durham, S. R.; Sorensen, P., Novel Approaches and Perspectives in Allergen Immunotherapy. *Allergy* 2017, 72, 1022-1034
78. Cappellano, G.; Woldetsadik, A. D.; Orilieri, E.; Shivakumar, Y.; Rizzi, M.; Carniato, F.; Gigliotti, C. L.; Boggio, E.; Clemente, N.; Comi, C.; Dianzani, C.; Boldorini, R.; Chiocchetti, A.; Renò, F.; Dianzani, U., Subcutaneous Inverse Vaccination with Plga Particles Loaded with a Mog Peptide and Il-10 Decreases the Severity of Experimental Autoimmune Encephalomyelitis. *Vaccine* 2014, 32, 5681-5689
79. Pei, W.; Wan, X.; Shahzad, K. A.; Zhang, L.; Song, S.; Jin, X.; Wang, L.; Zhao, C.; Shen, C., Direct Modulation of Myelin-Autoreactive Cd4(+) and Cd8(+) T Cells in Eae Mice by a Tolerogenic Nanoparticle Co-Carrying Myelin Peptide-Loaded Major Histocompatibility Complexes, Cd47 and Multiple Regulatory Molecules. *Int J Nanomedicine* 2018, 13, 3731-3750.

Example 4

Use of LSEC-Targeting NPs for Antigen-Specific Tolerance in a Murine Anaphylaxis Model We made use of an adjuvant-free OVA anaphylaxis model as described by Galli et al. Six to eight week old C57BL/6 mice received IV particle injections to deliver 25 µg OVA or 4 µg of either the OT-II or OT-I epitopes, delivered at a particle dose of 500 µg to each animal on weeks 0 and 1. The animals were subsequently sensitized by six doses of OVA (10 µg/mouse) IP on weeks 2, 3, 4, 5, 6 and 7, prior to exposure to OVA challenge by IP injection (500 µg/mouse) on week 9 (Galli paper). Animals were subsequently monitored to assess the anaphylaxis score (FIG. 9A). Two days after challenge, mice were sacrificed for tissue harvesting and collection of peritoneal lavage fluid. The treatment groups (n=6) in the experiment included: (i) a control group without NP pretreatment, sensitization or challenge; (ii) no pretreatment before sensitization and challenge; pretreatment with (iii) $NP^{OVA/ApoBP}$, (iv) $NP^{OT-II/ApoBP}$, (v) $NP^{OT-I}/ApoBP$ before sensitization and challenge. After challenge, anaphylaxis scores and body temperatures were monitored by three independent people. The scoring criteria were: 0=no symptoms; 1=scratching and rubbing of the nose and head; 2=puffiness around the eyes and mouth, diarrhea, pilar erecti, reduced activity, and/or decreased activity with increased respiratory rate; 3=wheezing, labored respiration, and cyanosis around the mouth and the tail; 4=no activity after prodding or tremor and convulsion; 5=death. The peritoneal inflammation and serum collection were performed two days after challenge.

Determination of Antigen-Specific Antibody Titers and Mouse Mast Cell Protease-1 (mMCPT-1) Levels in Serum Blood was collected at sacrifice and the mouse serum separated at 4500 g, 5 min. Antigen-specific antibody titers were determined by ELISA, as previously described. Briefly, the plates were coated with OVA (2 µg per well) in citrate-buffered saline buffer (0.05 M CBS, pH 9.6) overnight at 4° C. After washing using PBST (0.01 M PBS containing 0.05% [m/v] Tween 20, pH 7.4), PBS containing 10% FBS was used to block the plates for 2 hours. 100 µL of serum, serially diluted in PBS plus 1% FBS, was added into plates for 2-hour at 37° C. 100 µL of a diluted suspension of HRP-conjugated goat anti-mouse secondary antibodies, recognizing IgE, IgG1, or $IgG_{2a}$ was added to the plates for 2 hours at 37° C., before the addition of 50 µL TMB substrate for 30 min. The reaction was stopped by the addition of 50 µL sulfuric acid (2 M). The plates were read using a SpectraMax M5 microplate reader to record the optical density at a wavelength of 450 nm (OD450). Antibody titers were expressed as the highest dilution (titer) resulting in a doubling of OD values, compared to sera from non-treated animals. Levels of mMCPT-1 in serum were measured with an mMCPT-1 enzyme-linked immunosorbent assay kit, following the manufacturer's instructions.
Results:
TNP Encapsulation of OVA and the OT-IT Epitope Confers Protective Effects in a Murine Anaphylaxis Model In order to study a disease model that is more relevant to a systemic allergic event in humans, we also investigated the tolerogenic effects of the NPs on an adjuvant-free OVA sensitization model, where OVA challenge leads to mast cell release and anaphylaxis. This protocol involves intraperitoneal OVA sensitization once a week for 6 weeks, followed by intraperitoneal OVA challenge two weeks after the last sensitization. The ApoBP-conjugated TNPs containing encapsulated OVA or T-cell epitopes were IV injected prior to sensitization on two occasions, one week apart (FIG. 28, panel A). Challenged mice, without pretreatment, developed robust anaphylactic manifestations within 30 min, maintaining an anaphylaxis score of 3 for 60 min, before a return to baseline by 120 min (FIG. 28, panel B). This response was also accompanied by hypothermia. However, animals receiving $NP^{OT-II/ApoBP}$ and $NP^{OVA/ApoBP}$ showed little or no manifestations, such as scratching or rubbing the nose and head, facial puffiness, pilar erecti, increased respiratory rate, labored respiration and cyanosis (FIG. 28, panel B). We also assessed the levels of mouse mast cell protease-1 (mMCPT-1) release to the serum as determined by a commercially available ELISA kit (FIG. 28, panel C). This showed a significant increase in sensitized and exposed animals, with significant response reduction in animals treated with $NP^{OT-II/ApoBP}$ and $NP^{OVA/ApoBP}$. Although there was some response reduction in mice receiving $NP^{OT-I/ApoBP}$, the magnitude of the effect was significantly less than OVA or OT-II delivery. Consistent with Dr. Galli's adjuvant-free model, we did not observe a significant increase in OVA-specific IgE levels (FIG. 28, panel D). Instead, OVA-specific IgG, IgG1 and IgG2b levels were elevated by the allergen sensitization and challenge (FIG. 1D). $NP^{OT-II/ApoBP}$ and $NP^{OVA/ApoBP}$ significantly reduced IgG ($p<0.05$) and IgG1 ($p<0.01$) levels, while $NP^{OT-I/ApoBP}$ reduced the IgG2b titer, similar to $NP^{OT-II/ApoBP}$ ($p<0.05$) (FIG. 1D). In humans, and immediate hypersensitivity response can also be followed by a delayed inflammatory reaction, which was assessed in the mice by obtaining peritoneal lavage fluid that was analyzed for IL-4, IL-5, and TGF-β levels. This demonstrated a reduction of IL-4 and IL-5 production in response to $NP^{OT-II/ApoBP}$ and $NP^{OVA/ApoBP}$ pretreatment, which differed significantly from a lesser response by $NP^{OT-I/ApoBP}$ (FIG. 28, panel E). In addition, we also observed significant increases in TGF-β levels in animals treated with $NP^{OT-II/ApoBP}$ and $NP^{OVA/ApoBP}$ compared to treatment with other groups (FIG. 28, panel E). The lesser responses to the OT-I peptide may reflect an unexplained contribution of an immune response mediated by MHC-I then the peritoneal sensitization model. All considered, these data also show a robust tolerogenic effect of OVA and OT-II delivery by the conjugated TNP platform.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A tolerogenic nanoparticle comprising:
a nanoparticle comprising a biocompatible polymer;
an antigen encapsulated within or attached to said biocompatible polymer where said antigen comprises an antigen to which immune tolerance is to be induced by administration of said tolerogenic nanoparticle to a mammal; and
a first targeting moiety that binds to a mannose receptor in the liver and/or a second targeting moiety that binds to a mannose receptor in the liver, wherein said second targeting moiety is coupled to said nanoparticle through a hydroxyl terminus of said targeting moiety, wherein said hydroxyl terminus is bound to a COOH terminal group on said nanoparticle, and/or a third targeting moiety that is galactosamine, wherein said first targeting moiety and/or said second targeting moiety, and/or said third targeting moiety are attached to the surface of said nanoparticle.

2. The tolerogenic nanoparticle of claim 1, wherein said biocompatible polymer comprises one or more polymers selected from the group consisting of poly(lactic-co-glycolic acid) (PLGA), Poly(glycolic acid) (PGA), Poly(lactic acid) (PLA), Poly(caprolactone) (PCL), Poly(butylene succinate), Poly(trimethylene carbonate), Poly(p-dioxanone), Poly(butylene terephthalate), Poly(ester amide) (HYBRANE®), polyurethane, Poly[(carboxyphenoxy) propane- sebacic acid], Poly[bis(hydroxyethyl) terephthalate-ethyl orthophosphorylate/terephthaloyl chloride], Poly(B-hydroxyalkanoate), Poly(hydroxybutyrate), and Poly(hydroxybutyrate-co-hydroxyvalerate).

3. The tolerogenic nanoparticle of claim 2, wherein:
said biocompatible polymer comprises poly(lactic-co-glycolic acid) (PLGA); and/or
said biocompatible polymer comprises poly(lactic-co-glycolic acid) (PLGA) that comprises a lactide/glycolide molar ratio of about 50:50; and/or
said biocompatible polymer comprises poly(lactic-co-glycolic acid) (PLGA) where said PLGA includes a content ranging from about 8% up to about 20% of ~5 kDa PEG.

4. The tolerogenic nanoparticle of claim 1, wherein:
said nanoparticle ranges in size from about 50 nm, or from about 100 nm, or from about 200 nm up to about 450 nm, or up to about 400 nm, or up to about 350 nm, or up to about 300 nm; and/or
said nanoparticle ranges in size from about 200 nm up to about 300 nm.

5. The tolerogenic nanoparticle of claim 1, wherein:
said first binding moiety is covalently bound to said nanoparticle directly or through a linker; or
said first binding moiety is covalently bound to said nanoparticle through a linker; or
said first binding moiety is covalently bound to said nanoparticle through a linker wherein said linker comprises a maleimide linker; or
said first binding moiety is covalently bound to said nanoparticle through a linker wherein said linker comprises N-(2-aminoethyl)maleimide (NAEM).

6. The tolerogenic nanoparticle of claim 1,
wherein said second targeting moiety comprises mannan; and/or
wherein said second targeting moiety comprises a mannan having a MW ranging from about 35 to about 60 kDa.

7. The tolerogenic nanoparticle of claim 1, wherein said third binding moiety is adsorbed to said nanoparticle, or said third binding moiety is covalently bound to said nanoparticle directly or through a linker.

8. The tolerogenic nanoparticle of claim 1, wherein said an antigen is disposed on or encapsulated within said biocompatible polymer, or said antigen is attached to the surface of said nanoparticle.

9. The tolerogenic nanoparticle of claim 1, wherein:
said tolerogenic nanoparticle is effective to induce immune tolerance and/or to reduce an immune response, wherein said induction of immune tolerance is characterized by an increase in one or more markers selected from the group consisting of TGFβ, IL-10, and Foxp3.

10. The tolerogenic nanoparticle of claim 1, wherein said antigen comprises an antigen associated with an autoimmune disorder, or an epitope of said antigen.

11. The tolerogenic nanoparticle of claim 10, wherein:
said antigen comprises an antigen associated with an autoimmune disorder, wherein the autoimmune disorder is type 1 diabetes; and/or
said antigen comprises an antigen associated with an autoimmune disorder, wherein the autoimmune disorder is type 1 diabetes, wherein the antigen comprises a pancreatic cell antigen; and/or
said antigen is selected from the group consisting of insulin, proinsulin, glutamic acid decarboxylase-65 (GAD65), insulinoma-associated protein 2, heat shock protein 60, ZnT8, and islet-specific glucose-6-phosphatase catalytic subunit; and/or
said antigen comprises an antigen associated with an autoimmune disorder, wherein the autoimmune disorder is type 1 diabetes and said antigen comprises a pancreatic cell antigen that comprises or consists of an amino acid sequence from among VMNILLQYVV (SEQ ID NO:12), RMMEYGTTMV (SEQ ID NO:13), NLAQTDLATV (SEQ ID NO:14), QLARQQVHV (SEQ ID NO:15), SLSPLQAEL (SEQ ID NO:16), SLAAGVKLL (SEQ ID NO:17), VIVMLTPLV (SEQ ID NO:18), KLQVFLIVL (SEQ ID NO: 19), FLIVLSVAL (SEQ ID NO: 20), FLWSVFMLI (SEQ ID NO:21), NLFLFLFAV (SEQ ID NO:220, FLFAVGFYL (SEQ ID NO:23), YLLLRVLNI (SEQ ID NO:24), LNIDLLWS (SEQ ID NO:25), VLFGLGFAI (SEQ ID NO:26), RLLCALTSL (SEQ ID NO:27), ALWMRLLPL (SEQ ID NO:28 ), LWMRLLPLL (SEQ ID NO:29), RLLPLLALL (SEQ ID NO:30), HLCGSHLVEA (SEQ ID NO:31), HLVEALYLV (SEQ ID NO:32), ALYLVCGER (SEQ ID NO:33), LYLVCGERGF (SEQ ID NO:34), LVCGERGFF (SEQ ID NO:35), VCGERGFFYT (SEQ ID NO:36), GERGFFYT (SEQ ID NO:37), ERGFFYTPK (SEQ ID NO:38), FYTPKTRRE (SEQ ID NO:39), TPKTRREAEDL (SEQ ID NO:40), SLQPLALEG (SEQ ID NO:41), ALEGSLQKR (SEQ ID NO:42), SLQKRGIVEQ (SEQ ID NO:43), GIVEQCCTSI (SEQ ID NO:44), IVEQCCTSI (SEQ ID NO:45) and SLYQLENYC (SEQ ID NO:46).

12. The tolerogenic nanoparticle of claim 1, wherein: said nanoparticle contains a calcineurin inhibitor.

13. A pharmaceutical formulation, said formulation comprising:
a tolerogenic nanoparticle of claim 1; and
a pharmaceutically acceptable carrier.

14. A method for the treatment and/or prophylaxis of an autoimmune disorder in a mammal, said method comprising:
administering to said mammal an effective amount of a tolerogenic nanoparticle of claim 1, wherein said antigen comprises an antigen associated said autoimmune disorder, or an effective fragment of said antigen.

15. The tolerogenic nanoparticle of claim 12, wherein the calcineurin inhibitor is cyclosporine, or rapamycin (sirolimus) or an analogue thereof.

16. The tolerogenic nanoparticle of claim 15, wherein the rapamycin analogue is tacrolimus, everolimus, temsirolimus, everolimus or ridaforolimus.

\* \* \* \* \*